(12) United States Patent
Strempke et al.

(10) Patent No.: US 11,364,551 B2
(45) Date of Patent: Jun. 21, 2022

(54) SELF-ADJUSTING POCKET HOLE JIG SYSTEM

(71) Applicant: Kreg Enterprises, Inc., Huxley, IA (US)

(72) Inventors: Shelby Strempke, Kelley, IA (US); Tim Forbes, Ankeny, IA (US); Scott Schaaf, Ankeny, IA (US); Derek Steelman, Ankeny, IA (US); Kevin Shin, Phoenixville, PA (US)

(73) Assignee: KREG ENTERPRISES, INC., Huxley, IA (US)

( * ) Notice: Subject to any disclaimer, the term of this patent is extended or adjusted under 35 U.S.C. 154(b) by 109 days.

(21) Appl. No.: 16/788,440

(22) Filed: Feb. 12, 2020

(65) Prior Publication Data

US 2020/0254532 A1 Aug. 13, 2020

Related U.S. Application Data

(60) Provisional application No. 62/804,847, filed on Feb. 13, 2019.

(51) Int. Cl.
| | |
|---|---|
| *B23B 47/28* | (2006.01) |
| *B23Q 3/06* | (2006.01) |
| *B23B 49/00* | (2006.01) |

(52) U.S. Cl.
CPC .............. *B23B 47/287* (2013.01); *B23Q 3/06* (2013.01); *B23B 49/005* (2013.01); *B23B 2247/10* (2013.01); *B23B 2247/12* (2013.01); *B23B 2260/004* (2013.01)

(58) Field of Classification Search
CPC ............ B23B 2247/10; B23B 2247/12; B23B 47/287; B23B 47/28; B23B 2260/004; B23B 49/005; Y10T 408/98; B23Q 3/06
See application file for complete search history.

(56) References Cited

U.S. PATENT DOCUMENTS

| | | |
|---|---|---|
| 5,322,396 A | 6/1994 | Blacker |
| 5,676,500 A | 10/1997 | Sommerfeld |
| 5,791,835 A | 8/1998 | Chiang et al. |
| 6,254,320 B1 | 7/2001 | Weinstein et al. |
| 6,394,712 B1 | 5/2002 | Weinstein et al. |
| 6,599,064 B1 | 7/2003 | Robinson |

(Continued)

FOREIGN PATENT DOCUMENTS

| | | |
|---|---|---|
| AU | 8345001 A | 3/2002 |
| AU | 2014295887 A1 | 2/2016 |

(Continued)

*Primary Examiner* — Chwen-Wei Su

(74) *Attorney, Agent, or Firm* — Christopher A. Proskey; BrownWinick Law Firm

(57) ABSTRACT

A self-adjusting pocket hole jig system is presented having a base, an upright assembly operably connected to the base, a clamping assembly, operably connected to the upright assembly, a handle operably connected to the clamping assembly, and a drill guide assembly operably connected to the clamping assembly. The drill guide assembly is configured and arranged to move along the upright assembly between an unclamped position and a clamped position in response to movement of the handle. Movement of the handle simultaneously adjusts the height of the drill guide assembly as well as facilitates clamping of the drill guide assembly for workpieces of various thicknesses.

25 Claims, 123 Drawing Sheets

(56) References Cited

U.S. PATENT DOCUMENTS

| | | | |
|---|---|---|---|
| 6,726,411 B2 | 4/2004 | Sommerfeld et al. |
| D503,415 S | 3/2005 | Dembicks |
| 6,955,508 B1 | 10/2005 | Radcliffe |
| D528,930 S | 9/2006 | Degen |
| 7,101,123 B1 | 9/2006 | Weinstein et al. |
| 7,134,814 B1 | 11/2006 | Park |
| D567,269 S | 4/2008 | Sion |
| 7,374,373 B1 | 5/2008 | Park et al. |
| 7,484,914 B1 | 2/2009 | Weinstein et al. |
| 7,597,513 B2 | 10/2009 | Chiang |
| 7,670,089 B2 | 3/2010 | Chiang |
| 7,798,750 B2 | 9/2010 | Clark |
| 8,052,358 B2 | 11/2011 | McDaniel et al. |
| 8,083,443 B1 | 12/2011 | Circosta et al. |
| D651,885 S | 1/2012 | Banasik |
| 8,087,853 B2 | 1/2012 | Stukuls |
| 8,231,313 B2 | 7/2012 | Sommerfeld et al. |
| 8,840,345 B1 | 9/2014 | Park |
| 9,682,430 B2 | 6/2017 | Clark |
| 9,782,837 B2 | 10/2017 | Pelkey |
| D809,032 S | 1/2018 | Cummings |
| D809,578 S | 2/2018 | Cummings |
| 9,969,011 B1 | 5/2018 | Marusiak |
| 9,969,042 B2 | 5/2018 | Clark |
| 10,022,808 B2 | 7/2018 | Chang |
| 10,144,068 B1 | 12/2018 | Poole et al. |
| 10,173,269 B2 | 1/2019 | Cattaneo |
| 10,286,458 B2 | 5/2019 | Brigham |
| 10,315,295 B2 | 6/2019 | Vandenberg |
| 10,343,222 B2 | 7/2019 | Walter |
| 10,357,831 B2 | 7/2019 | Evatt et al. |
| 2003/0123941 A1 | 7/2003 | Emerson |
| 2004/0253065 A1 | 12/2004 | Davis |
| 2005/0089381 A1 | 4/2005 | Liu et al. |
| 2006/0228180 A1 | 10/2006 | Sommerfeld et al. |
| 2007/0201961 A1 | 8/2007 | Chiang |
| 2007/0280795 A1* | 12/2007 | McDaniel ............. B23B 49/005 408/115 R |
| 2007/0280797 A1 | 12/2007 | McDaniel et al. |
| 2008/0075546 A1 | 3/2008 | Lin |
| 2008/0099101 A1 | 5/2008 | Chiang |
| 2008/0187404 A1 | 8/2008 | Chiang |
| 2011/0150587 A1 | 6/2011 | Stukuls |
| 2012/0051865 A1 | 3/2012 | Liu |
| 2016/0158850 A1 | 6/2016 | Fisher |
| 2017/0087644 A1 | 3/2017 | Pelkey |
| 2018/0071835 A1 | 3/2018 | Poole et al. |
| 2018/0141133 A1 | 5/2018 | Clark |
| 2018/0185930 A1 | 7/2018 | Duginske |
| 2018/0214959 A1 | 8/2018 | Evatt et al. |
| 2018/0214960 A1 | 8/2018 | Evatt et al. |
| 2018/0290217 A1 | 10/2018 | Asimakis |
| 2018/0345385 A1 | 12/2018 | Yates et al. |
| 2019/0015903 A1 | 1/2019 | Schleicher |
| 2019/0030619 A1* | 1/2019 | Thackery .............. B23B 47/287 |
| 2019/0047058 A1 | 2/2019 | Pikarski et al. |
| 2019/0054547 A1 | 2/2019 | Pikarski et al. |
| 2019/0111499 A1* | 4/2019 | Evatt .................... B23B 47/287 |
| 2019/0126360 A1 | 5/2019 | Marra, Jr. |
| 2019/0176247 A1 | 6/2019 | Chang |
| 2019/0217402 A1 | 7/2019 | Brigham |

FOREIGN PATENT DOCUMENTS

| | | |
|---|---|---|
| AU | 2018101034 A4 | 8/2018 |
| CA | 3012668 | 1/2019 |
| DE | 102004023343 A1 | 12/2005 |
| DE | 202006005977 U1 | 8/2006 |
| DE | 60125047 T2 | 7/2007 |
| DE | 202012103274 U1 | 9/2012 |
| DE | 202017101885 U1 | 5/2017 |
| DE | 202018104374 U1 | 9/2018 |
| DE | 102004023343 | 1/2019 |
| DE | 102017115668 | 1/2019 |
| EP | 1712315 A1 | 10/2006 |
| EP | 1311364 B1 | 12/2006 |
| EP | 1595627 B1 | 4/2008 |
| EP | 2512763 A2 | 10/2012 |
| EP | 2223762 B1 | 7/2015 |
| EP | 3027364 A1 | 6/2016 |
| EP | 3391984 A1 | 10/2018 |
| EP | 3444057 | 2/2019 |
| EP | 3444058 | 2/2019 |
| EP | 3446817 | 2/2019 |
| GB | 2346573 | 8/2000 |
| GB | 2496473 A | 5/2013 |
| GB | 201806455 | 10/2018 |
| GB | 2564944 | 1/2019 |
| GB | 2567053 | 4/2019 |
| GB | 2567056 | 4/2019 |

* cited by examiner

SELF-ADJUSTING POCKET HOLE JIG SYSTEM

CROSS REFERENCE TO RELATED APPLICATIONS

This application claims priority to U.S. Provisional Application No. 62/804,847 which was filed on Feb. 13, 2019, which is fully incorporated by reference herein.

FIELD OF THE DISCLOSURE

This disclosure relates generally to jig systems for holding workpieces. More specifically and without limitation, this disclosure relates generally to improved drilling jig systems that facilitate faster and/or easier clamping of workpieces.

BACKGROUND OF THE DISCLOSURE

Pocket hole wood joinery involves joining boards by inserting a fastener at an angle through the edge of one workpiece into an adjoining workpiece, thereby joining the two workpieces together. Such joints are commonly used for face frames, cabinet boxes, leg-to-rail joinery in chairs and tables, and so forth. Drill guides or jigs are used to drill the holes through which the fasteners or pocket screws are inserted into the adjoining workpiece.

To facilitate the formation of pocket hole joinery, Applicant, Kreg Tool Company offers a line of pocket hole jigs. These pocket hole jigs are configured to clamp a workpiece in place and help guide a stepped drill bit at an angle into a workpiece thereby forming a pocket hole in the workpiece. The pocket hole formed by this process is configured to receive a screw that is used to screw two workpieces together.

Existing jigs for use forming pocket hole joinery have a variety of configurations and operate in a variety of manners. These configurations and manners of operation leave much to be desired. In addition, all of the existing pocket hole jigs available have deficiencies and therefore are not well suited for various applications, they are unnecessarily time consuming or they are unnecessarily inefficient to use.

For the reasons stated above, and for other reasons stated below which will become apparent to those skilled in the art upon reading and understanding the disclosure, there is a need in the art for a self-adjusting pocket hole jig system that improves upon the state of the art.

Thus it is an object of at least one embodiment of the disclosure is to provide a self-adjusting pocket hole jig system that improves upon the state of the art.

Another object of at least one embodiment of the disclosure is to provide a self-adjusting pocket hole jig system that is easy to use.

Yet another object of at least one embodiment of the disclosure is to provide a self-adjusting pocket hole jig system that is efficient.

Another object of at least one embodiment of the disclosure is to provide a self-adjusting pocket hole jig system that can be used with any type of workpiece.

Yet another object of at least one embodiment of the disclosure is to provide a self-adjusting pocket hole jig system that is cost effective.

Another object of at least one embodiment of the disclosure is to provide a self-adjusting pocket hole jig system that forms accurate pocket holes.

Yet another object of at least one embodiment of the disclosure is to provide a self-adjusting pocket hole jig system that is safe to use.

Another object of at least one embodiment of the disclosure is to provide a self-adjusting pocket hole jig system that has a durable design.

Yet another object of at least one embodiment of the disclosure is to provide a self-adjusting pocket hole jig system that has a long useful life.

Another object of at least one embodiment of the disclosure is to provide a self-adjusting pocket hole jig system that provides additional functionality for pocket hole jigs and pocket hole joinery.

Yet another object of at least one embodiment of the disclosure is to provide a self-adjusting pocket hole jig system that has a wide variety of uses.

Another object of at least one embodiment of the disclosure is to provide a self-adjusting pocket hole jig system that has a wide variety of applications.

Yet another object of at least one embodiment of the disclosure is to provide a self-adjusting pocket hole jig system that provides cost savings to a user.

Another object of at least one embodiment of the disclosure is to provide a self-adjusting pocket hole jig system that is relatively inexpensive.

Yet another object of at least one embodiment of the disclosure is to provide a self-adjusting pocket hole jig system that provides value.

Another object of at least one embodiment of the disclosure is to provide a self-adjusting pocket hole jig system that prevents or reduces relative movement between the pocket hole jig and the workpiece.

Yet another object of at least one embodiment of the disclosure is to provide a self-adjusting pocket hole jig system that reduces the amount of clamping pressure required to adequately clamp a pocket hole jig to a workpiece.

Another object of at least one embodiment of the disclosure is to provide a self-adjusting pocket hole jig system that facilitates the formation of aesthetically pleasing finished products.

Yet another object of at least one embodiment of the disclosure is to provide a self-adjusting pocket hole jig system that provides a clamping with a single movement of a handle.

Another object of at least one embodiment of the disclosure is to provide a self-adjusting pocket hole jig system that facilitates easier clamping.

Yet another object of at least one embodiment of the disclosure is to provide a self-adjusting pocket hole jig system that facilitates raising and lowering of the drill guide assembly with a single movement of the handle.

Another object of at least one embodiment of the disclosure is to provide a self-adjusting pocket hole jig system that facilitates easy release of the clamping mechanism.

Yet another object of at least one embodiment of the disclosure is to provide a self-adjusting pocket hole jig system that facilitates easy return of the clamping mechanism to a non-clamping position.

Another object of at least one embodiment of the disclosure is to provide a self-adjusting pocket hole jig system that facilitates easy adjustment of the clamping pressure.

Yet another object of at least one embodiment of the disclosure is to provide a self-adjusting pocket hole jig system that facilitates stable placement when used horizontally.

Another object of at least one embodiment of the disclosure is to provide a self-adjusting pocket hole jig system that that facilitates stable placement when used vertically.

Yet another object of at least one embodiment of the disclosure is to provide a self-adjusting pocket hole jig system that facilitates easy removal of chips and debris during use.

Another object of at least one embodiment of the disclosure is to provide a self-adjusting pocket hole jig system that is comfortable to use.

Yet another object of at least one embodiment of the disclosure is to provide a self-adjusting pocket hole jig system that is more stable than other pocket hole jigs.

Another object of at least one embodiment of the disclosure is to provide a self-adjusting pocket hole jig system that facilitates automatic return of the clamping assembly to a non-clamping position.

Yet another object of at least one embodiment of the disclosure is to provide a self-adjusting pocket hole jig system that facilitates spring loaded return of the clamping assembly to a non-clamping position.

Another object of at least one embodiment of the disclosure is to provide a self-adjusting pocket hole jig system that improves the ergonomics of use.

Yet another object of at least one embodiment of the disclosure is to provide a self-adjusting pocket hole jig system that easily adjusts to workpieces of various thicknesses.

Another object of at least one embodiment of the disclosure is to provide a self-adjusting pocket hole jig system that adjusts the drill guide assembly to the optimum position for each workpiece.

Yet another object of at least one embodiment of the disclosure is to provide a self-adjusting pocket hole jig system that consistently applies the same clamping pressure regardless of workpiece thickness.

Another object of at least one embodiment of the disclosure is to provide a self-adjusting pocket hole jig system that improves the intuitiveness of drilling pocket hole jigs.

Yet another object of at least one embodiment of the disclosure is to provide a self-adjusting pocket hole jig system that improves the usability of pocket hole jigs.

Another object of at least one embodiment of the disclosure is to provide a self-adjusting pocket hole jig system that eliminates the ability to choose incorrect wood thickness.

Yet another object of at least one embodiment of the disclosure is to provide a self-adjusting pocket hole jig system that reduces set-up time.

Another object of at least one embodiment of the disclosure is to provide a self-adjusting pocket hole jig system that provides a single touch point for clamping and adjusting the position of the drill guide assembly.

Yet another object of at least one embodiment of the disclosure is to provide a self-adjusting pocket hole jig system that provides convenient woodchip, dust and debris removal.

Another object of at least one embodiment of the disclosure is to provide a self-adjusting pocket hole jig system that provides easy removal and replacement of drill guide blocks.

These and other objects, features, or advantages of at least one embodiment will become apparent from the specification, figures and claims.

BRIEF SUMMARY OF THE INVENTION

A self-adjusting pocket hole jig is presented having a base having a lower portion and a backstop. An upright assembly is connected to the base and includes a clamping assembly having a handle, an upper link and a lower link. Clutch housing, having a plurality of clutch plates, and a clamp force adjustment mechanism, is connected to the upright assembly. A drill guide assembly having a removable drill guide block is connected to the upright assembly. The drill guide assembly moves along the upright assembly between an unclamped position and a clamped position when the handle is raised and lowered. Movement of the handle simultaneously adjusts the height of the drill guide assembly as well as facilitates clamping of the drill guide assembly for workpieces of various thicknesses.

Figure 54:
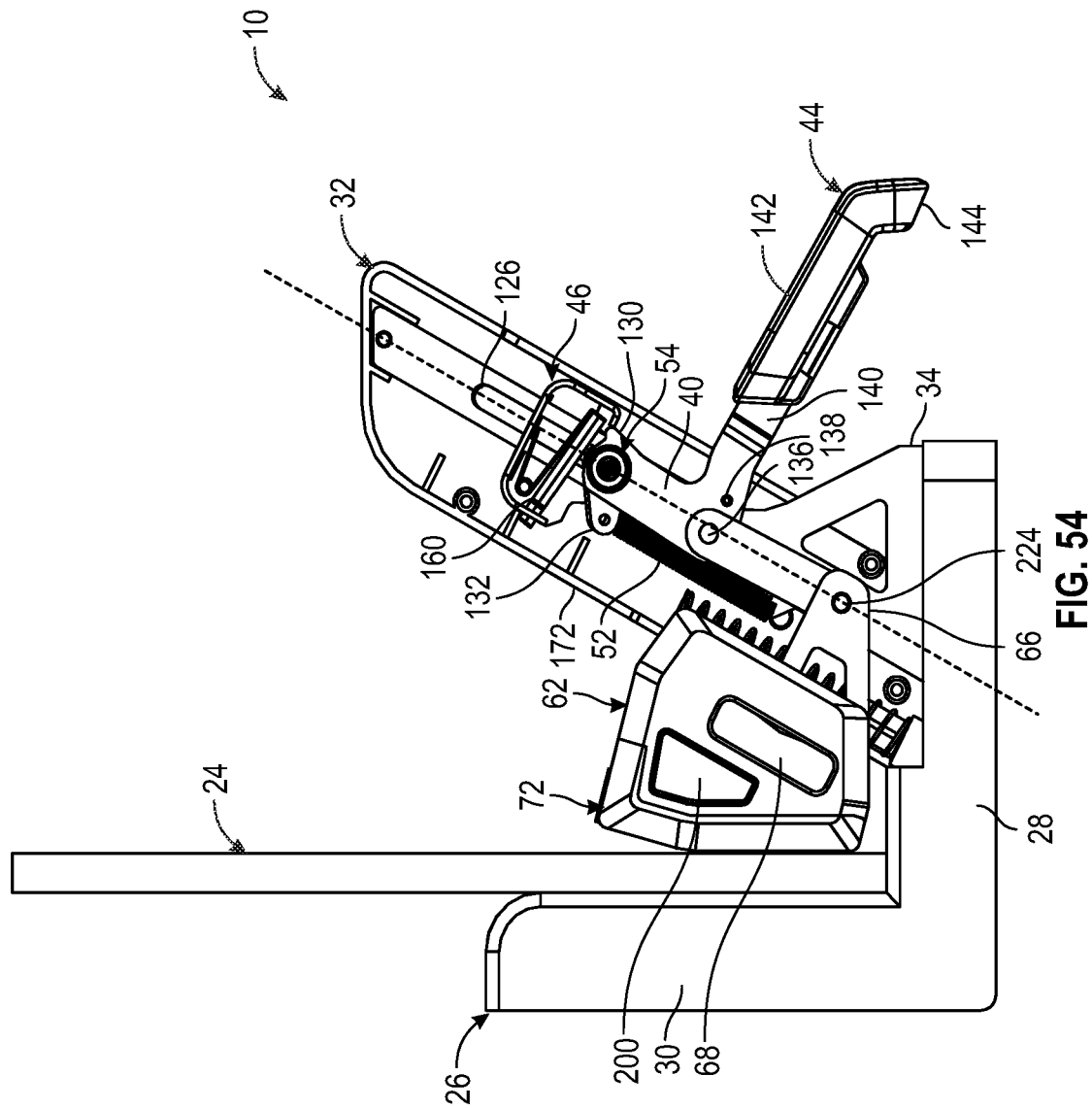
FIG. 54 shows a left side view of the self-adjusting pocket hole jig system shown in FIG. 52 with handle 44 further lowered to a fully lowered position to cause the drill guide block to be locked in a position in which the workpiece 24 is clamped between the clamping face and the backstop, in accordance with one or more embodiments.
Figure 55:
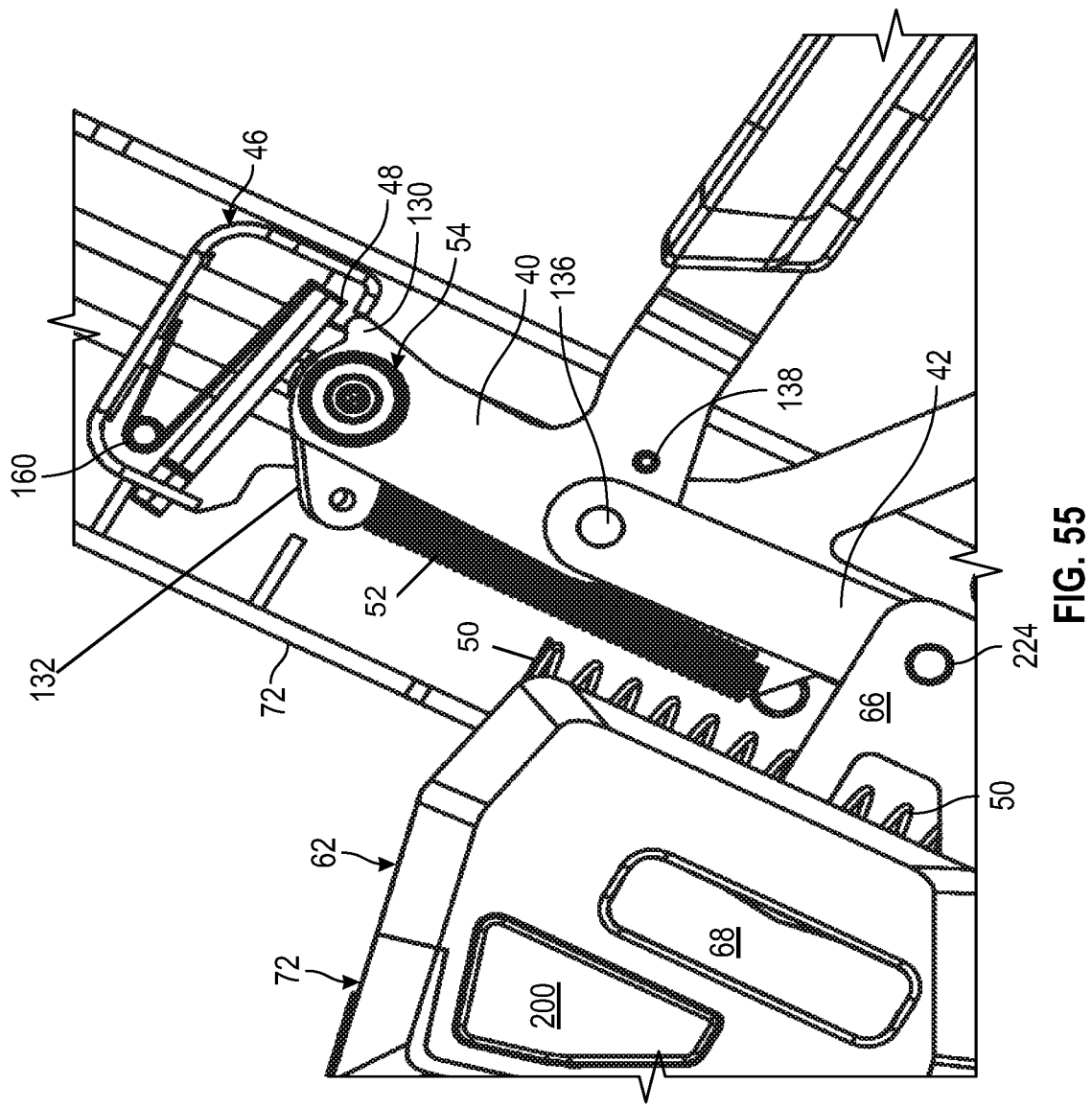

FIG. 55 shows a close-up left side view of a drill guide block and an upright element of a self-adjusting pocket hole jig shown in FIG. 54, in accordance with one or more embodiments.

Figure 56:
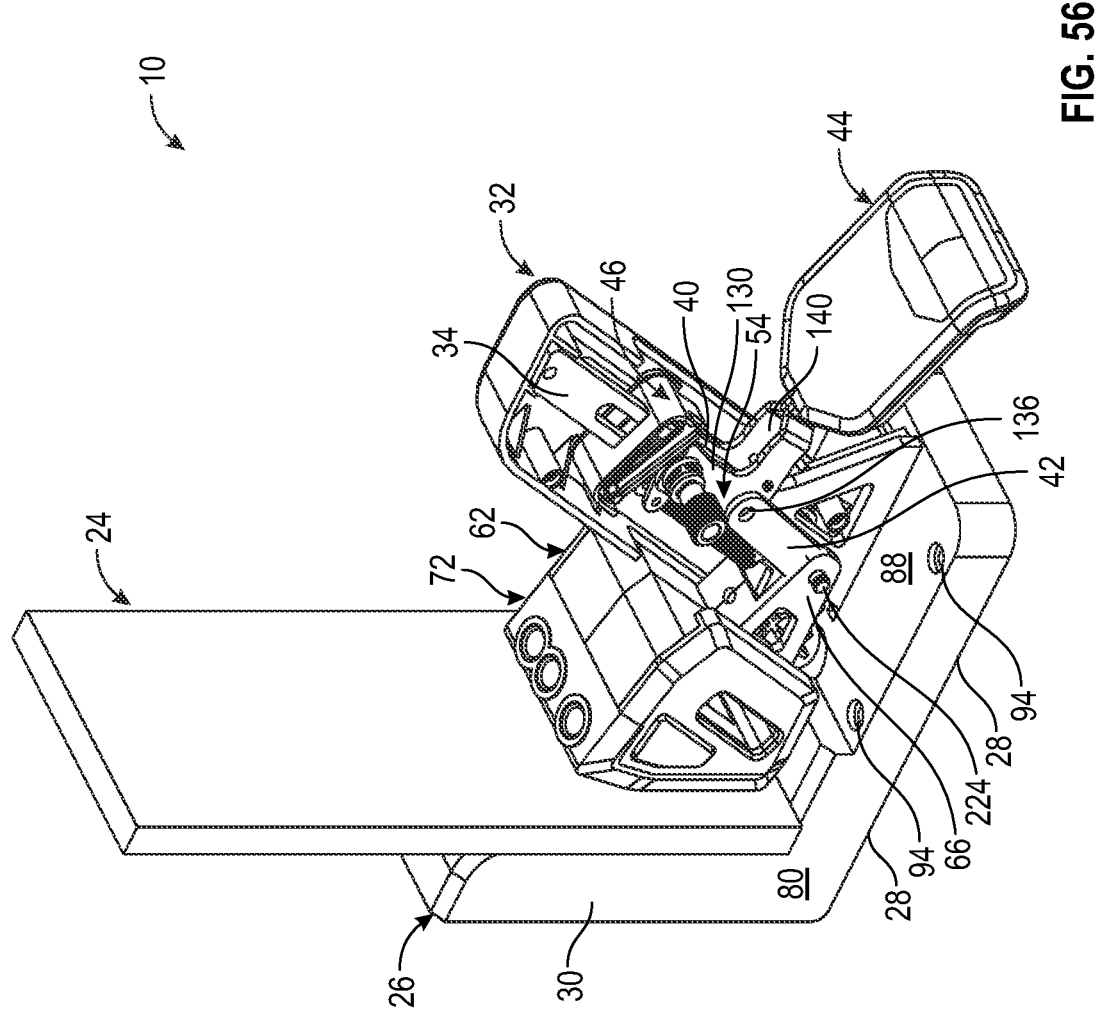

FIG. 56 shows a perspective view of the self-adjusting pocket hole jig shown in FIG. 54, in accordance with one or more embodiments.

Figure 48:
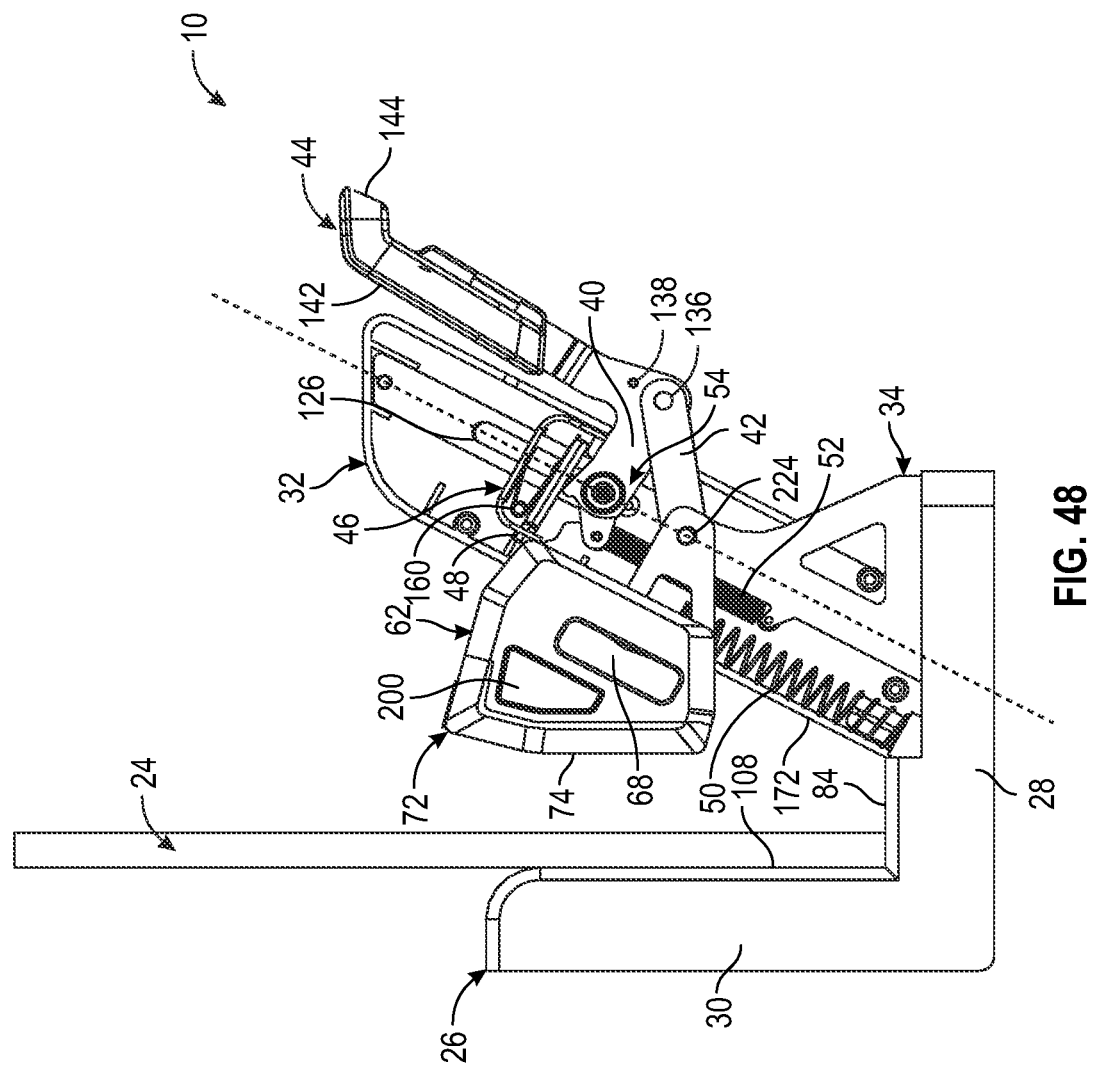
FIG. 48 shows a left side view of a self-adjusting pocket hole jig system with cut away section of upright element and with handle 44 in an fully raised position to permitting clamping face 74 of drill guide block 72 to be positioned further from the base, and thereby permitting a workpiece 24 to be placed on resting surface 84 of the base and against the backstop 30, in accordance with one or more embodiments.
Figure 57:
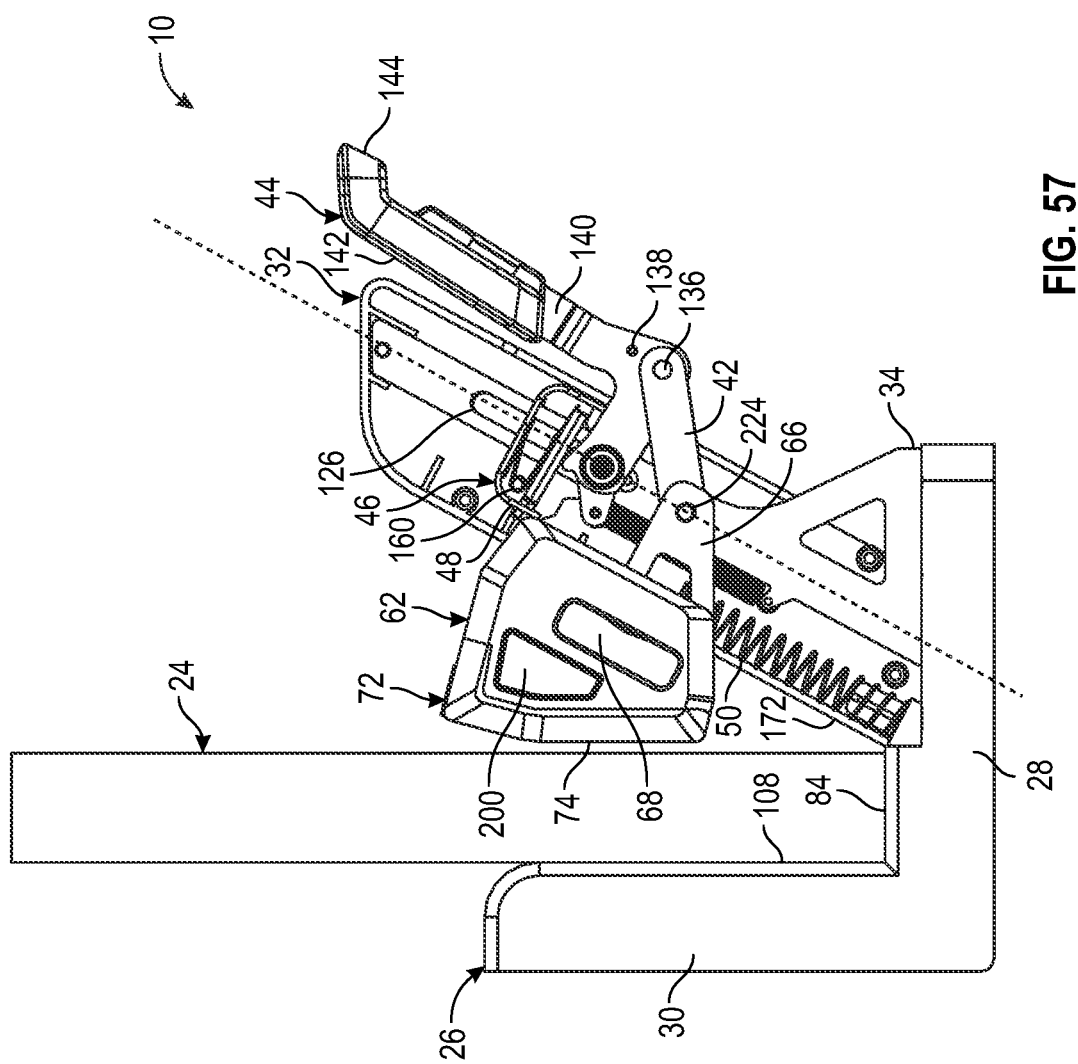

FIG. 57 shows a left side view of the self-adjusting pocket hole jig system shown in FIG. 48, with handle 44 in a fully raised position and a thicker workpiece 24 inserted between the clamping face and the backstop.

Figure 58:
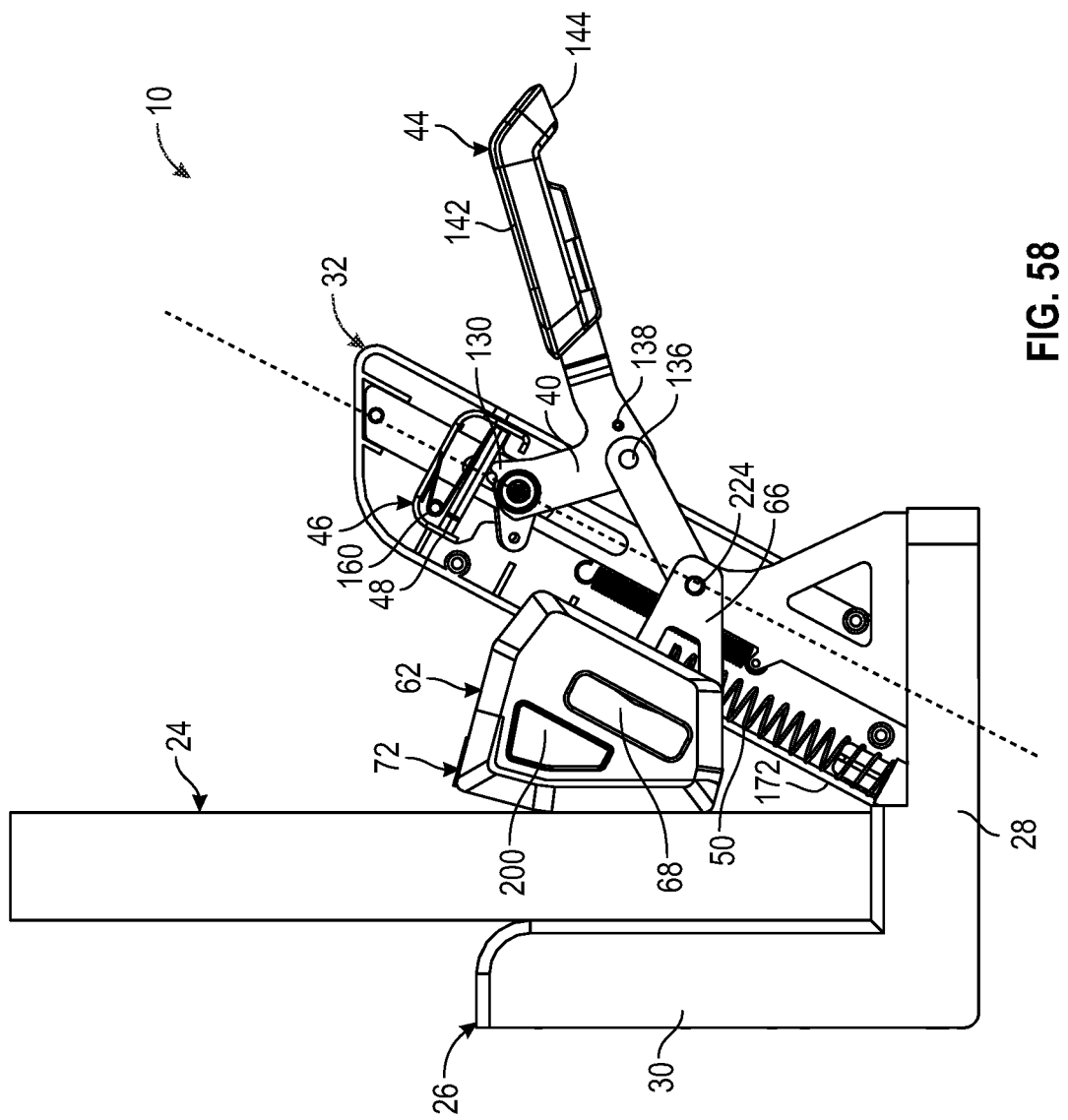

FIG. 58 shows a left side view of the self-adjusting pocket hole jig system shown in FIG. 57, with handle 44 in a lowered position causing the thicker workpiece 24 be engaged by the clamping face and the backstop.

Figure 59:
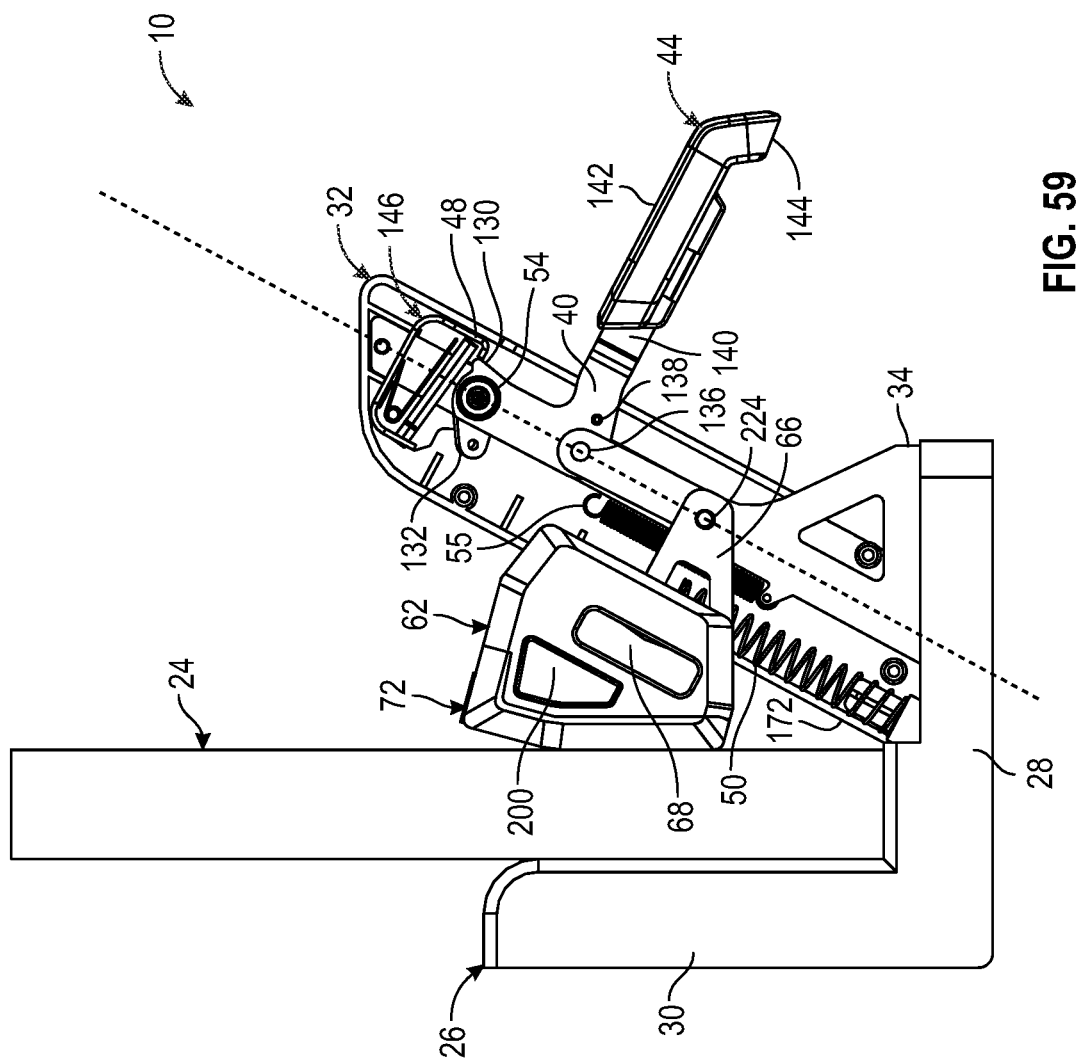

FIG. 59 shows a left side view of the self-adjusting pocket hole jig system shown in FIG. 58 with handle 44 further lowered to cause thicker workpiece 24 to be clamped between the clamping face and the backstop, in accordance with one or more embodiments.

Figure 60:
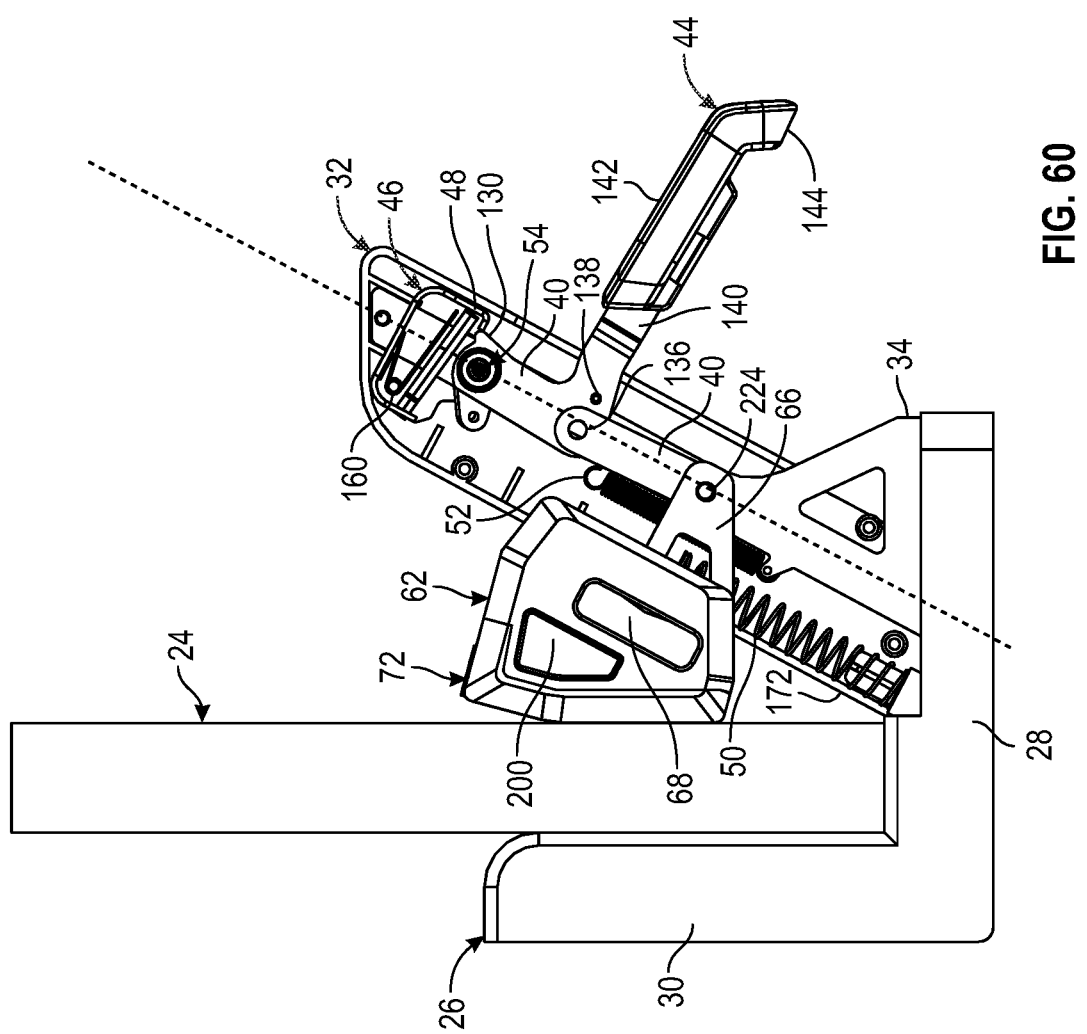

FIG. 60 shows a left side view of the self-adjusting pocket hole jig system shown in FIG. 59 with handle 44 further lowered to a fully lowered position to cause the drill guide block to be locked in a position in which the thicker workpiece 24 is clamped between the clamping face and the backstop, in accordance with one or more embodiments.

Figure 61:
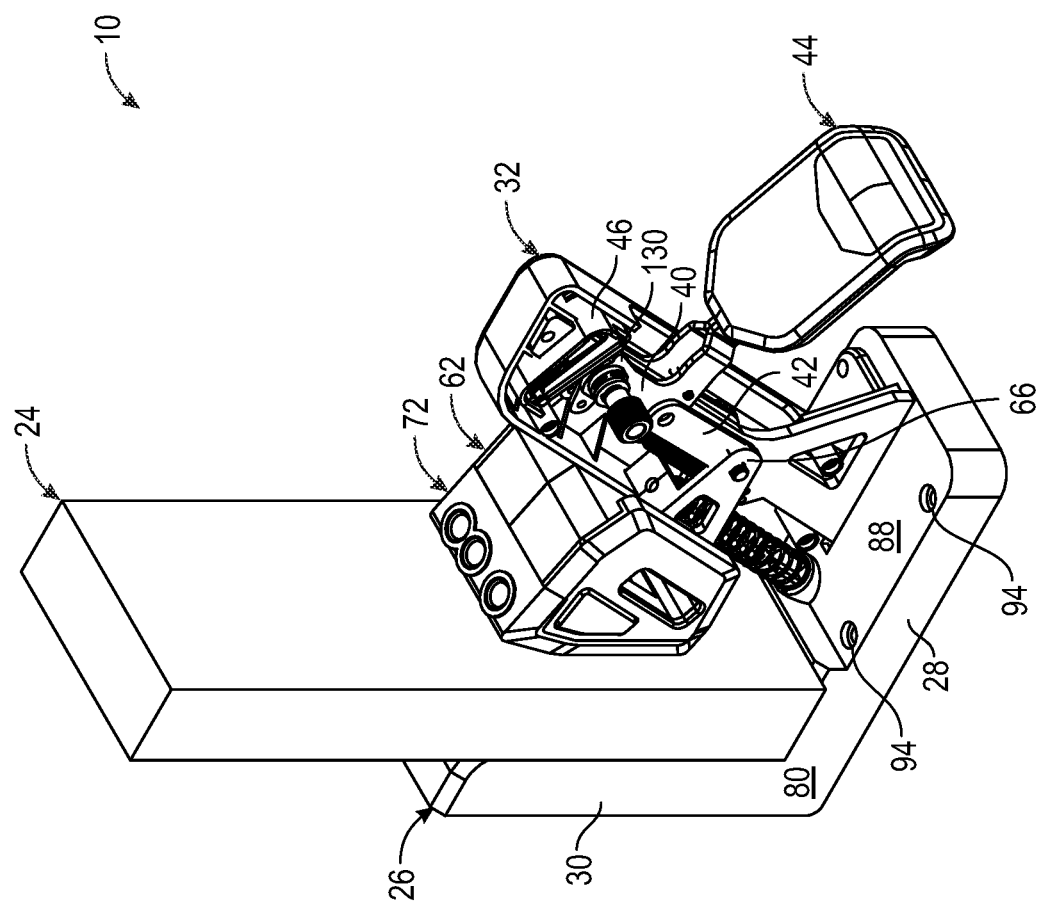

FIG. 61 shows a perspective view of the self-adjusting pocket hole jig shown in FIG. 60, in accordance with one or more embodiments.

Figure 62:
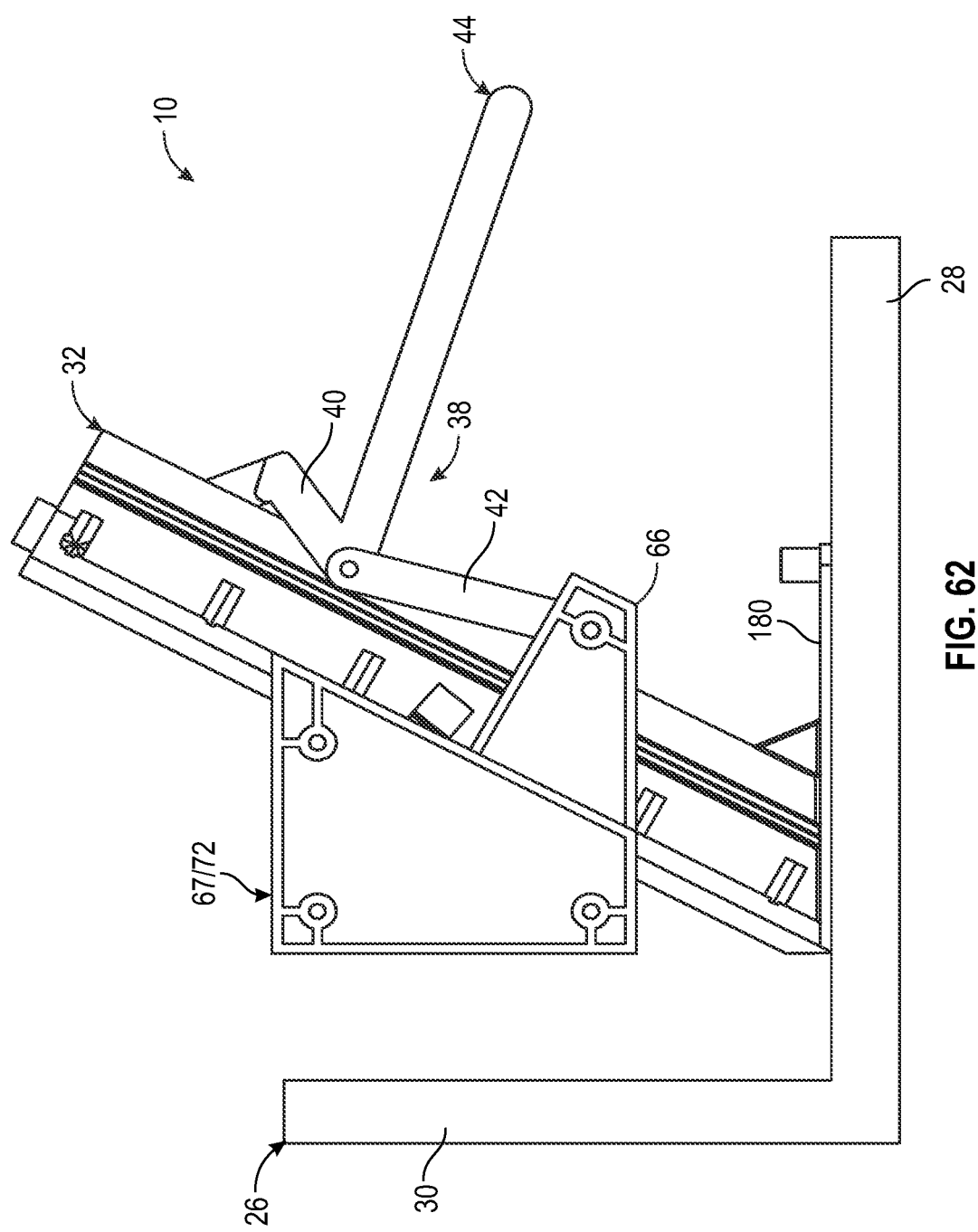

FIG. 62 shows a left side view of another self-adjusting pocket hole jig system, in accordance with one or more embodiments.

Figure 63:
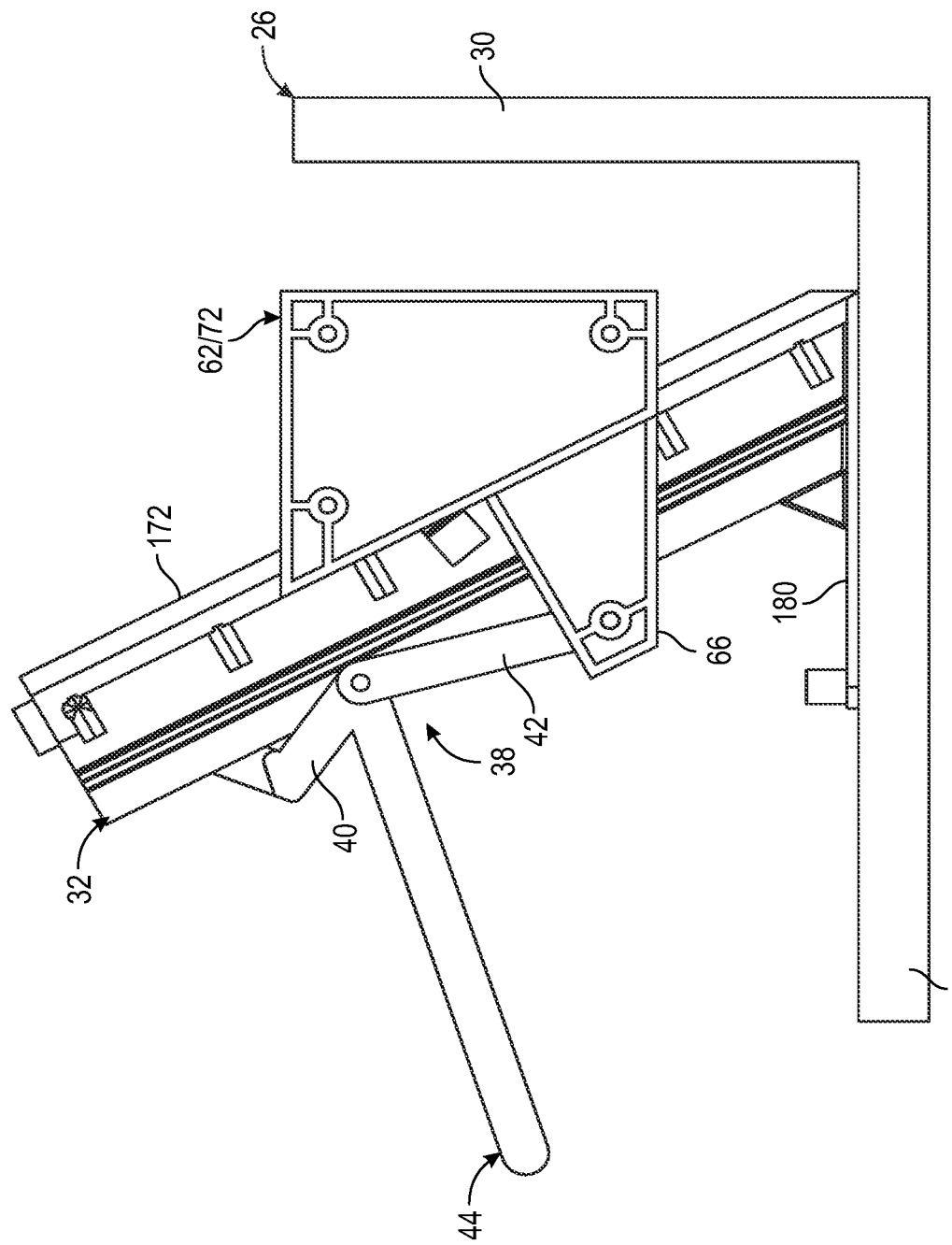

FIG. 63 shows a right side view of the self-adjusting pocket hole jig system shown in FIG. 62, in accordance with one or more embodiments.

Figure 64:
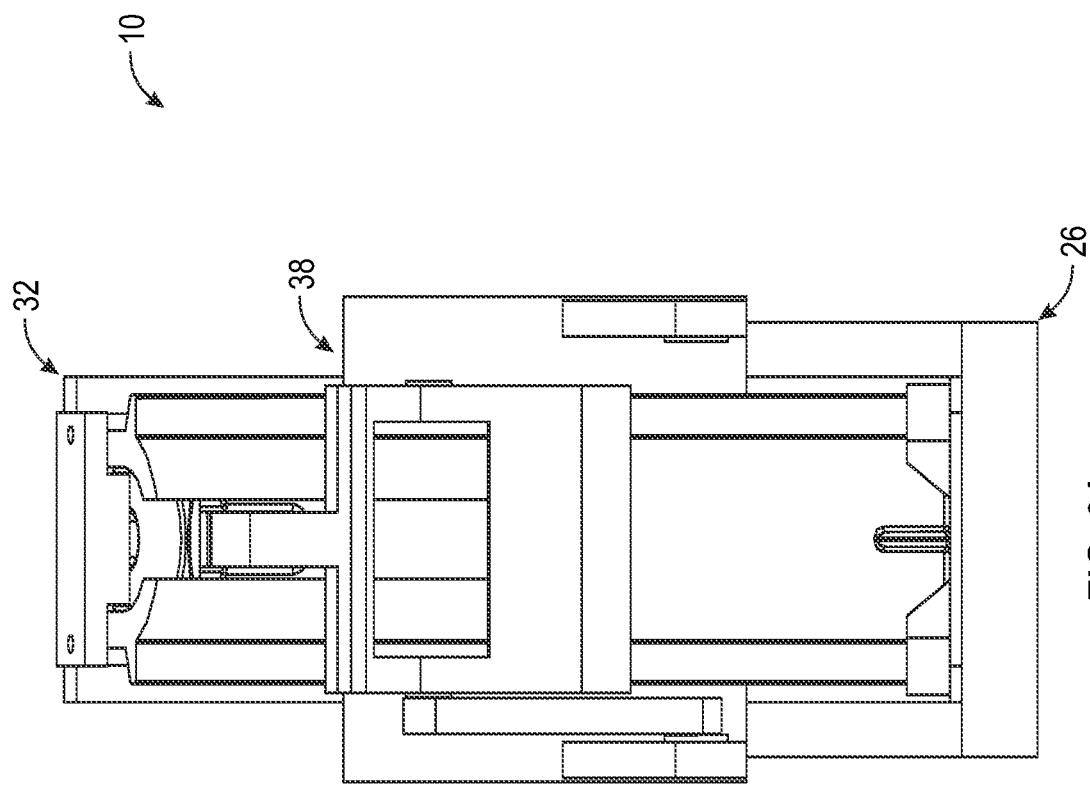

FIG. 64 shows a rearward side view of the self-adjusting pocket hole jig system shown in FIG. 62, in accordance with one or more embodiments.

Figure 65:
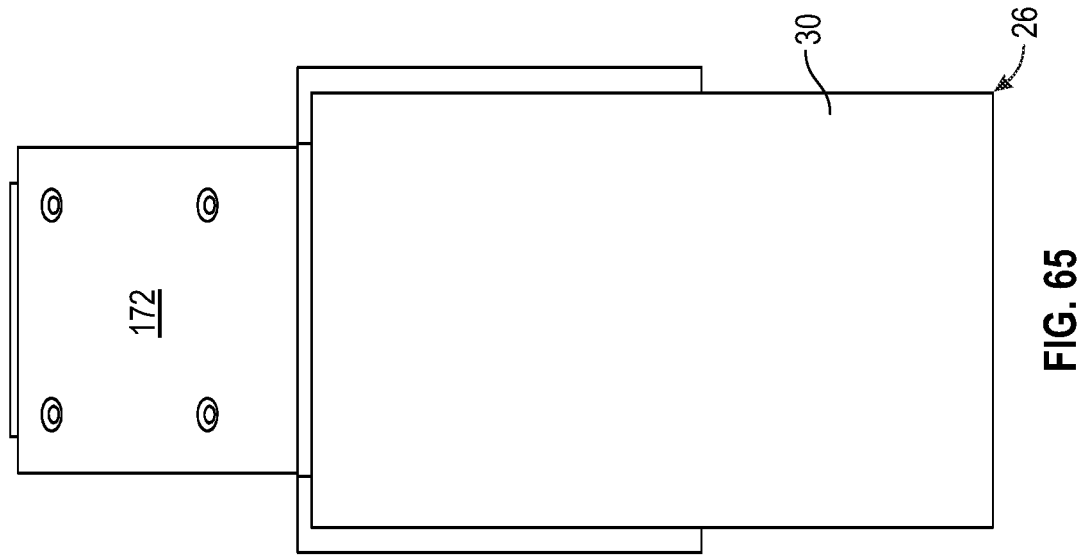

FIG. 65 shows a forward side view of the self-adjusting pocket hole jig system shown in FIG. 62, in accordance with one or more embodiments.

Figure 66:
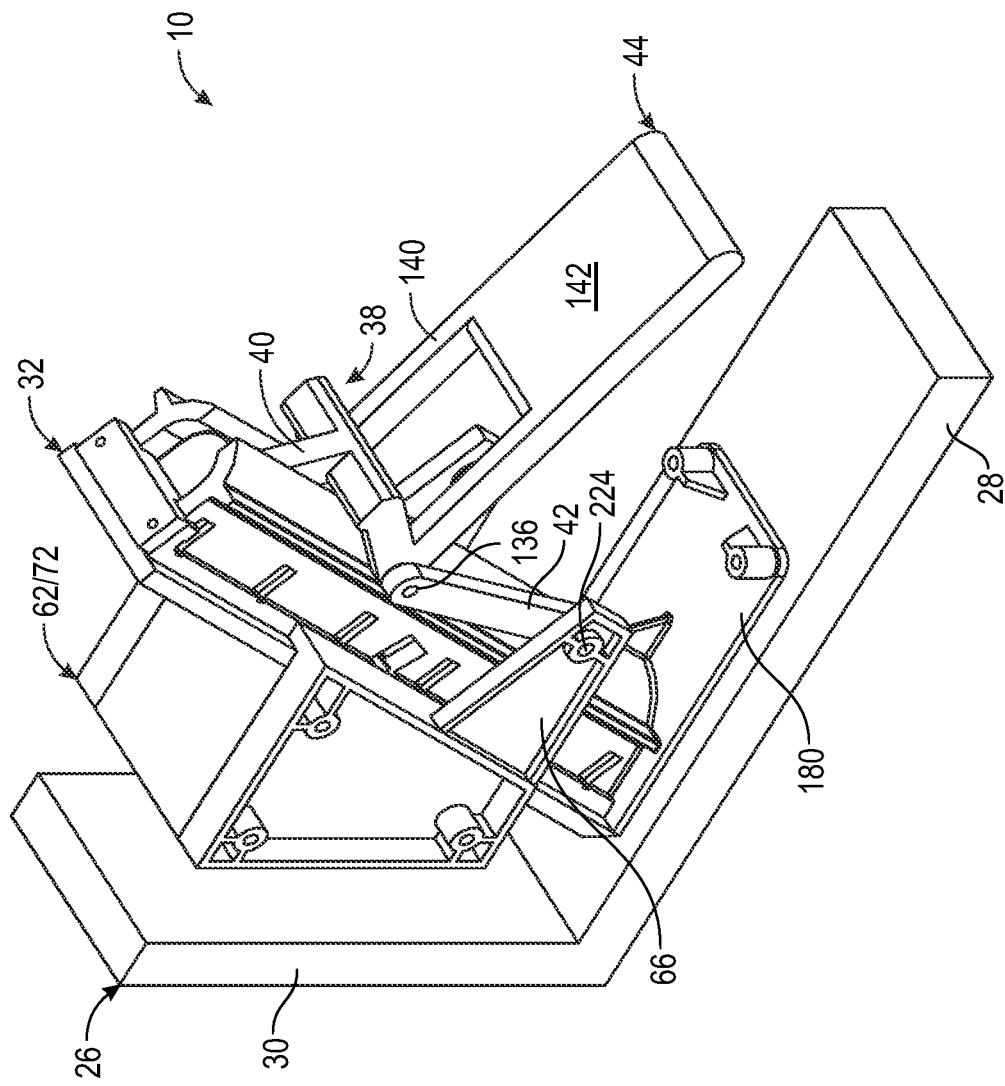

FIG. 66 shows a first perspective view of the self-adjusting pocket hole jig system shown in FIG. 62, in accordance with one or more embodiments.

Figure 67:
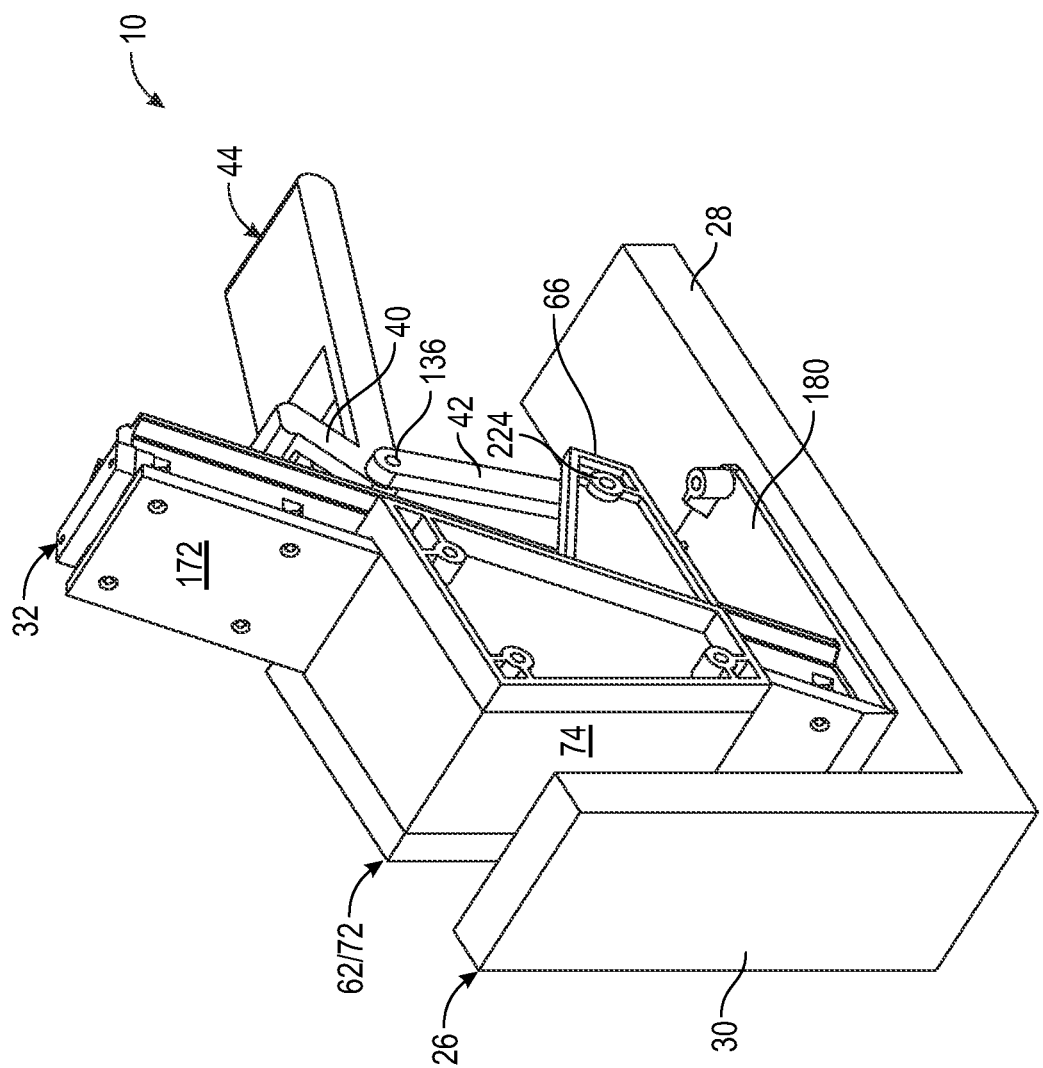

FIG. 67 shows a second perspective view of the self-adjusting pocket hole jig system shown in FIG. 62, in accordance with one or more embodiments.

Figure 68:
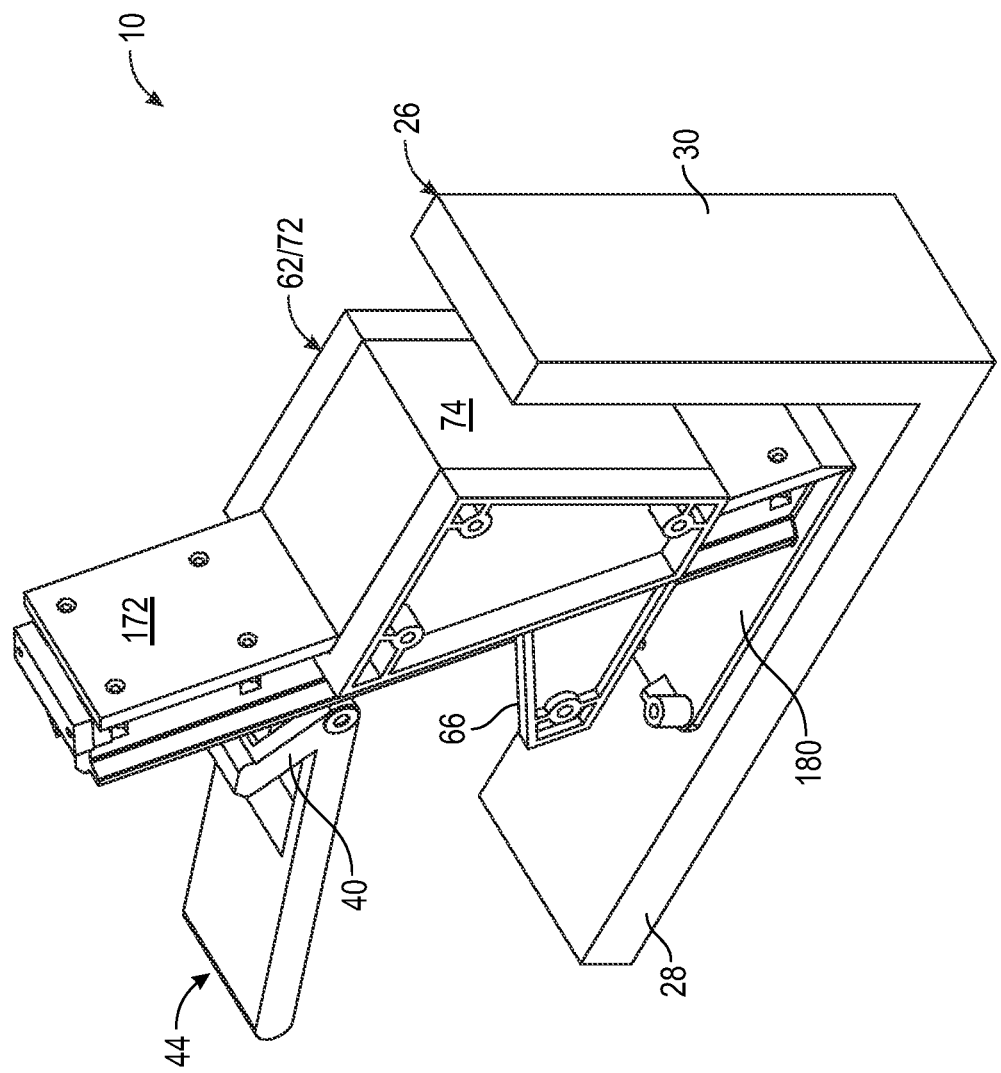

FIG. 68 shows third perspective view of the self-adjusting pocket hole jig system shown in FIG. 62, in accordance with one or more embodiments.

Figure 69:
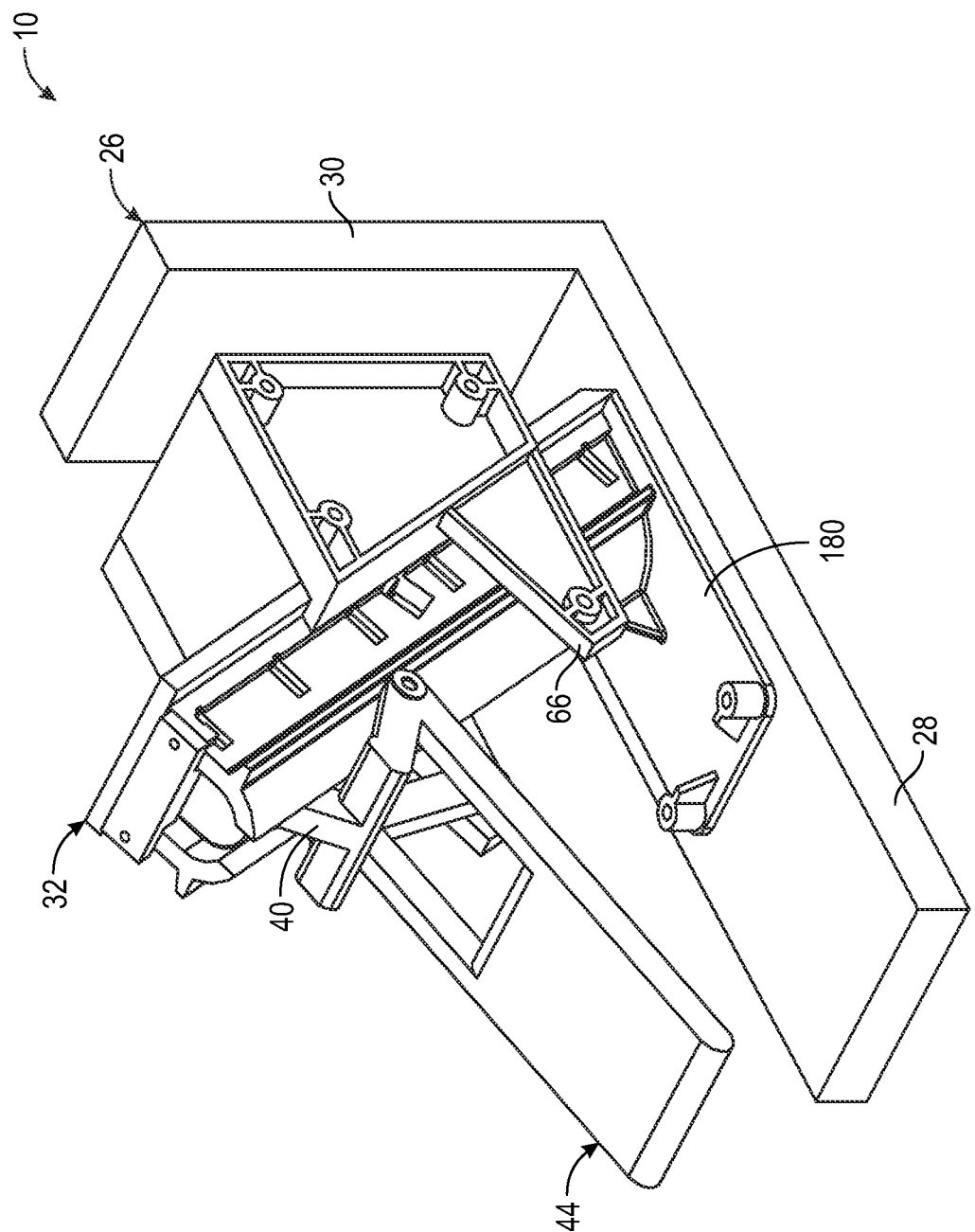

FIG. 69 shows a fourth perspective view of the self-adjusting pocket hole jig system shown in FIG. 62, in accordance with one or more embodiments.

Figure 70:
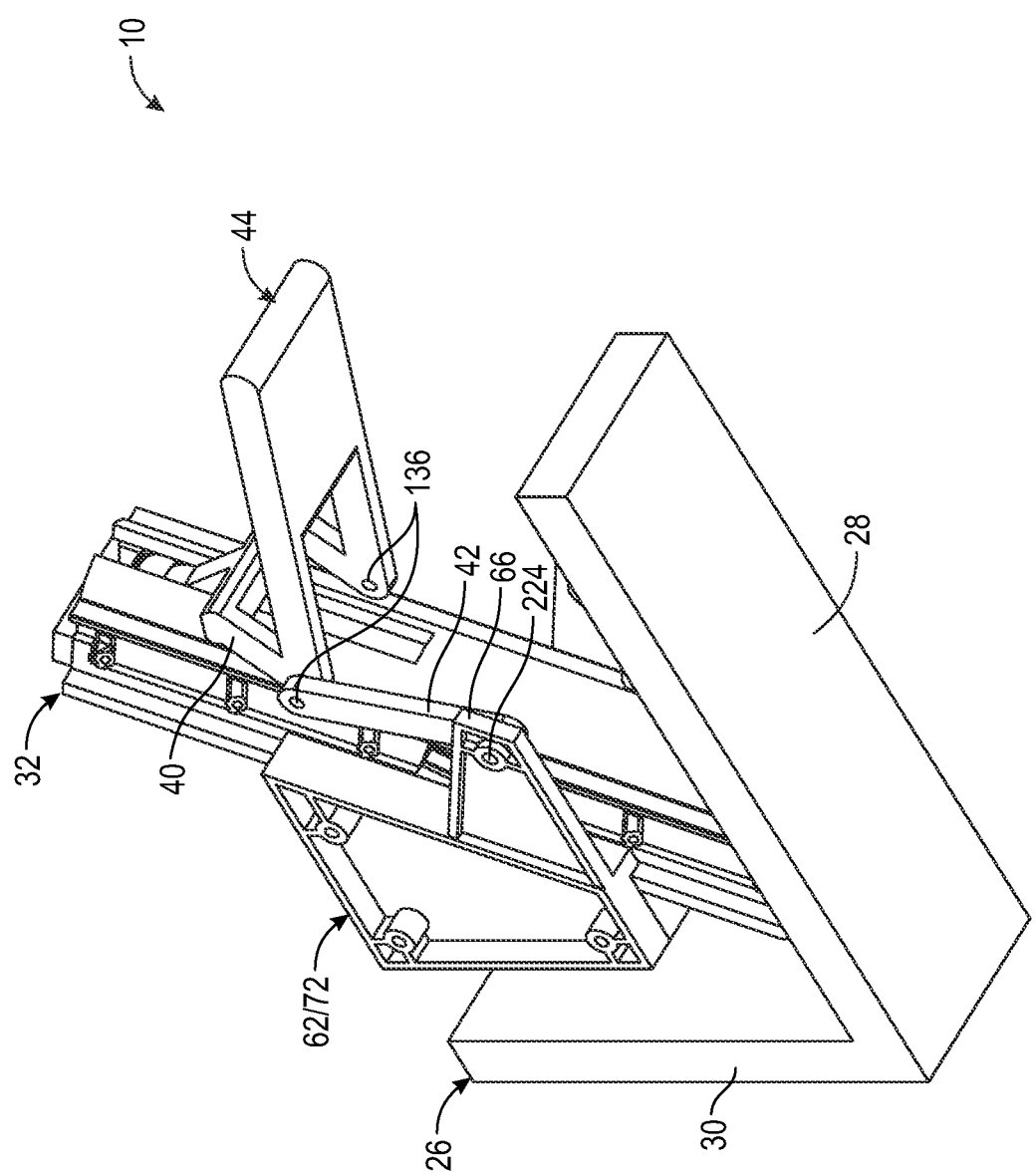

FIG. 70 shows a fifth perspective view of the self-adjusting pocket hole jig system shown in FIG. 62, in accordance with one or more embodiments.

Figure 71:
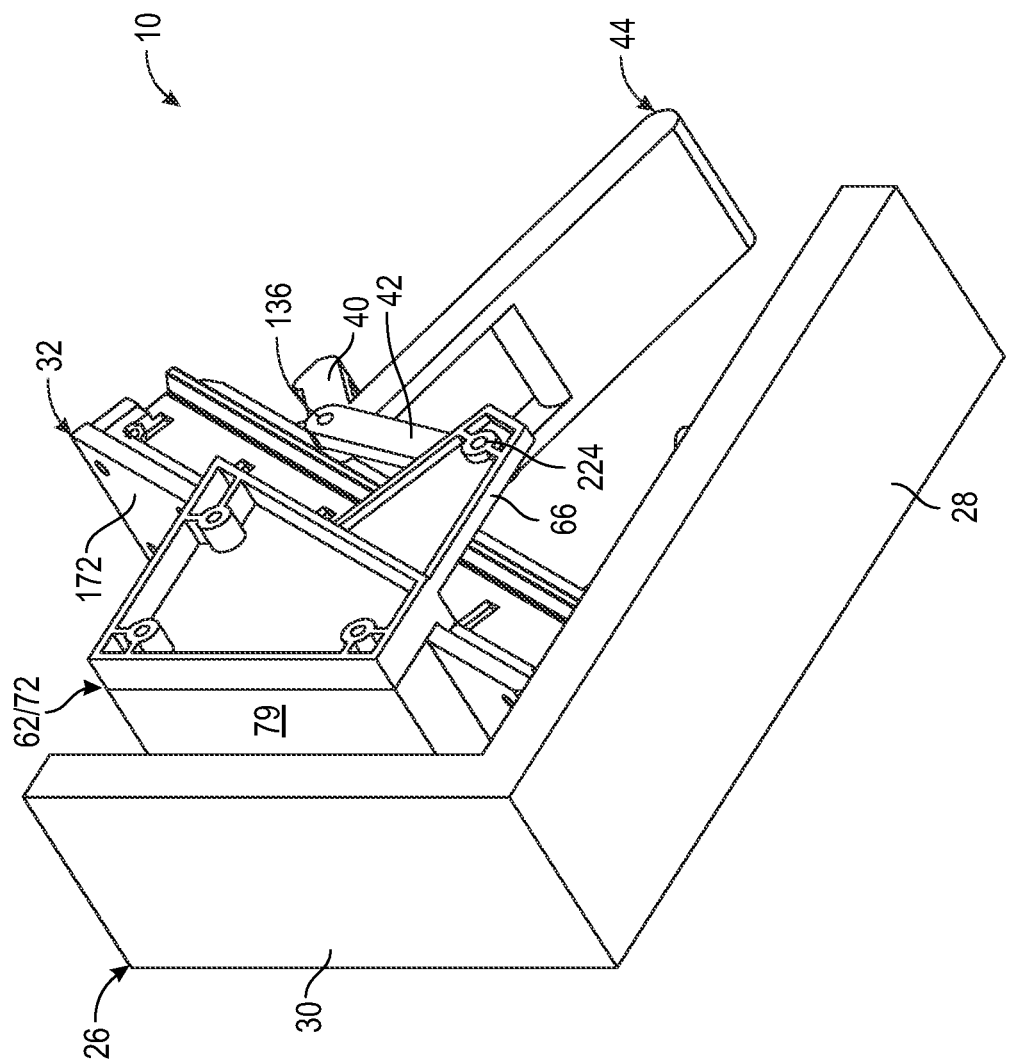

FIG. 71 shows a sixth perspective view of the self-adjusting pocket hole jig system shown in FIG. 62, in accordance with one or more embodiments.

Figure 72:
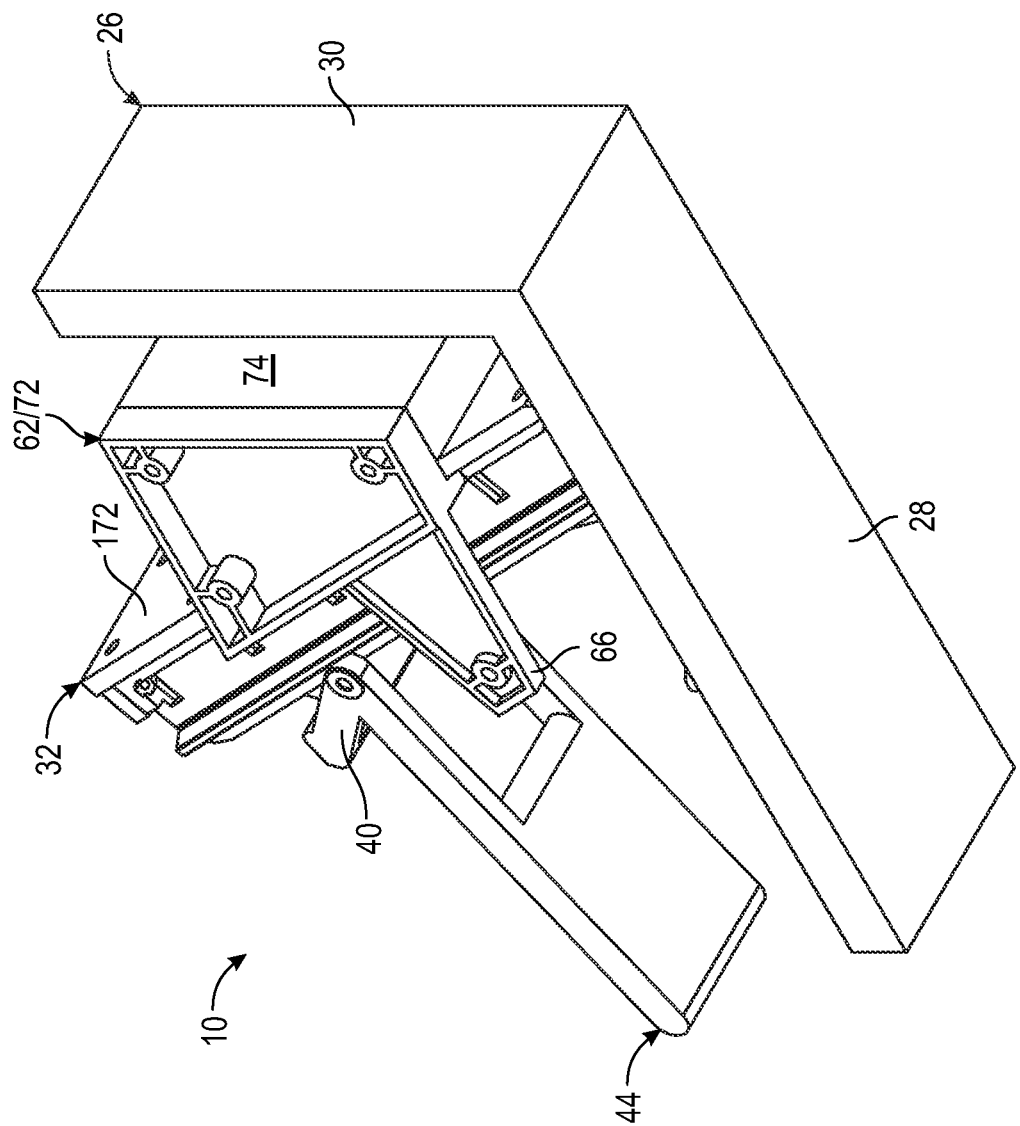

FIG. 72 shows a seventh perspective view of the self-adjusting pocket hole jig system shown in FIG. 62, in accordance with one or more embodiments.

Figure 73:
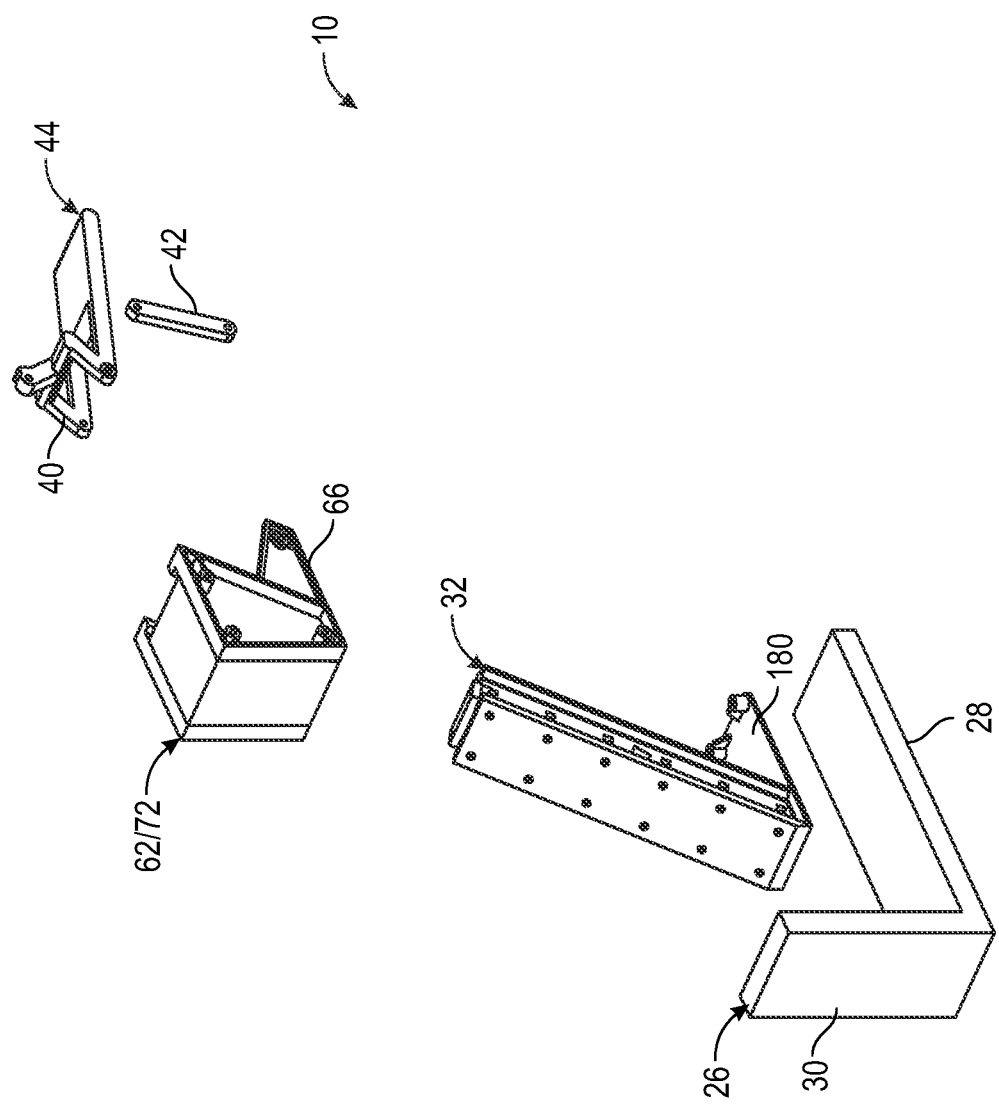

FIG. 73 shows an exploded perspective view of the self-adjusting pocket hole jig system shown in FIG. 62, in accordance with one or more embodiments.

Figure 74:
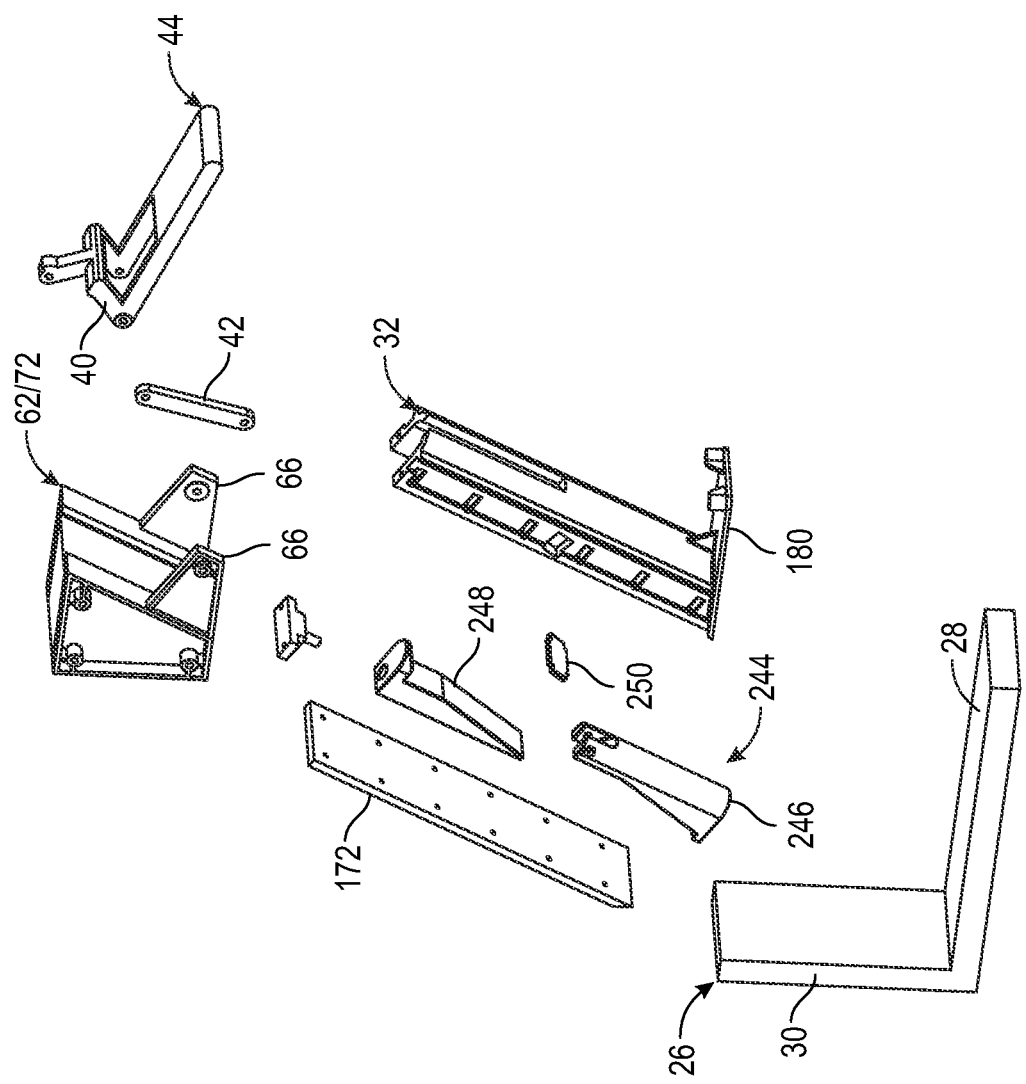

FIG. 74 shows another exploded perspective view of the self-adjusting pocket hole jig system shown in FIG. 62, in accordance with one or more embodiments.

Figure 75:
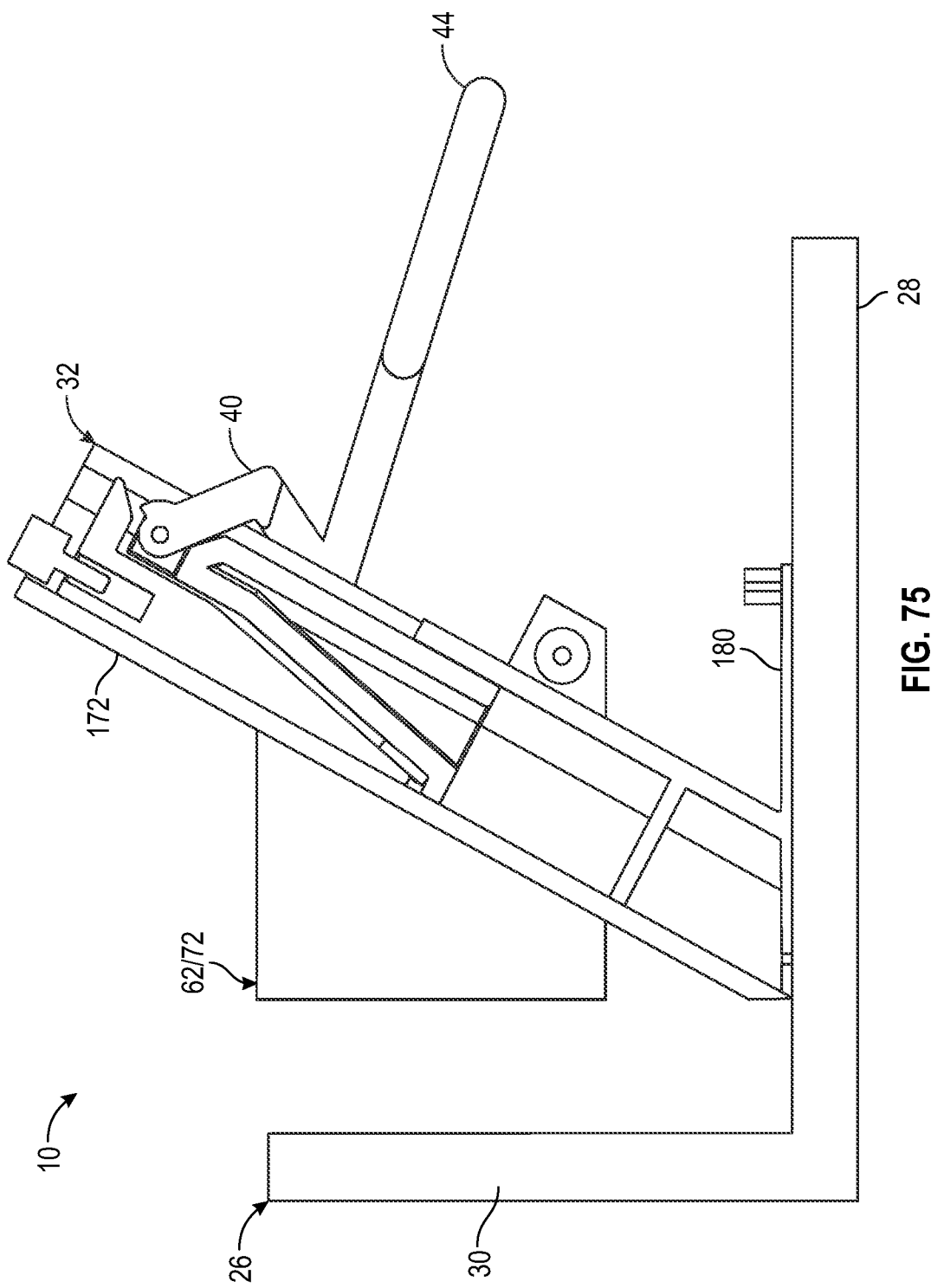

FIG. 75 shows a left side view of another self-adjusting pocket hole jig system, in accordance with one or more embodiments.

Figure 76:
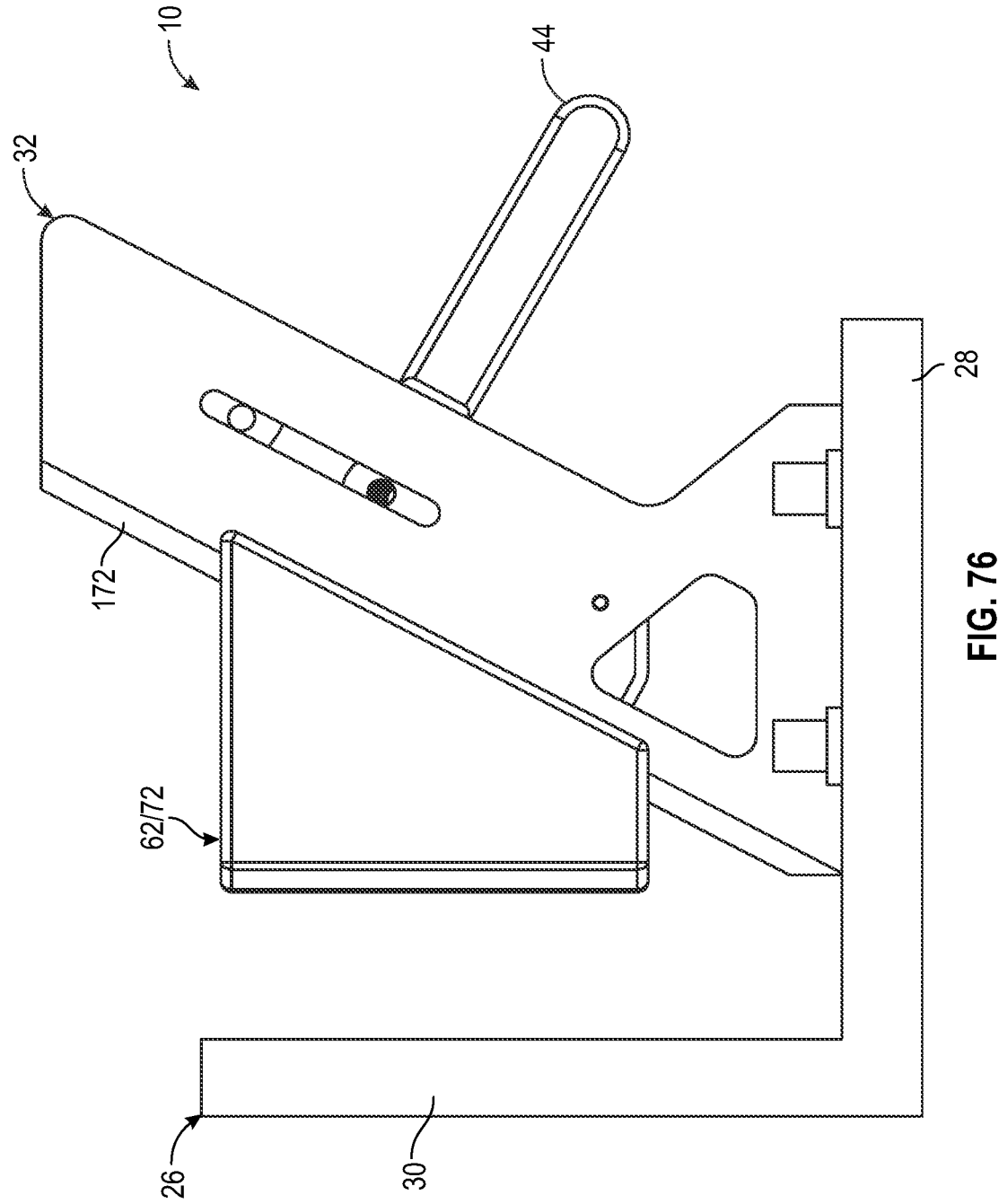

FIG. 76 shows a left side view of yet another self-adjusting pocket hole jig system, in accordance with one or more embodiments.

Figure 77:
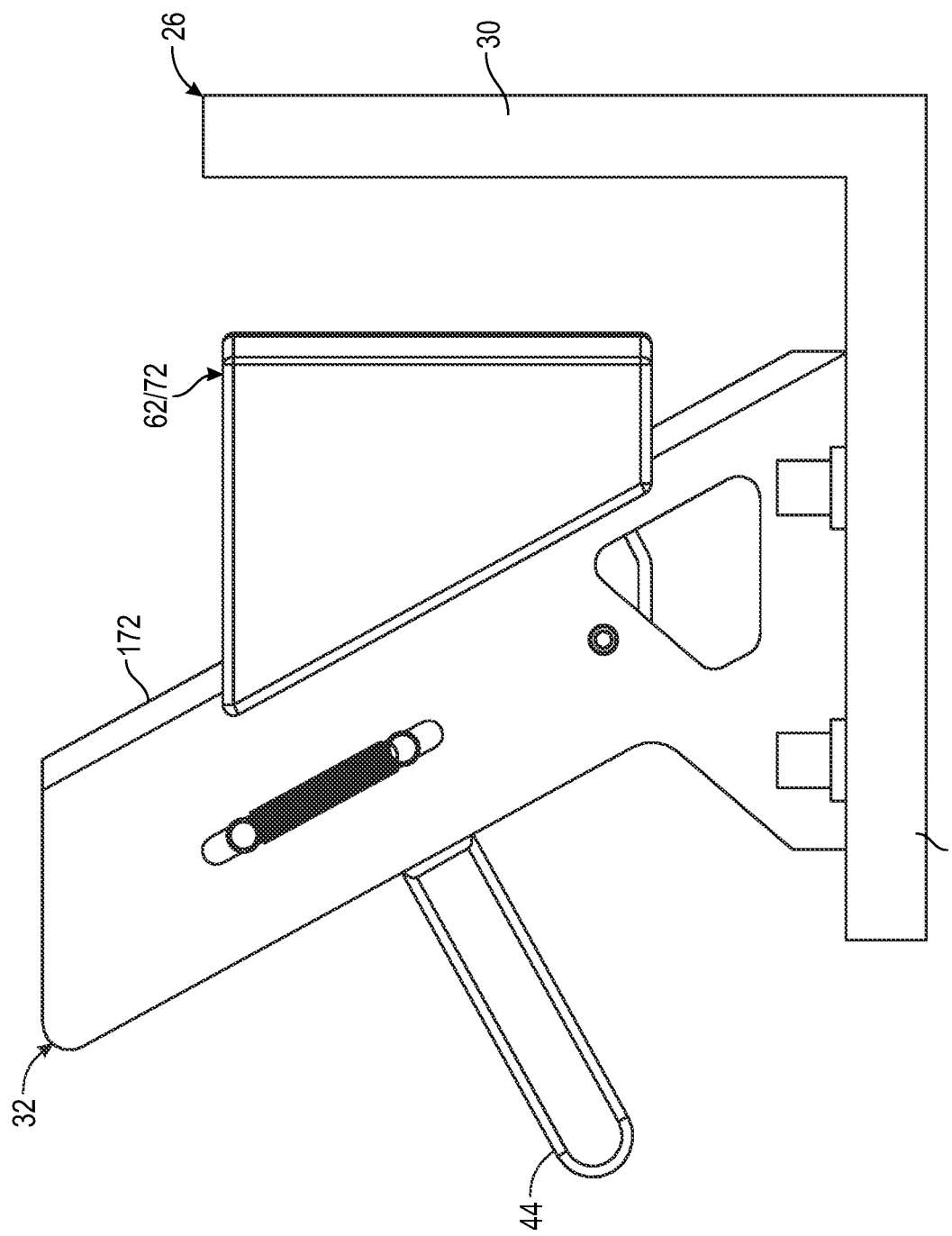

FIG. 77 shows a right side view of the self-adjusting pocket hole jig system shown in FIG. 76, in accordance with one or more embodiments.

Figure 78:
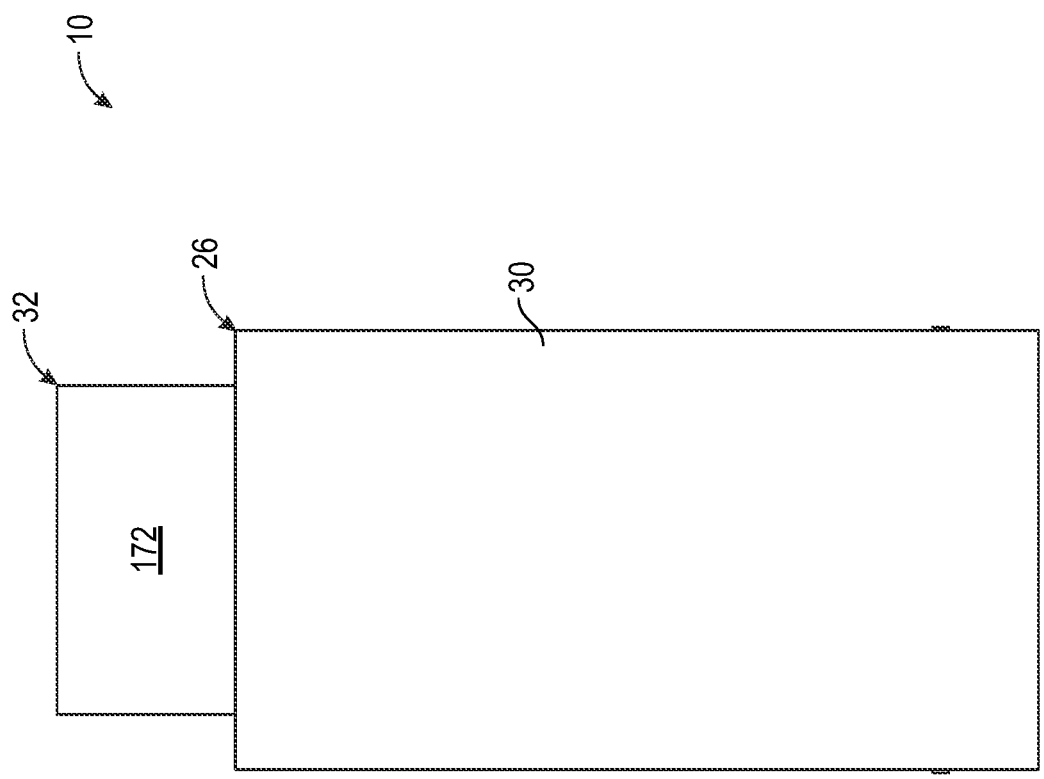

FIG. 78 shows a forward side view of the self-adjusting pocket hole jig system shown in FIG. 76, in accordance with one or more embodiments.

Figure 79:
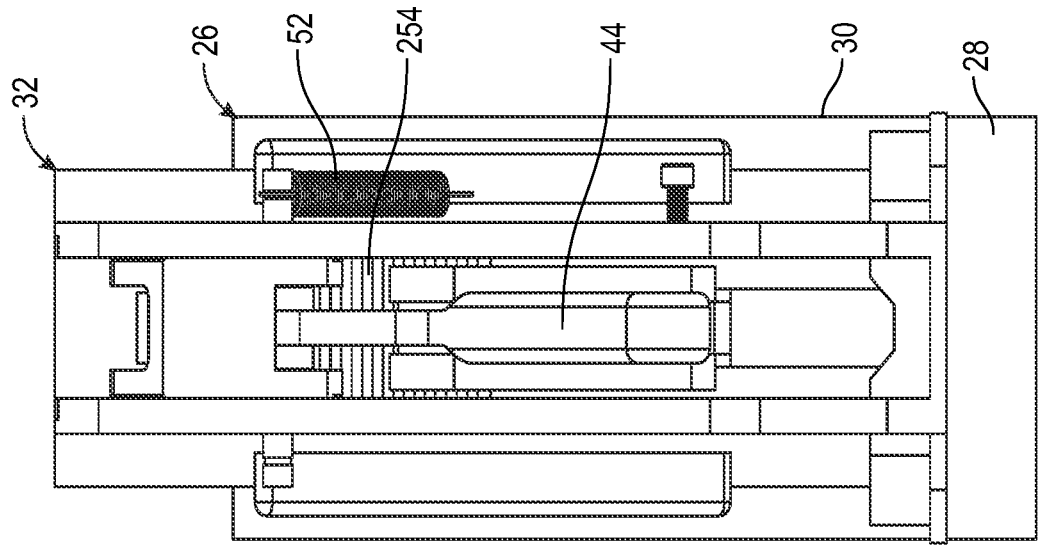

FIG. 79 shows a rearward side view of the self-adjusting pocket hole jig system shown in FIG. 76, in accordance with one or more embodiments.

Figure 80:
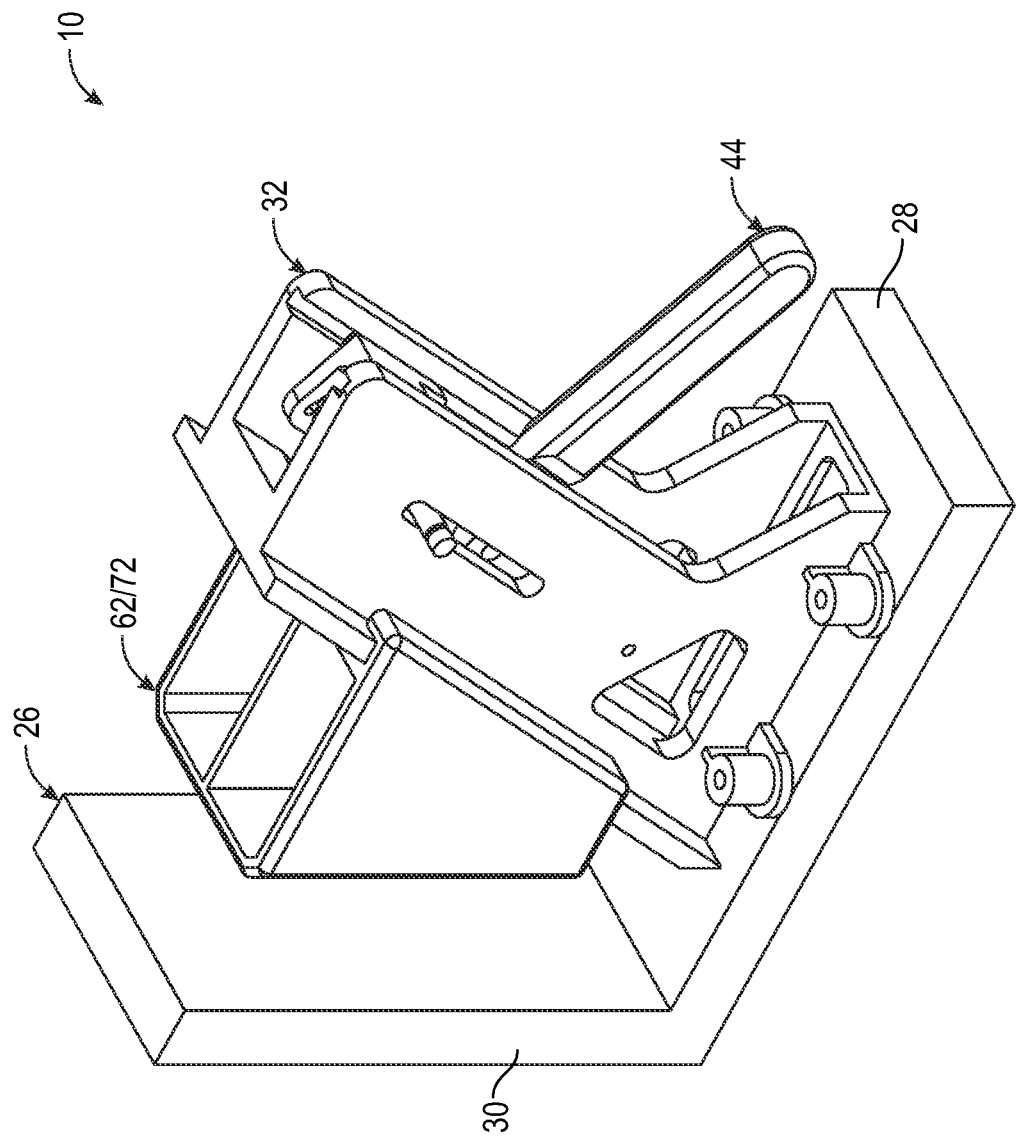

FIG. 80 shows a first perspective view of the self-adjusting pocket hole jig system shown in FIG. 76, in accordance with one or more embodiments.

Figure 81:
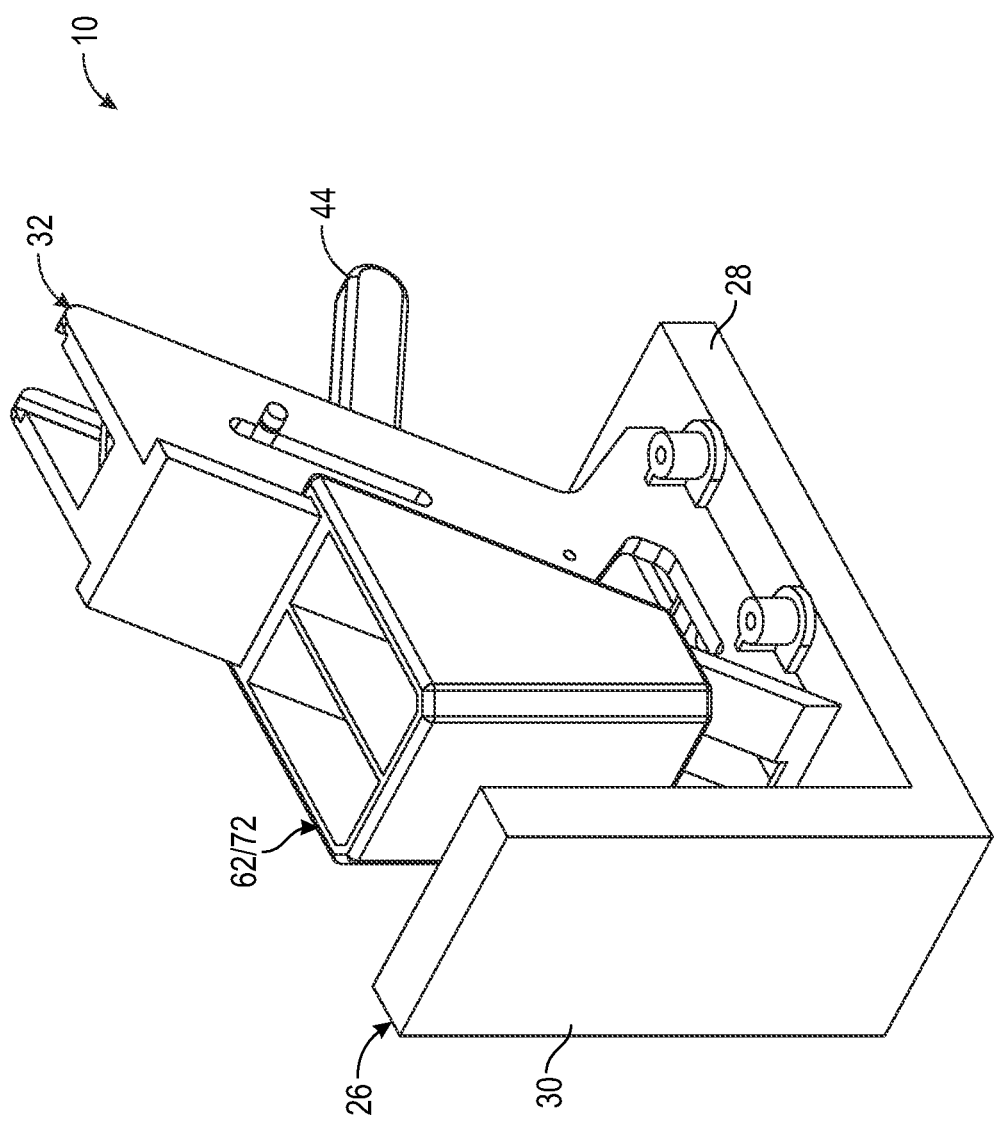

FIG. 81 shows a second perspective view of the self-adjusting pocket hole jig system shown in FIG. 76, in accordance with one or more embodiments.

Figure 82:
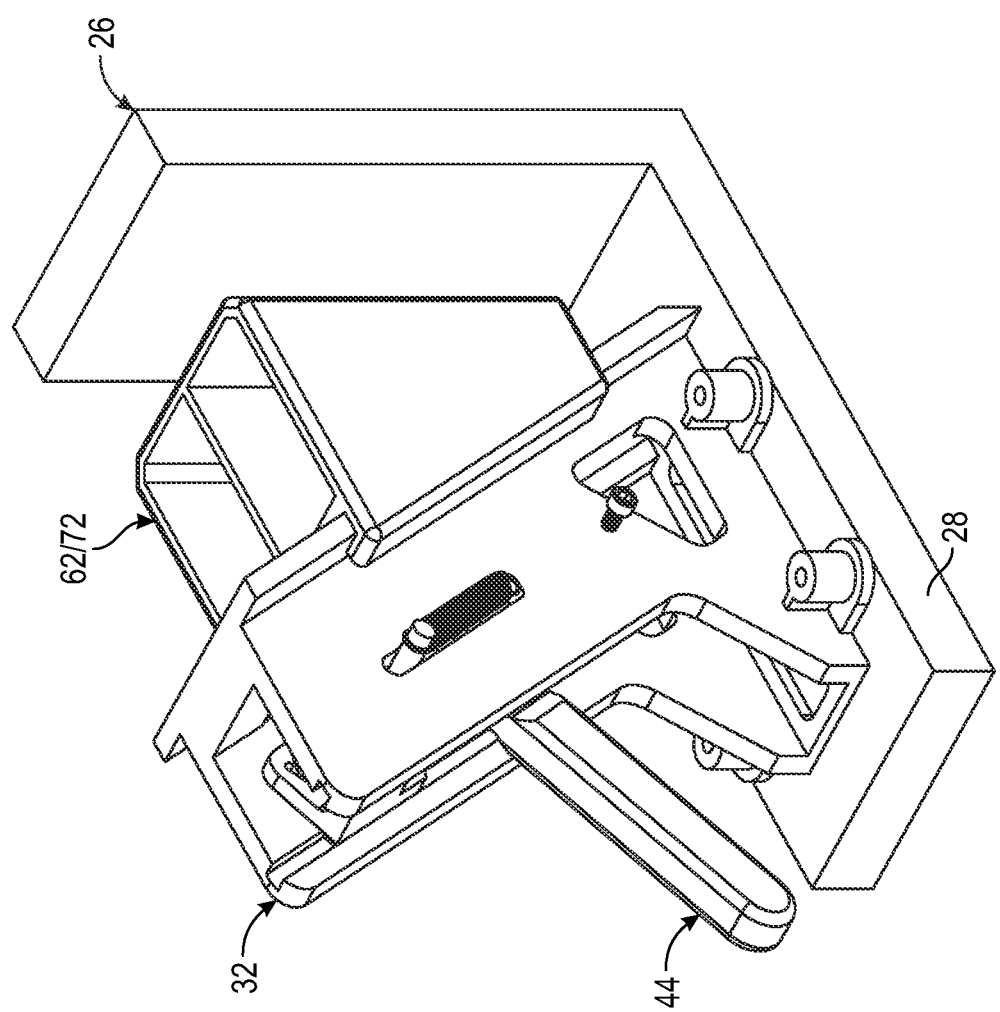

FIG. 82 shows third perspective view of the self-adjusting pocket hole jig system shown in FIG. 76, in accordance with one or more embodiments.

Figure 83:
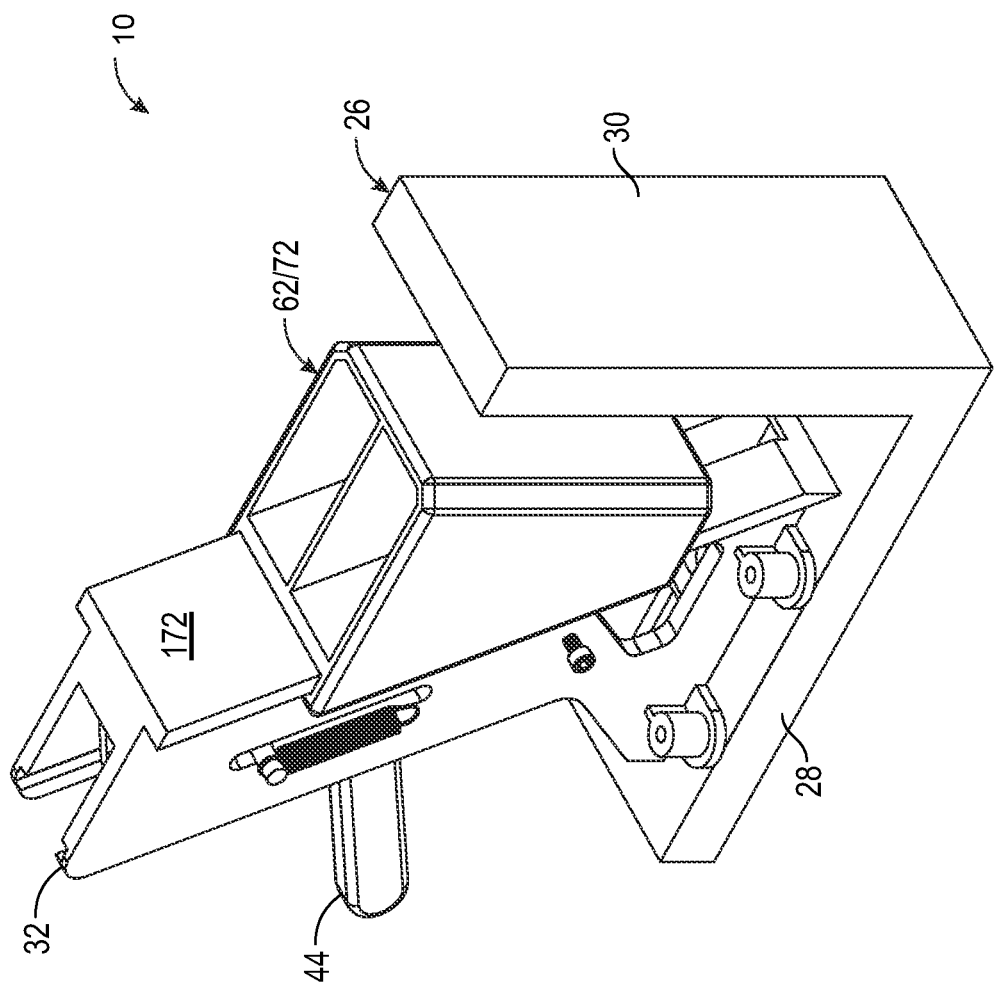

FIG. 83 shows a fourth perspective view of the self-adjusting pocket hole jig system shown in FIG. 76, in accordance with one or more embodiments.

Figure 84:
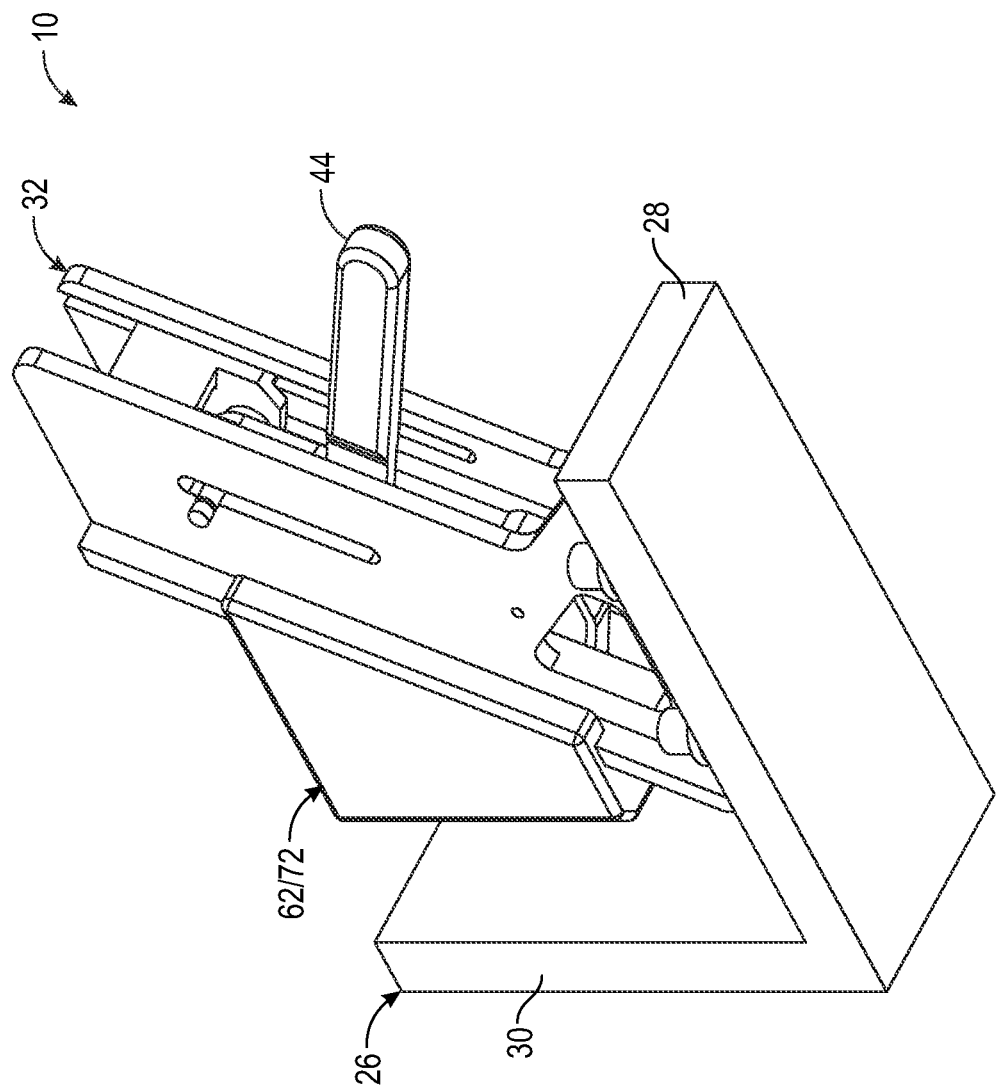

FIG. 84 shows a fifth perspective view of the self-adjusting pocket hole jig system shown in FIG. 76, in accordance with one or more embodiments.

Figure 85:
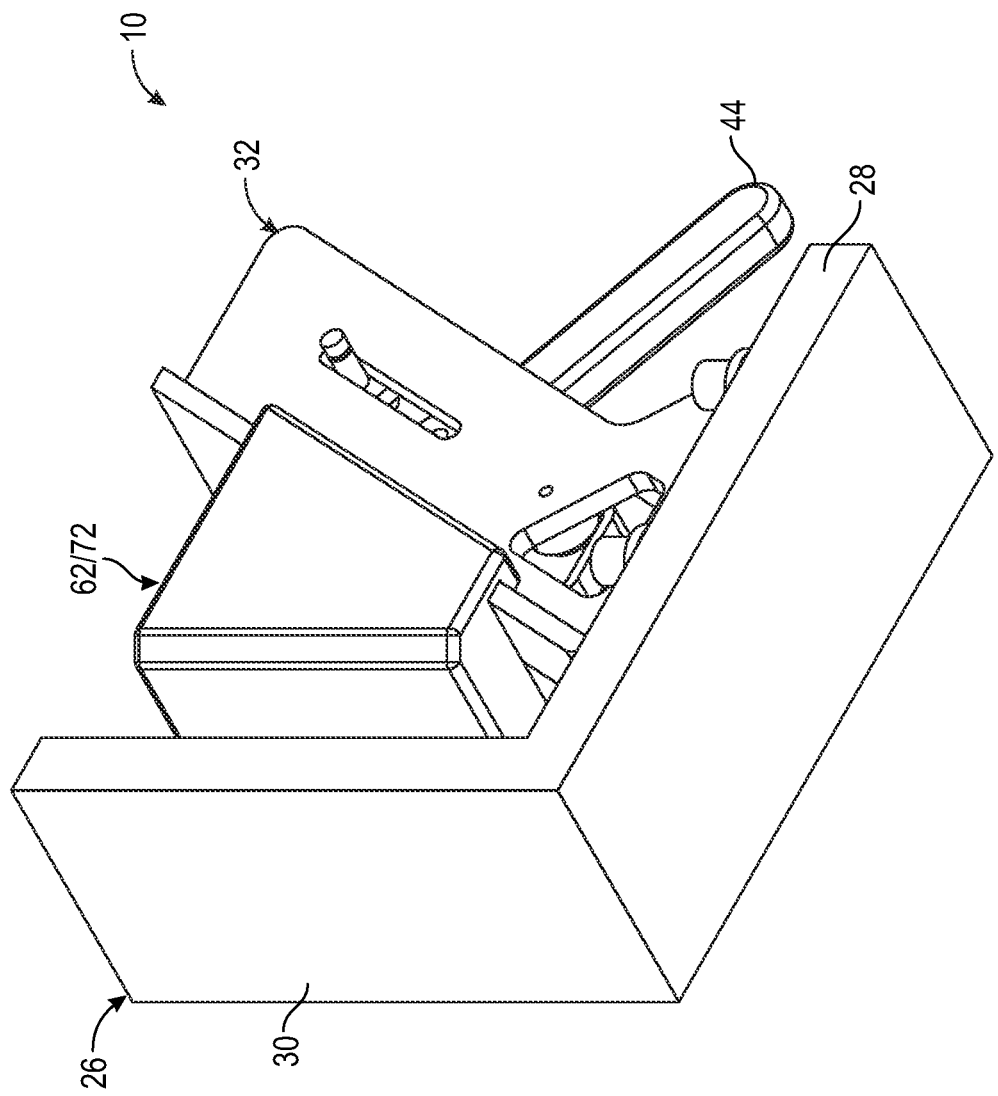

FIG. 85 shows a sixth perspective view of the self-adjusting pocket hole jig system shown in FIG. 76, in accordance with one or more embodiments.

Figure 86:
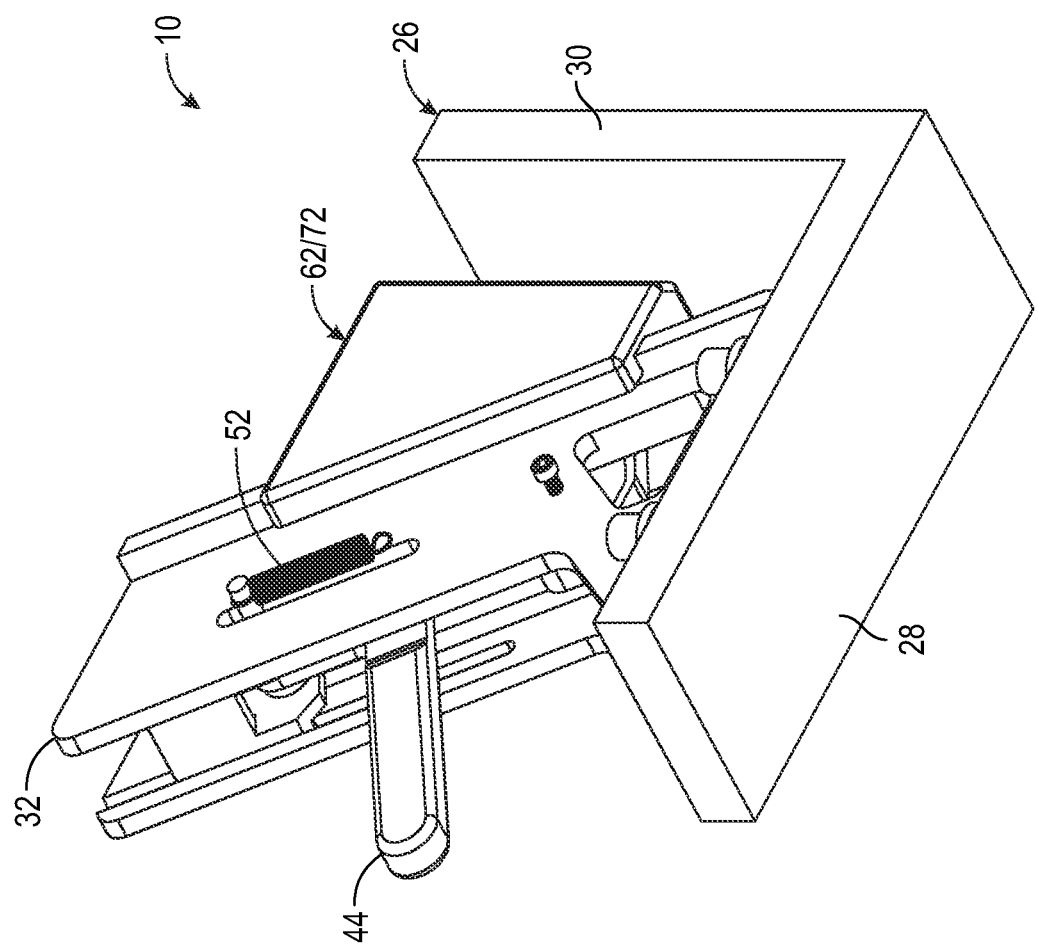

FIG. 86 shows a seventh perspective view of the self-adjusting pocket hole jig system shown in FIG. 76, in accordance with one or more embodiments.

Figure 87:
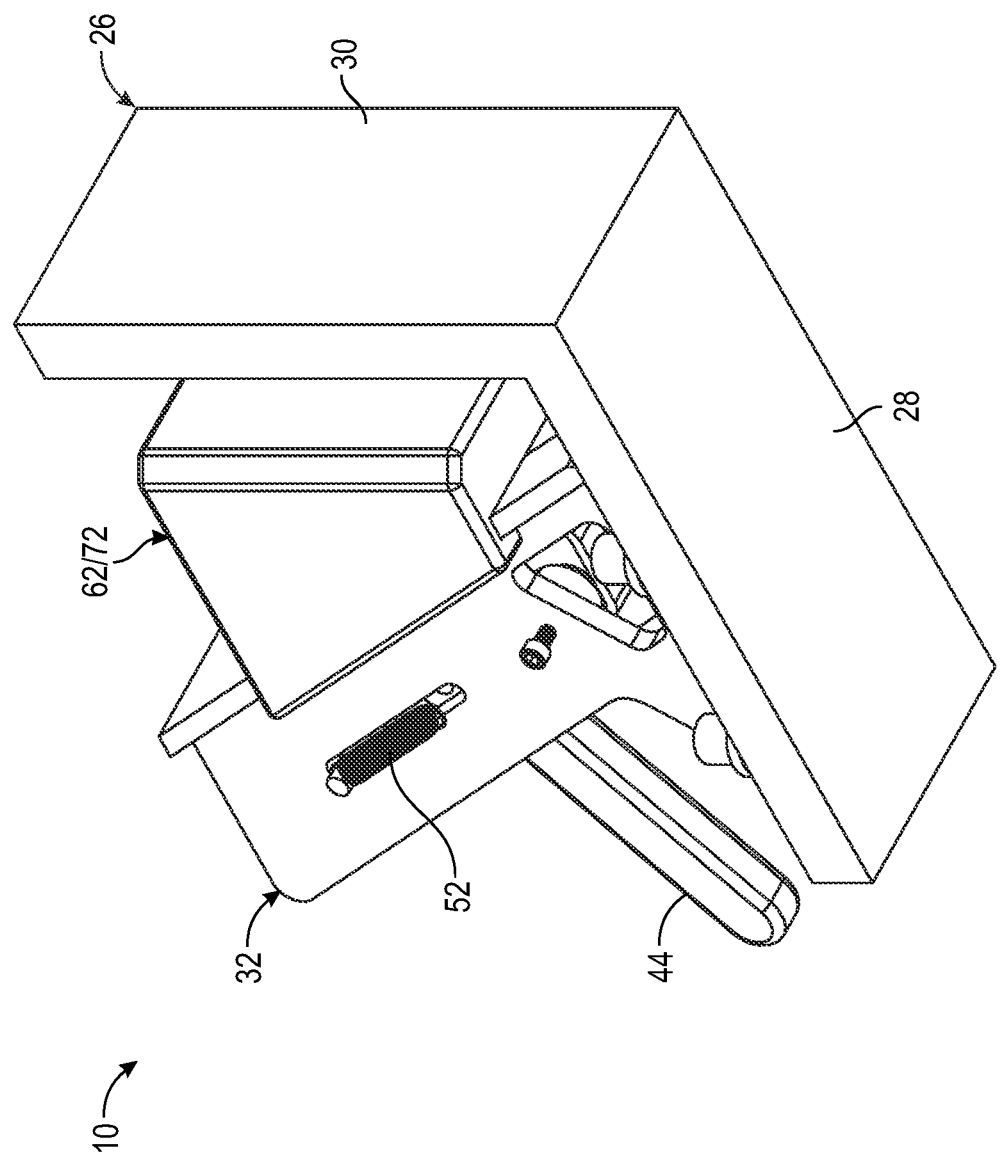

FIG. 87 shows an eighth perspective view of the self-adjusting pocket hole jig system shown in FIG. 76, in accordance with one or more embodiments.

Figure 88:
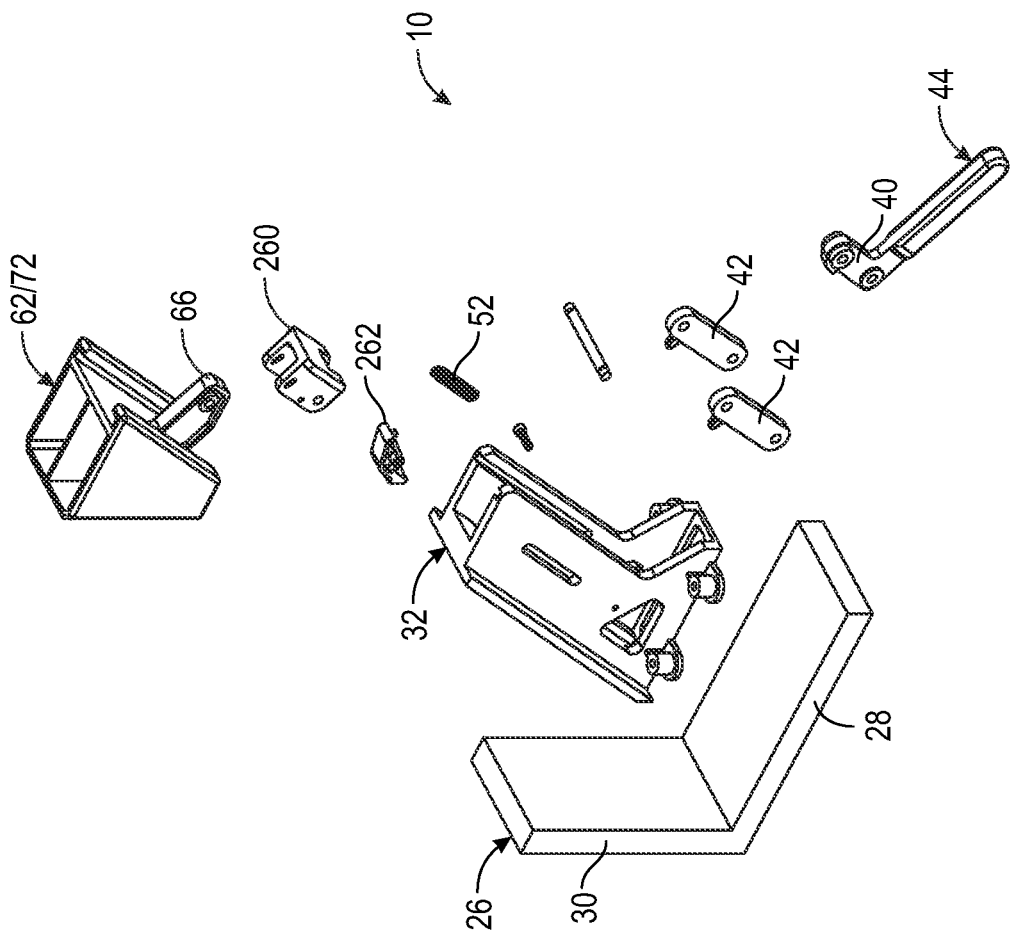

FIG. 88 shows an exploded perspective view of the self-adjusting pocket hole jig system shown in FIG. 76, in accordance with one or more embodiments.

Figure 89:
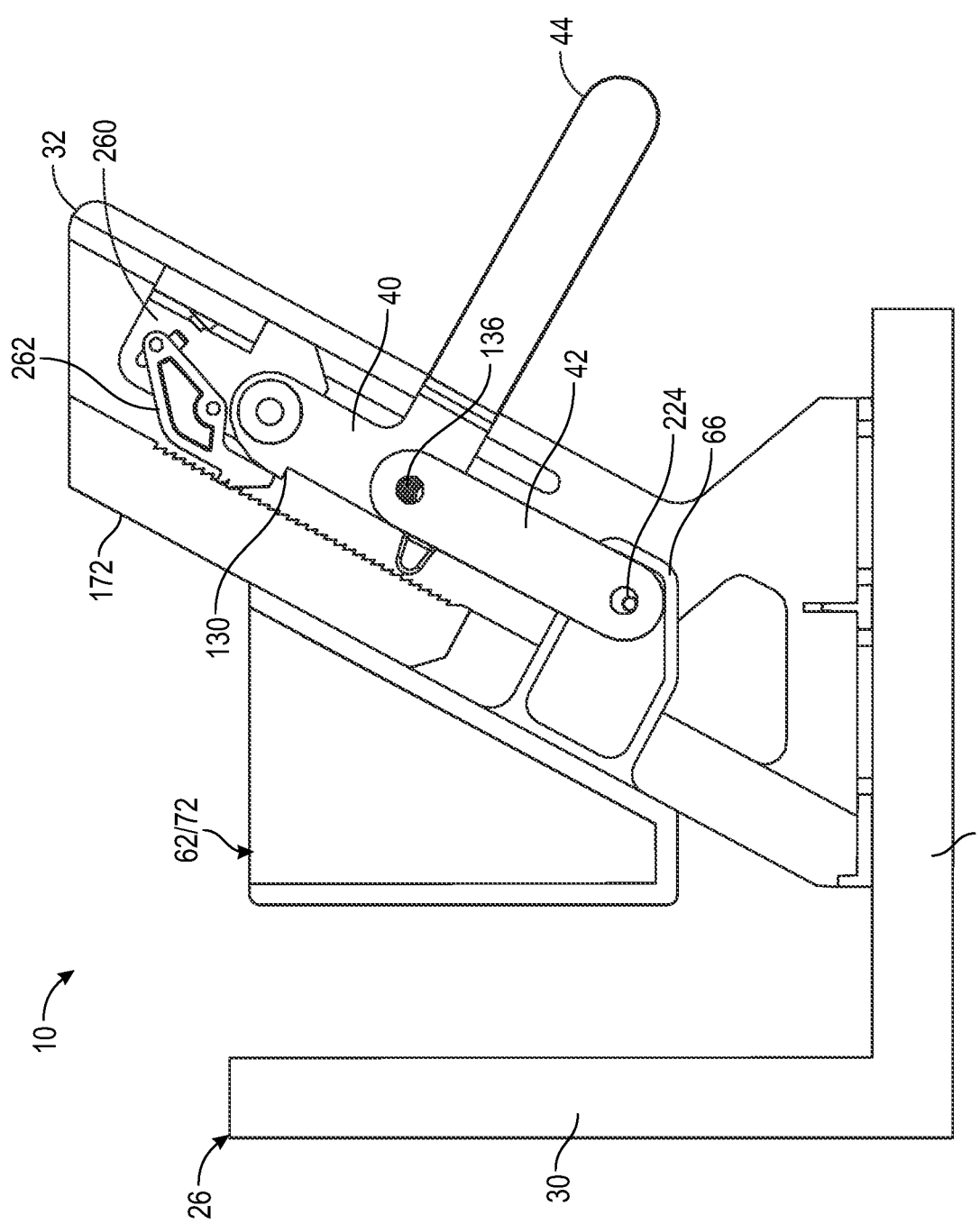

FIG. 89 shows a left side cutaway view of a self-adjusting pocket hole jig, in accordance with one or more embodiments.

Figure 90:
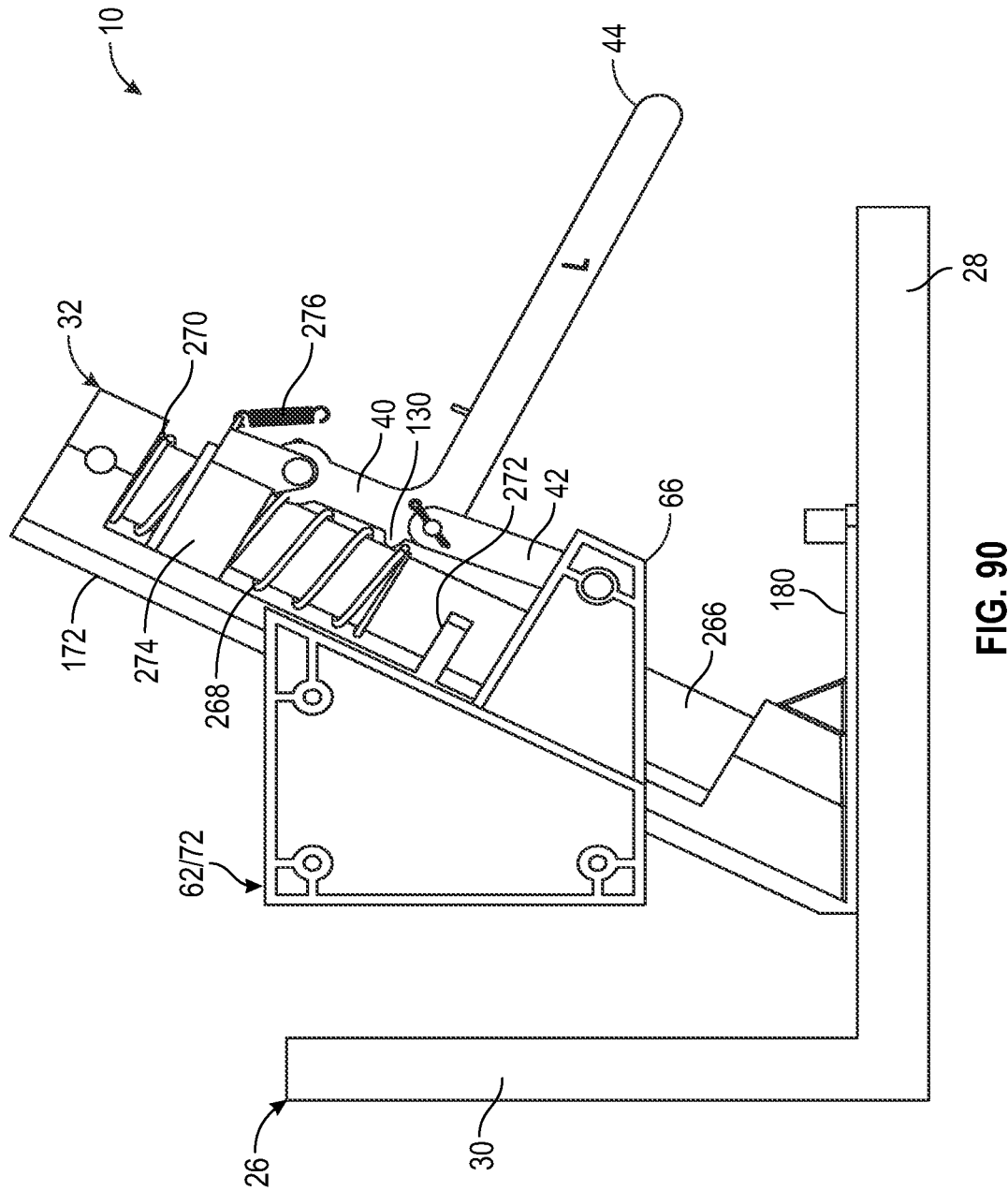

FIG. 90 shows another left side view of a self-adjusting pocket hole jig system, in accordance with one or more embodiments.

Figure 91:
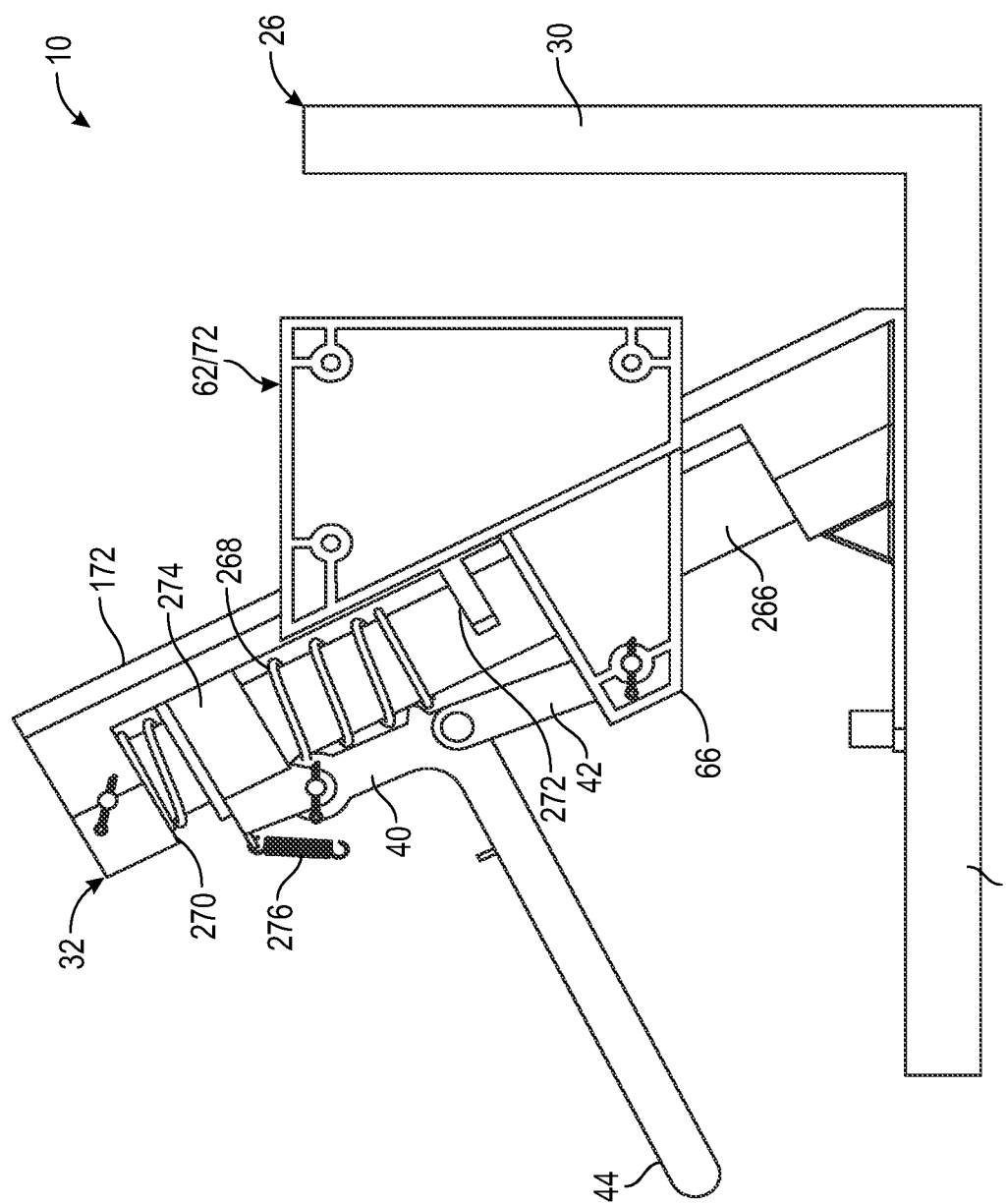

FIG. 91 shows a right side view of the self-adjusting pocket hole jig system shown in FIG. 90, in accordance with one or more embodiments.

Figure 92:
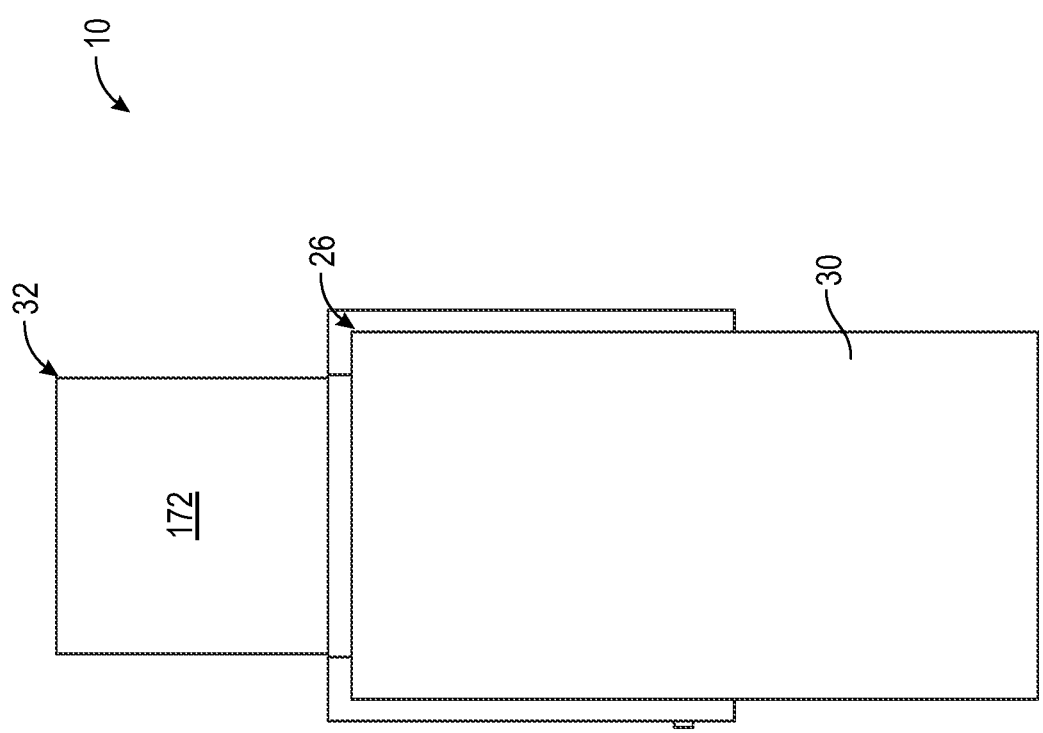

FIG. 92 shows a forward side view of the self-adjusting pocket hole jig system shown in FIG. 90, in accordance with one or more embodiments.

Figure 93:
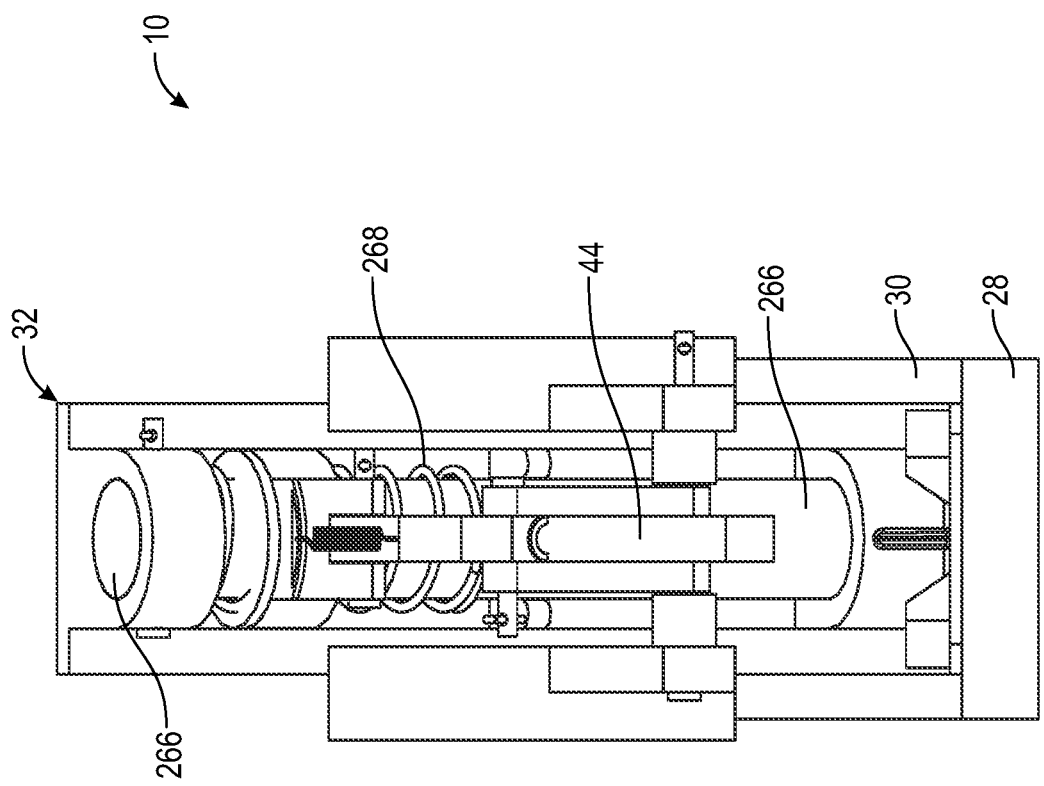

FIG. 93 shows a rearward side view of the self-adjusting pocket hole jig system shown in FIG. 90, in accordance with one or more embodiments.

Figure 94:
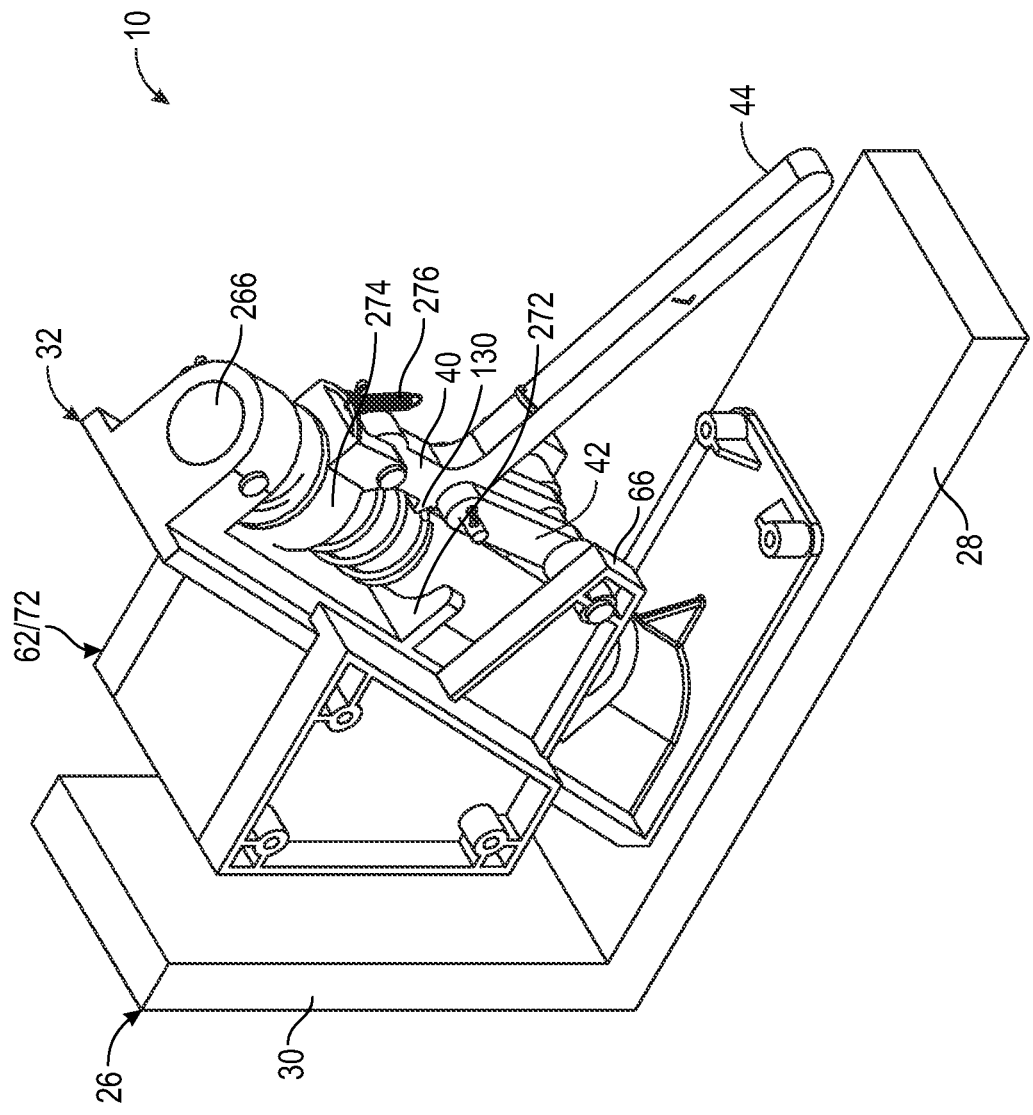

FIG. 94 shows a first perspective view of the self-adjusting pocket hole jig system shown in FIG. 90, in accordance with one or more embodiments.

Figure 95:
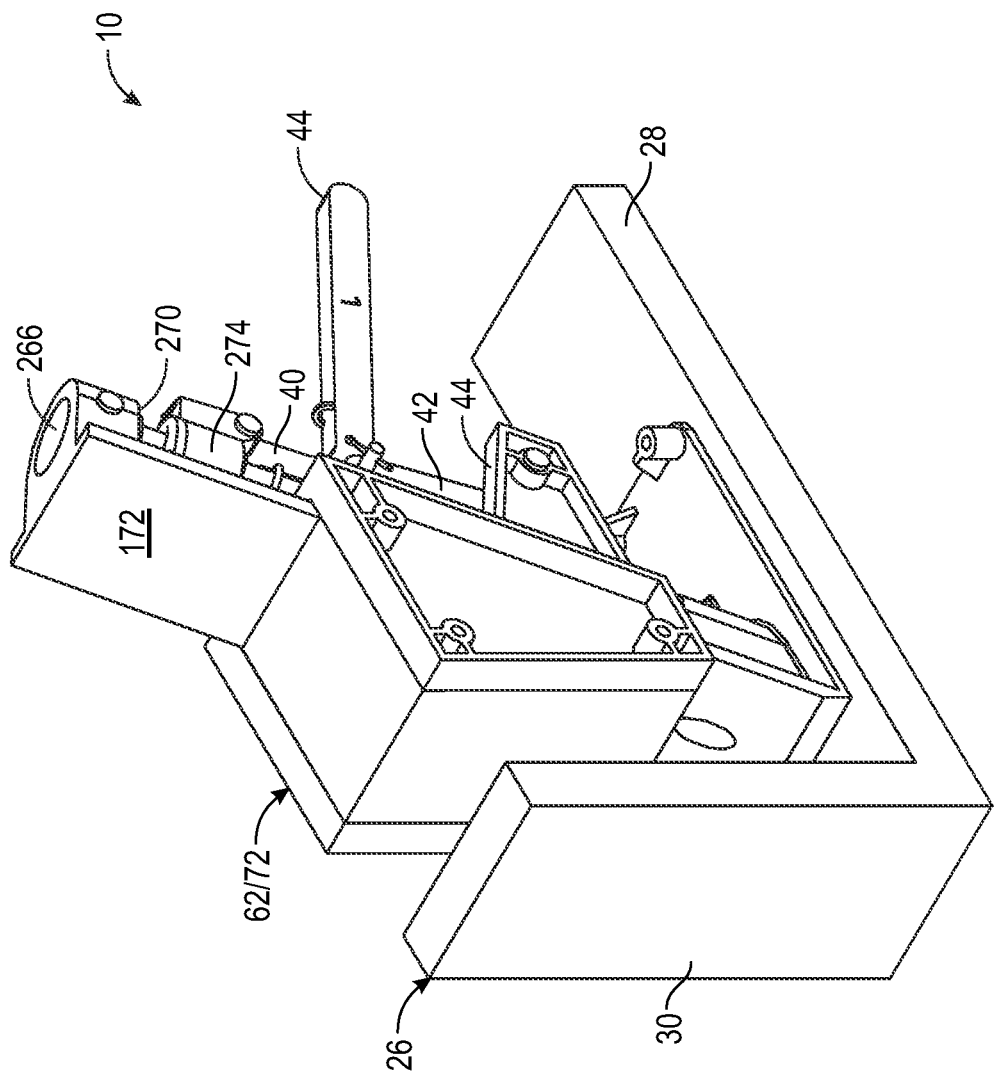

FIG. 95 shows a second perspective view of the self-adjusting pocket hole jig system shown in FIG. 90, in accordance with one or more embodiments.

Figure 96:
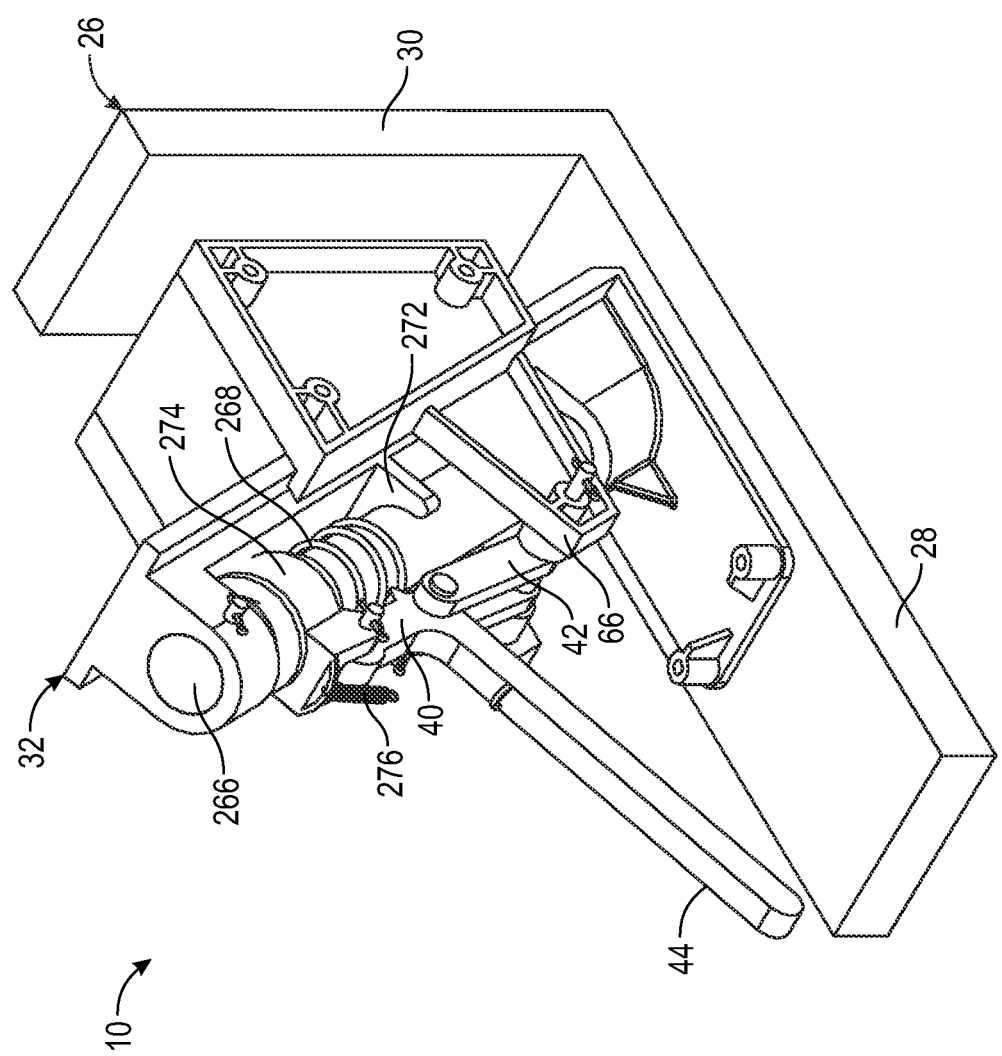

FIG. 96 shows third perspective view of the self-adjusting pocket hole jig system shown in FIG. 90, in accordance with one or more embodiments.

Figure 97:
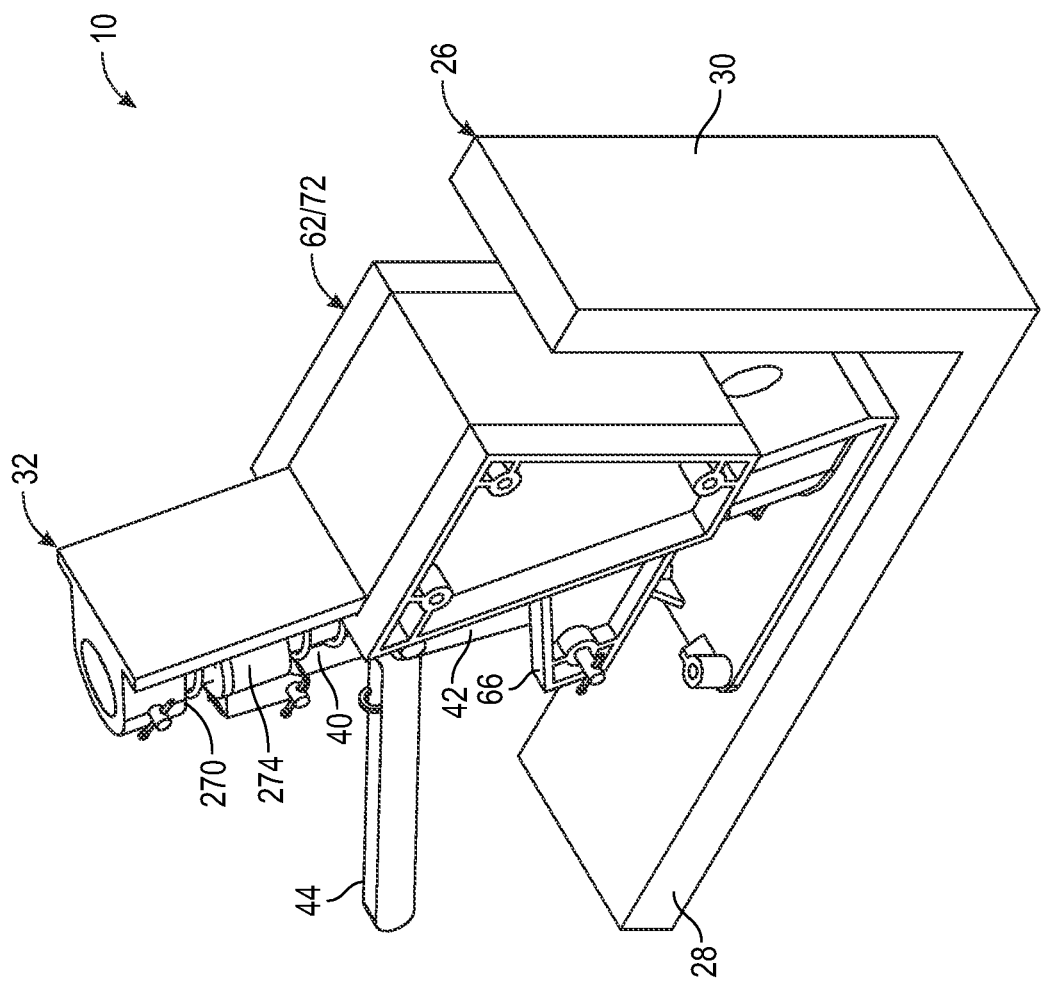

FIG. 97 shows a fourth perspective view of the self-adjusting pocket hole jig system shown in FIG. 90, in accordance with one or more embodiments.

Figure 98:
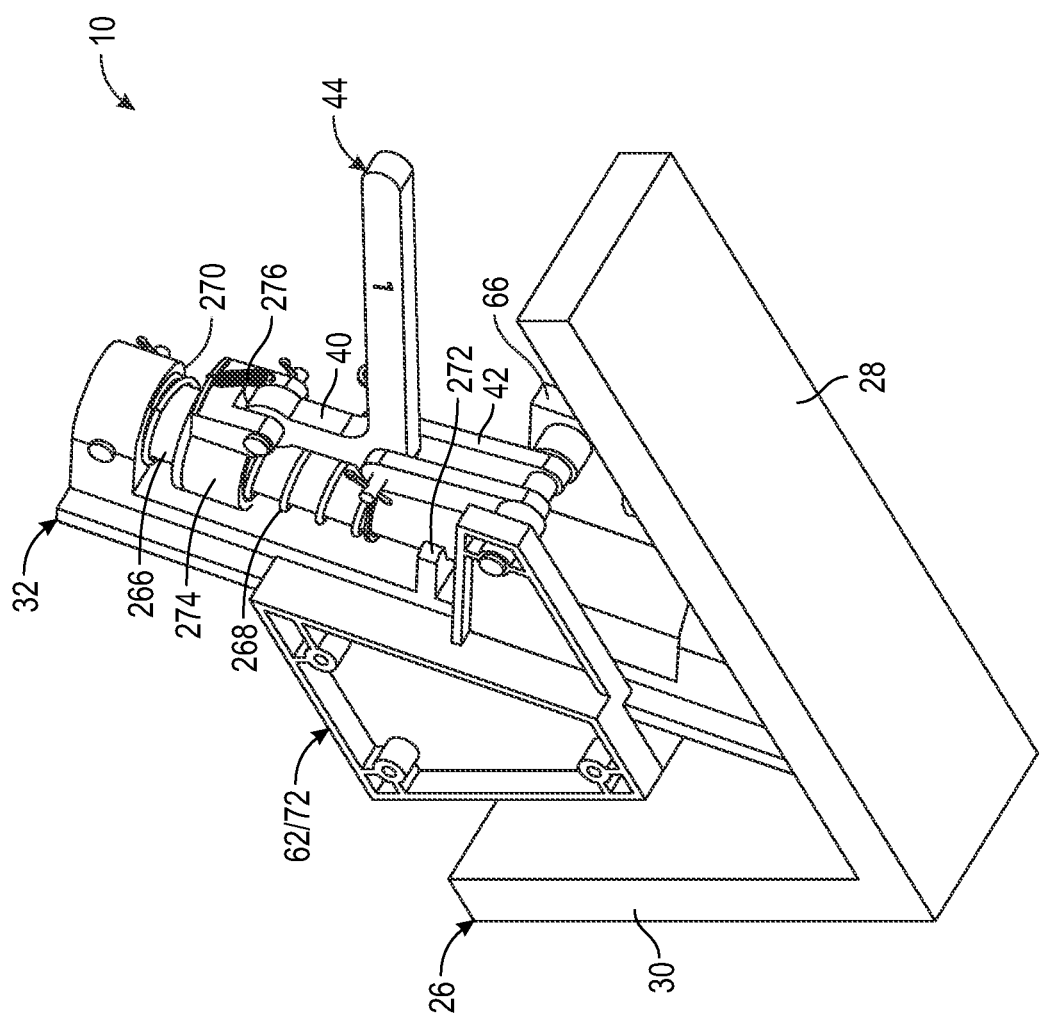

FIG. 98 shows a fifth perspective view of the self-adjusting pocket hole jig system shown in FIG. 90, in accordance with one or more embodiments.

Figure 99:
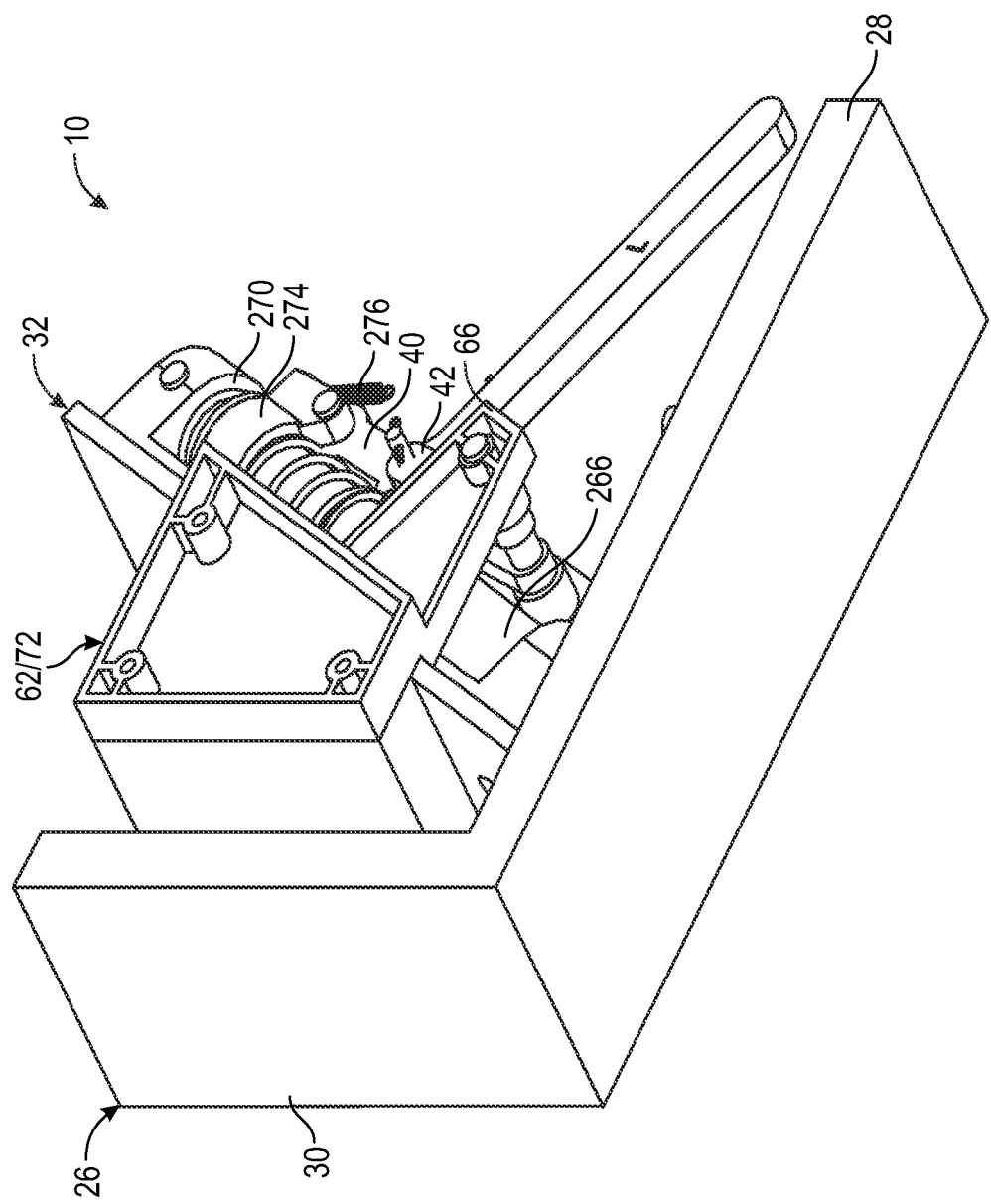

FIG. 99 shows a sixth perspective view of the self-adjusting pocket hole jig system shown in FIG. 90, in accordance with one or more embodiments.

Figure 100:
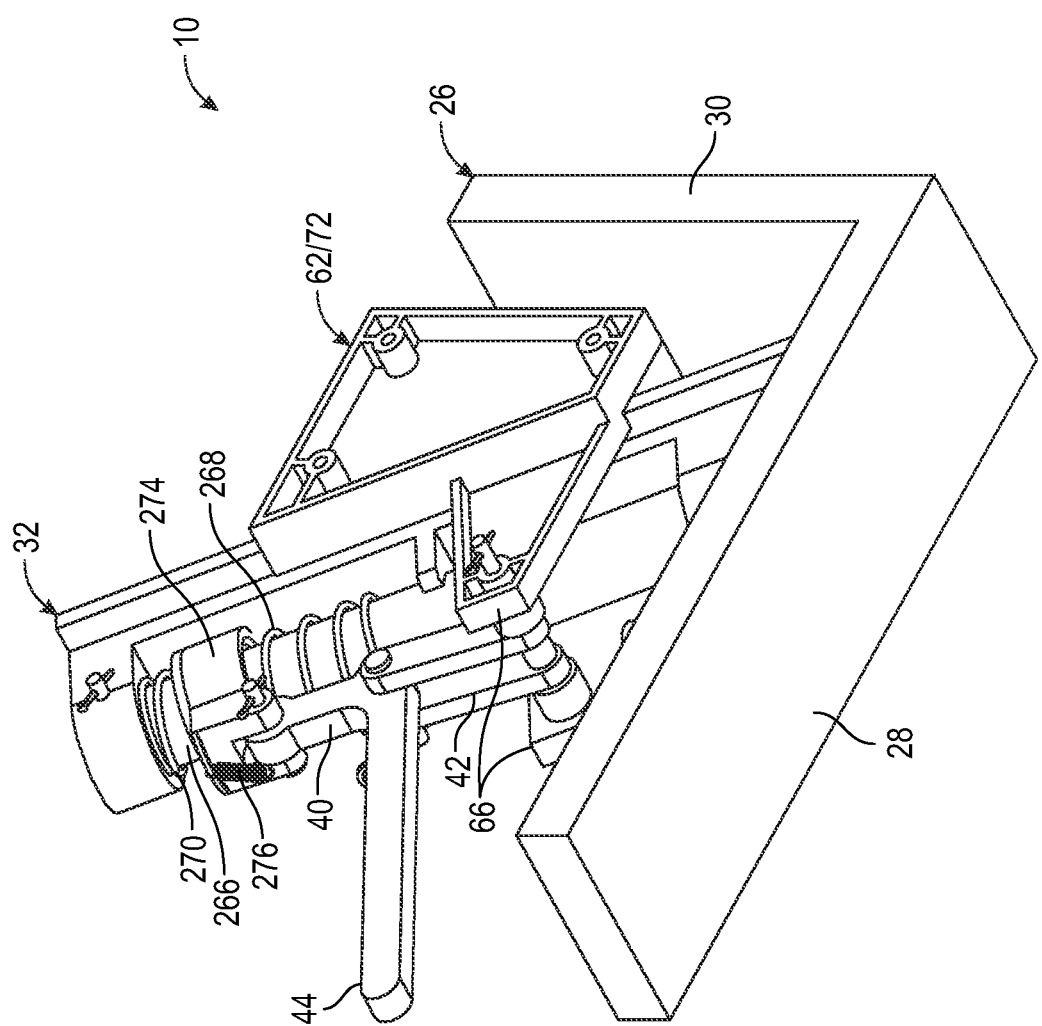

FIG. 100 shows a seventh perspective view of the self-adjusting pocket hole jig system shown in FIG. 90, in accordance with one or more embodiments.

Figure 101:
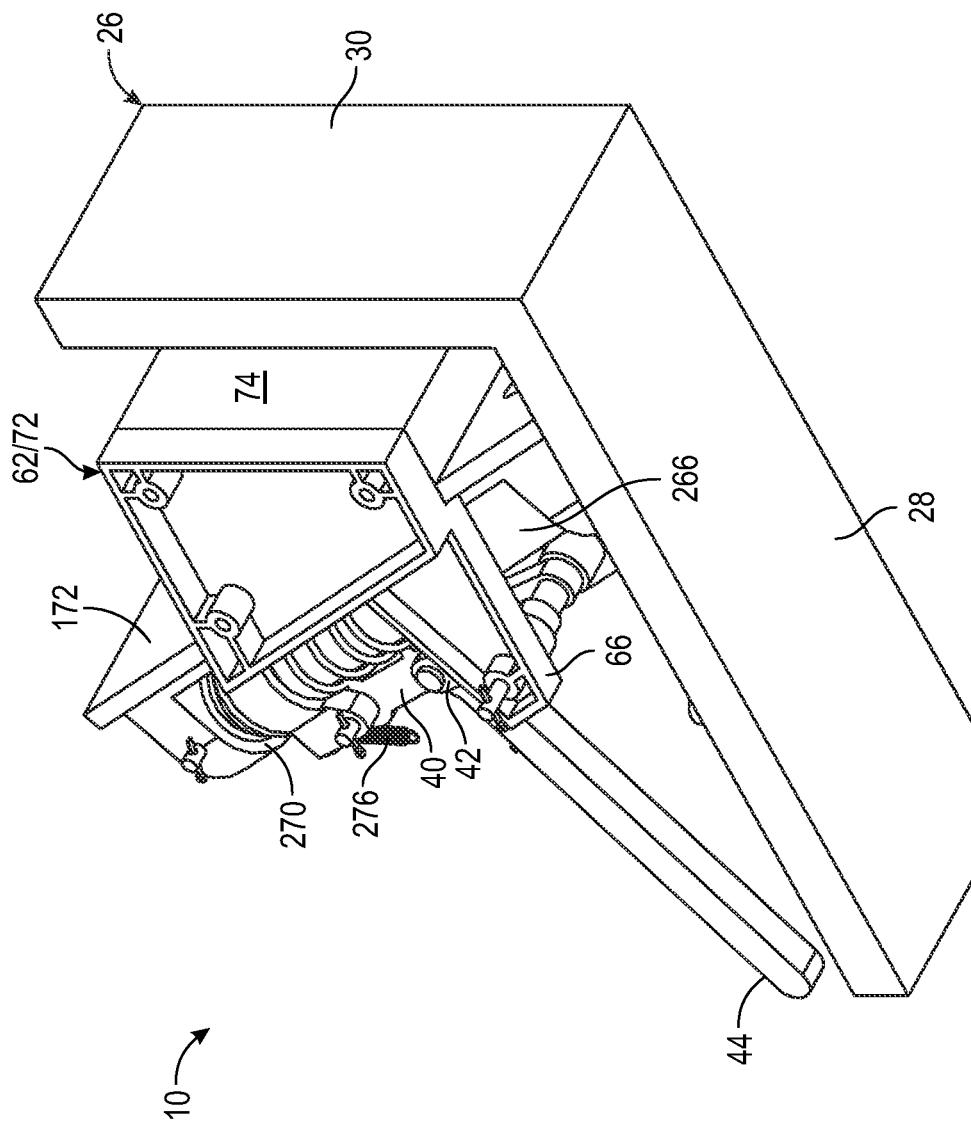

FIG. 101 shows an eighth perspective view of the self-adjusting pocket hole jig system shown in FIG. 90, in accordance with one or more embodiments.

FIG. 101 shows an eighth perspective view of the self-adjusting pocket hole jig system shown in FIG. 90, in accordance with one or more embodiments.

Figure 102:
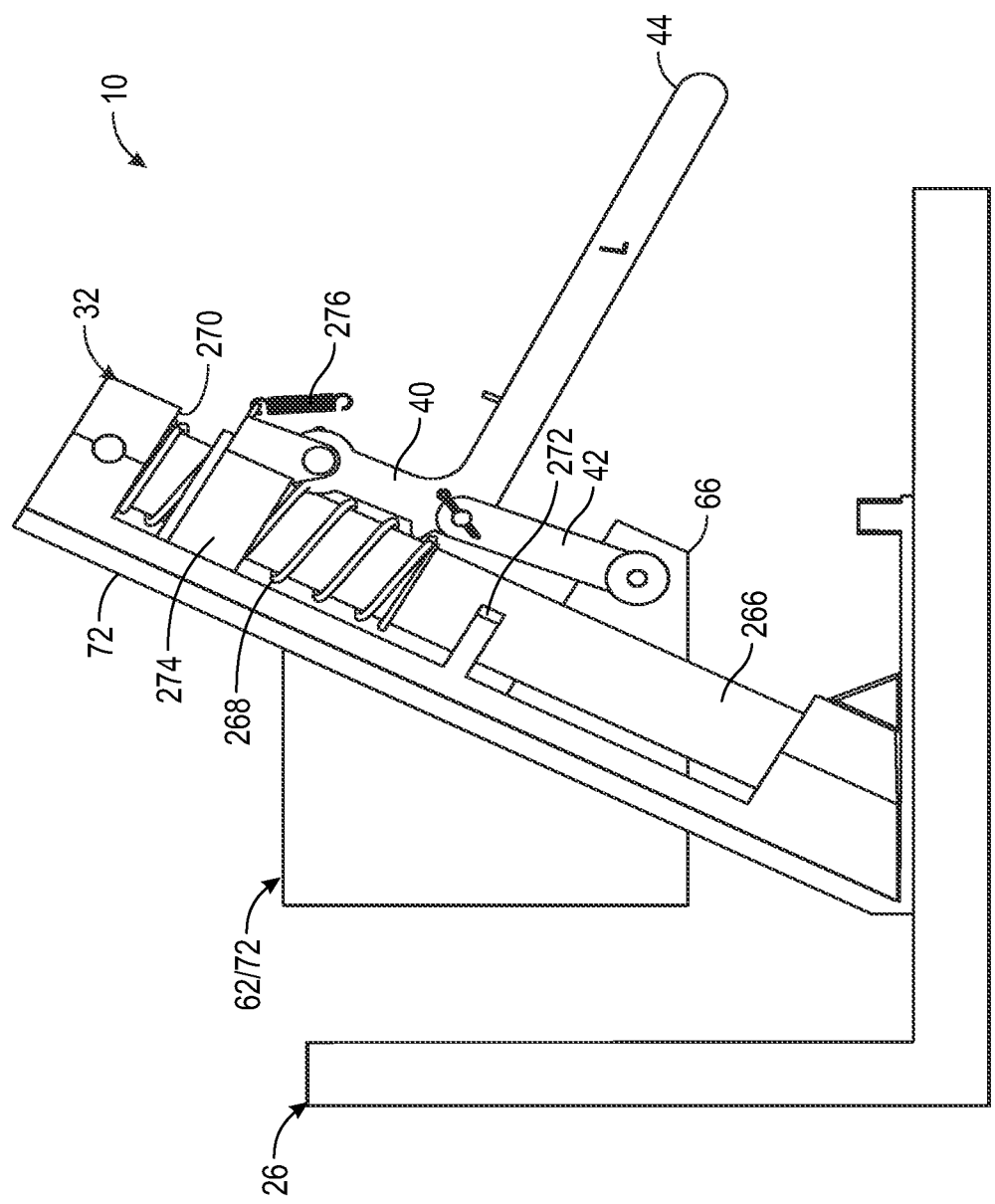

FIG. 102 shows a left side cutaway view of the self-adjusting pocket hole jig system shown in FIG. 90, in accordance with one or more embodiments.

Figure 103:
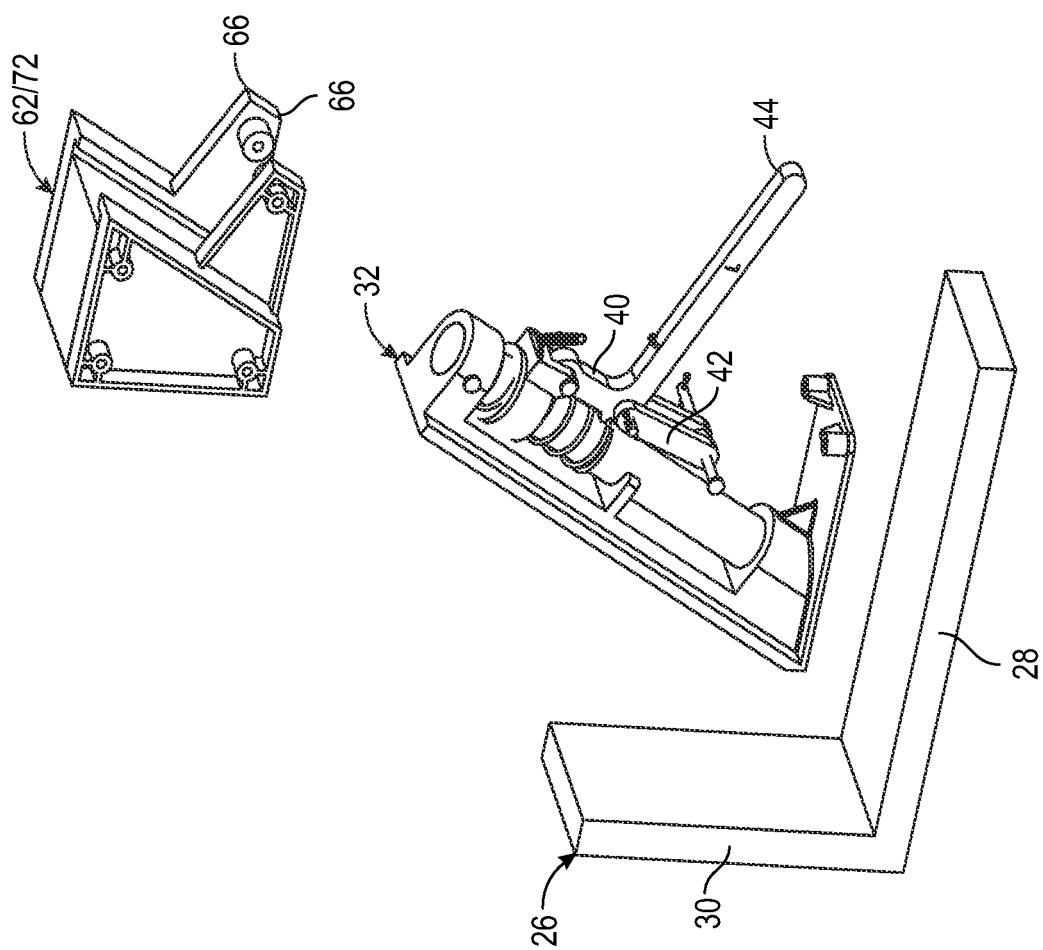

FIG. 103 shows an exploded perspective view of the self-adjusting pocket hole jig system shown in FIG. 90, in accordance with one or more embodiments.

Figure 104:
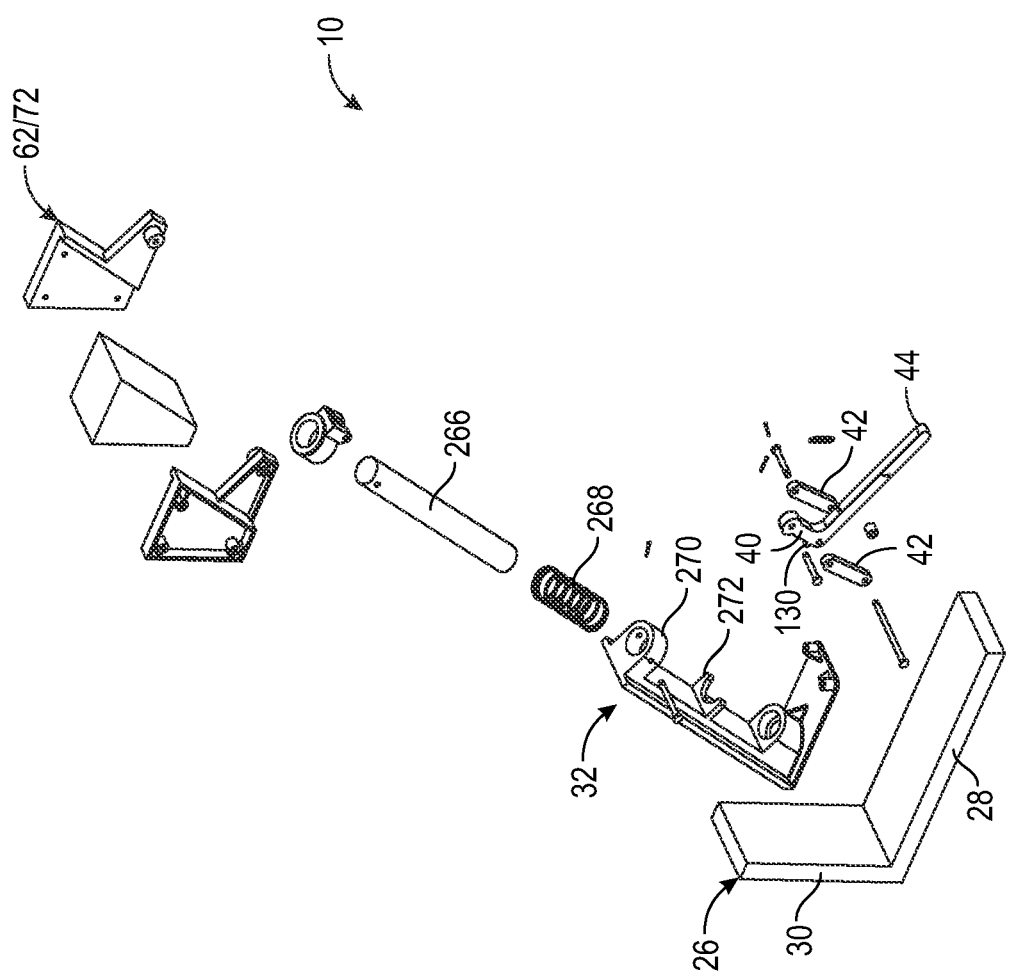

FIG. 104 shows another exploded perspective view of the self-adjusting pocket hole jig system shown in FIG. 90, in accordance with one or more embodiments.

Figure 105:
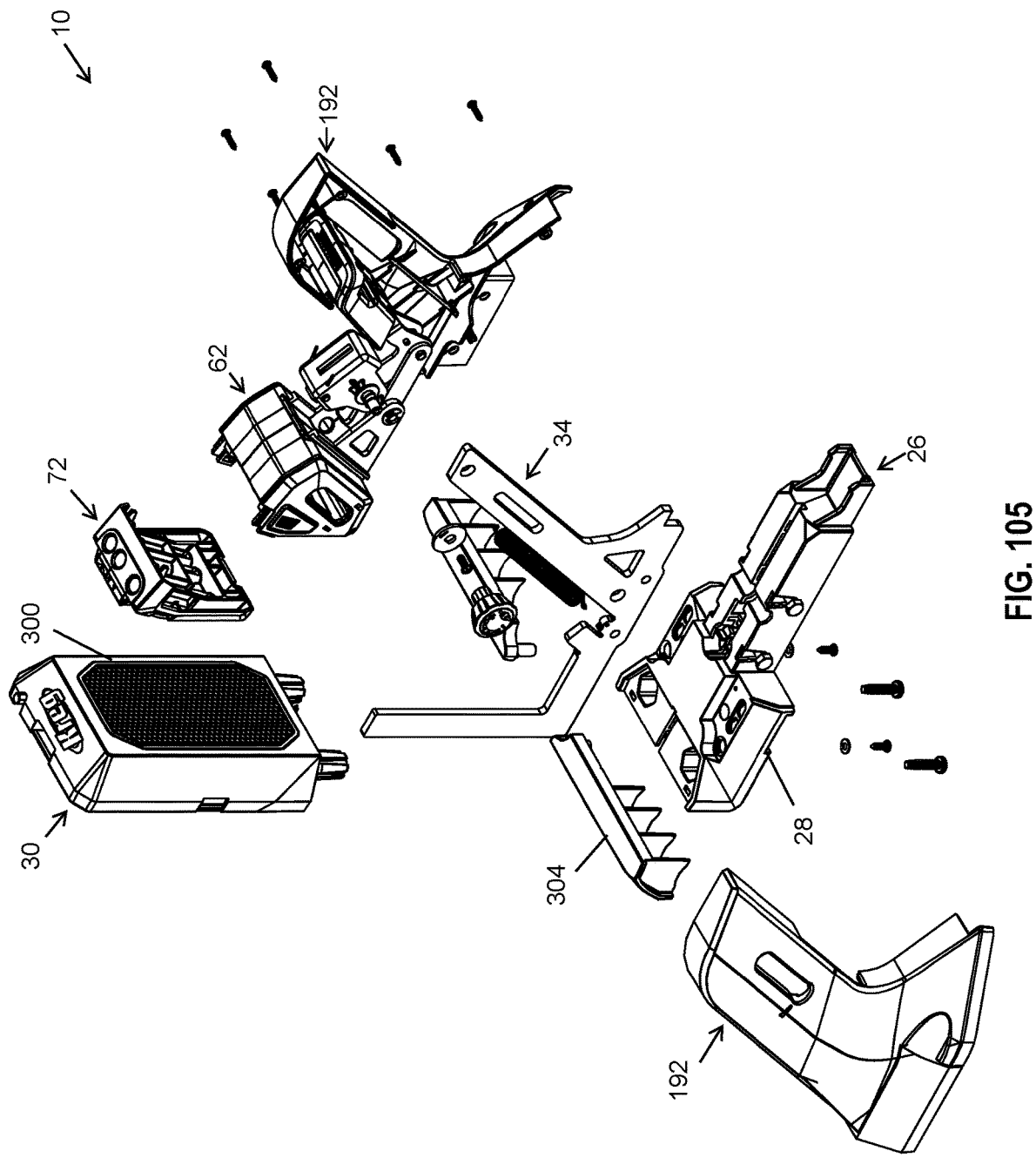

FIG. 105 shows an exploded perspective view of another self-adjusting pocket hole jig system, in accordance with one or more embodiments.

Figure 106:
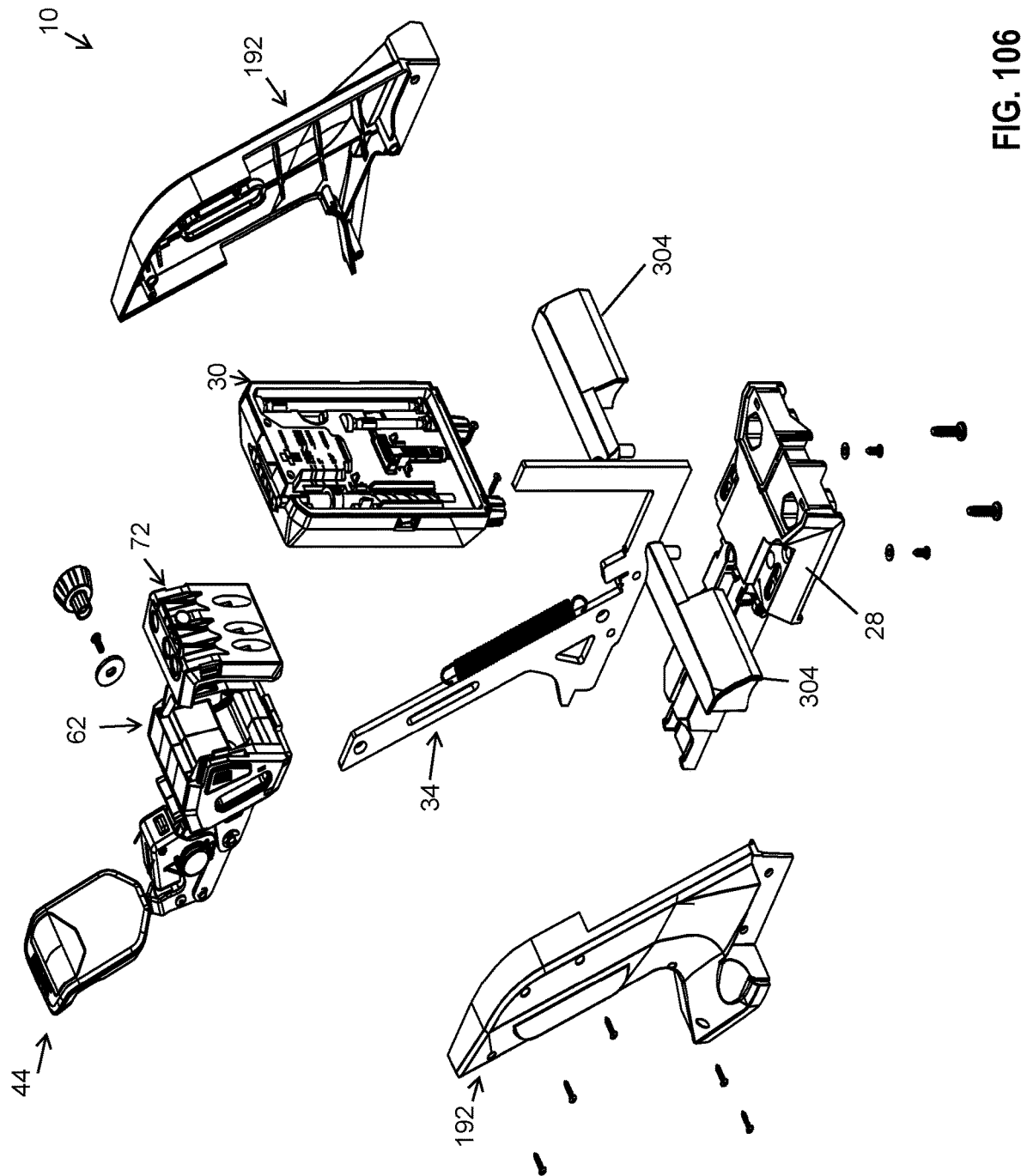

FIG. 106 shows another exploded perspective view of the self-adjusting pocket hole jig system shown in FIG. 105, in accordance with one or more embodiments.

Figure 107:
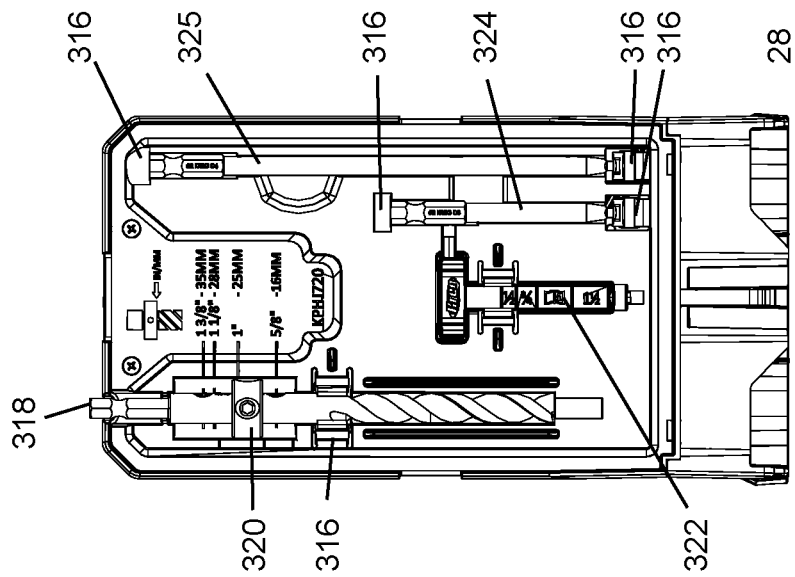

FIG. 107 shows a forward side view of the self-adjusting pocket hole jig system shown in FIG. 105 with storage features, in accordance with one or more embodiments.

Figure 108:
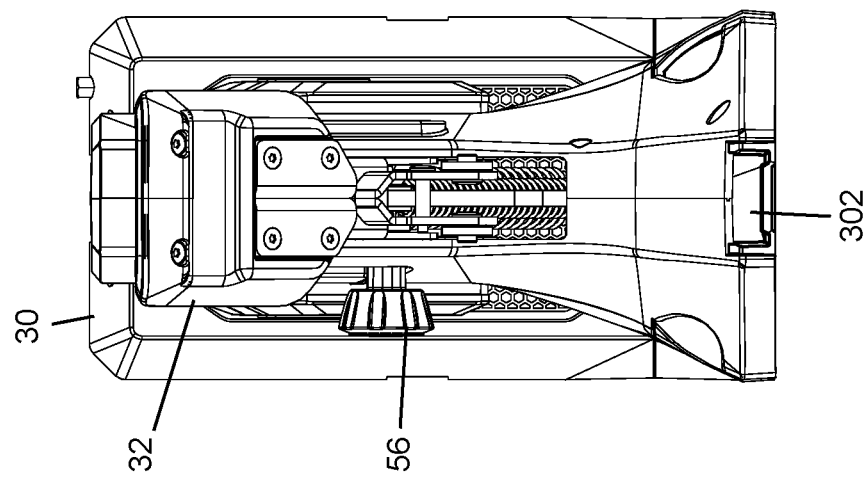

FIG. 108 shows a rearward side view of the self-adjusting pocket hole jig system shown in FIG. 105, in accordance with one or more embodiments.

Figure 109:
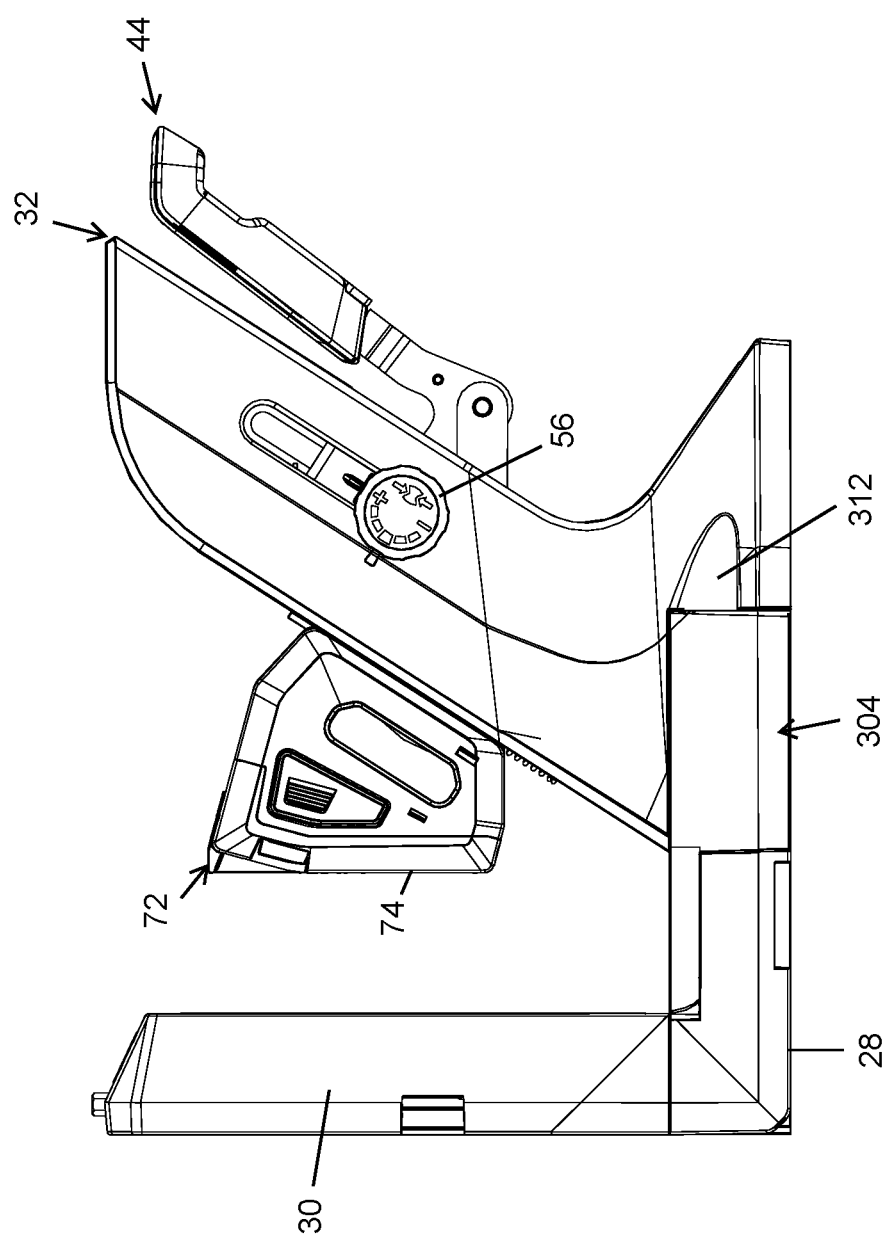

FIG. 109 shows a left side view of the self-adjusting pocket hole jig system shown in FIG. 105, in accordance with one or more embodiments.

Figure 110:
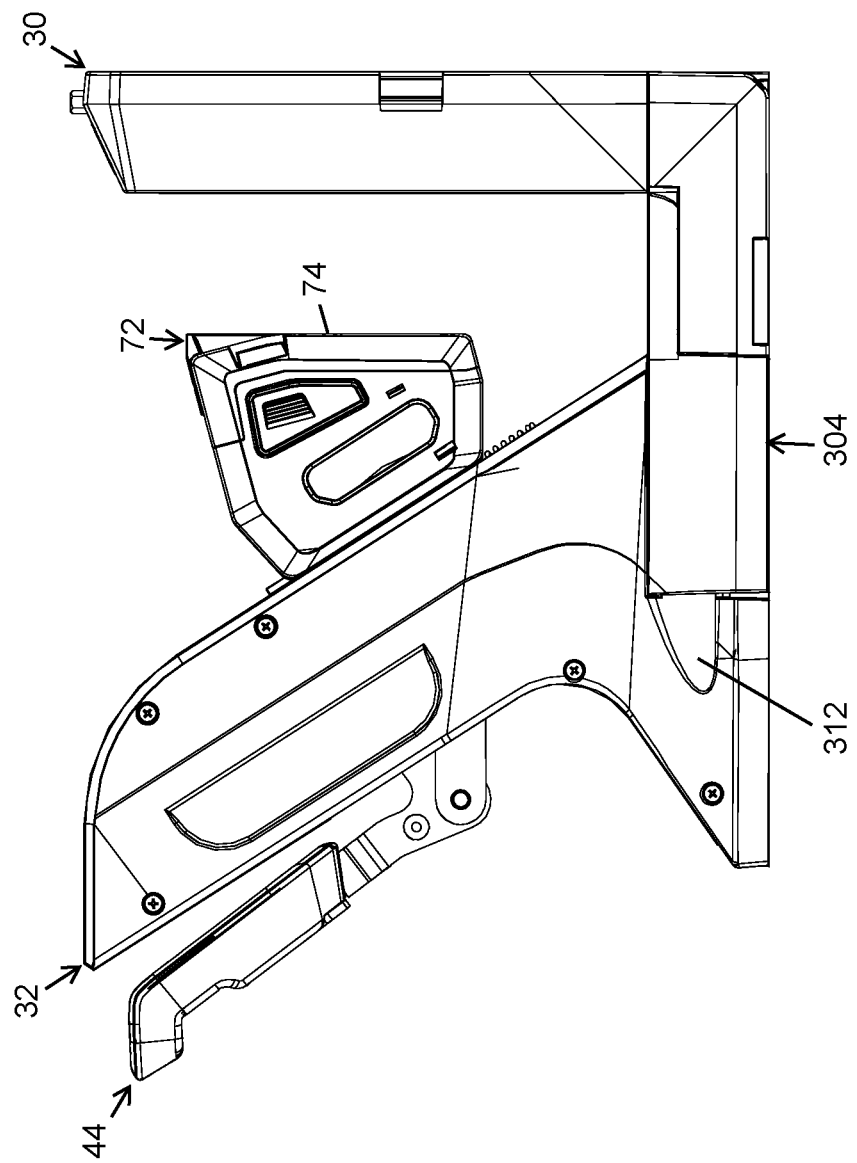

FIG. 110 shows a right side view of the self-adjusting pocket hole jig system shown in FIG. 105, in accordance with one or more embodiments.

Figure 111:
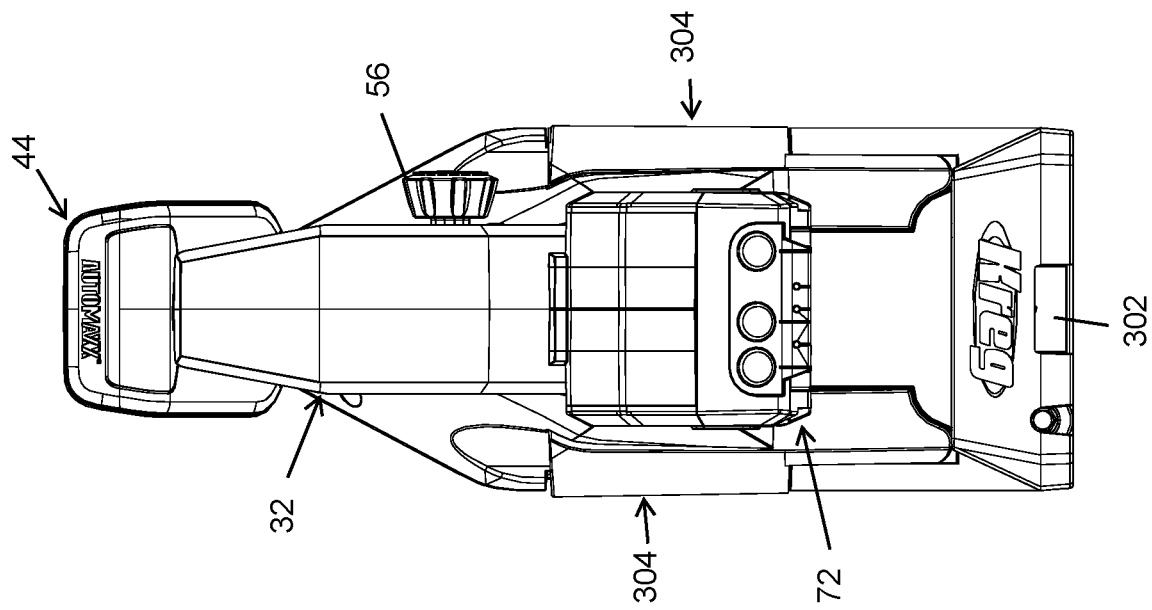

FIG. 111 shows a topside side view of the self-adjusting pocket hole jig system shown in FIG. 105, in accordance with one or more embodiments.

Figure 112:
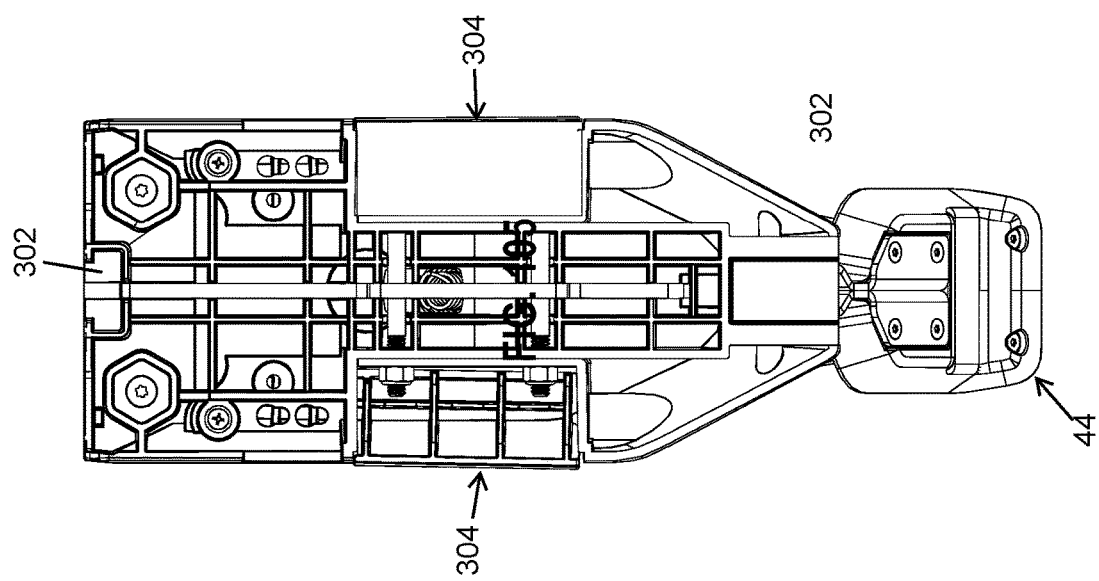

FIG. 112 shows a bottom side view of the self-adjusting pocket hole jig system shown in FIG. 105, in accordance with one or more embodiments.

Figure 113:
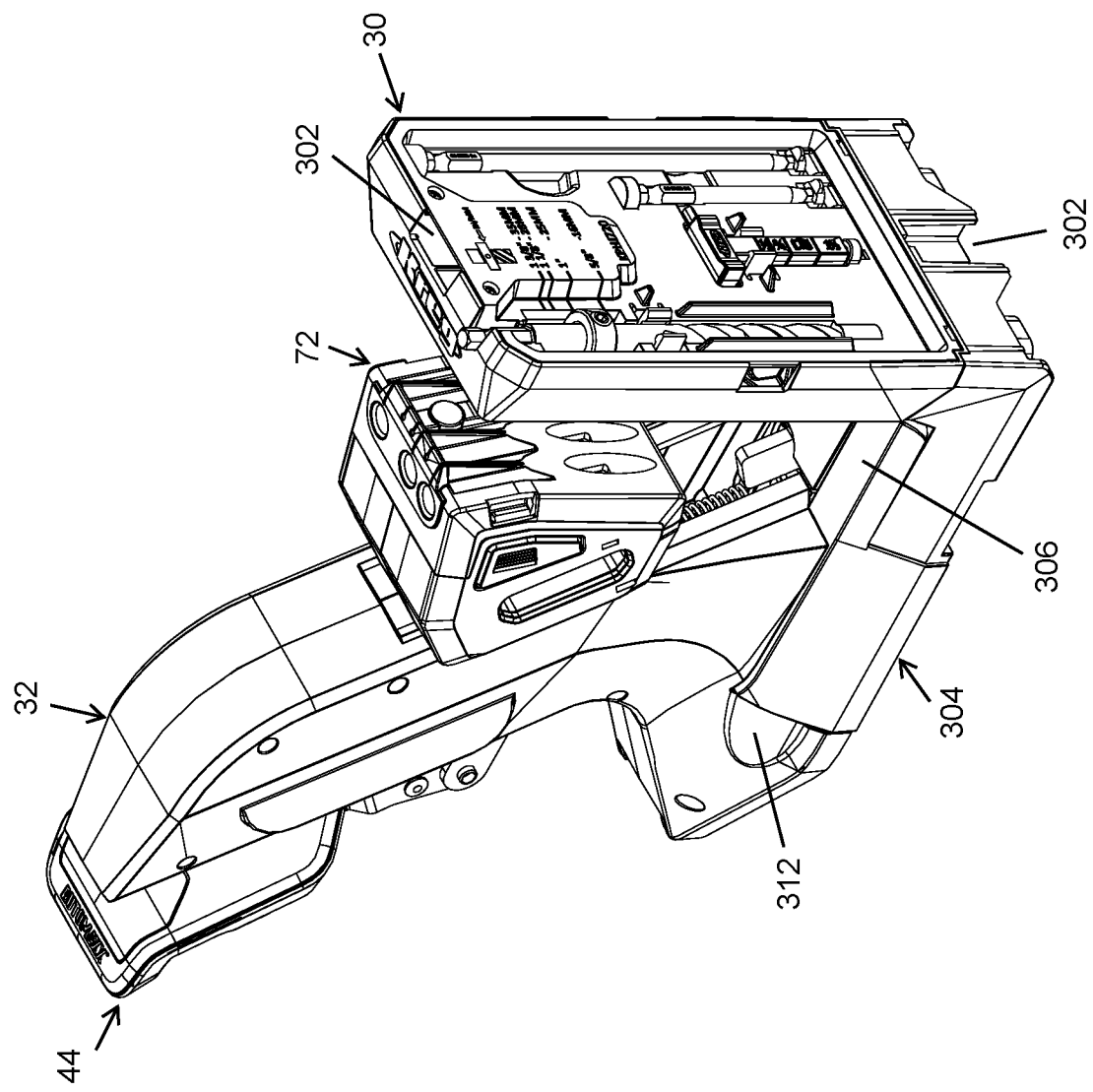

FIG. 113 shows a first perspective view of the self-adjusting pocket hole jig system shown in FIG. 105, in accordance with one or more embodiments.

Figure 114:
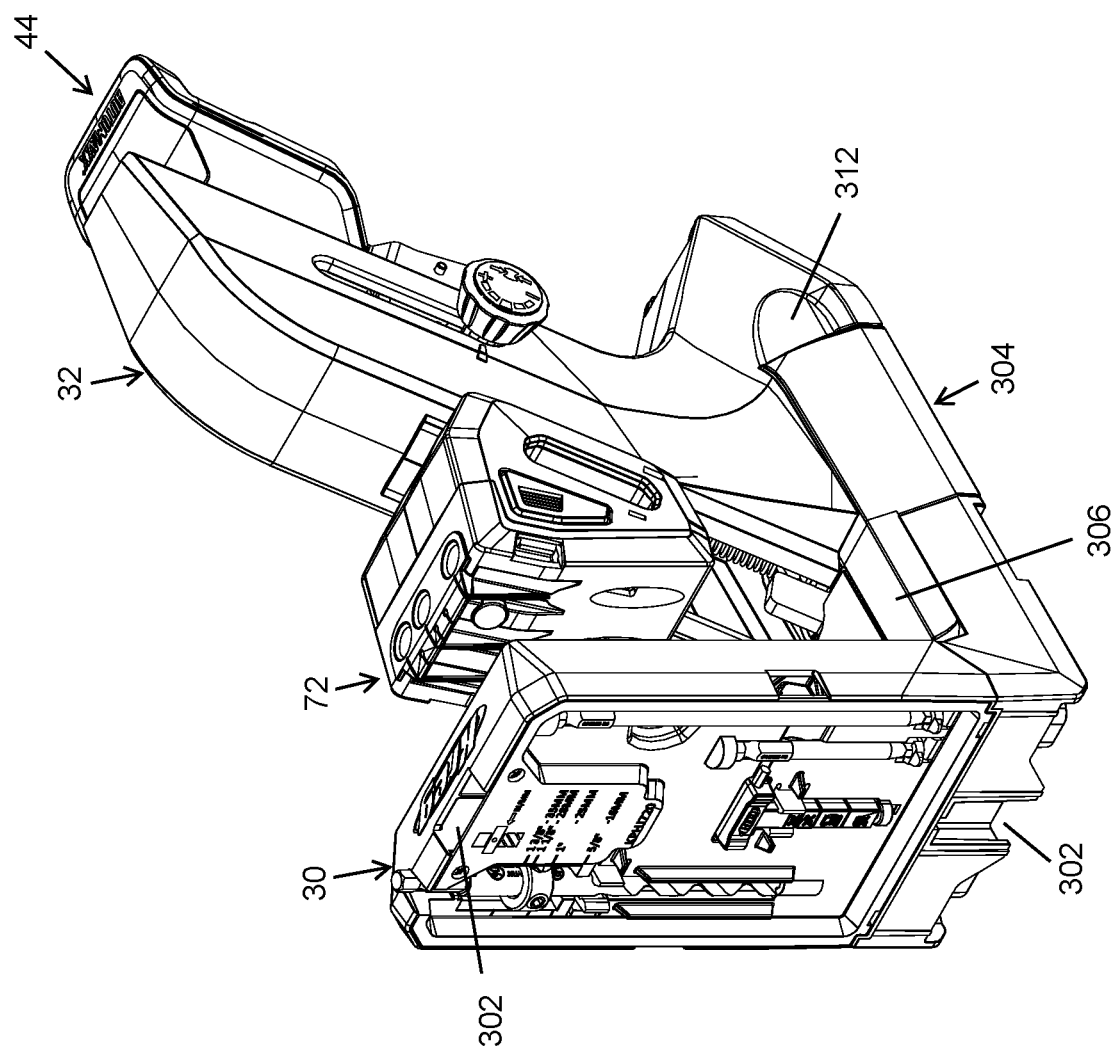

FIG. 114 shows a second perspective view of the self-adjusting pocket hole jig system shown in FIG. 105, in accordance with one or more embodiments.

Figure 115:
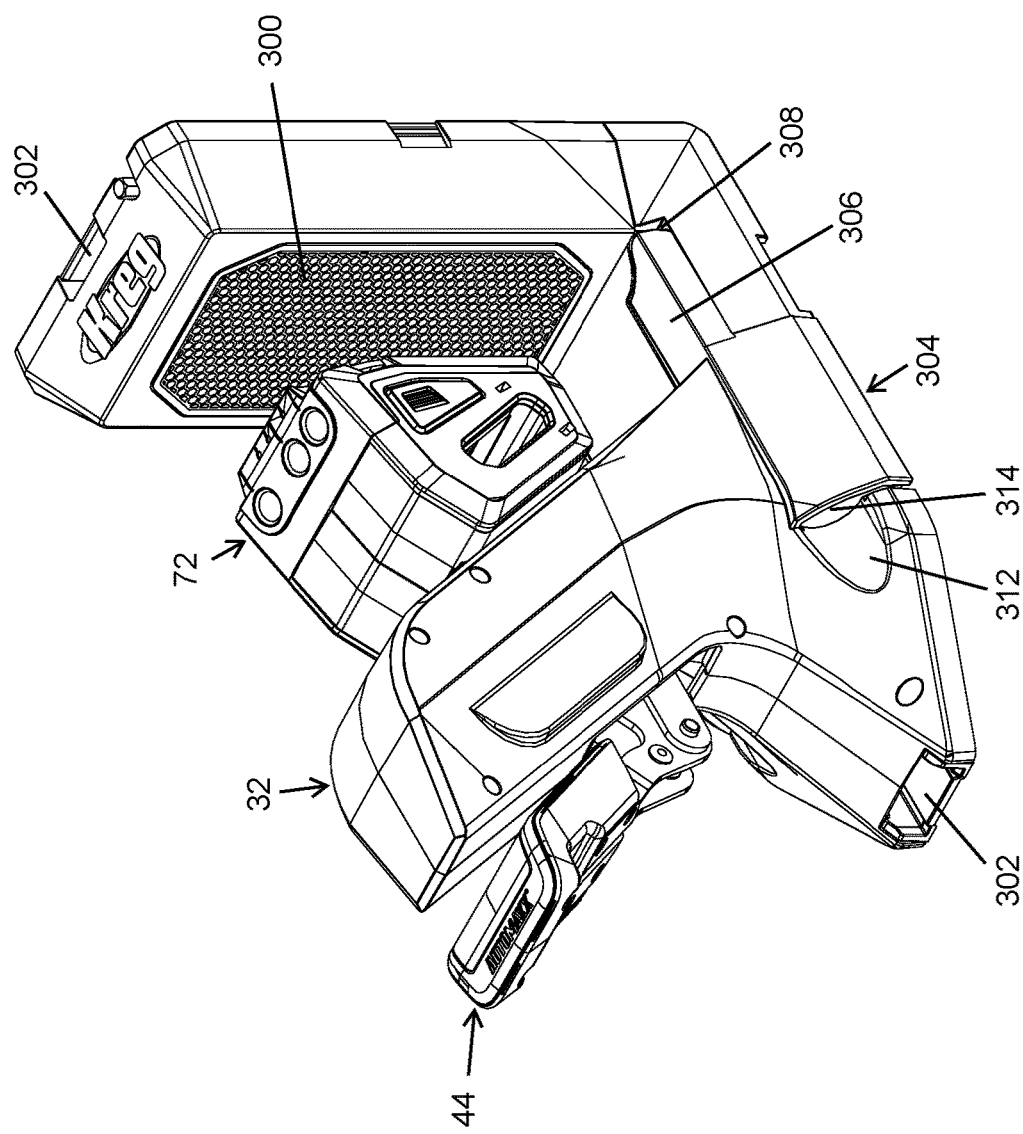

FIG. 115 shows third perspective view of the self-adjusting pocket hole jig system shown in FIG. 105, in accordance with one or more embodiments.

Figure 116:
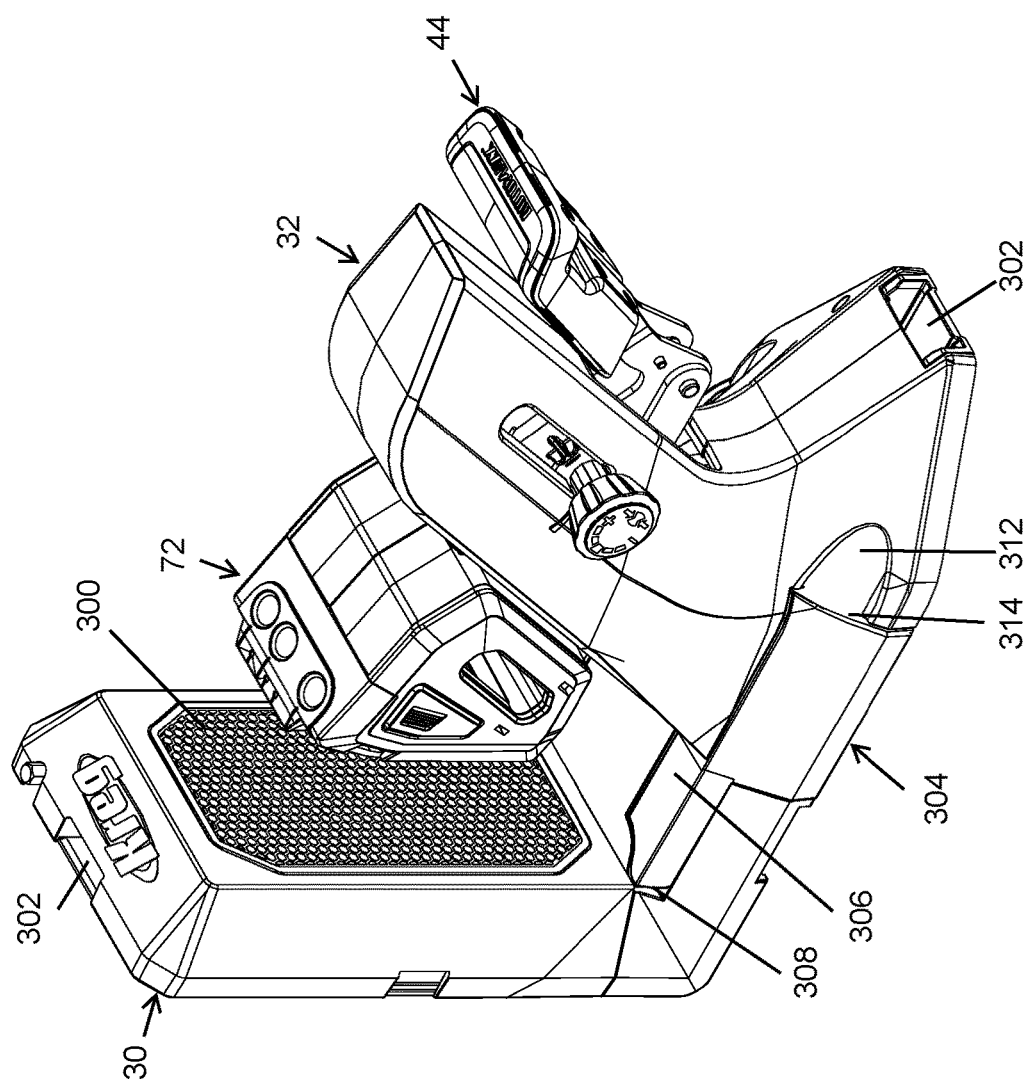

FIG. 116 shows a fourth perspective view of the self-adjusting pocket hole jig system shown in FIG. 105, in accordance with one or more embodiments.

Figure 117:
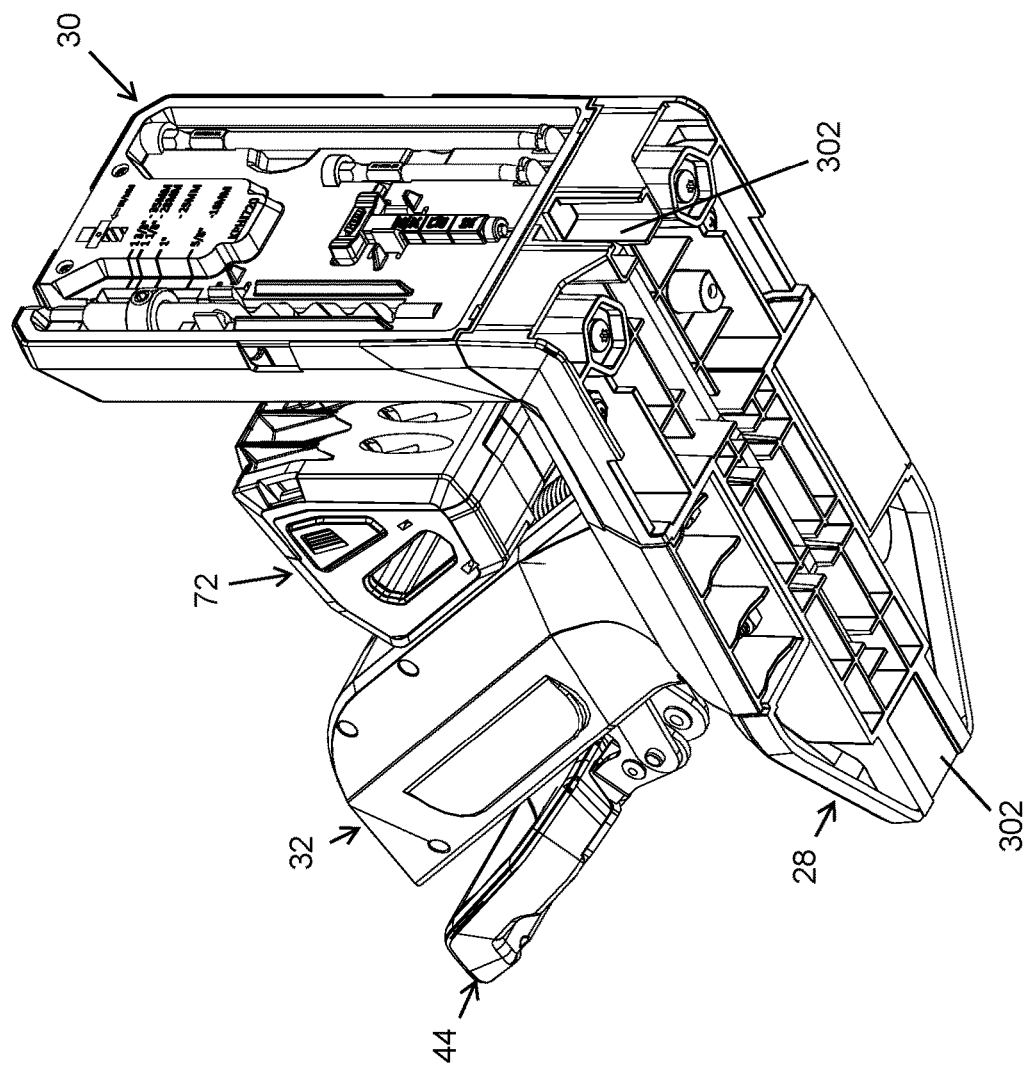

FIG. 117 shows a fifth perspective view of the self-adjusting pocket hole jig system shown in FIG. 105, in accordance with one or more embodiments.

Figure 118:
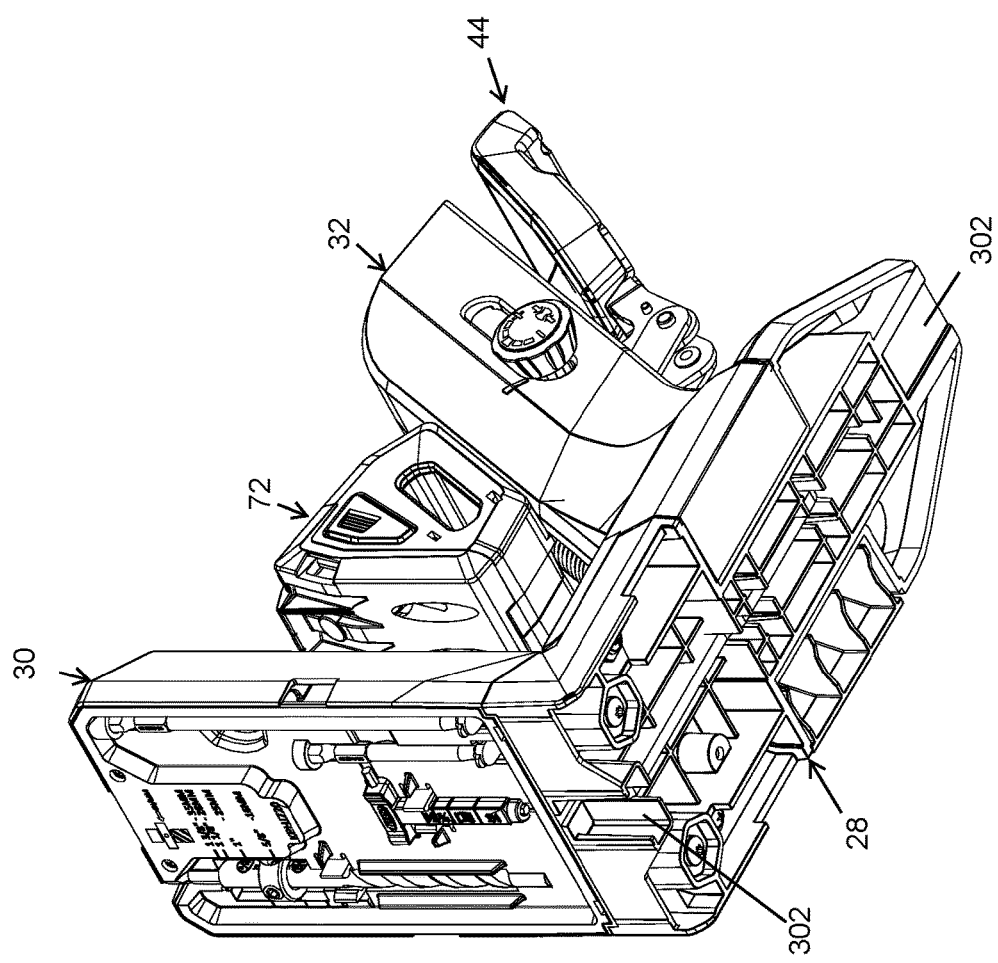

FIG. 118 shows a sixth perspective view of the self-adjusting pocket hole jig system shown in FIG. 105, in accordance with one or more embodiments.

Figure 119:
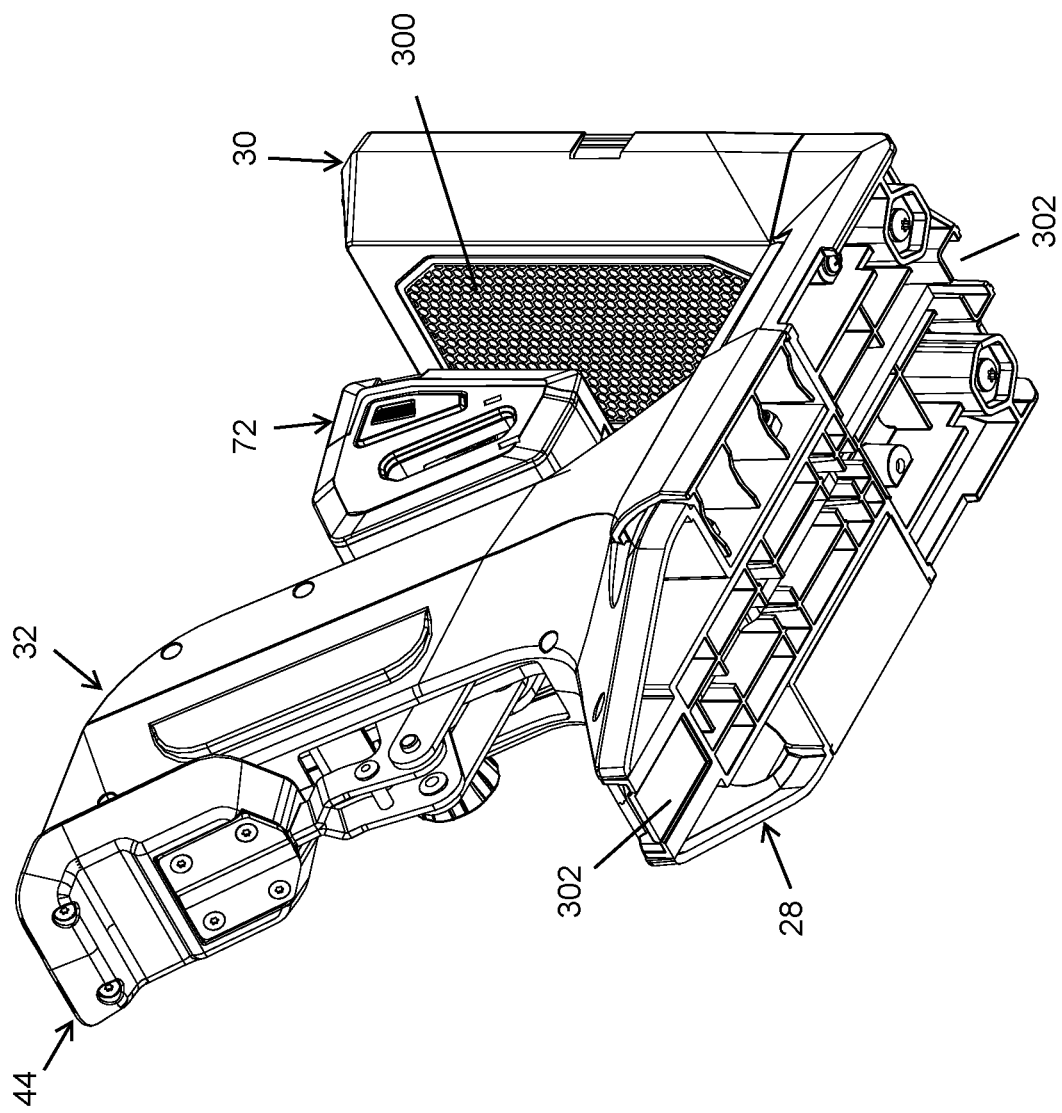

FIG. 119 shows a seventh perspective view of the self-adjusting pocket hole jig system shown in FIG. 105, in accordance with one or more embodiments.

Figure 120:
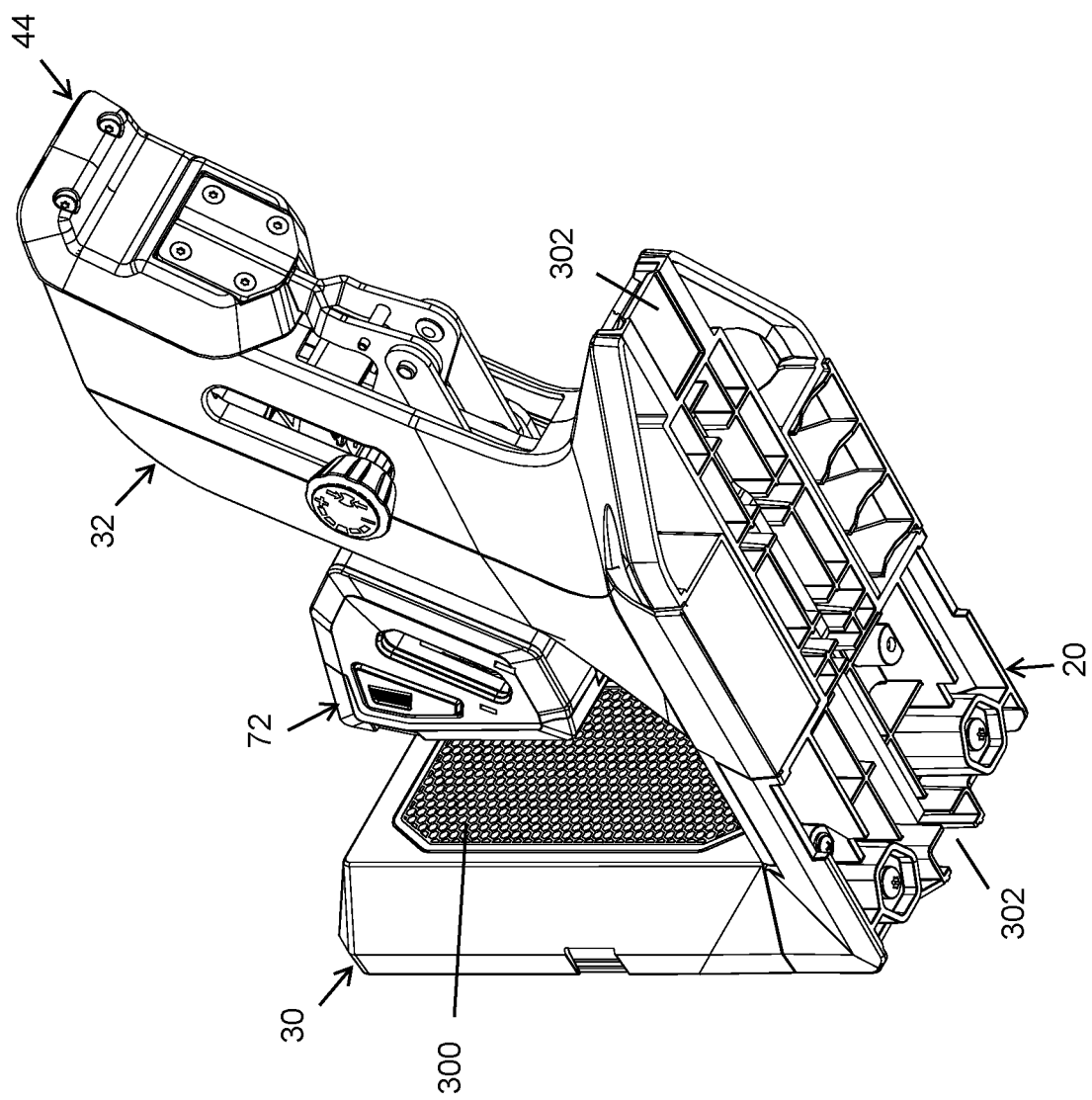

FIG. 120 shows an eighth perspective view of the self-adjusting pocket hole jig system shown in FIG. 105, in accordance with one or more embodiments.

Figure 121:
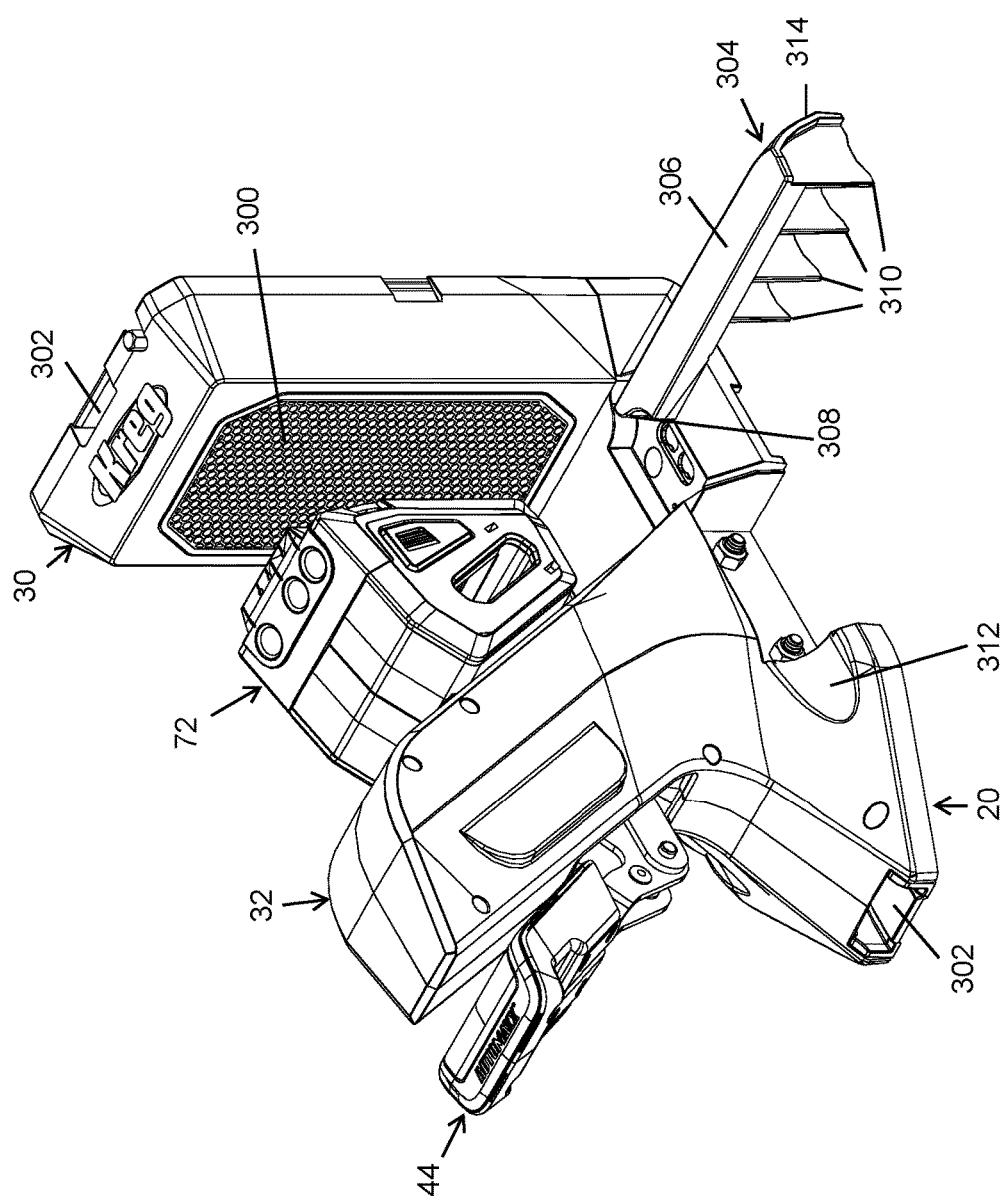

FIG. 121 shows a ninth perspective view of the self-adjusting pocket hole jig system shown in FIG. 105 with wings extended, in accordance with one or more embodiments.

Figure 122:
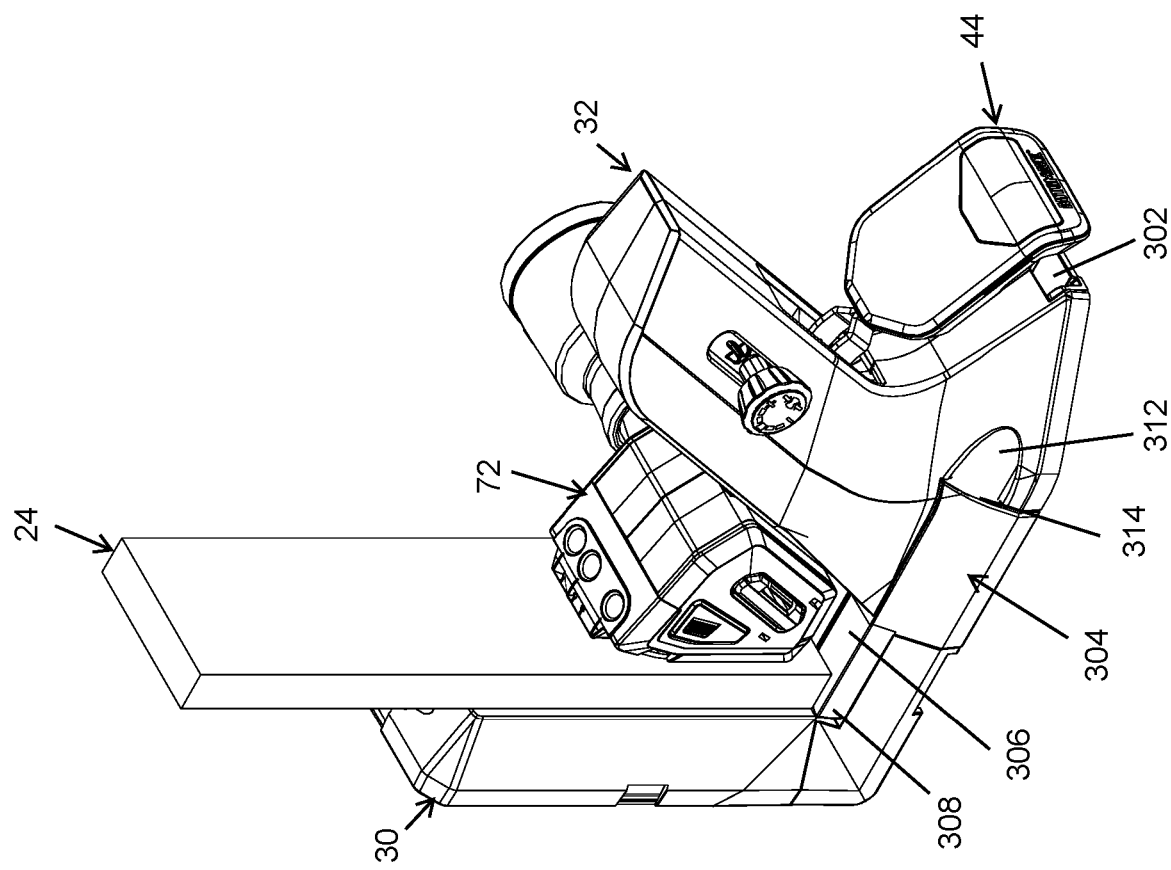

FIG. 122 shows a tenth perspective view of the self-adjusting pocket hole jig system shown in FIG. 105 with wings retracted and workpiece, in accordance with one or more embodiments.

Figure 123:
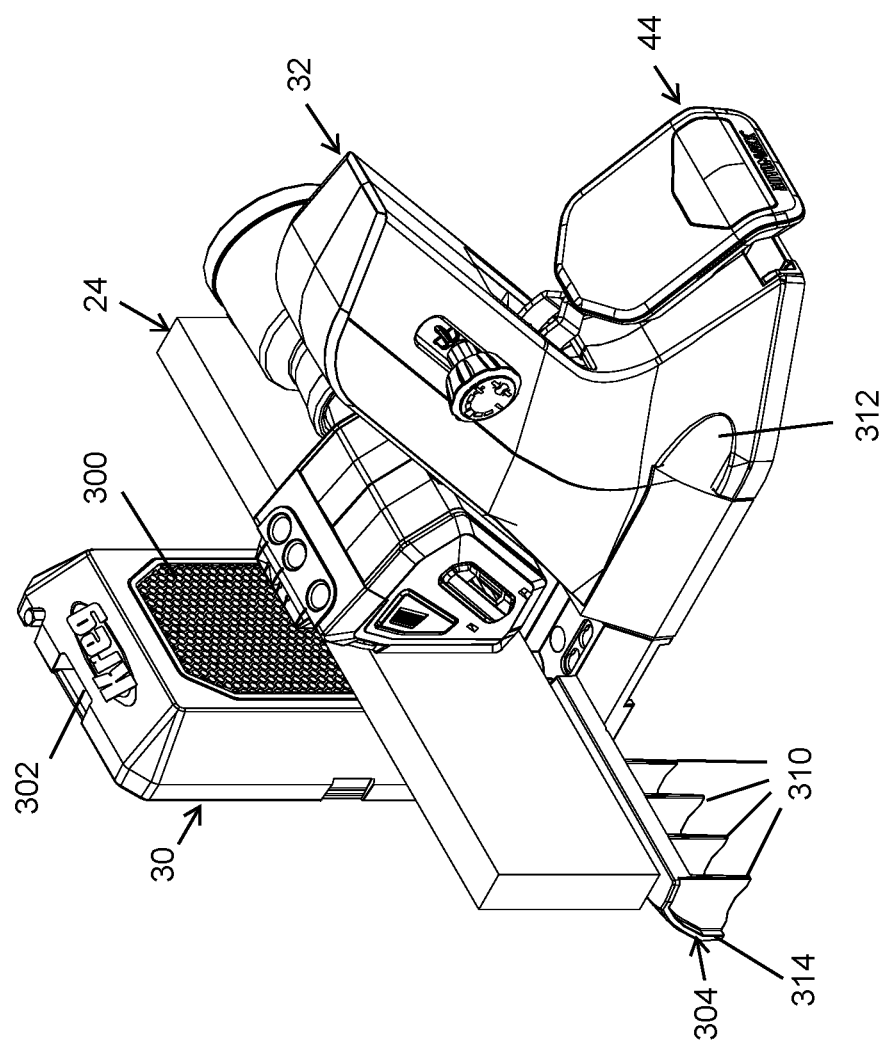

FIG. 123 shows a eleventh perspective view of the self-adjusting pocket hole jig system shown in FIG. 105 with wings extended and workpiece, in accordance with one or more embodiments.

DETAILED DESCRIPTION

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure. Moreover, although the disclosed embodiments are primarily described in the context of pocket hole jig applications, the embodiments are not so limited. In is appreciated that the embodiments may be adapted for use in other applications which may be improved by the disclosed structures, arrangements and/or methods. It is to be understood that use of the improvements disclosed in association with a pocket hole jig is only one of countless examples of use and is not meant to be limiting.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "A but not B," and "B but not A." As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

System:

In the arrangement shown, as one example, a self-adjusting pocket hole jig system 10 (or simply "system 10") is presented. In the arrangement shown, as one example, self-adjusting pocket hole jig system 10 has a forward side 12, a rearward side 14, a top side 16, a bottom side 18, a left side 20 and a right side 22.

Self-adjusting pocket hold jig system 10 is formed of any suitable size, shape and design and is configured facilitate quick and easy and secure clamping of workpieces 24 of various thickness as well as various sizes and shapes. In one arrangement, as is shown, self-adjusting pocket hole jig system 10 includes a base 26 having a lower portion 28 and a backstop 30 among other parts, components and features as are described herein. In one arrangement, as is shown, self-adjusting pocket hole jig system 10 includes an upright assembly 32 having a center support 34 and opposing covers 36 among other parts, components and features as are described herein. In one arrangement, as is shown, self-adjusting pocket hole jig system 10 includes a clamping assembly 38 having an upper link 40 and a lower link 42, a handle 44 connected to the upper link 42, a clutch housing 46 having at least one clutch plate 48 connected to the upper link 42, a first return spring 50 and a second return spring 52, among other parts, components and features as are described herein. In one arrangement, as is shown, self-adjusting pocket hole jig system 10 includes a clamp force adjustment mechanism 54 having a knob 56, a rotating rod 58, and a camp surface 60, among other parts, components and features as are described herein. In one arrangement, as is shown, self-adjusting pocket hole jig system 10 includes a drill guide assembly 62 having a main body 64 with a pair of arms 66, an opening 68 in the main body, a pair of spring biased members 70 that facilitate attachment and removal of a drill guide block 72 having a clamping face 74 and a plurality of drill guides 76 that define bores 78 that extend through the clamping face 74 at an angle, among other parts, components and features as are described herein.

Workpiece:

In the arrangement shown, self-adjusting pocket hole jig system 10 is used to form pocket holes in a workpiece 24. Workpiece 24 may be formed of any size, shape and design. In the arrangement shown, as one example, workpiece 24 is a generally planar shaped piece of material that may be formed of wood, plywood, composite wood, plastic, MFD (medium density fiberboard) or any other material. Workpiece 24 may be a solid piece of wood, or it may be a composite piece of wood or other material. Workpiece 24 may be a large planar member, such as a four-by-eight sheet of plywood, or it may be a narrow and small member such as a piece of face-frame, or workpiece 24 may be anything in-between. Work piece 24 may be thick, such as one and a half inches thick, such as a two-by-four, or thicker, or it may be as narrow as half an inch, or thinner. Essentially workpiece 24 may be formed of any size, shape and design and configuration.

Base:

In the arrangement shown, as one example, self-adjusting pocket hole jig system 10 includes a base 26. Base 26 may be formed of any size, shape and design and is configured to receive and hold clamping assembly 38 as well as facilitate stable placement of self-adjusting pocket hole jig system 10 on a work surface as well as facilitate clamping of workpiece 24 therein.

In the arrangement shown, as one example, base 26 when viewed from the side is formed of a generally L-shaped member having lower portion 28 and a backstop 30 that are joined together and extend in approximate perpendicular alignment to one another. In the arrangement shown, as one example, lower portion 28 and a backstop 30 have generally planar opposing sides 80 that extend in approximate parallel spaced relation to one another.

In the arrangement shown, as one example, lower portion 28 includes a rearward end 82 that is generally flat and planar in shape. In the arrangement shown, as one example, the plane formed by rearward end 82 extends in approximate perpendicular alignment to the planes of sides 80 of base 26. In the arrangement shown, as one example, the outward ends of rearward end 82 connect to the rearward end of sides 80.

In the arrangement shown, as one example, lower portion 28 includes a resting surface 84. Resting surface 84 is configured to engage and support an end of a workpiece 24 thereon when the workpiece 24 is clamped against backstop 30. To facilitate support of workpiece 24, resting surface 84 forms a generally flat and planar upper surface of lower portion 28 at the forward end of lower portion 28. In the arrangement shown, as one example, the plane formed by resting surface 84 extends in approximate perpendicular alignment to the planes formed by sides 80. In the arrangement shown, as one example, the outward ends of resting surface 84 connect to the sides 80, the forward end of resting surface 84 connects to backstop 30, and the rearward end of resting surface 84 connects to step 86.

In the arrangement shown, as one example, step 86 forms a generally flat and planar surface that extends in approximate perpendicular alignment to the plane formed by resting surface 84. In the arrangement shown, as one example, step 86 forms a generally flat and planar surface that also extends in approximate perpendicular alignment to the planes formed by opposing sides 80. In the arrangement shown, as one example, the depth or thickness of lower portion 28 is greater forward of step 86, and the depth or thickness of lower portion 28 is less rearward of step 86. In the arrangement shown, as one example, step 86 connects at its upper end to the rearward end of resting surface 84, step 86 connects at its outward sides to sides 80, and step 86 connects at its lower end to the forward end of platform 88.

In the arrangement shown, as one example, a platform 88 is positioned rearward of step 86. Platform 88 forms a generally flat and planar surface that extends in approximate parallel alignment to the plane formed by resting surface 84. In the arrangement shown, as one example, the plane formed by platform 88 extends in approximate perpendicular alignment to the plane formed by step 86. In the arrangement shown, as one example, the plane formed by platform 88 extends in approximate perpendicular alignment to the plane formed by opposing sides 80. In the arrangement shown, as one example, platform 88 connects at its forward end to the lower end of step 86, platform 88 connects at its outward sides to sides 80, and platform 88 connects at its rearward end to the upper end of rearward end 82.

In the arrangement shown, as one example, platform 88 of lower portion 28 includes a slot 90 therein. In the arrangement shown, as one example, slot 90 is generally centrally positioned within lower portion 28 when viewed from above or below and extends the majority of the distance between rearward end 82 and step 86. Slot 90 is configured to receive and hold the lower end of center support 34 of upright assembly 32 therein so as to facilitate secure attachment of center support 34 to base 26. In the arrangement shown, as one example, once the lower end of center support 34 is inserted into slot 90, the lower end of center support 34 is screwed or bolted to the lower portion 28 of base 26 using one or more fasteners that extend laterally through holes 92 in lower portion 28 of base 26, as well as through the lower end of center support 34 held within slot 90, thereby securely attaching the lower end of center support 34 to lower portion 28 of base 26.

In the arrangement shown, as one example, platform 88 also includes a plurality of through holes 94 therein. In the arrangement shown, as one example, through holes 94 are positioned just inward of each corner of platform 88 when viewed from above or below and extend vertically through lower portion 28 of base 26. Through holes 94 are configured to receive fasteners therein that are configured to extend through and attach a platform of the lower end of upright assembly 32 to the platform 88 of lower portion 28 of base 26 thereby securely attaching the lower end of upright assembly 32 to lower portion 28 of base 26.

In the arrangement shown, as one example, the lower side 98 of lower portion 28 forms a generally flat and planar surface that is configured to facilitate stable support when the lower side 98 of self-adjusting pocket hole jig system 10 is placed on a flat work surface to be used in a vertical manner. In the arrangement shown, as one example, the generally flat planar surface of lower side 98 of lower portion 28 is formed by a lower end of a plurality of structural supports 100 that extend across and throughout the base 26, including lower portion 28 as well as backstop 30. In the arrangement shown, as one example, the plane formed by lower side 98 extends in approximate parallel spaced relationship to the planes of resting surface 84 and platform 88. In the arrangement shown, as one example, the plane formed by lower side 98 extends in approximate perpendicular alignment to the plane formed by sides 80 as well as the plane formed by rearward end 82.

In the arrangement shown, as one example, a receiver 102 is approximately centrally positioned at the intersection of step 86 and platform 88. Receiver 102 is formed of any suitable size, shape and design and is configured to receive and hold onto the lower end of first return spring 50 of clamping assembly 38. In the arrangement shown, as one example, receiver 102 includes a generally cylindrical collar 104 that extends upward and rearward at an angle away from backstop 30 of base 26. In the arrangement shown, as one example, a cross-shaped member 106 extends upward and rearward from the upper end of the collar. In this arrangement, the upper surface of collar 104 is configured to receive and engage the lower end of first return spring 50 while the cross-shaped member 106 is configured to extend within the hollow interior of the lower end of return spring 50, thereby holding it in place. Any other configuration is hereby contemplated for use for holding first return spring 50 in place such as a simple post, a circular recess in lower portion 28 of base 26, or any other connection member.

In the arrangement shown, as one example, the forward end of lower portion 28 connects to the lower end of backstop 30.

In the arrangement shown, as one example, backstop 30 includes a clamping surface 108 that is generally flat and planar in shape. In the arrangement shown, as one example, clamping surface 108 faces rearward. In the arrangement shown, as one example, the plane formed by clamping surface 108 extends in approximate perpendicular alignment to the planes of sides 80 of base 26 as well as to the plane formed by resting surface 84. In the arrangement shown, as one example, the outward ends of clamping surface 108 connect to the rearward end of sides 80 of backstop 30, and the lower end of clamping surface 108 connects to the forward end of resting surface 84. In the arrangement shown, as one example, clamping surface 108 is configured to engage and support a forward side of a workpiece 24 when the workpiece 24 is clamped against backstop 30. To facilitate support of workpiece 24, clamping surface 108 forms a generally flat and planar rearward facing surface of backstop 30 at the forward end of resting surface 84. In the arrangement shown, as one example, the plane formed by clamping surface 108 extends in approximate perpendicular alignment to the plane formed by upper end 110 of backstop 30. In the arrangement shown, as one example, the upper end of clamping surface 108 connects to the rearward end of upper end 110.

In the arrangement shown, as one example, backstop 30 includes an upper end 110 that is generally flat and planar in shape. In the arrangement shown, as one example, the plane formed by upper end 110 extends in approximate perpendicular alignment to the planes of sides 80 of base 26 as well as clamping surface 108. In the arrangement shown, as one example, the outward ends of upper end 110 connect to the upper ends of sides 80.

In the arrangement shown, as one example, the forward side 112 of backstop 30 forms a generally flat and planar surface that is configured to facilitate stable support when the forward side 112 of backstop 30 of self-adjusting pocket hole jig system 10 is placed on a flat work surface to be used in a horizontal manner. In the arrangement shown, as one example, the generally flat planar surface of forward side 112 of lower portion 28 is formed by a forward end of a plurality of structural supports 100 that extend across and throughout the base 26, including lower portion 28 as well as backstop 30. In the arrangement shown, as one example, the plane formed by forward side 112 of backstop 30 extends in approximate parallel spaced relationship to the plane formed by clamping surface 108. In the arrangement shown, as one example, the plane formed by forward side 112 of backstop 30 extends in approximate perpendicular alignment to the plane formed by sides 80 as well as the plane formed by upper end 110.

In this way, the configuration of base 26 facilitates stable placement of and use of self-adjusting pocket hole jig system 10 in a vertical manner, when resting on lower side 98. In this way, the configuration of base 26 facilitates stable placement of and use of self-adjusting pocket hole jig system 10 in a horizontal manner, when resting on forward side 112.

In the arrangement shown, as one example, the distance between lower side 98 and resting surface 84 is approximately the thickness of a conventional 2×4. Similarly, in the arrangement shown, as one example, the distance between forward side 112 and clamping surface 108 is approximately the thickness of a conventional 2×4. As such, a conventional 2×4 can be used to make jigs or other support members when using self-adjusting pocket hole jig system 10 to drill pocket hole jigs regardless of whether the self-adjusting pocket hole jig system 10 is used in a vertical orientation or a horizontal orientation.

In the arrangement shown, as one example, base 26 is a formed of a single monolithic member that is formed by any process such as molding, injection molding, casting, forming, machining, or through any other manufacturing process. In one arrangement, base 26 is formed of a solid member. In another arrangement, as is shown, so as to provide the requisite strength while minimizing weight and material usage, base 26 is skeletonized and includes structural supports 100 that extends across the lower side 98 and forward side 112 of base 26. In another arrangement, base 26 is formed of a plurality of components that are connected to one another by fastening means such as adhesive, gluing, bolting, screwing, snap fitting, friction fitting or any other manner or method or means or the like processes. In one arrangement, base 26 is formed of a plastic or composite material. In another arrangement, base 26 is formed of a metallic material. In another arrangement, base 26 is formed of a plastic or composite material that includes metallic support members that extend through the base 26 thereby providing additional strength and rigidity.

In the arrangement shown, as one example, upright assembly 32 is connected to base 26.

Upright Assembly:

In the arrangement shown, as one example, self-adjusting pocket hole jig system 10 includes an upright assembly 32. Upright assembly 32 may be formed of any size, shape and design and is configured to provide support for clamping assembly 38, handle 44 and drill guide assembly 62 and facilitate clamping of workpiece 24 in self-adjusting pocket hole jig system 10.

Center Support:

In the arrangement shown, as one example, upright assembly 32 includes a center support 34. Center support 34 is itself formed of any suitable size, shape and design and is configured to connect to lower portion 28 of base 26 and to provide support for upright assembly 32. In the arrangement shown, as one example, center support 34 is formed of generally planar member that extends a length between an upper end 114 and a lower end 116. In the arrangement shown, as one example, the lower end 116 includes a pair of feet that are laterally spaced from one another a distance and include a hole 118. In the arrangement shown, as one example, lower end 116 of center support 34 is configured to be inserted within slot 90 of lower portion 28 of base 26 and are configured to receive fasteners, such as screws or bolts, that extend through a portion of the base 26 thereby rigidly and securely attaching the lower end 116 of center support 34 to lower portion 28 of base 26.

In the arrangement shown, as one example, center support 34 includes a main body 120 that extends between lower end 116 and upper end 114. In the arrangement shown, as one example, main body 120 has a generally flat and straight and square forward edge and a generally flat and straight and square rearward edge that extend in approximate parallel spaced relation to one another from lower end 116 to upper end 114, albeit at an angle to vertical. That is, while backstop 30 rises generally vertically upward from lower portion 28 of base 26, main body 120 of center support 34 extends rearward at an angle as it extends upward from lower portion 28 of base 26.

In the arrangement shown, as one example, an arm 122 extends rearward from main body 120 near the lower end 116 thereby broadening the stance of the lower end 116 of center support 34 thereby increasing the support for upright assembly 32, and increasing the surface area of engagement between center support 34 and lower portion 28 of base 26 which enhances strength and rigidity of upright assembly 32. In the arrangement shown, as one example, a triangular shaped opening is positioned in the lower portion of center support 34 between main body 120 and arm 122 to reduce weight and material usage.

In the arrangement shown, as one example, an arm 124 extends forward from the forward side of main body 120 adjacent the lower end 116 of center support 34 and includes a hole therein. This arm, and its associated hole, serves as a connection point for the lower end of second return spring 52.

In the arrangement shown, as one example, a slot 126 is positioned in center support 34 adjacent the upper end 114. Slot 126 extends a length in approximate parallel spaced relation with the length of main body 120 and facilitates connection of components of clamping assembly 38 to center support 34, while also allowing vertical movement of these components of clamping assembly 38 relative to the length of slot 126.

In one arrangement, center support 34 is formed of a solid metallic material, so as to maximize strength and rigidity and durability as well as to provide a long useful life. The use of a solid metallic member for center support 34 also facilitates crisp and firm locking of clutch plates 48 on center support 34. In some embodiments, other size shape or design as well as any other material is hereby contemplated for use for center support 34.

Upper Link:

In the arrangement shown, as one example, clamping assembly 38 includes an upper link 40. Upper link 40 is itself formed of any suitable size, shape and design and is configured to connect to clutch housing 46 on its upper end and to connect to lower link 42 on its lower end.

In the arrangement shown, as one example, upper link 40 is formed of a pair of generally symmetric members wherein one member is positioned on each side of center support 34. The upper end of upper link 40 includes a hole 128 that receives clamp force adjustment mechanism 54 therein. More specifically, in the arrangement shown, hole 128 in the upper end of upper link 40 receives rod 58 of clamp force adjustment mechanism 54 there through. Rod 58 of clamp force adjustment mechanism 54 extends through the hole 128 in the upper end of upper link 40 on each side of center support 34. Rod 58 also extends through slot 126 in center support 34, which facilitates constrained of limited upward and downward movement of the upper end of upper link 40 on center support 34.

In the arrangement shown, as one example, the upper end of upper link 40 is generally rounded when viewed from the side. In the arrangement shown, as one example, a protrusion 130 extends upward from the generally rounded upper end of upper link 40 at the rearward side of upper link 40. This protrusion 130 breaks the rounded surface of the upper end of upper link 40 as protrusions 130 rise up from and out of the upper end of upper link 40. Protrusions 130 are configured to engage the lower side of clutch plates 48. When protrusions 130 engage clutch plates 48 the clutch plates 48 cannot lock onto center support 34. In contrast, when protrusions 130 disengage clutch plates 48 the clutch plates lock onto center support 34. As upper link 40 rotates between an unclamped position and a clamped position, protrusions 130 move between engagement with clutch plates 48 and disengagement with clutch plates 48.

In the arrangement shown, as one example, arms 132 are connected to the upper end of upper link 40 and extend forward therefrom. Arms 132 are configured to engage and hold the upper end of second return spring 52, such as through insertion of a portion of second return spring 52 through a hole in the forward end of arms 132, however any other connection method or manner is hereby contemplated for use between arms 132 and second return spring 52. In this way, the upper end of second return spring 52 connects to the forward end of arms 132 and the lower end of second return spring 52 connects to arm 124 of center support 34. In this way, second return spring 52 is stretched between arms 132 of upper link 40 and arm 124 of center support 34 which has the effect of biasing or pulling the upper end of upper link 40 downward which causes the handle 44 to naturally move upward when in an unclamped position.

In the arrangement shown, as one example, upper link 40 is formed of a pair of members wherein one member is positioned on each side of center support 34. The upper end of upper link 40 includes a hole 128 that receives clamp force adjustment mechanism 54 therein. More specifically, in the arrangement shown, hole 128 in the upper end of upper link 40 receives rod 58 of clamp force adjustment mechanism 54 there through. Rod 58 of clamp force adjustment mechanism 54 extends through the hole 128 in the upper end of upper link 40 on each side of center support 34. Rod 58 also extends through slot 126 in center support 34, which facilitates constrained of limited upward and downward movement of the upper end of upper link 40 on center support 34.

In the arrangement shown, as one example, the lower end of upper link 40 includes a hole 134 that receives a pivot point 136 therein. Pivot points 136 connect the lower end of upper links 40 to the upper end of lower links 42. In this way, pivot point 136 facilitates relative angular rotation of upper links 40 with respect to lower links 42 around the axis of rotation formed by pivot point 136.

In the arrangement shown, as one example, the lower end of upper link 40 includes a stop bar 138 that extends across the opposing sides of upper link 40 just rearward of hole 134 and pivot point 136. In the arrangement shown, as one example, stop bar 138 is a cylindrical rod that extends in approximate perpendicular alignment to the planes formed by upper link 40. In the arrangement shown, as one example, stop bar 138 extend through holes in each side of upper link 40 and is locked into place in the holes in upper link 40. In the arrangement shown, as one example, when clamping assembly 38 is a clamped position, with handle 44 in a fully downward position or a fully clamped position, the forward side of stop bar 138 engages the rearward side of center support 34. This engagement between stop bar 138 and center support 34 defines the over-center condition of a fully clamped position. This engagement between stop bar 138 and center support 34 prevents the clamping assembly 38 moving too far forward, which can cause too much pressure on workpiece 24 and/or can risk breaking components of system 10.

In the arrangement shown, as one example, the lower end of upper link 40 includes an extension 140. In the arrangement shown, as one example, extension 140 extends rearward from the lower end of upper link 40 and facilitates connection to handle 44 at the rearward end of extension 140. In the arrangement shown, as one example, the opposing sides of upper link 40 neck or bend inward toward one another and connect to one another just before handle 44 connects to upper link 40. In this way, the opposing sides of upper link 40 join to one another at the rearward end of extension 140 forming upper link 40 into a single joined component. In the arrangement shown, as one example, the side of extension 140 are connected to one another by any manner, method or means such as by stamping, press fitting, friction fitting, screwing, bolting, gluing, welding, adhering, or by any other manner, method or means or the like.

Handle:

In the arrangement shown, as one example, handle 44 connects to the rearward end of extension 140 of upper link

40. Handle 44 is formed of any suitable size, shape and design and is configured to facilitate comfortable, easy and ergonomic clamping and unclamping of the system 10. In the arrangement shown, as one example, handle 44 is formed of a generally square or rectangular shaped pad when viewed from above that includes a slightly recessed upper surface 142. In the arrangement shown, as one example, the rearward end of handle 44 includes an angled section 144 that angles downward and outward as it extends away from upper surface 142.

The large surface area of upper surface 142 provides ample area to comfortably apply pressure and downward force onto handle 44 and clamping assembly 38 thereby facilitating movement from a non-clamping position to a clamping position wherein workpiece 24 is clamped between the clamping face 74 of drill guide block 72 and clamping surface 108 of backstop 30. The down turned angled section 144 provides an easy and comfortable place for a user to grasp handle 44 and pull upward to move the handle 44 and clamping assembly 38 form a clamped position to a non-clamped position.

Handle 44 is connected to extension 140 of upper link 40 by any manner, method or means such as by stamping, press fitting, friction fitting, screwing, bolting, gluing, welding, adhering, molding-onto extension 140, or by any other manner, method or means or the like.

Lower Link:

In the arrangement shown, as one example, clamping assembly 38 includes a pair of lower links 42. Lower links 42 are formed of any suitable size, shape and design and is configured to connect to the lower end of upper links 40 at their upper end and connect to arms 66 of drill guide assembly 62 on their lower end.

In the arrangement shown, as one example, lower links 42 are formed of generally planar members that extend from an upper end to a lower end and includes a hole 146 in each end. In the arrangement shown, as one example, hole 146 in the upper end of lower links 42 receives a pivot point 136 that connects to hole 134 in the lower end of upper link 40 and facilitates relative angular rotation of upper links 40 with respect to lower links 42 around the axis of rotation formed by pivot point 136.

In the arrangement shown, as one example, hole 146 in the lower end of lower links 42 receives a pivot point 146 that connects to hole 148 in the rearward end of arms 66 of drill guide assembly 62 and facilitates relative angular rotation of lower links 42 with respect to arms 66 of drill guide assembly 62. In this way, movement of lower links 42 facilitates movement of drill guide assembly 62 along the length of upright assembly 32.

Clutch Housing:

In the arrangement shown, as one example, clamping assembly 38 includes a clutch housing 46. Clutch housing 46 is formed of any suitable size, shape and design and is configured to facilitate movement along the length of upright assembly 32 and center support 34 while facilitating selective locking along the length of upright assembly 32 and center support 34 so as to facilitate automatic clamping of workpieces 24 of various thicknesses.

In the arrangement shown, as one example, clutch housing 46 includes an upper wall 150 that includes a slot 152 therein that is sized and shaped to fit over the upper end 114 of center support 34. The plane formed by upper wall 150 extends in approximate perpendicular alignment to the length of main body 120 of center support 34. In the arrangement shown, as one example, clutch housing 46 includes a pair of opposing sides 154 that extend downward in approximate parallel spaced relation to one another as they extend downward from the upper wall 150 of clutch housing 46. Sides 154 extend in approximate parallel spaced relation to the sides of main body 120 of center support 34. In the arrangement shown, as one example, clutch housing 46 includes a forward wall 156 and rearward wall 158 that extend downward in approximate parallel spaced relation to one another as they extend downward from the upper wall 150 of clutch housing 46. In this way, upper wall 150, sides 154, forward wall 156 and rearward wall 158 of clutch housing 46 form a hollow interior that houses and holds clutch plates 48 and bias member 160 therein. Clutch housing 46 slides along the length of center support 34 between a fully raised position, or a fully unclamped position, and a fully lowered position, or a fully clamped position as handle 44 and upper link 40 and lower link 42 themselves move between a fully raised position, or a fully unclamped position, and a fully lowered position, or a fully clamped position.

In the arrangement shown, as one example, clutch housing 46 houses one or more clutch plates 48 within the hollow interior of clutch housing 46 as well as bias member 160 which applies a spring bias force upon clutch plates 48 that causes clutch plates 48 to bind or lock onto center support 34 when the support of the protrusion 130 of upper link 40 is removed. In the arrangement shown, as one example, two clutch plates 48 are used which are placed in parallel relation to one another within the hollow interior of clutch housing 46, however any number of clutch plates 48 are hereby contemplated for use such as one, two, three, four, five, six, seven, eight, nine, ten or more. The more clutch plates 48 that are used the greater the amount of locking force can be held by the clutch housing 46. In the arrangement shown, as one example, when multiple clutch plates 48 are used they are laid on top of one another in frictional engagement with one another, however each clutch plate 48 may slide slightly relative to one another when they are tilted with respect to center support 34.

In the arrangement shown, as one example, clutch plates 48 are generally planar members that, like upper wall 150 of clutch housing 46, include slots through their approximate center that allow center support 34 to extend through clutch plates 48. In the arrangement shown, as one example, when the plane formed by clutch plates 48 are in approximate perpendicular alignment to the length of the center support 34 the clutch plates 48 move freely along the length of center support 34. In contrast, in the arrangement shown, as one example, when the plane formed by clutch plates 48 angles out of perpendicular alignment to the length of the center support 34 the clutch plates 48 lock onto center support 34. This occurs when the support of the protrusion 130 of upper link 40 is removed, by rotation of handle 44, thereby allowing bias member 160 to force one end of clutch plates 48 out of perpendicular alignment with the length of center support 34. In the arrangement shown, as one example, bias member 160 is a spring positioned between the lower surface of upper wall 150 and the upper surface of the upper-positioned clutch plate 48 that forces the rearward end of clutch plates 48 downward on a side opposite where protrusion 130 forces clutch plates 48 upward.

Clamp Force Adjustment Mechanism:

In the arrangement shown, as one example, self-adjusting pocket hole jig system 10 includes a clamp force adjustment mechanism 54. Clamp force adjustment mechanism 54 may be formed of any size, shape and design and is configured to facilitate user adjustment of clamping force or clamping pressure that self-adjusting pocket hole jig system 10 applies on workpieces 24 of various thicknesses. That is, regardless of the thickness of workpiece 24, self-adjusting pocket hole jig system 10 will apply approximately the same amount of clamping force on workpiece 24 by automatically adjusting the internal components of self-adjusting pocket hole jig system 10 in response to the thickness of workpiece In the arrangement shown, as one example, clamp force adjustment mechanism 54 includes a knob 56 connected to a rotating rod 58 that is connected to and/or includes a cam surface 60. In the arrangement shown, as one example, knob 56 is positioned on an outward side of covers 36 of upright assembly 32 so as to facilitate easy adjustment by a user. In the arrangement shown, as one example, knob 56 and/or rod 58 that knob 56 is connected to extend through slot 162 in at least one cover 36. In the arrangement shown, as one example, slot 162 in covers 36 is positioned adjacent slot 126 in center support 34, in this way, as clutch housing 46 travels along center support 34, knob 56 is able to move within slot 162 in covers 36.

Knob 56 connects to rod 58 which is connected to and/or includes a cam surface 60. In the arrangement shown, as one example, rotating rod 58 extends through holes 164 in the lower end of sides 154 of clutch housing 46 as well as through holes 128 in the upper end of upper link 40. In this arrangement, rod 58 also extends through slot 126 in center support 34 thereby connecting opposing sides 154 of clutch housing 46 while extending through center support 34. In this way, rod 58 connects knob 56, cam surface 60, upper ends of upper link 40 of clamping assembly 38 and sides 154 of clutch housing 46 while also extending through center support 34.

In the arrangement shown, as one example, cam surface 60 is positioned between a stop 166 on the upper side and lower side of cam surface 60. In the arrangement shown, as one example, cam surface 60 has a generally circular exterior surface that is captured between the opposing stops 166 which are positioned on the upper side and lower side of cam surface 60 within tight and close tolerances, and in some arrangements in engagement with cam surface 60 while also allowing for the rotation of cam surface 60 between stops 166. In the arrangement shown, as one example, rod 58 and knob 56 are connected in an off-center alignment to the circular exterior surface of cam surface 60 such that when knob 56 and rod 58 are rotated, cam surface 60 rotates between the upper and lower stops 166. Alternatively, a non-circular lobe maybe used as cam surface 60. This rotation of cam surface 60, due to the off-center connection to rod 58 causes the relative position of the upper end of upper link 40 to change relative to clutch housing 46. Essentially, rotation of knob 56 causes rotation of cam surface 60 which causes the upper end of upper link 40 of clamping assembly 38 to move up or down, depending on the direction of rotation, relative to clutch housing 46 and clutch plates 48.

That is, effectively, rotation of knob 56 in a first direction lengthens the linkage whereas rotation of knob 56 in a second direction, opposite the first direction, shortens the linkage. This lengthening or shortening of the length of the linkage of clamp force adjustment mechanism 54 affects the clamping force or clamping pressure applied to workpiece 24.

As is further described herein, the sooner the protrusion 130 disengages the clutch plates 48 the sooner the clutch plates 48 lock onto the center support 34. The sooner the clutch plates 48 lock onto the center support 34 the greater the distance clamping assembly 38 travels to go to an over-center clamped position. The sooner the clutch plates 48 lock onto the center support 34 the sooner the clamping face 74 of the drill guide block 72 begins applying a clamping force on workpiece 24. The sooner the clutch plates 48 lock onto the center support 34 the greater the clamping force applied to the workpiece 24.

Thin Portion of Cam Surface:

As such, this translates into when the thinner the portion of cam surface 60 is positioned between the upper stop 166 and rod 58 the higher the protrusion 130 of upper link 40 relative to clutch housing 46 and clutch plates 48 and therefore the greater the amount of engagement between protrusion 130 and clutch plates 48. As such, the handle 44 must be rotated further downward to disconnect protrusion 130 from clutch plates 48, at which point the clutch plates 48 lock onto the center support 34. As such, the handle 44 does not have as far to rotate after disconnection between protrusion 130 and clutch plates 48, and when clutch plates 48 lock onto center support 34, to go to an over-center condition. As such, less clamping pressure is applied to workpiece 24 when clamping assembly 38 is in an over-center clamping position when a thinner portion of cam surface 60 is positioned between upper stop 166 and rod 58.

Thick Portion of Cam Surface:

In contrast, as such, this translates into when the thicker the portion of cam surface 60 is positioned between the upper stop 166 and rod 58 the lower the protrusion 130 of upper link 40 relative to clutch housing 46 and clutch plates 48 and therefore the less the amount of engagement between protrusion 130 and clutch plates 48. As such, the handle 44 does not rotate as far downward to disconnect protrusion 130 from clutch plates 48, at which point the clutch plates 48 lock onto the center support 34. As such, the handle 44 has farther to rotate after disconnection between protrusion 130 and clutch plates 48, and when clutch plates 48 lock onto center support 34, to go to an over-center condition. As such, more clamping pressure is applied to workpiece 24 when clamping assembly 38 is in an over-center clamping position when a thicker portion of cam surface 60 is positioned between upper stop 166 and rod 58.

As such, in this way, clamp force adjustment mechanism 54 provides infinite adjustment of clamping pressure for workpiece 24. As knob 56 is rotated in a direction that causes a decrease in the thickness of the cam surface 60 between rod 58 and upper stop 166 the lesser the amount of clamping pressure because protrusion 130 of upper link 40 disconnects from clutch plates 48 later. As knob 56 is rotated in a direction that causes an increase in the thickness of the cam surface 60 between rod 58 and upper stop 166 the greater the amount of clamping pressure because protrusion 130 of upper link 40 disconnects from clutch plates 48 sooner.

In the arrangement shown, as one example, cam surface 60 is formed of a cylindrical plate positioned on the outward side of both opposing sides 154 of clutch housing 46 around hole 164. In this arrangement, each of these cam surfaces 60 are connected to and rotated by rod 58. In this arrangement, each of these cam surfaces 60 are captured between opposing upper and lower stops 166. In this way, placing a cam surface 60 on each side 154 of clutch housing 46 provides balance to clutch housing 46 and accurate and precise adjustment of clamping pressure. In this way, placing a cam surface 60 on each side 154 of clutch housing 46 provides accurate and precise adjustment of each side of upper link 40 of clamping assembly 38.

In the arrangement shown, as one example, only a single knob 56 extends out of one side of clamping assembly 38.

In an alternative arrangement, a knob 56 extends out of both sides of clamping assembly 38 thereby allowing for adjustment from both sides.

In one arrangement, detents are used in association with knob 56. These detents allow a user to freely rotate knob 56 and its attached cam surface 60, however these detents provide user feedback through resistance that help a user understand how far they have rotated knob 56. These detents also help to hold knob 56 in place once set by a user. In this way, the use of detents in association with knob 56 provides an easier to use and more accurate arrangement that better holds the user-set position.

Covers:

In the arrangement shown, as one example, self-adjusting pocket hole jig system 10 includes a pair of covers 36. Covers 36 may be formed of any suitable size, shape and design and are configured to cover portions of the upright assembly 32 while also providing additional support for center support 34 as well as providing support to as well as a surface for drill guide assembly 62 to slide upon to move between an non-clamping position to a clamping position and vice versa.

In the arrangement shown, as one example, upright assembly 32 includes a pair of covers 36 that are approximately symmetric to one another and connect together along a seamline 168 that extends along the approximate forward-to-back center of clamping assembly 38. In this way, when opposing left and right covers 36 are joined together they form a hollow interior 170 that houses and holds center support 34, clutch housing 46 and other portions of clamping assembly 38 and clamp force adjustment mechanism 54 as is shown and described herein. That is, the generally symmetric or mirror-image covers 36 join together along seamline 168 in a clamshell like manner.

In the arrangement shown, as one example, covers 36 include a forward side 172 and an opposing rear side 174, exterior sides 176, an upper side 178 and a platform 180 at their lower end. In the arrangement shown, as one example, the forward side 172 is generally flat and planar and extends in approximate parallel spaced relation to the forward side of main body 120 of center support 34. In this way, the flat and planar forward side 172 of the joined covers 36 serves as a sliding surface for the rearward side of drill guide assembly 62 to slide over as it moves between a non-clamping position and a clamping position.

In the arrangement shown, as one example, platform 180 is connected to the lower end of covers 36. Platform 180 is formed of any suitable size shape and design and is configured to connect to base 26 in a rigid and stable manner so as to added stability to upright assembly 32. In the arrangement shown, as one example, platform 180 is a generally planar member that includes a plurality of through holes 182 therein. In the arrangement shown, as one example, when covers 36 are joined together, the combined platforms 180 form a generally square or rectangular peripheral edge when viewed from above or below that is configured to fit on platform 88 of lower portion 28 of base 26. In the arrangement shown, through holes 82 of platform 180 of covers 36 match up with through holes 94 in platform 88 of lower portion 28 of base 26. In the arrangement shown, as one example, covers 36 are installed on base 26 by aligning the through holes 182 in platforms 180 of covers 36 with the through holes 94 of platform 88 of lower portion 28 of base 26. Once in this alignment, fasteners, such as screws or bolts or the like are passed through the through holes 182 in platform 180 of covers 26 and into the through holes 94 of platform 88 of lower portion 28 of base 26. When installed in this manner, platform 180 of covers 36 are in frictional planar engagement with platform 88 of lower portion 28 of base 26.

In the arrangement shown, as one example, opposing covers 36 include a plurality of through holes 184 that are used to join opposing covers 36. In the arrangement shown, as one example, when covers 36 are installed around center support 34, clutch housing 46 and the other internal components of system 10, and opposing covers 36 connect to one another along seamline 168, through holes 184 in opposing covers 36 align with one another. Once in this alignment, fasteners, such as screws or bolts or the like are passed through the through holes 184 in opposing covers 26 thereby joining opposing covers 36 in a locked arrangement. Affixing opposing covers 36 to one another also helps to hold and secure the internal components of upright assembly 32 between coves 36. As one example, the upper end 114 of center support 34 is held within supports 186 on the interior surfaces of covers 36 thereby securely locking the upper end 114 of center support 34 in place within covers 36. The connection of opposing covers 36 to one another as well as to center support 34 as well as to base 26 increases the strength and rigidity of upright assembly 32.

In the arrangement shown, as one example, when covers 36 are joined together they form a forward slot 186 in their forward side 172 that receives and allows arms 66 of drill guide assembly 62 to extend there through and allows for vertical motion of drill guide assembly 62 relative to upright assembly 32. In the arrangement shown, as one example, when covers 36 are joined together they form a rearward slot 188 in their rearward side 174 that receives and allows the extension of upper links 40 and/or lower links 42 of clamping assembly 38 to extend there through and allows for rotational motion of upper links 40 and/or lower links 42 therein. As handle 44 is moved upward or downward portions of upper links 40 and/or lower links 42 move through rearward slot 188 thereby facilitating clamping and unclamping. In the arrangement shown, as one example, covers 36 include a slot 162 in their exterior sides 176 that receives clamp force adjustment mechanism 54 and allows the components of clamp force adjustment mechanism 54 that extend through slot 162 to vertically move as clutch housing 46 vertically moves as handle 44 is moved upward or downward as upper links 40 and/or lower links 42 move thereby facilitating clamping and unclamping.

In the arrangement shown, as one example, a flange 190 extends outward past sides 176 at the forward side 172 of covers 36. In this way, flanges 190, which extend outward from each side of the forward side 172 of covers 36 expands the surface area of the forward side 172 of upright assembly 32. Flanges 190 also form a lip that extends past sides 176 which is grasped by drill guide assembly 62. That is, flanges 190 facilitate a connection point for drill guide assembly 62 and help to hold drill guide assembly 62 onto the forward side 172 of upright assembly 32 while also allowing drill guide assembly 62 to slide along forward side 172 of upright assembly 32. In the arrangement shown, as one example, when viewed along the length of flanges 190, flanges 190 have a relatively square or rectangular shape that extends past forward side 172 and sides 176.

In the arrangement shown, as one example, the lower end of center support 34 extends into base 26. In an alternative arrangement, a perpendicular member is connected to the lower end of center support 34 that provides increased surface area for the lower end of center support 34 to engage base 26. This also allows for the lower end of center support 34 to be placed on a work bench or other work surface without having to cut out an area for the lower protrusions of center support 34. This makes it easier to use the upright assembly 32 in a standalone manner separated from a dedicated base 26. This also allows users to make custom jigs out of a plurality of upright assemblies 32, such as when manufacturing cabinetry or furniture.

Drill Guide Assembly:

In the arrangement shown, as one example, self-adjusting pocket hole jig system 10 includes a drill guide assembly 62. Drill guide assembly 62 may be formed of any size, shape and design and is configured to move along upright assembly 38 by way of operation of clamping assembly 38 and handle 44 so as to facilitate clamping of workpiece 24 and drilling of pocket holes in workpiece 24. In the arrangement shown, as one example, drill guide assembly 62 includes a main body 64 having arms 66 and an opening 68 therein as well as spring biased members 70 as well as other components and features as is described herein.

In the arrangement shown, as one example, main body 64 is formed of a pair of halves 192 that are approximately symmetric to one another and connect together to one another at a generally centrally positioned seamline 194. In the arrangement shown, as one example, side members 196 are connected to the outward sides of halves 192. Side members 196 are formed of any suitable size, shape and design and are configured to enclose the outward end of halves 192. Halves 192 and side members 196 may be connected to one another by any manner, method or means such as screwing, bolting, welding, gluing, adhering, snap fitting, friction fitting or the like or any combination thereof.

In the arrangement shown, as one example, side members 196 include an opening 198 that is positioned slightly upward and forward from opening 68 that extends through side members 196 as well as halves 192. Opening 198 is configured to hold spring biased members 70 therein. In the arrangement shown, as one example, spring biased members 70 are include a cover 200 that fits within the interior side of opening 198 and a biasing member 202 that is positioned between the interior surface of cover 200 and the outward facing side of the halve 192 that cover 200 is associated with. In the arrangement shown, as one example, biasing member 202 is a spring that provides a bias force that forces cover 200 outward. However, user applied pressure may move cover 200 inward when the spring bias force of biasing member 200 is overcome. In one arrangement, the rearward end of cover 200 connects to side members 196 by a pair of opposed pivot points 201 on the upper end lower ends of cover 200 that facilitate pivoting of the forward end of cover 200 on the axis of rotation formed by the connection of pivot points 201 to side members 196. This arrangement also allows for some mechanical advantage over biasing member 202 and facilitates the inward motion of the forward end of covers 200 upon rotation on pivot points 201.

In the arrangement shown, as one example, the forward end of cover 200 includes at least one lip 204 that includes a feature 206 thereon that is configured to selectively attach to and hold drill guide block 72 to the forward end of drill guide assembly 62. In the arrangement shown, as one example, lip 204 of cover 200 extends forward from the upper forward end of main body 64 and feature 206 is positioned at the forward end of lip 204. This arrangement is configured to allow drill guide block 72 to lock onto the main body 62 of drill guide assembly 62 upon installation and prevents unintentional disassembly or separation of drill guide block 72 from main body 64 of drill guide assembly 62. That is, when drill guide block 72 is installed onto drill guide assembly 62 the shape or angled surfaces of features 206 cause covers 200 to move inward against the bias force of biasing member 202 until the feature 206 clears a corresponding feature 208 on drill guide block 72, at which point the bias force of bias member 202 pushes cover 200 outward thereby locking drill guide block 72 onto drill guide assembly 62.

To remove drill guide block 72 from drill guide assembly 62 a user applies inward pressure against opposing covers 200 of spring bias members 70 thereby overcoming the bias force of biasing members 202. Upon overcoming the biasing force of biasing members 202, covers 200 move inward. Once the feature 206 of lips 204 of covers 200 clear the corresponding feature 208 of drill guide block 72, drill guide block 72 may be removed from drill guide assembly 62. In this way, drill guide assembly 62 provides a quick and easy and convenient way to install and remove various drill guide blocks 72 without tools and by hand only. Swapping out drill guide blocks 72 allows for the use of different drill guide blocks 72 for different applications and various purposes.

In the arrangement shown, as one example, opening 68 extends through drill guide assembly 62 from side-to-side. That is, in the arrangement shown, as one example, opening 68 extends through opposing side members 196 as well as opposing halves 192 of main body 64. In the arrangement shown, as one example, opening 68 is generally square or rectangular in shape when viewed from the side and extends in approximately a consistent and continuous manner through drill guide assembly from side-to-side. However any other size, shape or configuration of opening 68 is hereby contemplated for use.

In the arrangement shown, as one example, a passageway 210 connects to opening 68. In the arrangement shown, as one example, passageway 210 is generally centrally positioned within the lower portion of main body 64 of drill guide assembly 62. Passageway 210 forms an open path between the forward side of halves 192 and connects to opening 68 within drill guide assembly 62. The forward end of passageway 210 connects to a passageway 212 that connects to bores 78 of drill guides 76 in drill guide block 72. In this way, the connection of passageway 212 in drill guide block 72 to passageway 210 in drill guide assembly 62 provides a path for woodchips, dust and debris generated during drilling to exit drill guide assembly 62. This is true even though drill guide assembly 62 is moveable along upright assembly 32.

In the arrangement shown, as one example, a connection point 214 is positioned at the lower end of the forward side of main body 64. Connection point 214 is formed of any suitable size, shape and design and is configured to receive a connection point 216 in the lower end of drill guide block 72. In the arrangement shown, as one example, connection point 214 is a lip that forms an upwardly facing recess. In this arrangement, connection point 214 is configured to receive a protrusion that serves as connection point 216 in drill guide block 72. In this way, the connection point 214 of drill guide assembly 62 receives the connection point 216 in drill guide block 72 in mating arrangement, while also allowing for limited rotation of drill guide block 72 relative to drill guide assembly 62. Once the connection point 216 of drill guide block 72 is received within the connection point 214 of drill guide assembly 62, the upward end of drill guide block 72 is rotated toward drill guide assembly 62 until the features 206 of covers 200 lock on to features 208 of drill guide block 72. Once this occurs, the lower end of drill guide block 72 is secured to drill guide assembly 62 by connection point 214 and the upper outward sides of drill guide block 72 are secured to drill guide assembly 62 by features 206. In this way a secure connection is made that holds drill guide assembly 62 and drill guide block 72 together without the use of tools in a quick, easy, convenient and secure manner. That is, this installation may be made by hand only.

To remove drill guide block 72 from drill guide assembly 62, covers 200 are depressed inward until the features 206 of covers 200 clear the corresponding features 208 of drill guide block 72 at which point the upper end of drill guide block 72 is rotated downward until the connection point 216 of drill guide block 72 is removed from the connection point 214 of drill guide assembly 62. In this way, drill guide block 72 may be quickly, easily and conveniently removed from drill guide assembly 62 by hand only without the use of tools.

In the arrangement shown, as one example, the rearward side of drill guide assembly 62 includes a rear wall 218. In the arrangement shown, as one example, rear wall 218 is generally flat and planar and extends at an acute angle to clamping face 74 of drill guide block 72. That is, when viewed from the side, when the plane formed by clamping face 72 extends vertically, the plane formed by rear wall 218 extends at less than ninety degrees. This angular arrangement is configured to accommodate the angle of the forward side 172 of covers 36 of upright assembly 32.

In the arrangement shown, as one example, a pair of slots 220 are positioned at the outward sides of drill guide assembly 62. In the arrangement shown, as one example, slots 220 are formed by the rearward end of side members 196 extending past rear wall 218 and then extending inward toward one another a distance before terminating in a free and unattached end. In the arrangement shown, as one example, slots 220 extend in parallel spaced relation to the plane of rear wall 218 and extend uninterrupted from the top end of drill guide assembly 62 to the lower end of drill guide assembly. In the arrangement shown, as one example, slots 220 are generally square or rectangular in shape when viewed from above or below and are configured to receive the generally square or rectangular flanges 190 therein within close and tight tolerances while also allowing for sliding movement of drill guide assembly 62 upon upright assembly 32.

In the arrangement shown, as one example, spaced inward a distance from slots 220, arms 66 extend rearward a distance before terminating in a free end. In the arrangement shown, as one example, a pair of arms 66 are spaced a distance from one another in symmetric fashion to the centerline or seamline 194 of drill guide assembly 62. These arms 66 extend out of the plane formed by rear wall 218 in approximate perpendicular alignment to the plane of rear wall 218. Opposing arms 66 extend in approximate parallel spaced relation to one another. In the arrangement shown, as one example, a support member 222 extends across and connects opposing arms 66 at their upper forward ends thereby providing additional strength and support.

In the arrangement shown, as one example, the rearward ends of arms 66 include a hole 148 therein that extends through opposing arms 66 in approximate perpendicular alignment to the plane of arms 66. In the arrangement shown, as one example, arms 66 pivotally connect to the lower end of lower links 42 by inserting a pivot point 224 through the holes 148 of arms 66 as well as through hole 146 in the lower end of lower link 42 thereby connecting arms 66 and lower links 42 while allowing for relative rotation of arms 66 and lower links 42.

In the arrangement shown, as one example, when drill guide assembly 62 is installed onto upright assembly 32, arms 66 extend through forward slot 186 in forward side 172 of covers 36. In this position, rear wall 218 of drill guide assembly 62 is positioned in approximate planar sliding engagement to the plane formed by forward side 172 of covers 36 of upright assembly 32. In this position, flanges 190 of covers 36 are received within slots 220 of drill guide assembly 62. In this arrangement, drill guide assembly 62 may slide up and down along forward side 172 of covers 36 guided by the planar engagement of rear wall 281 of drill guide assembly 62 with the forward side 172 of covers 36 as well as being guided by flanges 190 of covers 36 being positioned within slots 220 of drill guide assembly 62. In this way, drill guide assembly 62 may move between a non-clamping position to a clamping position along upright assembly 32.

Drill Guide Block:

In the arrangement shown, as one example, self-adjusting pocket hole jig system 10 includes a drill guide block 72. Drill guide block 72 may be formed of any size, shape and design and is configured to be attached to and removed from drill guide assembly 62 and includes a clamping face 74 and drill guides 76 having bores 78 therein that facilitate drilling of pocket holes in workpiece 24.

In the arrangement shown, as one example, drill guide block 72 includes a main body 226 having a clamping face 74 and an upper wall 228. Drill guides 76 having generally cylindrical bores 78 that extend there through extend at an angle through drill guide block 72 such that the bore 78 of drill guides 76 intersect upper wall 228 at their upper end and intersect clamping face 74 at their lower end.

In the arrangement shown, as one example, bores 78 include a passageway 212 therein that extends rearward from bore 78 and through the main body 226 of drill guide block 72. When drill guide block 72 is in position on drill guide assembly 62, passageways 212 of bores 78 of drill guide block 72 connect to passageway 210 in drill guide assembly 62 so as to facilitate the removal of wood chips, dust and debris generated during drilling.

In the arrangement shown, as one example, a feature 208 is positioned adjacent the sides of drill guide block 72 that are configured to receive and hold feature 206 of drill guide assembly 62 thereby holding drill guide block 72 onto drill guide assembly 62. In the arrangement shown, as one example, a connection point 216 is positioned adjacent the lower end of drill guide block 72 that is configured to engage and hold to connection point 214 of drill guide assembly 62 thereby holding drill guide block 72 onto drill guide assembly 62. In this way, the combination of connection point 214 and connection points 216 of drill guide block 72 enables the quick, easy, convenient and secure installation of drill guide block 72 onto drill guide assembly 62. In this way, the combination of connection point 214 and connection points 216 of drill guide block 72 enables the quick, easy and convenient removal of drill guide block 72 from drill guide assembly 62.

Vacuum Attachment:

In the arrangement shown, as one example, self-adjusting pocket hole jig system 10 includes a vacuum attachment 230. Vacuum attachment 230 may be formed of any size, shape and design and is configured to be attached to and removed from drill guide assembly 62 and facilitates the removal of woodchips, dust and debris generated during drilling from the drill guide assembly 62 and drill guide block 72.

In the arrangement shown, as one example, vacuum attachment 230 includes an end wall 232 that connects at its upper and lower ends to upper and lower walls 234. End wall 324 also connects at its forward and rearward ends to forward and rearward walls 236. In the arrangement shown, as one example, end wall 232 is generally square or rectangular in shape. In the arrangement shown, as one example, upper and lower walls 234 extend in approximate parallel spaced relation to one another, and upper and lower walls 234 extend in approximate perpendicular alignment to end wall 232. In the arrangement shown, as one example, forward and rearward walls 236 extend in approximate parallel spaced relation to one another, and forward and rearward walls 236 extend in approximate perpendicular alignment to end wall 232. In the arrangement shown, as one example, upper and lower walls 234 extend in approximate perpendicular alignment to forward and rearward walls 236. In this way, the combination of end wall 232, upper and lower walls 234 and forward and rearward walls 236 form a generally square or rectangular shaped member that is configured to fit within opening 68 of main body 64 of drill guide assembly 62.

The end of upper and lower walls 234 and forward and rearward walls 236 opposite end wall 232 is connected to a neck section 238 that is connected to a collar section 240. Neck section 238 extends in a direction away from end wall 232 and smoothly converts the generally square or rectangular configuration of upper and lower walls 234 and forward and rearward walls 236 to the generally cylindrical shape of collar section. Collar section 240 is a generally elongated cylindrical shaped member that is configured to receive the end of a conventional vacuum. In this way, vacuum attachment 230 forms a generally hollow member.

In the arrangement shown, as one example, one of or both of forward and rearward walls 236 include a plurality of openings 242 therein that enable the entry of woodchips, dust and debris into the hollow interior of vacuum attachment 230 which are then removed under vacuum by a vacuum attached to collar section 240. In an alternative arrangement, one of or both of forward and rearward walls 236 are partially or wholly open thereby allowing unrestricted entry of woodchips, dust and debris into the hollow interior of vacuum attachment 230.

In the arrangement shown, as one example, the end of vacuum attachment 230 having end wall 232 is configured to be inserted into the opening 68 in either of the sides of drill guide assembly 62. That is, vacuum attachment 230 and drill guide assembly 62 is ambidextrous. Once vacuum attachment 230 is fully inserted into opening 68, the end wall 232 covers opening 68 on the side of drill guide assembly 62 opposite the side of insertion of the vacuum attachment 230. Once vacuum attachment 230 is fully inserted into opening 68, vacuum attachment 230 is in position to receive woodchips, dust and debris generated during drilling of pocket holes.

That is, during drilling of pocket holes, a drill bit is inserted within the bore 78 of at least one drill guide 76 of drill guide block 72. As the pocket hole is being drilled, woodchips, dust and debris are generated. The woodchips, dust and debris generated during drilling passes from bore 78, through passageway 212 in drill guide block 72, through passageway 210 in drill guide assembly 62 and through the forward wall 236 of vacuum attachment 230. The woodchips, dust and debris then travel through neck section 238, through collar 240 and out of vacuum attachment 230 under vacuum by an attached vacuum. In this way, a clean, effective, convenient way of removing woodchips, dust and debris from drill guide assembly 62.

Notably, as the drill guide assembly 62 and drill guide block 72 travel along the angled upright assembly 32 between a non-clamping position and a clamping position, vacuum attachment 230 travels with the drill guide assembly 62 and drill guide block 72.

Some embodiments may utilize other sizes, shapes and/or designs to implement the vacuum attachment 230. In one or more embodiments, instead of inserting vacuum attachment 230 into opening 68, vacuum attachment 230 is not inserted into opening 68. In one arrangement, vacuum attachment 230 attaches to the exterior of drill guide assembly 62 and covers one of the openings 68 while the other opening 68 may be covered, the other opening 68 may be left open, or the other opening 68 may not be present and instead only a single opening 68 is present.

In Operation—Example—Thin Workpiece:

With reference to FIGS. 48-56 an example is presented wherein self-adjusting pocket hole jig system 10 is used to clamp and automatically adjust to the thickness of a thin workpiece 24. In this arrangement, the lower end of workpiece 24 is placed on resting surface 84 of lower portion 28 of base 26 and the forward face of workpiece 24 is placed against clamping surface 108 of backstop 30 of base 26.

In the arrangement shown in FIG. 48 a fully unclamped position or a fully non-clamping position is presented. In this position, handle 44 is in a fully raised position. Drill guide assembly 62 and drill guide carrier 72 are in a fully raised position along upright assembly 32. In a fully unclamped position, clutch housing 46 is in a fully lowered position such that clutch housing 46 is positioned adjacent the lower end of slot 162 in covers 36 as well as slot 126 in center support 34 within the hollow interior of upright assembly 32.

In the arrangement shown, in FIG. 48, the axis of rotation that extends through the intersection of the upper end of upper links 40 and clutch housing 46 as well as the axis of rotation that extends through the intersection of the lower end of lower link 42 and arms 66 of drill guide assembly 62 are in alignment with one another along the centerline of center support 34, which is shown in a dashed line. In this position, the axis of rotation that extends through the intersection of the lower end of upper links 40 and the upper end of lower links 42 is positioned well behind the centerline of center support 34 as well as outside of the hollow interior 170 of covers 36.

Figure 49:
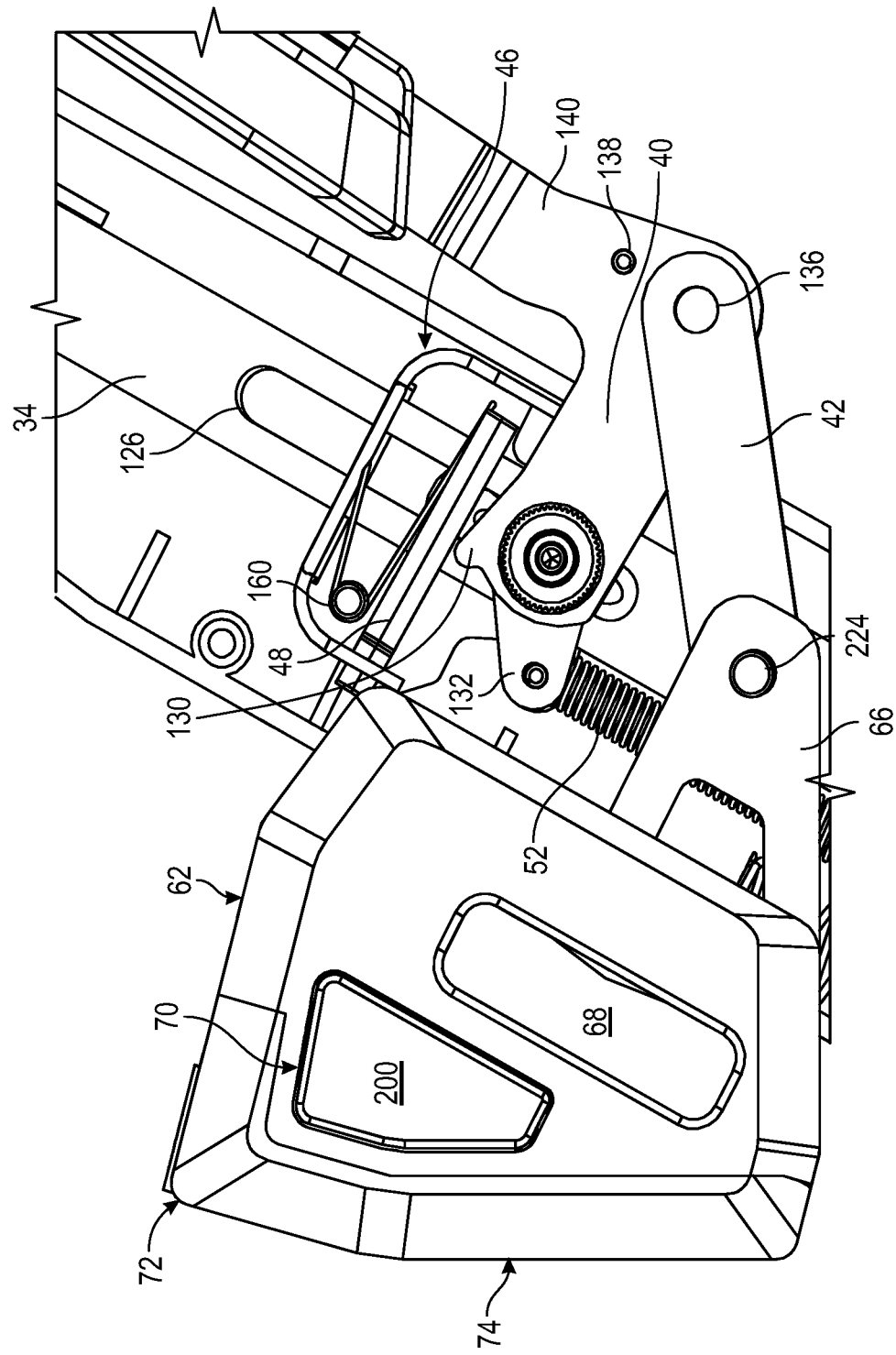
FIG. 49 shows another close-up left side view of a drill guide block and an upright element of a self-adjusting pocket hole jig system with handle 44 of the upright element in the fully raised position, in accordance with one or more embodiments.

As is best shown, in the close-up view of FIG. 49, in a fully unclamped position, the protrusion 130 of the upper end of upper links 40 engage and push upward upon the lower sides of clutch plates 48 thereby keeping the clutch plates 48 from locking onto center support 34.

From the unclamped or non-clamping position, to clamp workpiece 24, all the user needs to do is lower handle 44.

As handle 44 is rotated downward, this causes upper link 40 to rotate on the axis of rotation that extends through the upper end of upper link 40 and through the lower end of clutch housing 46. As Handle 44 is rotated downward, this causes the lower end of upper link 40 to move downward as well as causes the lower end of upper link 40 to rotate upon the axis of rotation that connects the lower end of upper link 40 to the upper end of lower link 42. As the handle 44 is rotated downward, the lower end of upper link 40 moves downward which causes the lower end of lower link 42 to move downward as well.

As the handle 44 is rotated downward, the lower end of lower link 42 rotates with respect to arms 66 of drill guide assembly 62 as the drill guide assembly 62 is driven downward. As the drill guide assembly 62 is driven downward the first return spring 50 is compressed and pushes against the downward motion of drill guide assembly 62. As the drill guide assembly 62 is driven downward, the rear wall 218 of drill guide assembly 62 slides over the forward side 172 of covers 36 as flanges 190 are held within slots 220 of drill guide assembly 62. This downward driving of drill guide assembly 62 continues until the clamping face 74 of drill guide assembly 62 engages the rearward facing surface of workpiece 24, which is shown in FIG. 50.

Figure 50:
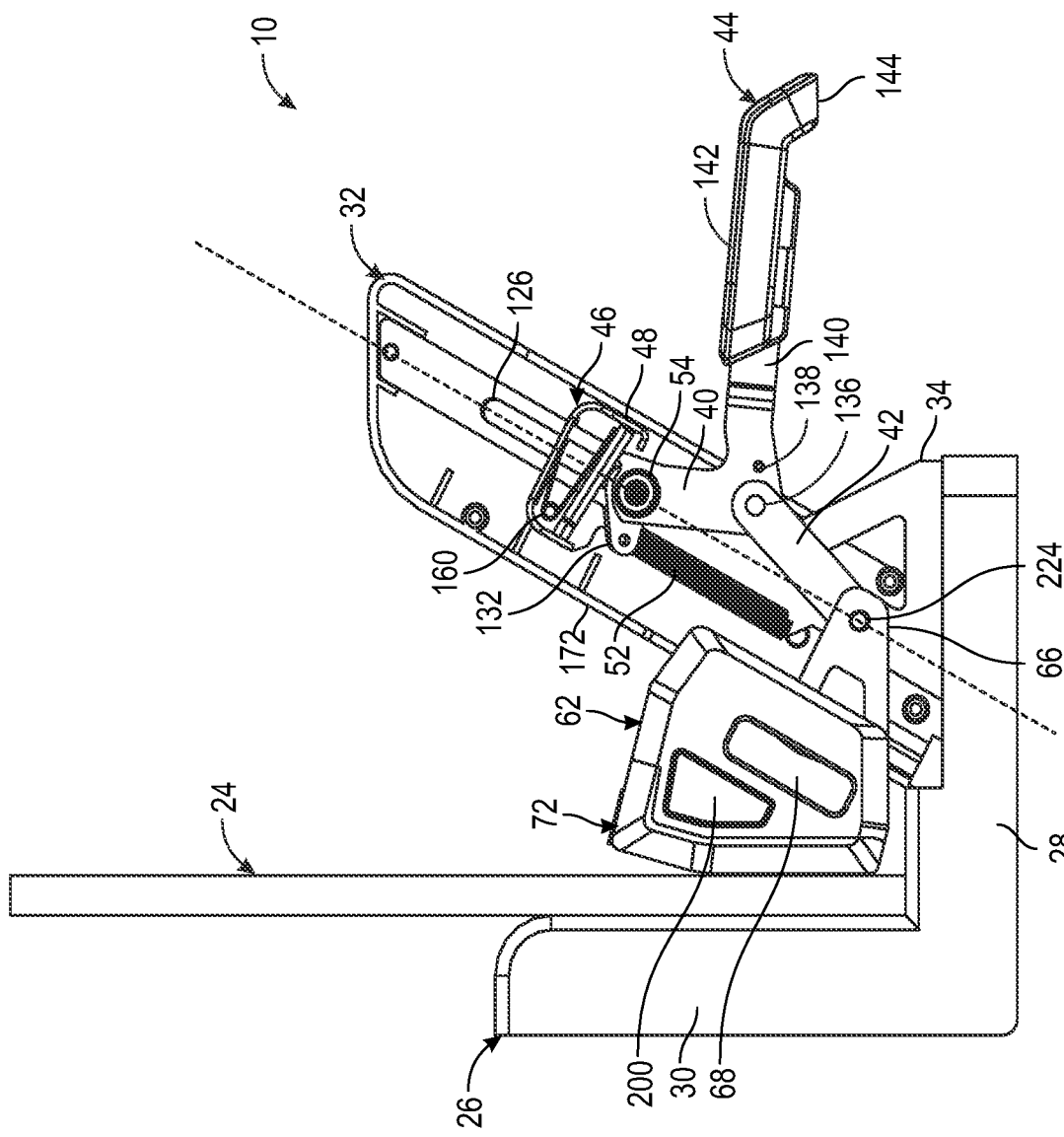
FIG. 50 shows a left side view of the self-adjusting pocket hole jig system and workpiece 24 shown in FIG. 48, with handle 44 in a lower position to cause clamping face 74 of drill guide block 72 to be positioned closer to the base so workpiece 24 and thereby cause workpiece 24 to be in contact with both the clamping face and the backstop, in accordance with one or more embodiments.

FIG. 50 shows the point when clamping face 74 of drill guide assembly 62 engages the rearward facing surface of workpiece 24. At this point, as is shown in FIG. 50, the axis of rotation that extends through the intersection of the upper end of upper links 40 and clutch housing 46 as well as the axis of rotation that extends through the intersection of the lower end of lower link 42 and arms 66 of drill guide assembly 62 are in alignment with one another along the centerline of center support 34, which is shown in a dashed line. In this position, the axis of rotation that extends through the intersection of the lower end of upper links 40 and the upper end of lower links 42 is positioned slightly behind the centerline of center support 34.

Figure 51:
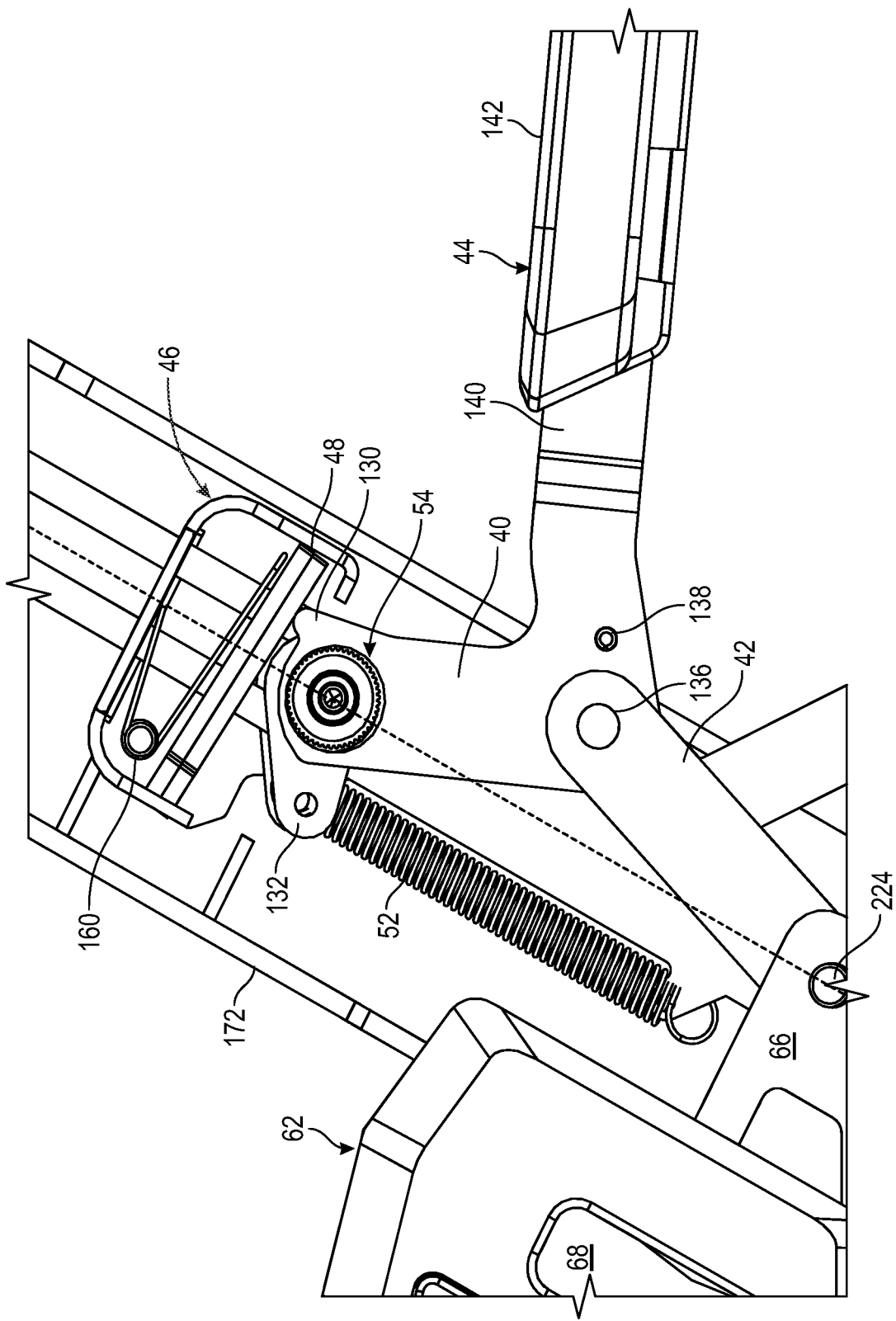
FIG. 51 shows a close-up left side view of a drill guide block and an upright element of a self-adjusting pocket hole jig system shown in FIG. 50, in accordance with one or more embodiments.

As is best shown, in the close-up view of FIG. 51, in this position, with the clamping face 74 of drill guide block 72 engaged with the rearward facing surface of workpiece 24, the protrusion 130 of the upper end of upper links 40 continues to engage and push upward upon the lower sides of clutch plates 48 thereby keeping the clutch plates 48 from locking onto center support 34. With that said, when comparing FIG. 49 with FIG. 51, protrusion 130 has substantially moved rearward with respect to clutch plates 48. As such, protrusion 130 is nearing the point where protrusion 130 disengages clutch plates 48.

With reference to FIG. 50, at this point, continued downward movement of handle 44 causes clamping face 74 to push into workpiece 24 thereby forcing workpiece 24 into clamping surface 108. As the handle 44 continues to move downward pressure builds between clamping face 74 and workpiece 24. This pressure builds between clamping face 74 and workpiece 24 until enough force is applied by handle 44 that overcomes the amount of force applied by second return spring 52 which pulls clutch housing 46 downward along center support 34. Once enough force is applied by handle 44 to overcome the downward pull on clutch housing 46 by second return spring 52, clutch housing 46 begins to slide upward upon center support 34. As clutch housing 46 slides upward upon center support 34, second return spring 52 is stretched between its lower connection point at arm 124 of center support 34 and its upper connection point at arms 132 which connects to the intersection of clutch housing 46 and the upper end of upper links 40.

Clutch housing 46 continues to be driven upward along center support 34 as the upper end of upper link 40 rotates. As the angle of upper link 40 changes as the clutch housing 46 moves upward the relationship between the protrusion 130 of the upper end of upper links 40 changes with respect to the lower side of clutch plates 48. That is protrusion 130 continues to rotate rearward as the handle 44 moves downward.

This continues to a point where protrusion 130 of the upper end of upper link 40 disengages from clutch plates 48. This point is approximately shown in FIG. 52 and FIG. 53. When comparing FIG. 50 with FIG. 52, clutch housing 46 has moved higher along center support 34. As the protrusion 130 of the upper end of upper link 40 disengages from clutch plates 48 the upward support the protrusion 130 provides to the rearward ends of clutch plates 48 is removed. This upward support provided by protrusion 130 to clutch plates 48 counteracts the downward force applied on the upper side of clutch plates 48 by the spring of bias member 160. As the support provided by protrusion 130 is removed, the rearward end of clutch plates 48 is forced downward by bias member 160 until clutch plates 48 lock onto center support 34. When clutch plates 48 bind or lock onto center support 34 clutch housing 46 stops moving upward along 34 by the clutch plates 48 locked onto center support 34.

Figure 52:
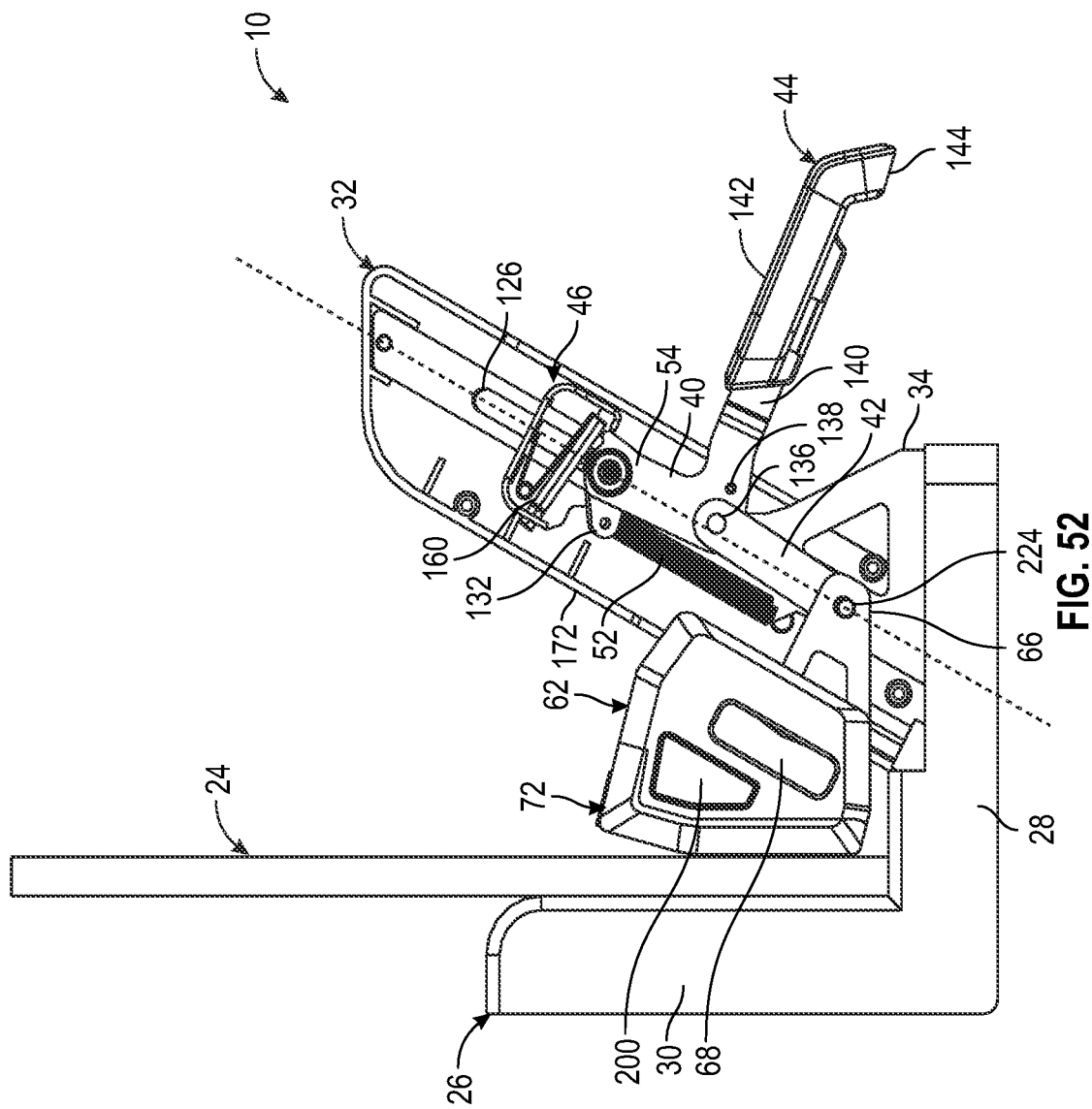
FIG. 52 shows a left side view of the self-adjusting pocket hole jig system shown in FIG. 50 with handle 44 further lowered to cause workpiece 24 to be clamped between the clamping face and the backstop, in accordance with one or more embodiments.

FIG. 52 shows the approximate point when protrusion 130 disengages from the lower surface of clamping plates 48. At this point, as is shown in FIG. 52, the axis of rotation that extends through the intersection of the upper end of upper links 40 and clutch housing 46 as well as the axis of rotation that extends through the intersection of the lower end of lower link 42 and arms 66 of drill guide assembly 62 are in alignment with one another along the centerline of center support 34, which is shown in a dashed line. In this position, the axis of rotation that extends through the intersection of the lower end of upper links 40 and the upper end of lower links 42 is positioned just barely behind the centerline of center support 34.

When clutch housing 46 is locked in place, as handle 44 continues to rotate downward, as the upper end of upper link 44 is stationary or essentially stationary in place, essentially the only direction for relative movement is downward and against workpiece 24. That is, once the clutch housing 46 is locked in place the upper end of upper link 40 is locked in place. As such, as the handle 44 continues to rotate downward, the lower end of upper link 40 continues to move downward. This downward movement of the lower end of upper link 40 causes the lower end of lower link 42 to continue to move downward. This downward movement of the lower end of lower link 42 causes the drill guide assembly 62 to continue to move downward, against the increasing pressure provided. This pressure is applied to workpiece 24 thereby forcing workpiece 24 against backstop 30

This continues until the handle 44 is moved such that the axis of rotation between the lower end of the upper link 40 and the upper end of the lower link 44 move to an over-center condition, which is shown in FIG. 54 and FIG. 55, at which point stop bar 138 engages the rearward side of center support 34 thereby preventing any further downward movement of handle 44. In this over-center condition, upper link 40 and lower link 42 and handle 44 are naturally held in place as the forces generated through clamping have a tendency to force stop bar 138 into the rearward side of center support 34.

FIG. 54 shows the approximate point when protrusion stop bar 138 engages the rearward side of center support 34 in an over-center condition of clamping assembly 38. At this point, as is shown in FIG. 54, the axis of rotation that extends through the intersection of the upper end of upper links 40 and clutch housing 46 as well as the axis of rotation that extends through the intersection of the lower end of lower link 42 and arms 66 of drill guide assembly 62 are in alignment with one another along the centerline of center support 34, which is shown in a dashed line. In this position, the axis of rotation that extends through the intersection of the lower end of upper links 40 and the upper end of lower links 42 is positioned just forward the centerline of center support 34—which is an over-center condition.

When in an over-center condition, clamping face 74 of drill guide block 72 is in flat and flush and tight engagement with the rearward face of workpiece 24. This allows a user to easily and securely drill pocket holes in workpiece 24 through bores 78 formed by drill guides 76 in drill guide block 72. As the pocket holes are drilled, woodchips, dust and debris travels through passageways 212 in bores 78 in drill guide block 72 and into the passageway 210 in drill guide assembly 62 under vacuum applied through vacuum attachment 230 inserted within an opening 68 in a side of main body 64. The woodchips, dust and debris are pulled into the vacuum attachment 230 under vacuum and are pulled through the hollow interior of vacuum attachment 230 and out the collar section 240 thereby removing the woodchips, dust and debris from the drill guide block 72 and the drill guide assembly 62. This makes the process of drilling pocket holes cleaner and easier while also improving the quality of the pocket holes by removing the interference caused by woodchips, dust and debris generated during drilling.

Once drilling is completed, all the user needs to do to release and remove the workpiece 24 is lift up on the outward end of handle 44 which causes the upper link 40 and lower link 42 to move out of an over-center condition as the handle 44 is raised. As the handle 44 is raised, the protrusion 130 pushes up on the rearward end of clutch plates 48 and upon overcoming the spring bias force applied by bias member 160 thereby breaks the locking engagement between clutch plates 48 and center support 34. Once the locking engagement between clutch plates 48 and center support 34 is broken, the clutch housing 46 is automatically pulled downward by the tension of second return spring 52 while the drill guide assembly 62 is automatically pushed upward by first return spring 50, all while handle 44 is automatically pulled upward by the combined spring force of first return spring 50 and second return spring 52. This motion automatically continues, in the reverse manner described with respect to clamping motion, until the clamping assembly 38 moves back to a fully unclamped or a fully non-clamped position, at which point the workpiece 24 may be removed and the self-adjusting pocket hole jig system 10 is ready for clamping again in the same way described herein.

One of the benefits of self-adjusting pocket hole jig system 10 is that as the handle 44 is lowered the clamping face 74 of drill guide block 72 remains vertical, or said another way, parallel to the rearward facing surface of workpiece 24 throughout the clamping motion. That is as the handle 44 is lowered with a single motion the clamping face 74 moves downward and forward while maintaining a perpendicular alignment to the rearward facing surface of workpiece 24. In this way, engagement of the clamping face 74 onto the rearward facing surface of workpiece 24 effectively applies a forward clamping force on the workpiece 24 that is perpendicular to the rearward facing surface of workpiece 24 with little downward force. In this way, the clamping motion of self-adjusting pocket hole jig system 10 does effectively not impart a rotational force upon workpiece 24 as does other clamping systems. In addition, the clamping force of self-adjusting pocket hole jig system 10 is centered upon the area where bores 78 of drill guides 76 intersect with workpiece 24 thereby ensuring the clamping pressure is applied by self-adjusting pocket hole jig system 10 at the optimal position to ensure drilling of the most accurate and clean pocket holes in the safest possible manner.

One of the benefits of the self-adjusting pocket hole jig system 10 is that the handle 44 moves only in a single plane. That is, the user may clamp and unclamp self-adjusting pocket hole jig system 10 by moving handle 44 downward (for clamping) and upward (for unclamping) in a single plane. This single plane of motion, using only handle 44 is easier on the user and more ergonomic. In addition it is simpler to use and learn as compared to a multi-movement process, not to mention faster. In addition, the user may clamp and unclamp by placing their hand on only a single component, the handle 44, which eliminates the need to grasp and manipulate multiple devices, as is required by other prior-art jigs. As such, the speed, comfort and ease of use of the self-adjusting pocket hole jig system 10 is unmatched.

In Operation—Example—Thick Workpiece:

With reference to FIGS. 57-61 an example is presented wherein self-adjusting pocket hole jig system 10 is used to clamp and automatically adjust to the thickness of a thick workpiece 24. In this arrangement, the self-adjusting pocket hole jig system 10 operates in the same manner described herein, with the difference being the drill guide assembly 62 engages the workpiece 24 earlier which is accommodated by the clutch housing 46 moving upward along center support 34 earlier in the clamping process. In this way, approximately the same clamping pressure is applied when clamping both thin or thick workpieces 24, or for that matter, approximately the same clamping pressure is applied to any thickness of workpiece 24 automatically by way of automatic internal adjustments made automatically within the self-adjusting pocket hole jig system 10 without user intervention. That is, the user experience as it applies to clamping is practically identical for clamping any sized workpiece 24 and requires no user adjustments.

Figure 53:
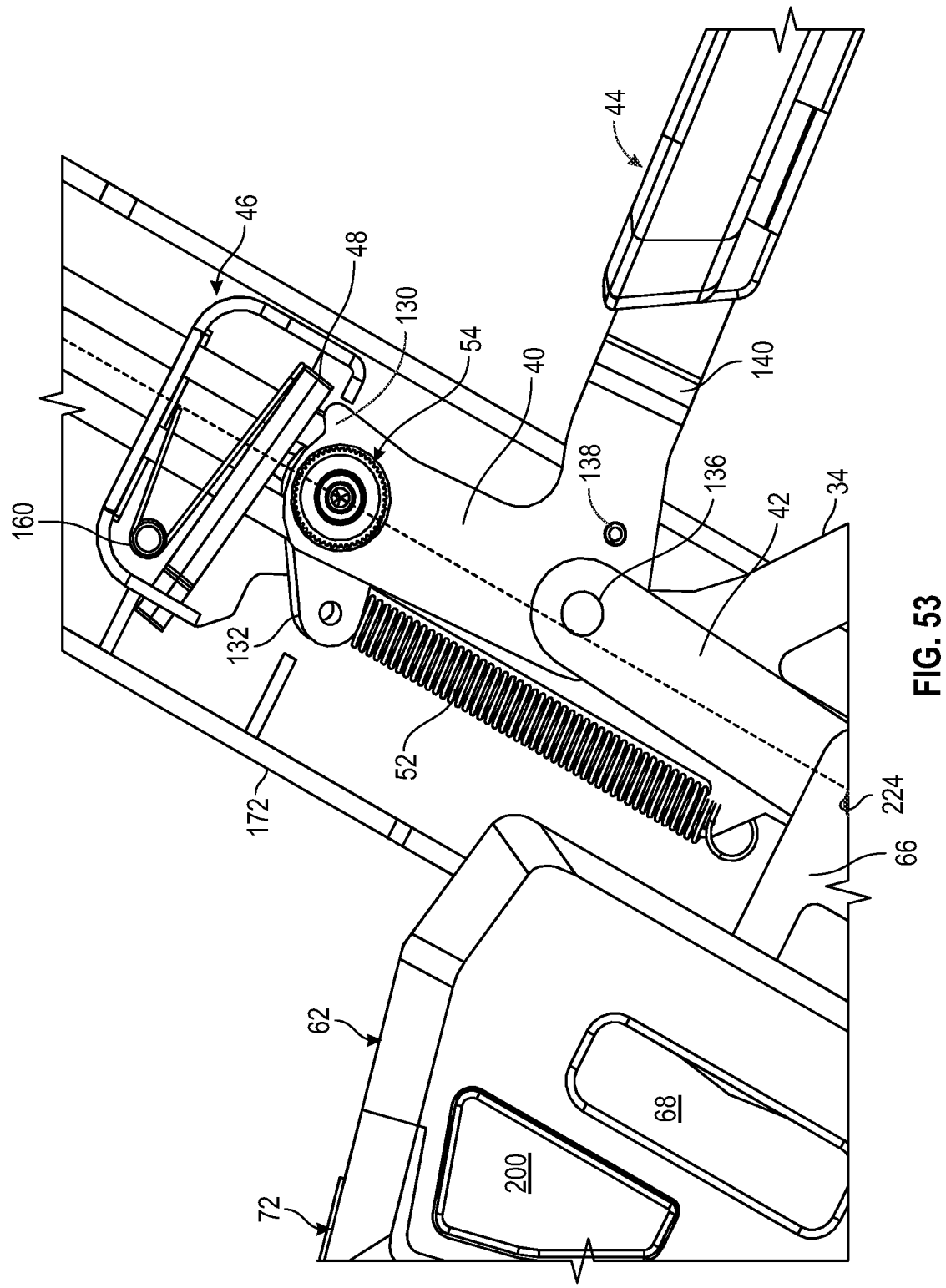
FIG. 53 shows a close-up left side view of a drill guide block and an upright element of a self-adjusting pocket hole jig shown in FIG. 52, in accordance with one or more embodiments.

As such, FIG. 48 and FIG. 49 is similar to FIG. 57; FIG. 50 and FIG. 51 is similar to FIG. 58; FIG. 52 and FIG. 53 is similar to FIG. 59; FIG. 54 and FIG. 55 is similar to FIG. 60; and FIG. 56 is similar to FIG. 61. The close-up views of FIGS. 49, 51, 53 and 55, are not repeated for the thick clamping example as the teaching as it applies to the position of protrusion 130 is functionally similar albeit with a different position of components along the length of center support 34.

The only user adjustment that may be made to adjust operation of the self-adjusting pocket hole jig system 10 is rotation of knob 56 of clamp force adjustment mechanism 54 which increases or decreases the clamping pressure applied to workpieces 24. The adjusted clamping pressure as set by rotation of knob 56 of clamp force adjustment mechanism 54 is then applied to all workpieces 24 of any thickness without any further user adjustment.

Grippy Material:

In one arrangement, some or all of the surfaces of system 10 that engage workpiece 24 are partially or wholly covered by a compressible material that has a high coefficient of friction or a non-compressible material that has a high coefficient of friction. This material with a high coefficient of friction is referred to herein as a grippy material and helps to hold workpiece 24 in place within jig 10 as well as reduces the amount of clamping pressure required to adequately hold workpiece 24 in place. This is because this grippy material has a high coefficient of friction making it less likely that workpiece 24 will slide or shift after being clamped and during the drilling process.

In one arrangement this grippy material with a high coefficient of friction covers some or the entire upward facing resting surface 84 of lower portion 28 of base 26, the rearward facing clamping surface 108 of back stop 30 of base 26 and/or the clamping face 74 of drill guide block 72. The entirety of these surfaces may be covered by a grippy material or alternatively only a portion of these surfaces may be covered by a grippy material. The grippy material may be added on top of these surfaces by gluing, adhering, spraying, sticking or otherwise by adding the grippy material by any other manner, method or means. Alternatively, the grippy material may be formed into these surfaces during manufacturing such as through dual durometer molding or otherwise by adding the grippy material by any other manner, method or means.

Figure 1:
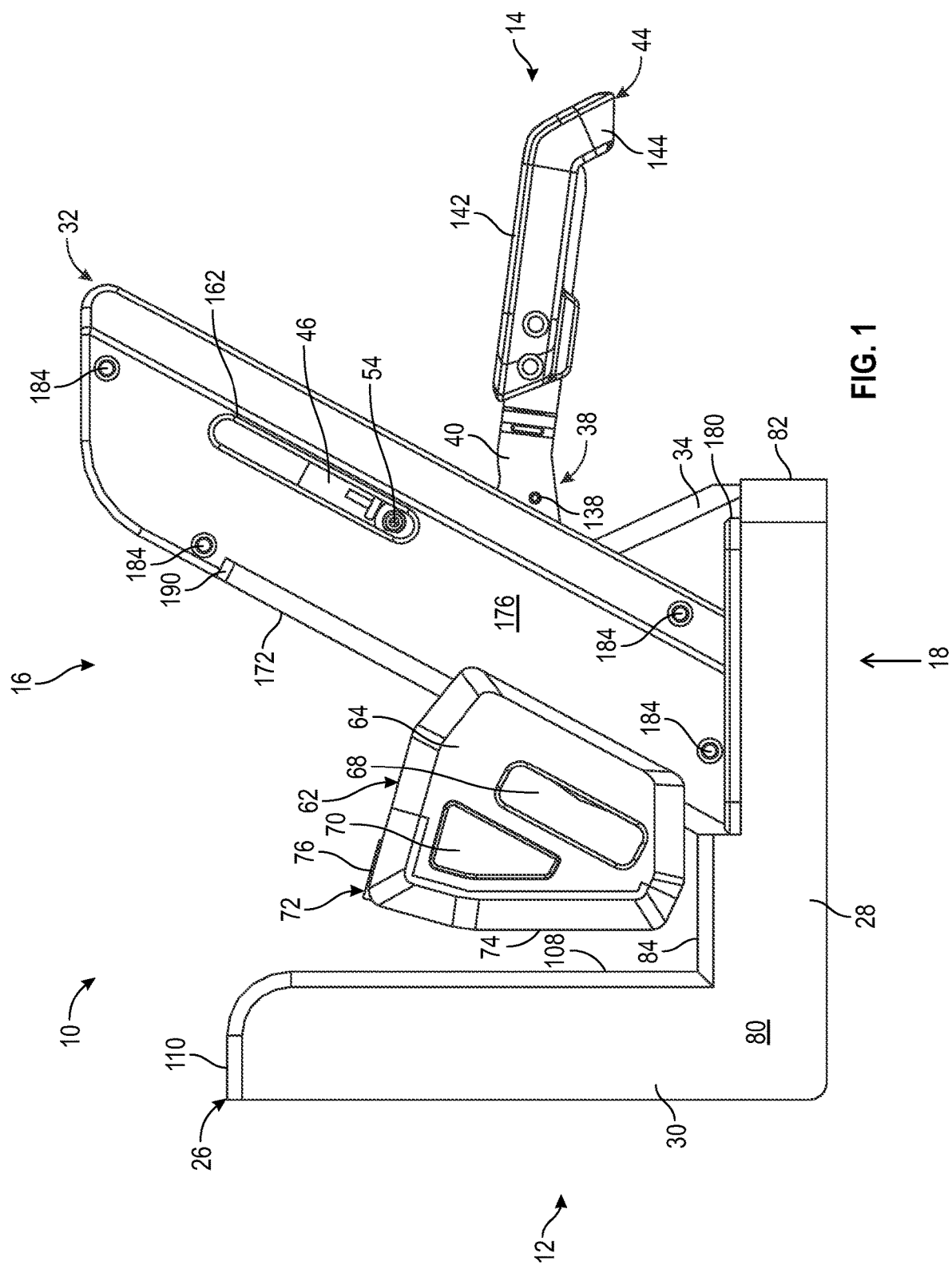
FIG. 1 shows a left side view of a self-adjusting pocket hole jig system, in accordance with one or more embodiments.
Figure 2:
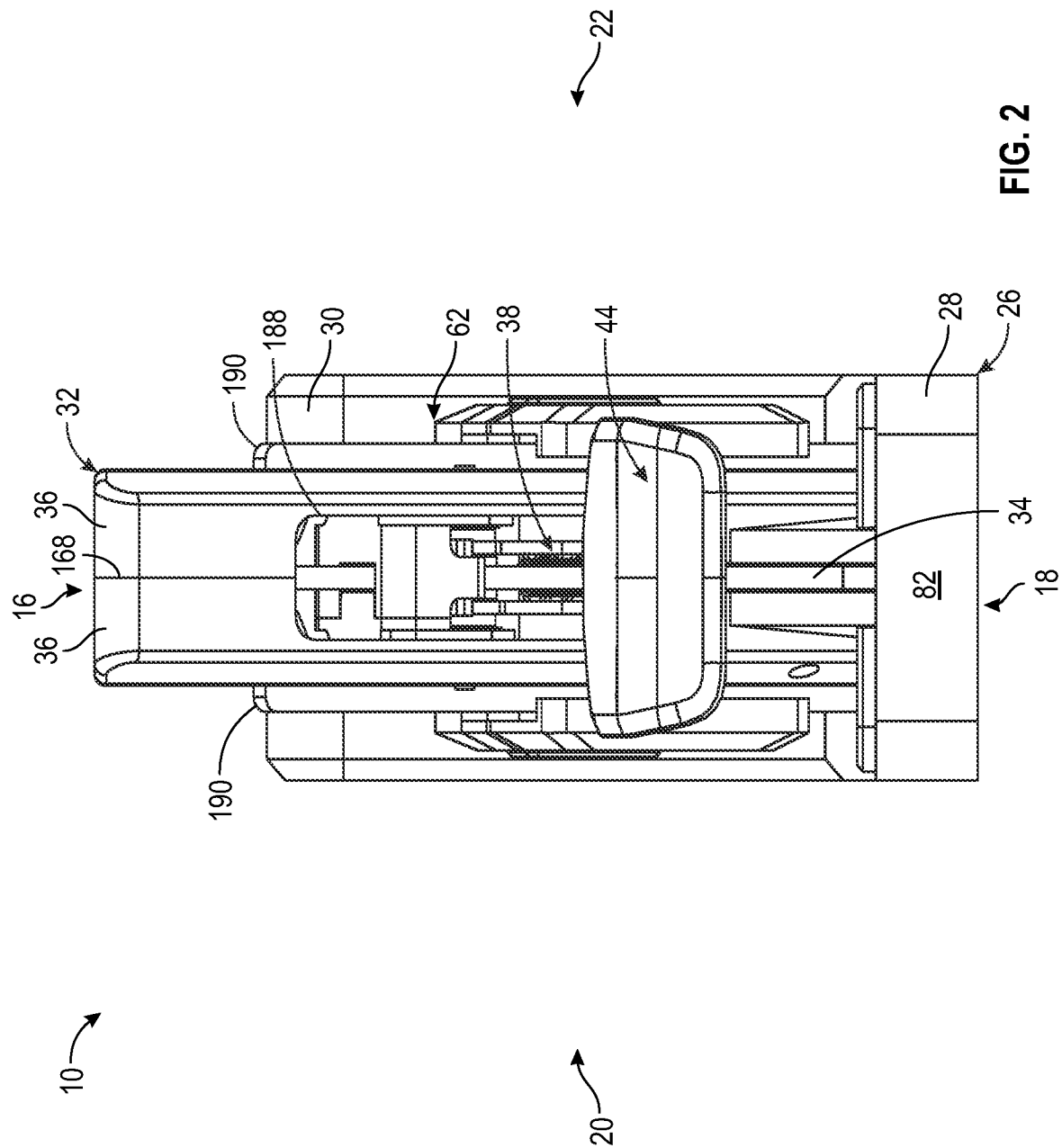
FIG. 2 shows a rearward side view of the self-adjusting pocket hole jig system shown in FIG. 1, in accordance with one or more embodiments.
Figure 3:
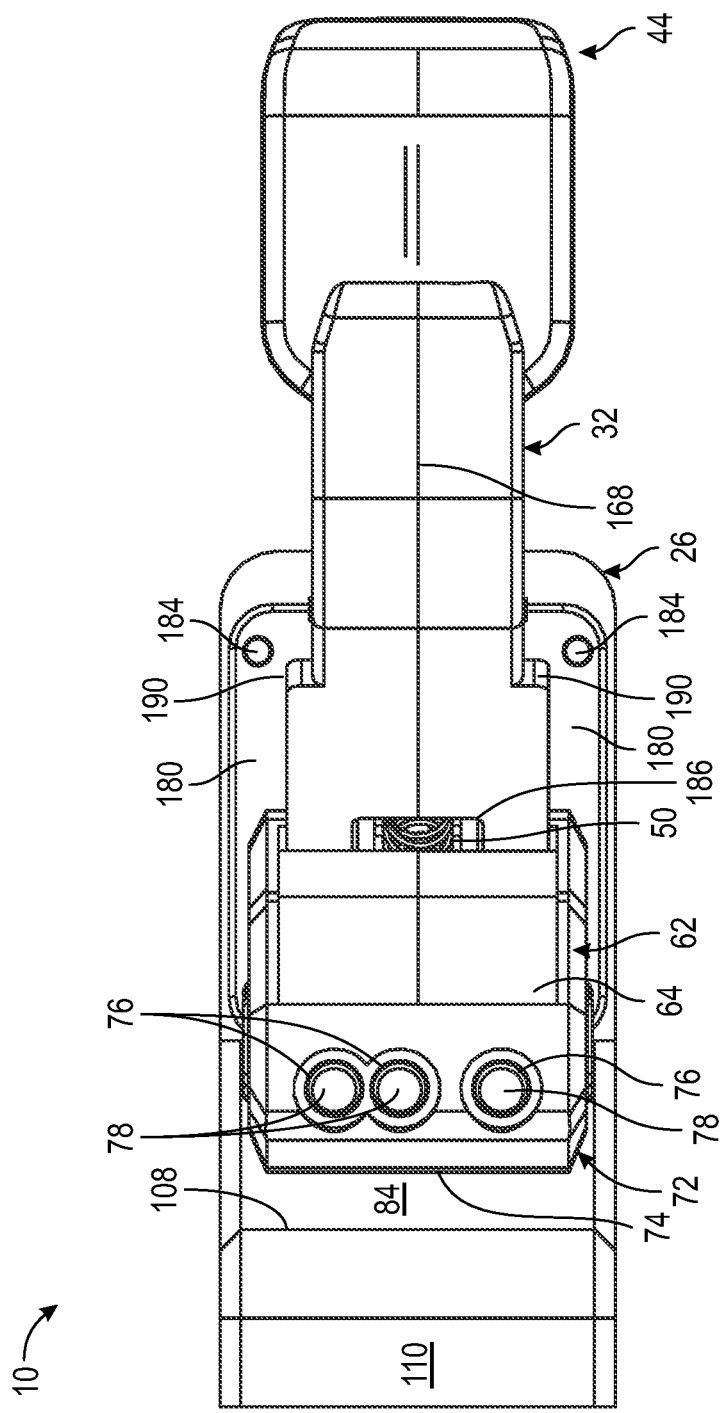
FIG. 3 shows a top view of the self-adjusting pocket hole jig system shown in FIG. 1, in accordance with one or more embodiments.
Figure 4:
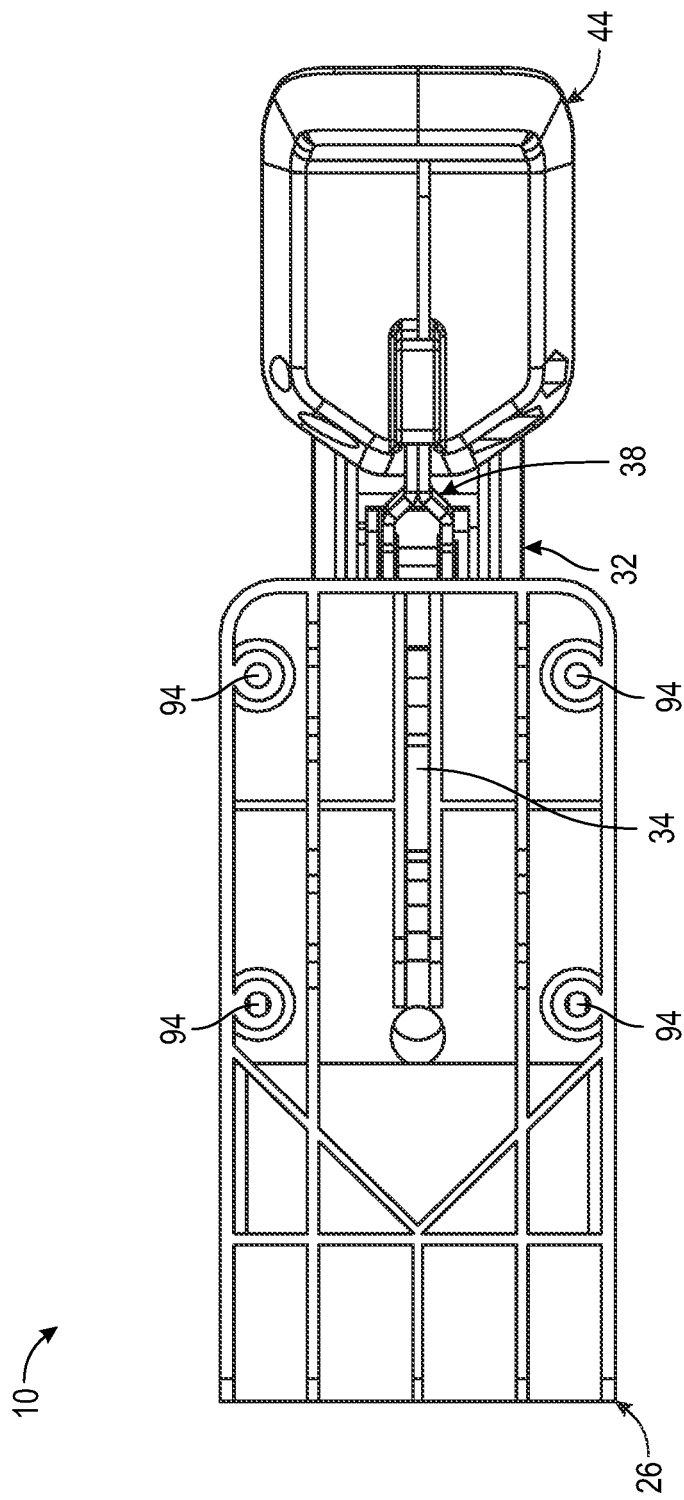
FIG. 4 shows a bottom view of the self-adjusting pocket hole jig system shown in FIG. 1, in accordance with one or more embodiments.
Figure 5:
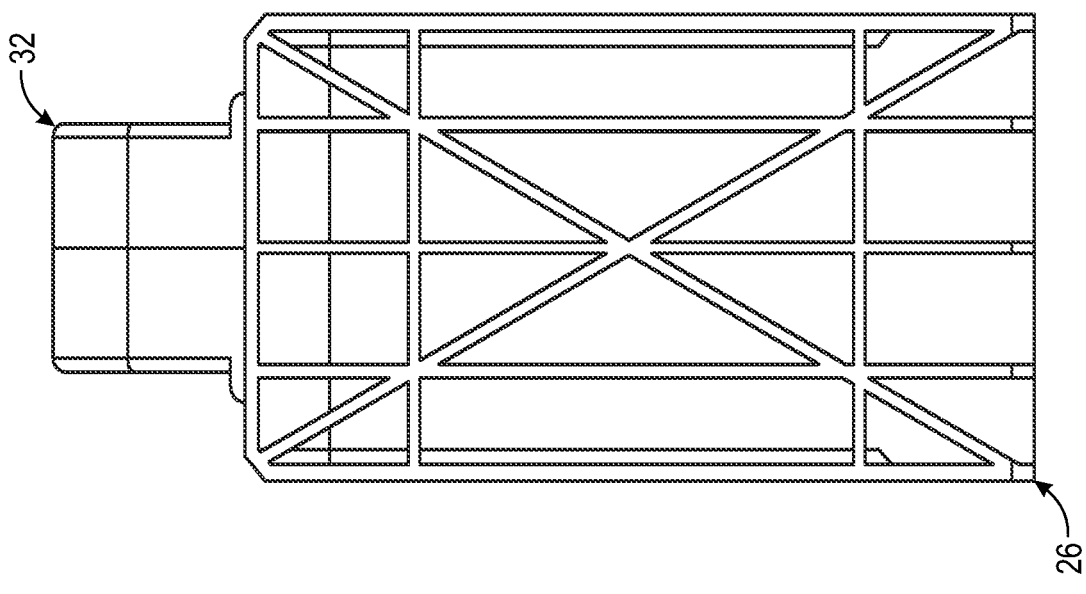
FIG. 5 shows a forward side view of the self-adjusting pocket hole jig system shown in FIG. 1, in accordance with one or more embodiments.
Figure 6:
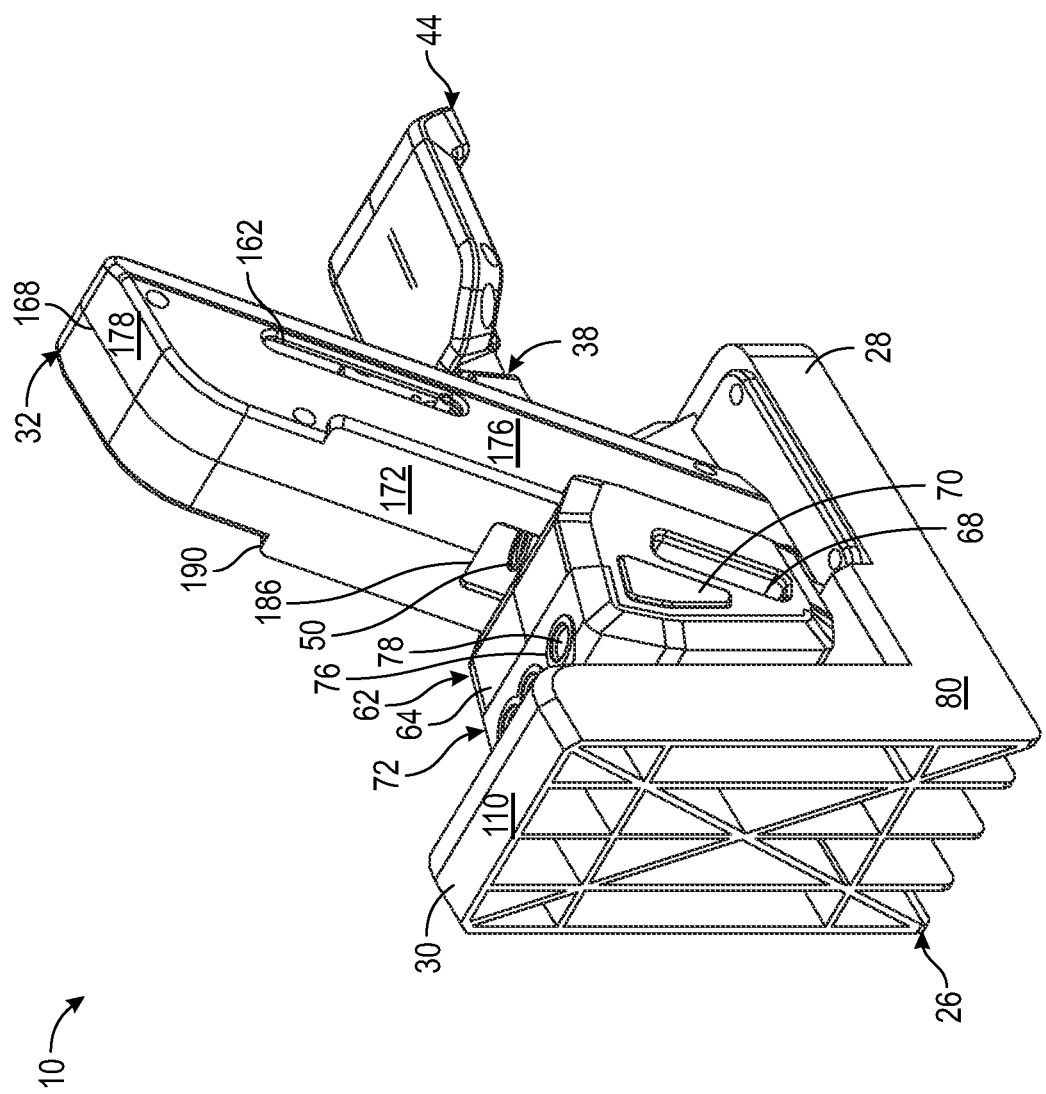
FIG. 6 shows a first perspective view of the self-adjusting pocket hole jig system shown in FIG. 1, in accordance with one or more embodiments.
Figure 7:
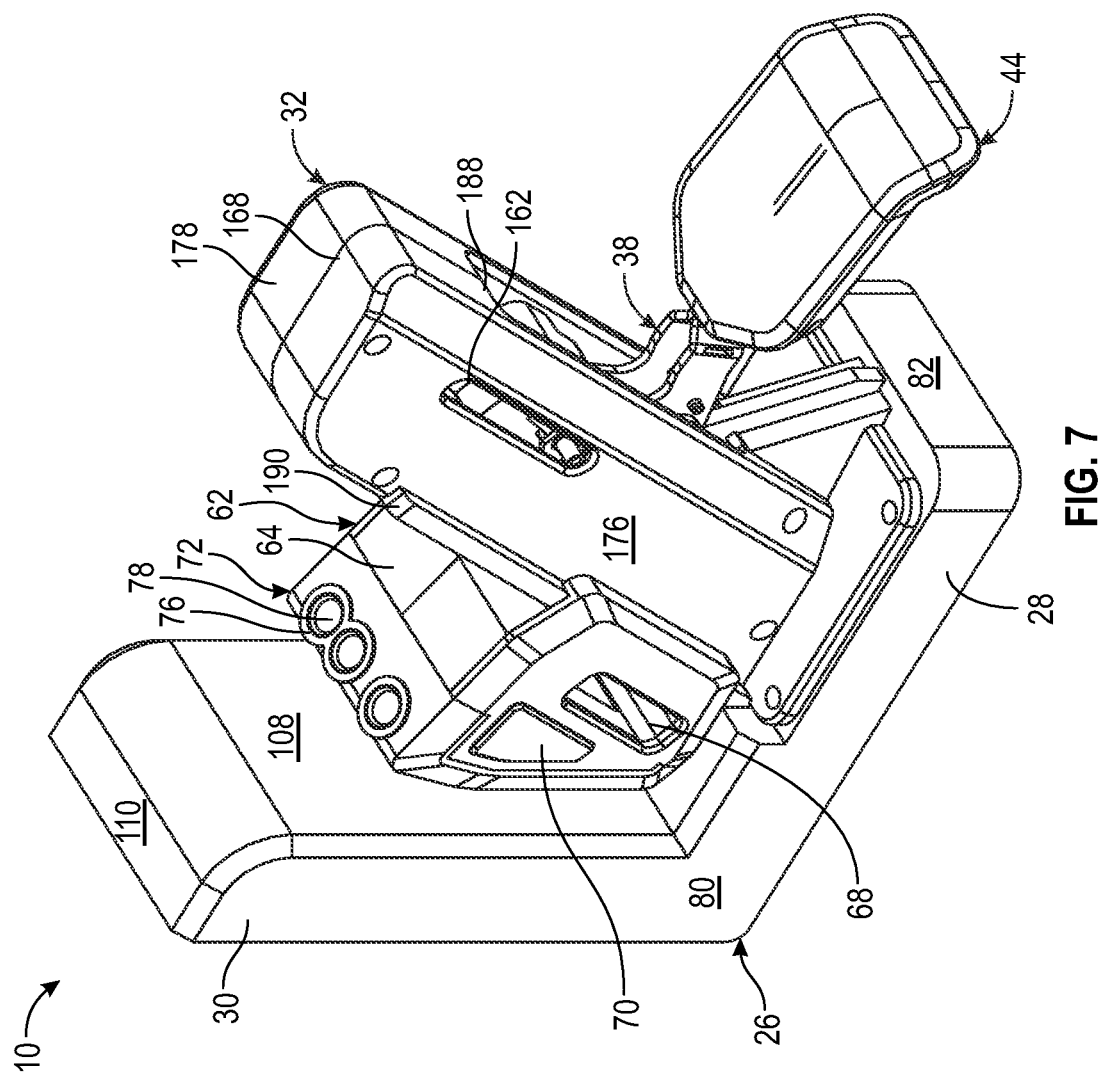
FIG. 7 shows a second perspective view of a self-adjusting pocket hole jig system shown in FIG. 1, in accordance with one or more embodiments.
Figure 8:
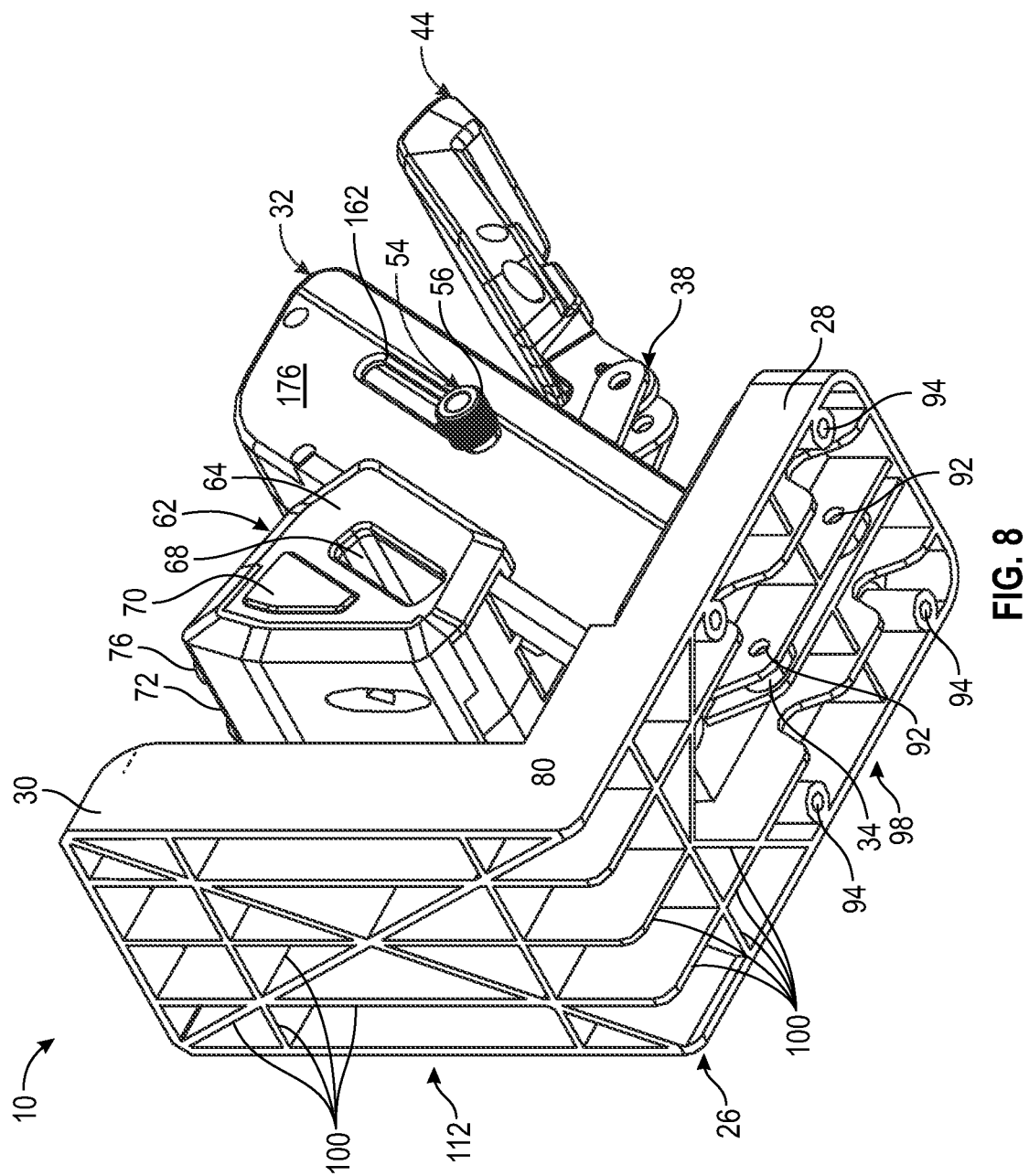
FIG. 8 shows a third perspective view of a self-adjusting pocket hole jig system shown in FIG. 1, in accordance with one or more embodiments.
Figure 9:
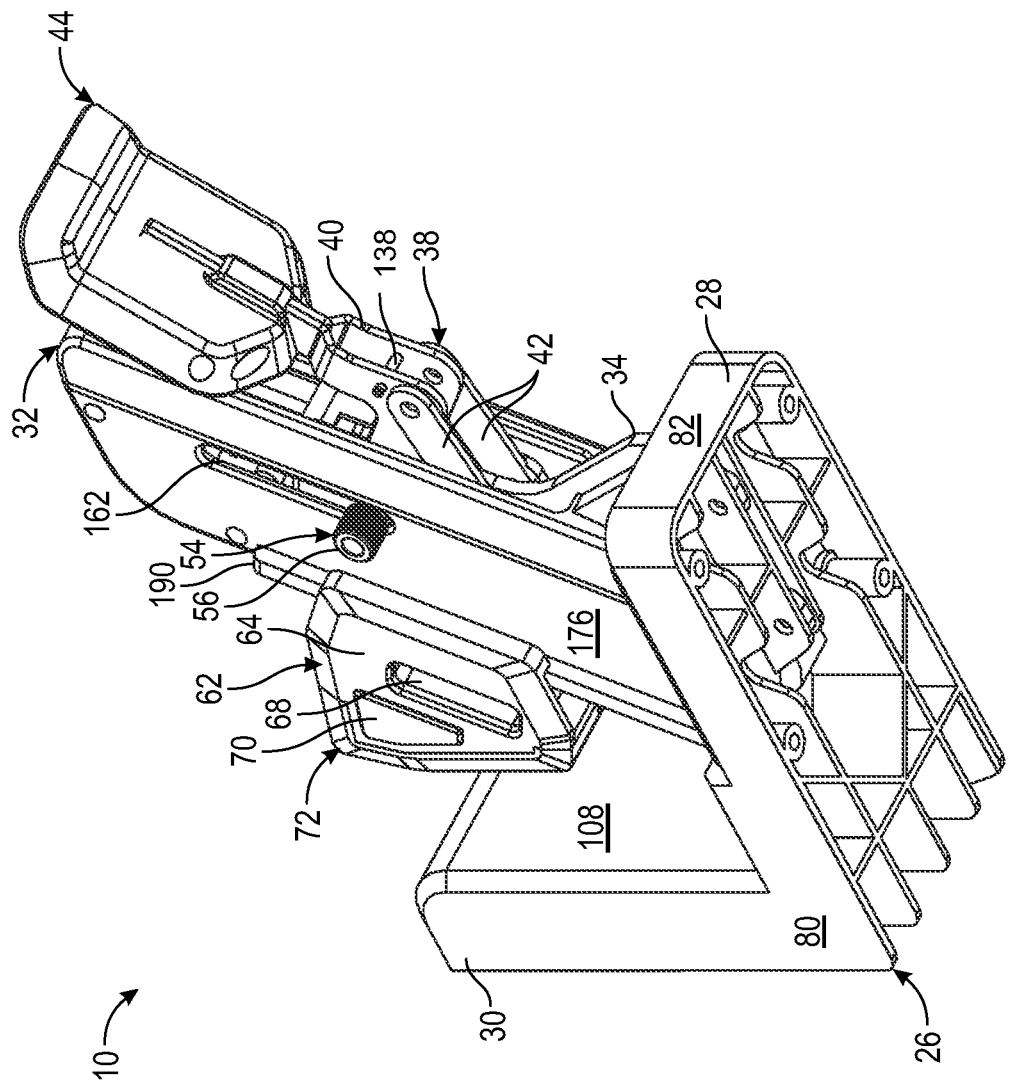
FIG. 9 shows a fourth perspective view of a self-adjusting pocket hole jig system shown in FIG. 1, in accordance with one or more embodiments.
Figure 10:
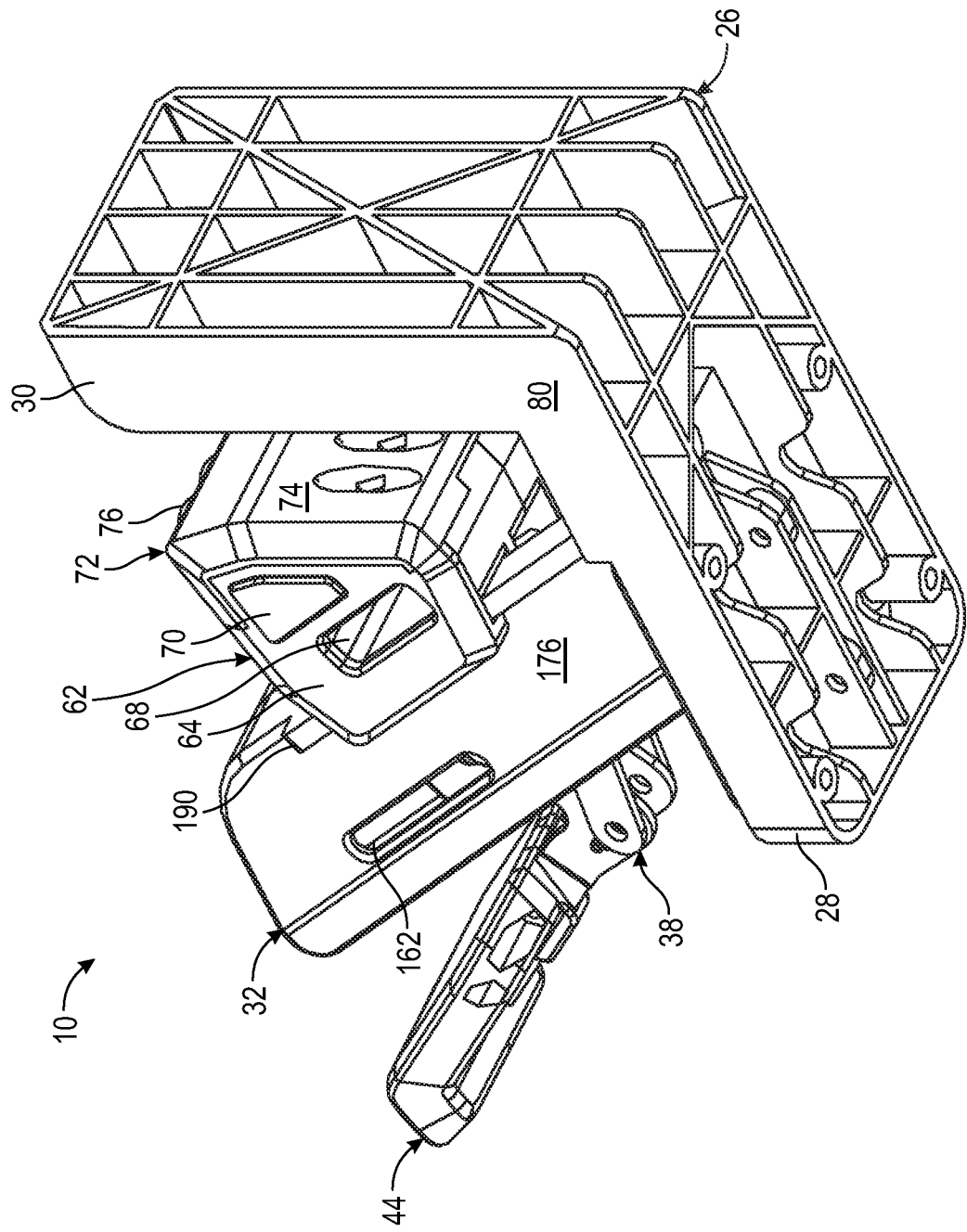
FIG. 10 shows a fifth perspective view of a self-adjusting pocket hole jig system shown in FIG. 1, in accordance with one or more embodiments.
Figure 11:
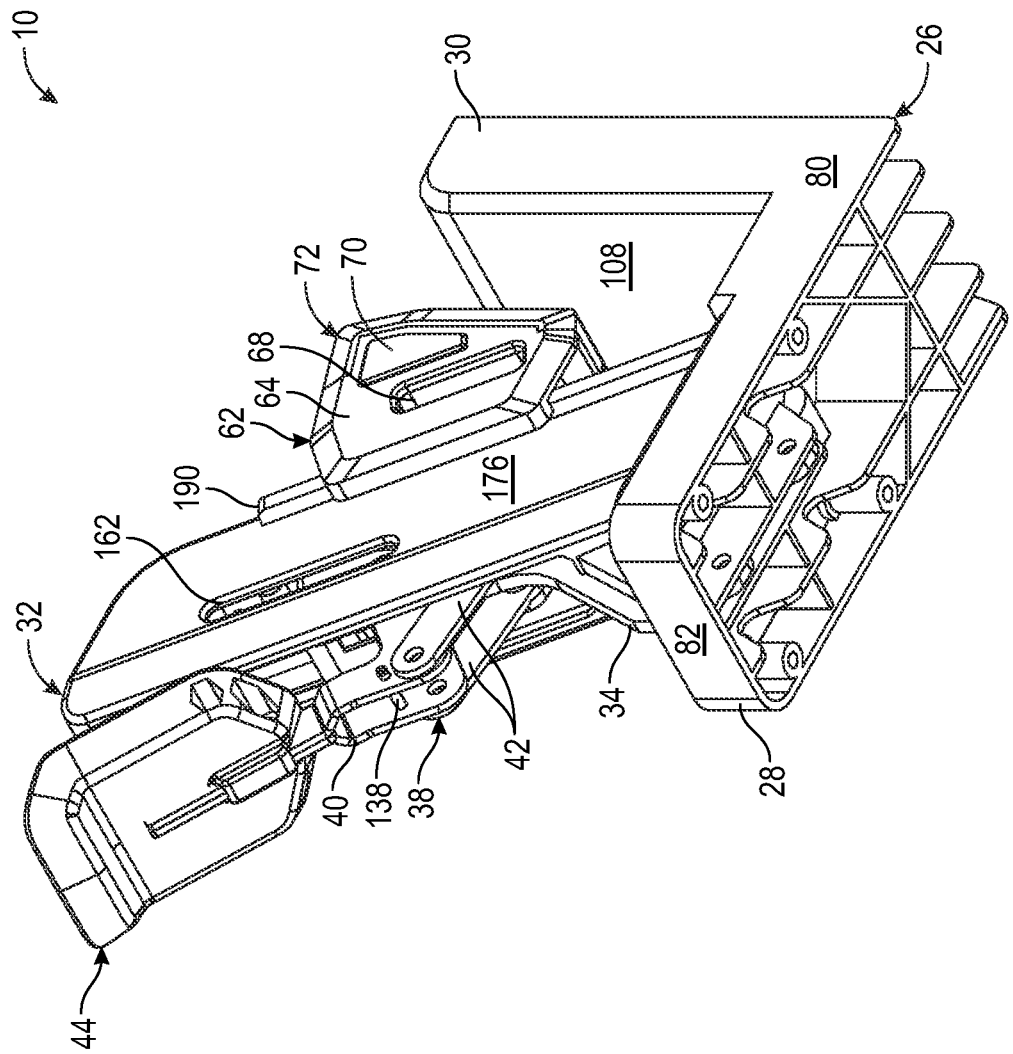
FIG. 11 shows a sixth perspective view of a self-adjusting pocket hole jig system shown in FIG. 1, in accordance with one or more embodiments.
Figure 12:
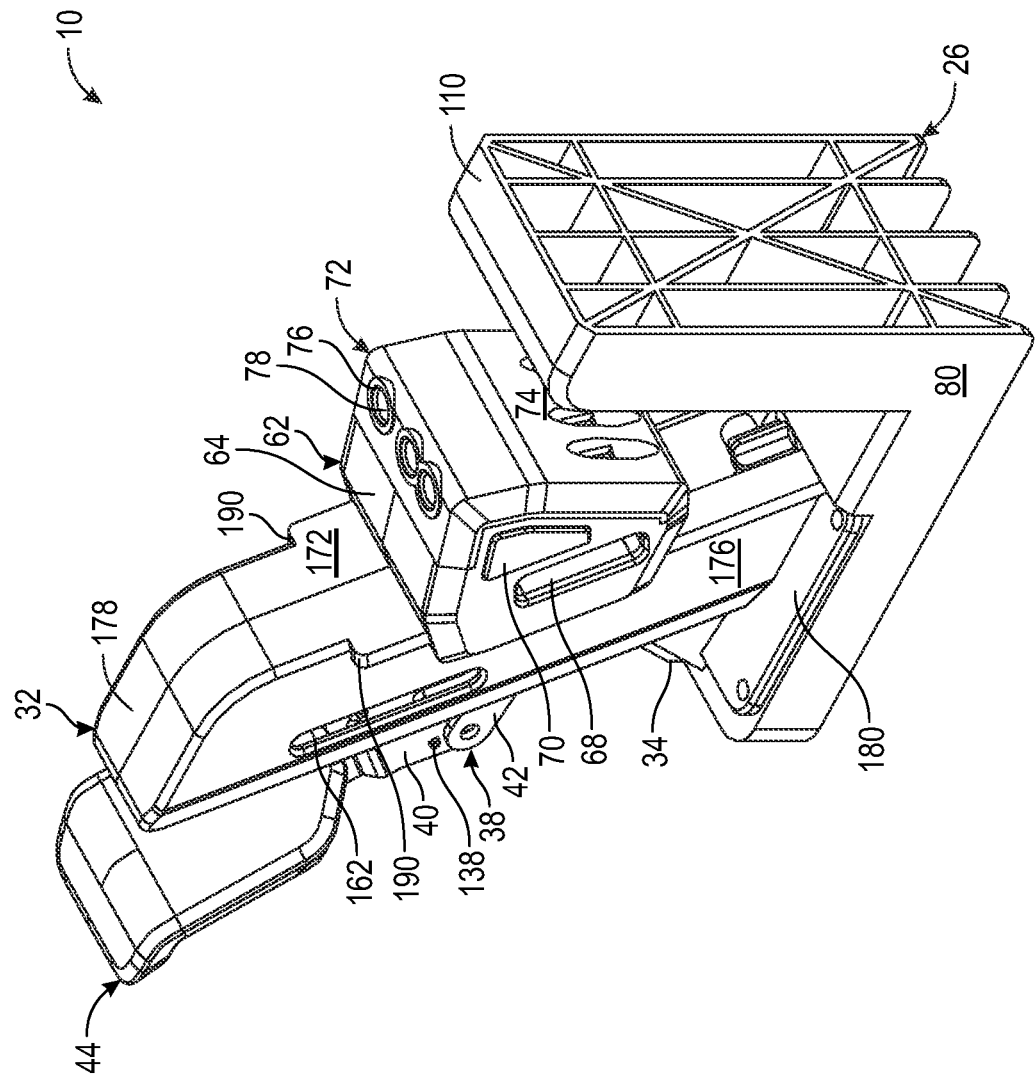
FIG. 12 shows a seventh perspective view of a self-adjusting pocket hole jig system shown in FIG. 1, in accordance with one or more embodiments.
Figure 13:
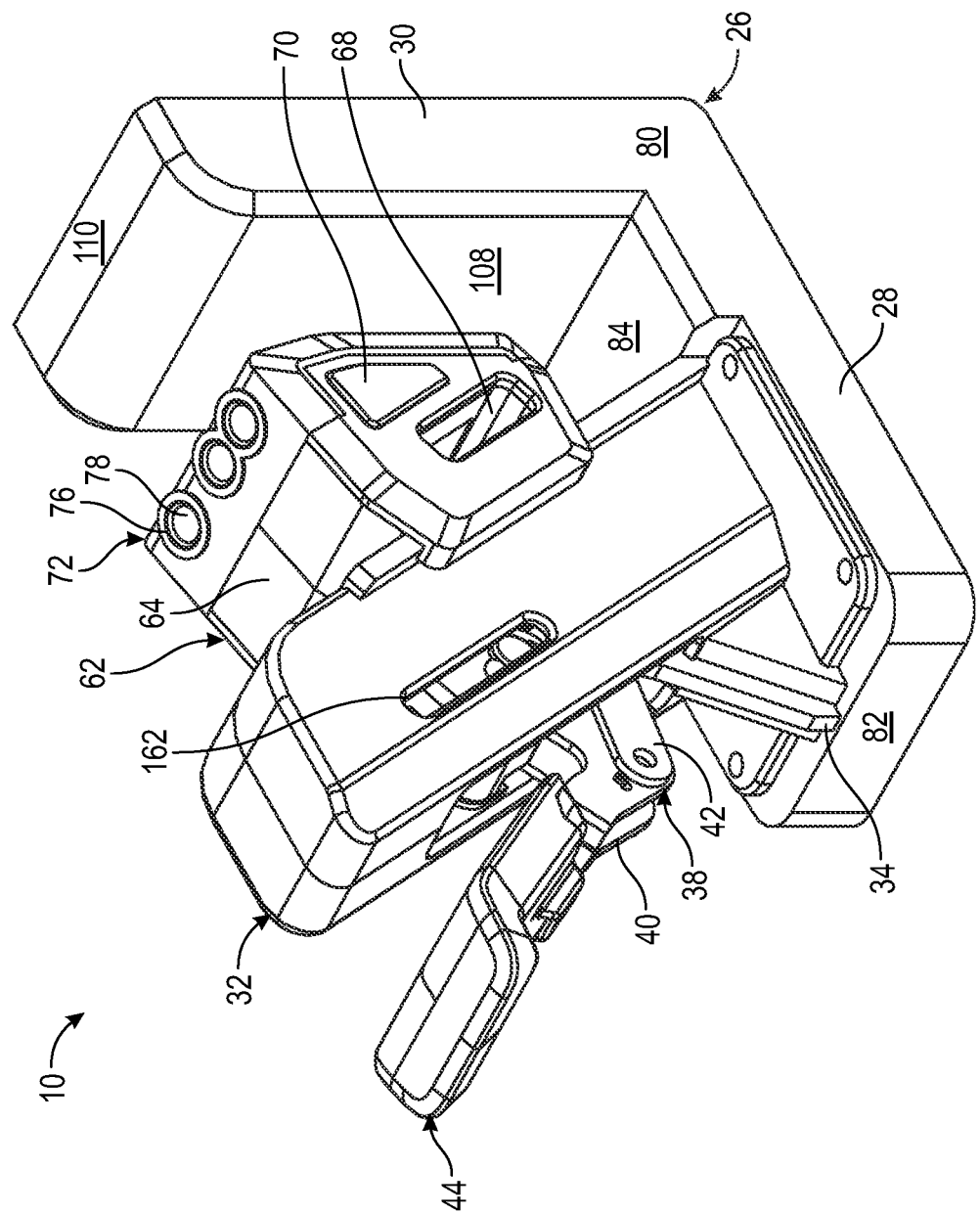
FIG. 13 shows an eighth perspective view of a self-adjusting pocket hole jig system shown in FIG. 1, in accordance with one or more embodiments.
Figure 14:
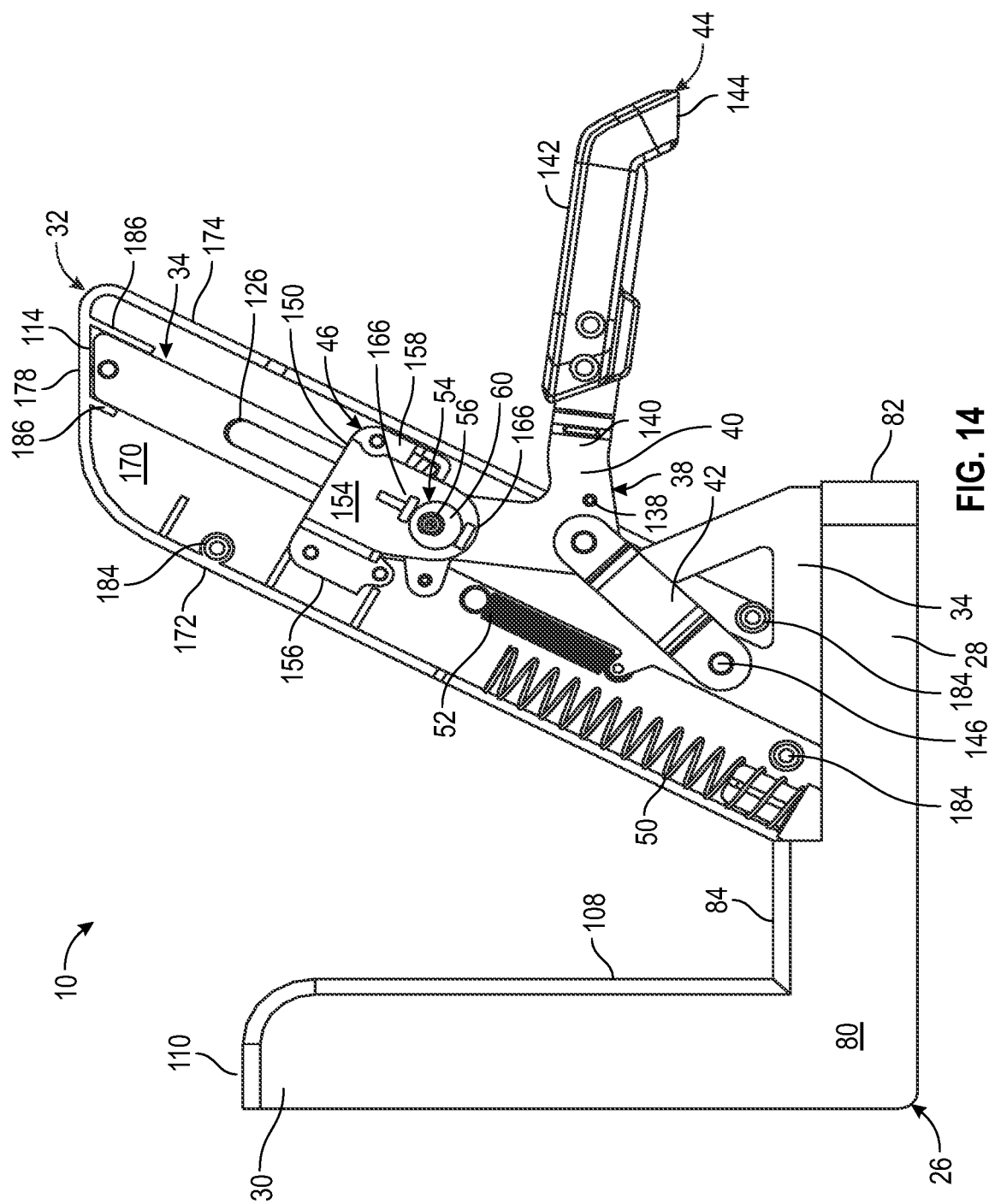
FIG. 14 shows a left side view of the self-adjusting pocket hole jig system shown in FIG. 1 with cut away section of upright element and drill guide assembly removed, in accordance with one or more embodiments.
Figure 15:
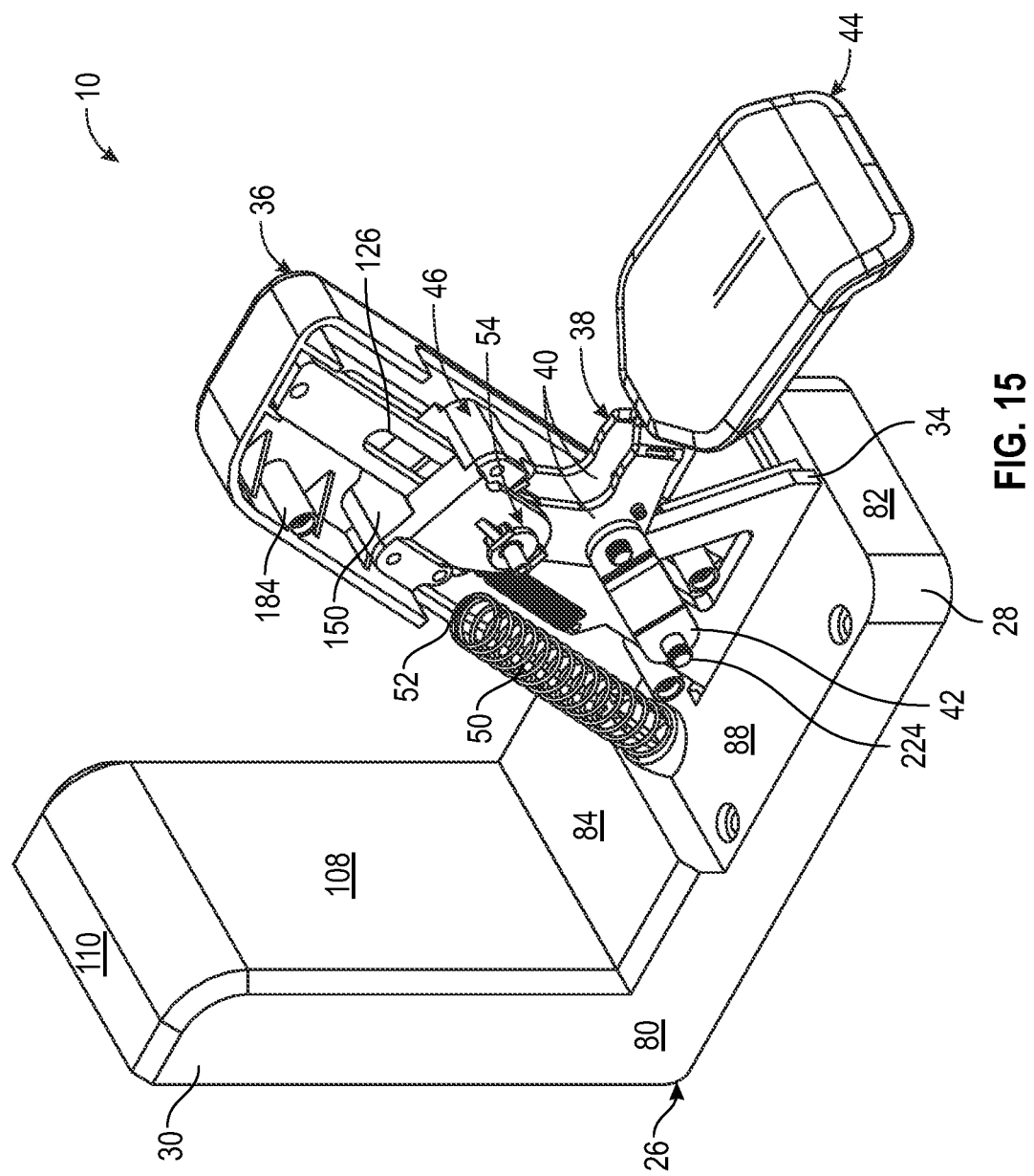
FIG. 15 shows a perspective view of the self-adjusting pocket hole jig system shown in FIG. 14, in accordance with one or more embodiments.
Figure 16:
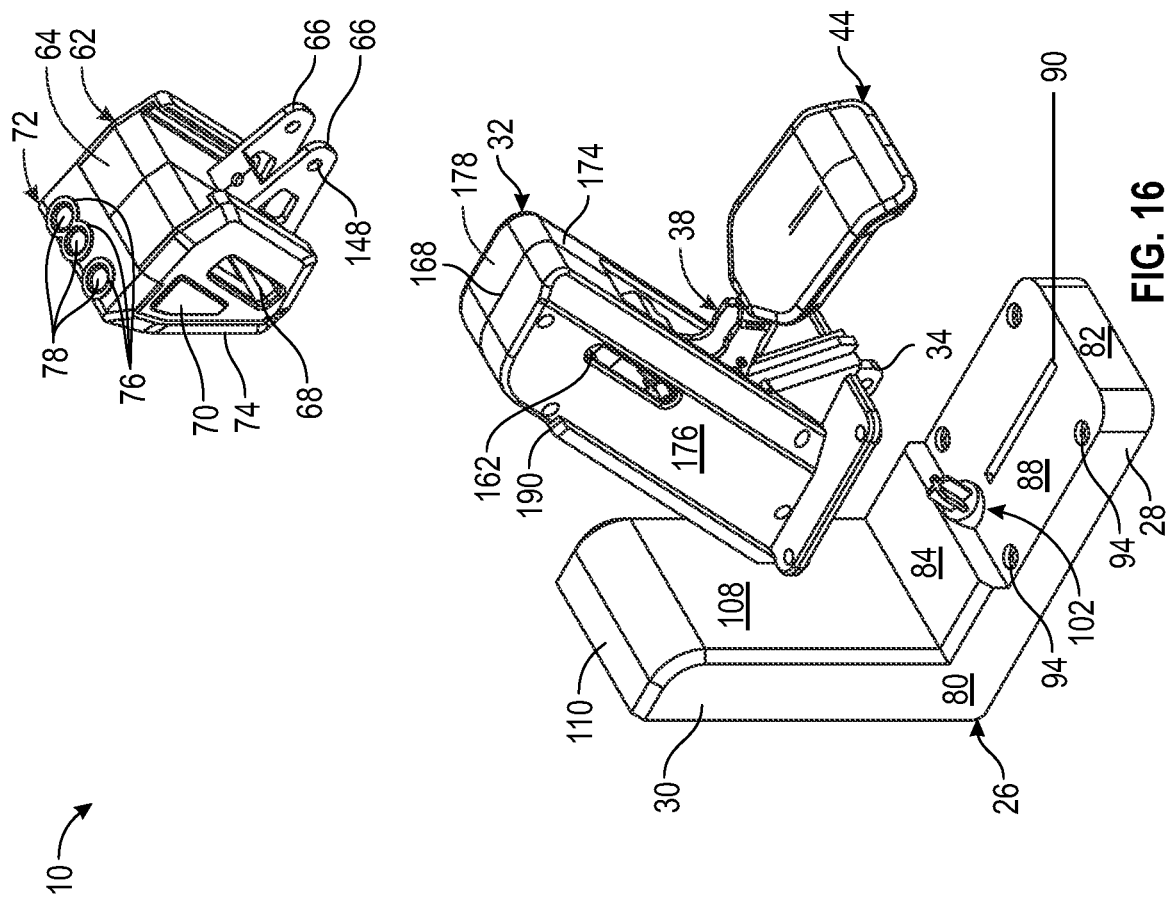
FIG. 16 shows an exploded perspective view of the self-adjusting pocket hole jig system shown in FIG. 14, in accordance with one or more embodiments.
Figure 17:
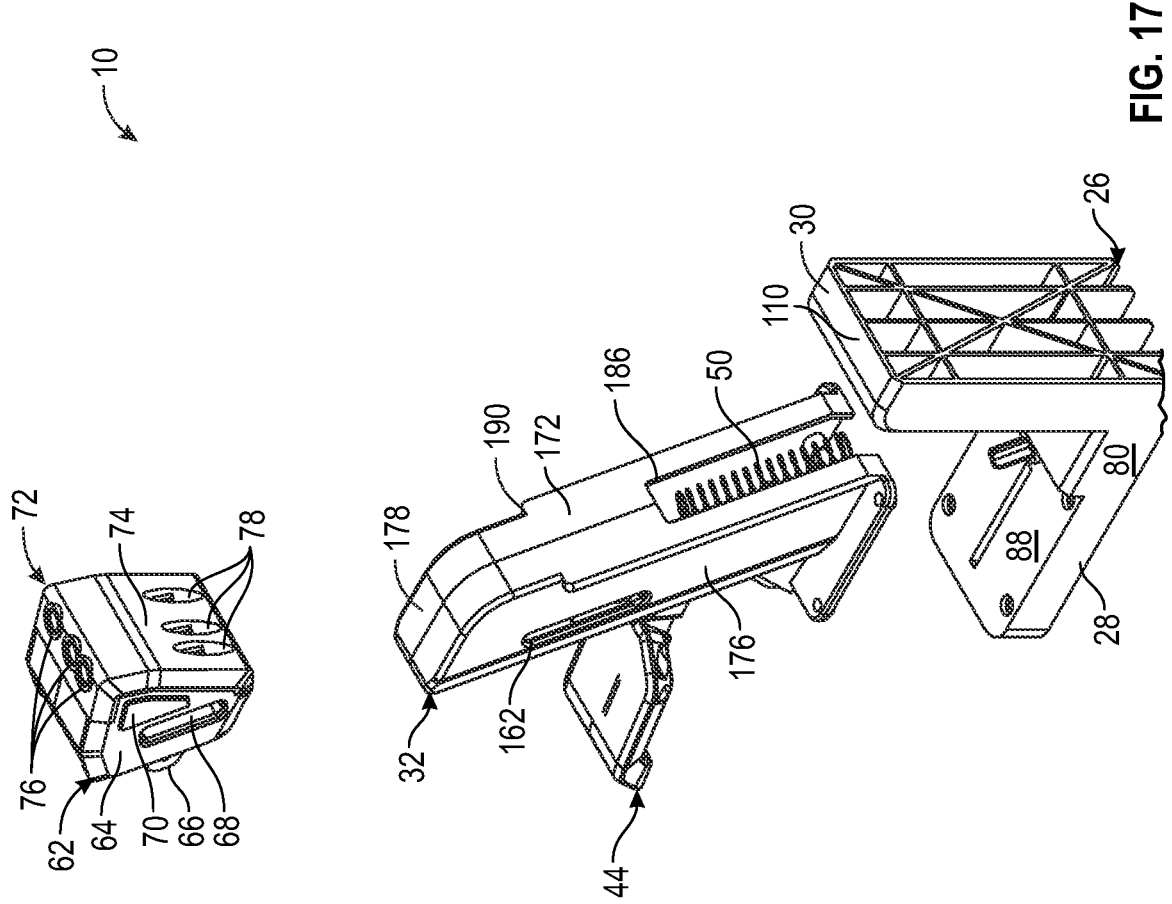
FIG. 17 shows another exploded perspective view of the self-adjusting pocket hole jig system shown in FIG. 14, in accordance with one or more embodiments.
Figure 18:
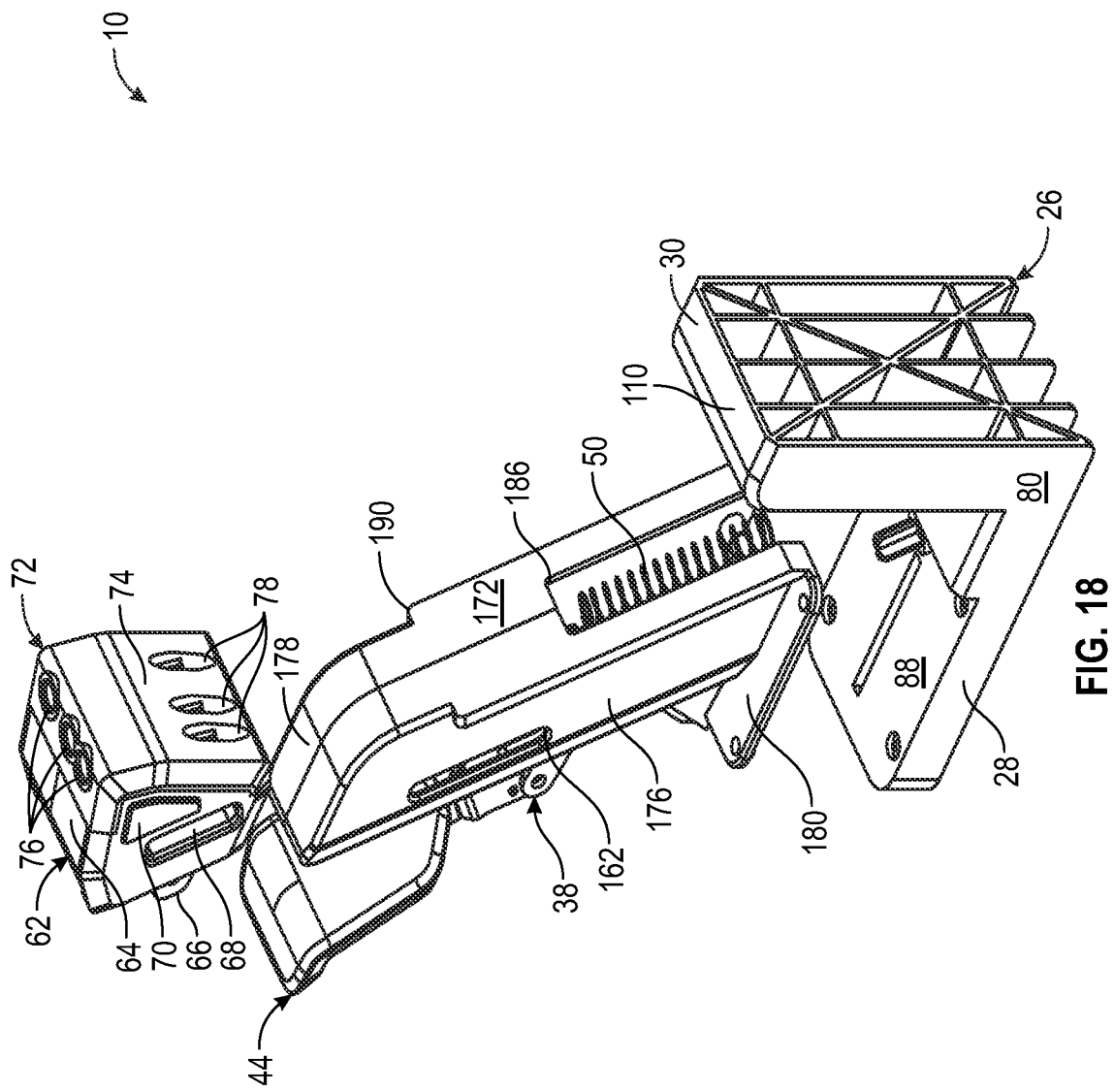
FIG. 18 shows another exploded perspective view of the self-adjusting pocket hole jig system shown in FIG. 14, in accordance with one or more embodiments.
Figure 19:
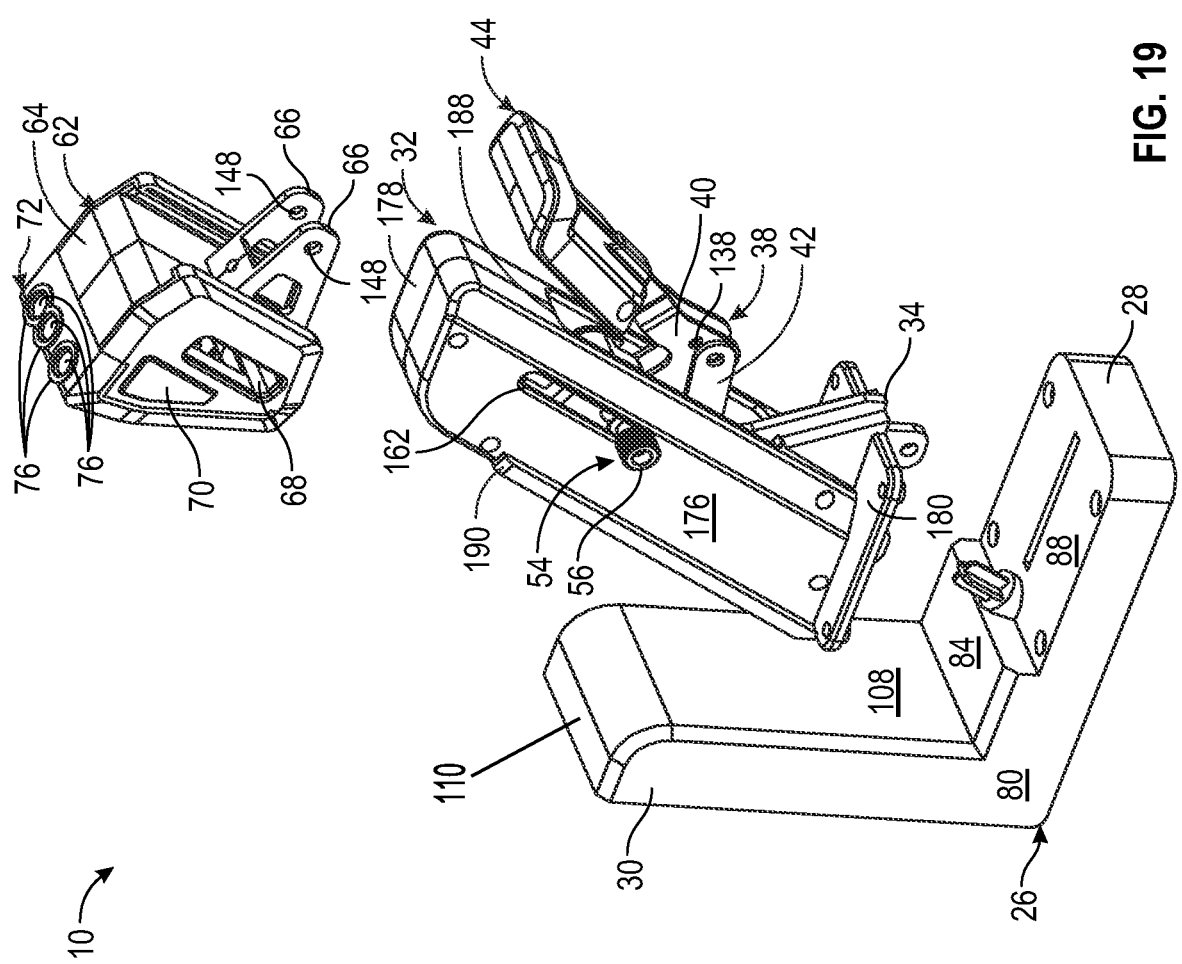
FIG. 19 shows another exploded perspective view of the self-adjusting pocket hole jig system shown in FIG. 14, in accordance with one or more embodiments.
Figure 20:
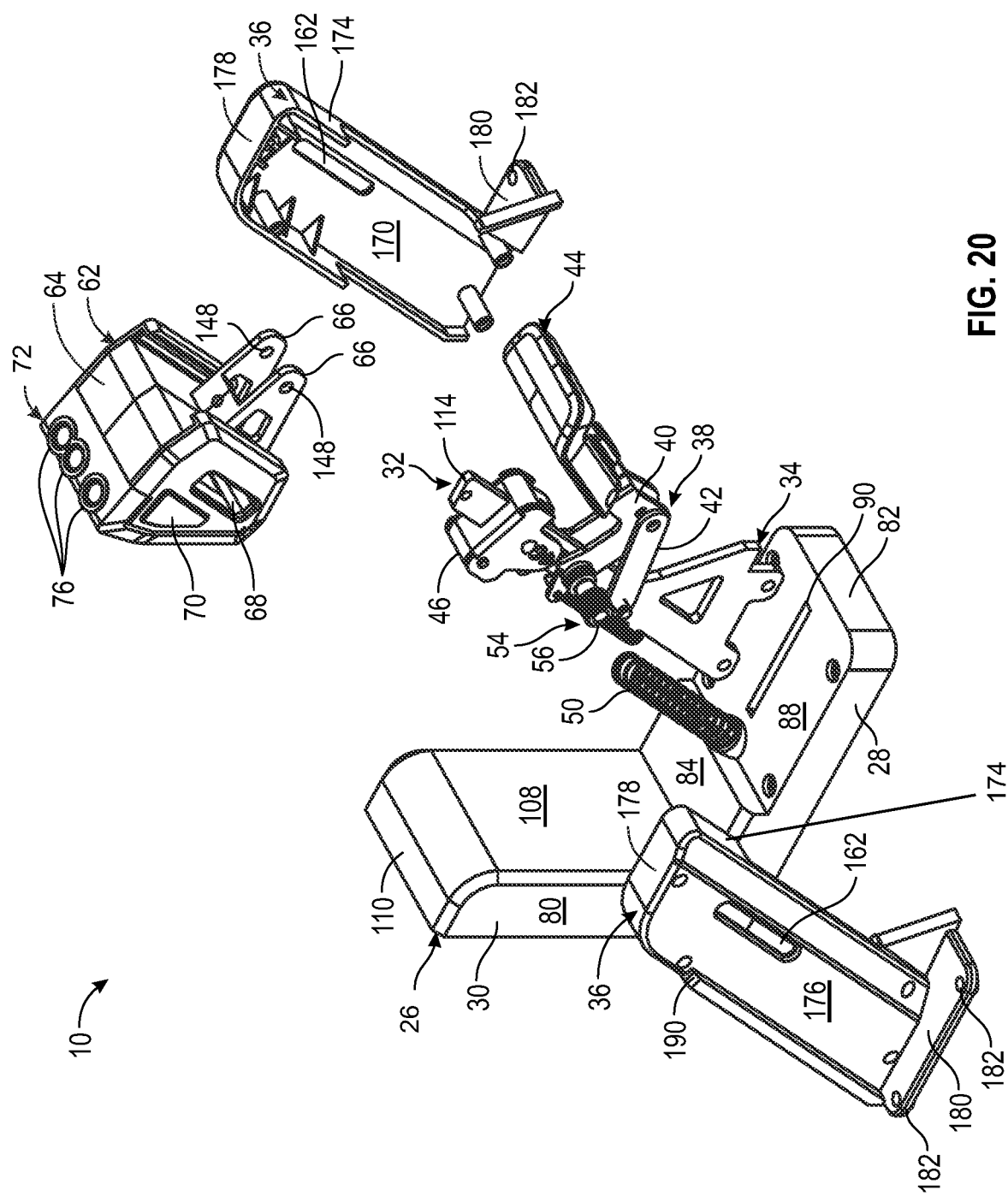
FIG. 20 shows another exploded perspective view of the self-adjusting pocket hole jig system shown in FIG. 14, in accordance with one or more embodiments.
Figure 21:
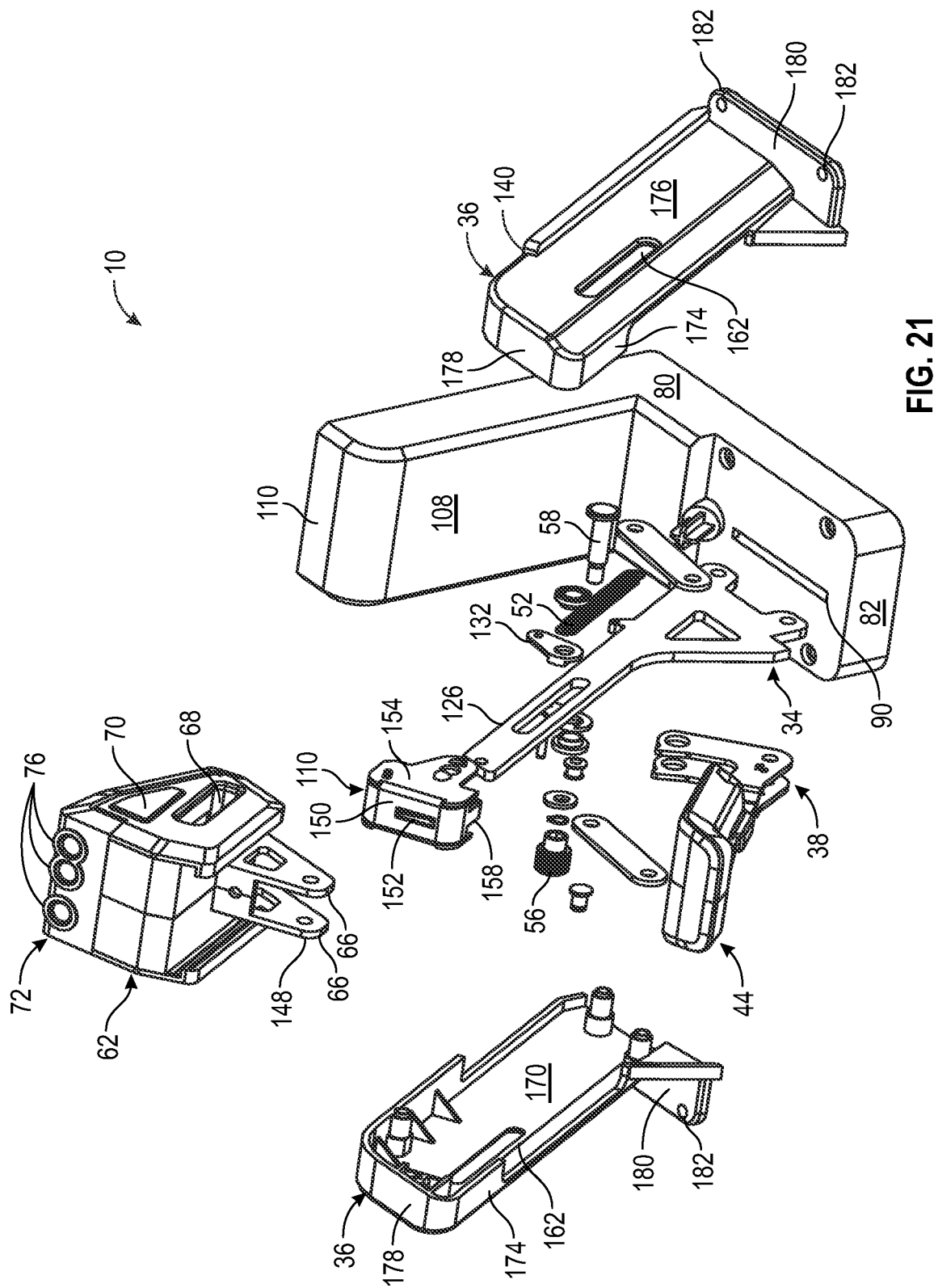
FIG. 21 shows another exploded perspective view of the self-adjusting pocket hole jig system shown in FIG. 14, in accordance with one or more embodiments.
Figure 22:
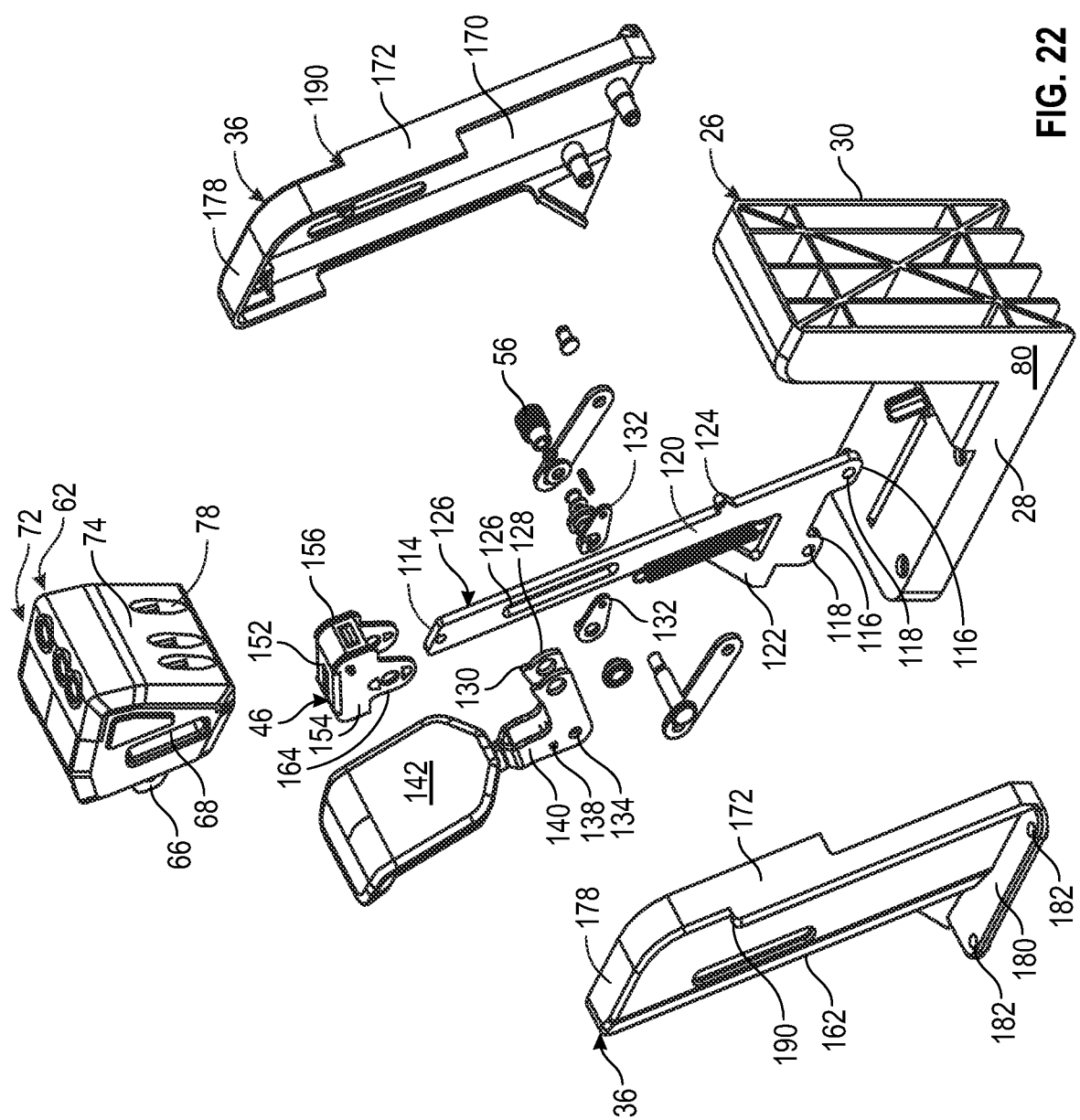
FIG. 22 shows another exploded perspective view of the self-adjusting pocket hole jig system shown in FIG. 14, in accordance with one or more embodiments.
Figure 23:
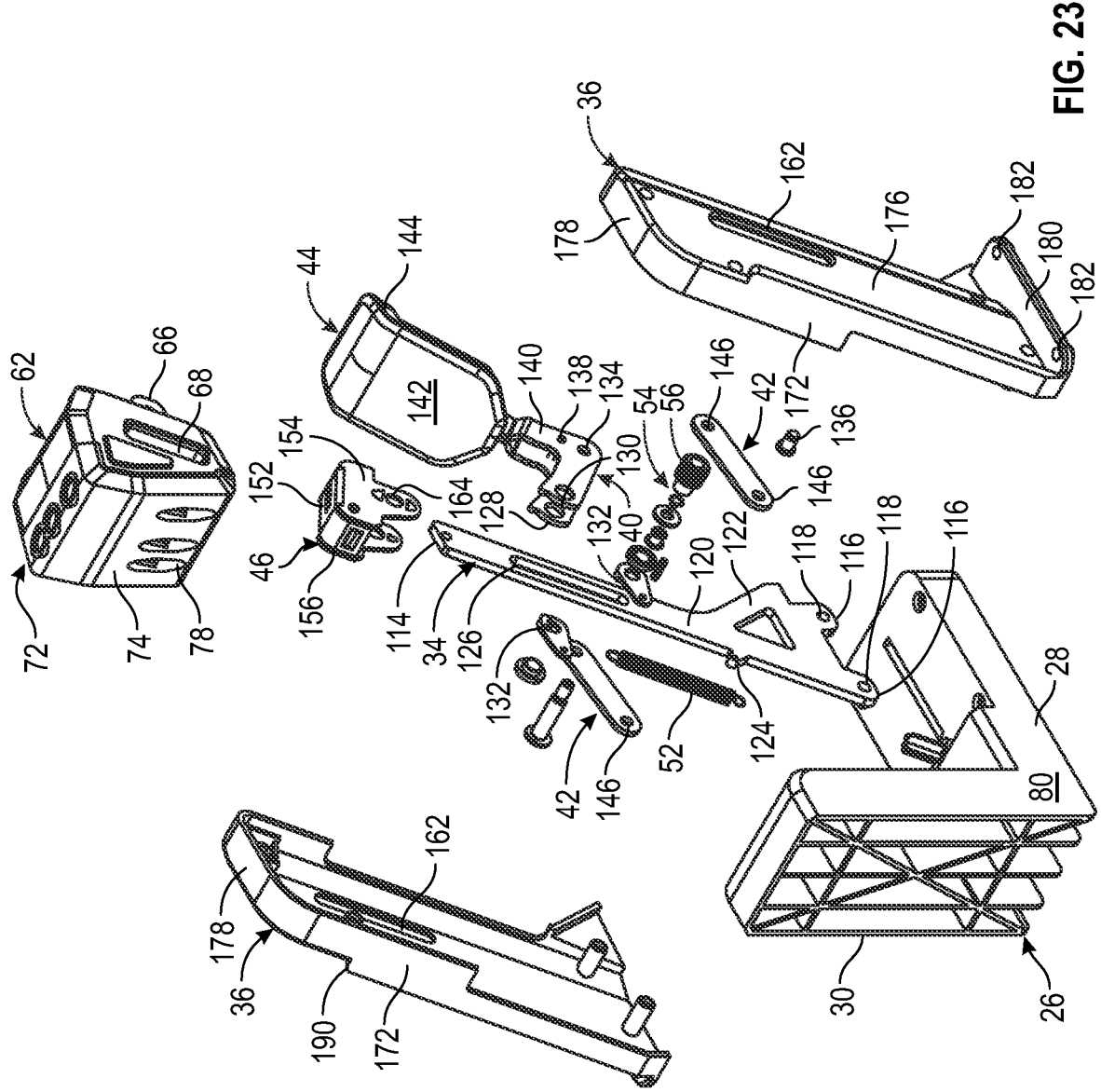
FIG. 23 shows another exploded perspective view of the self-adjusting pocket hole jig system shown in FIG. 14, in accordance with one or more embodiments.
Figure 24:
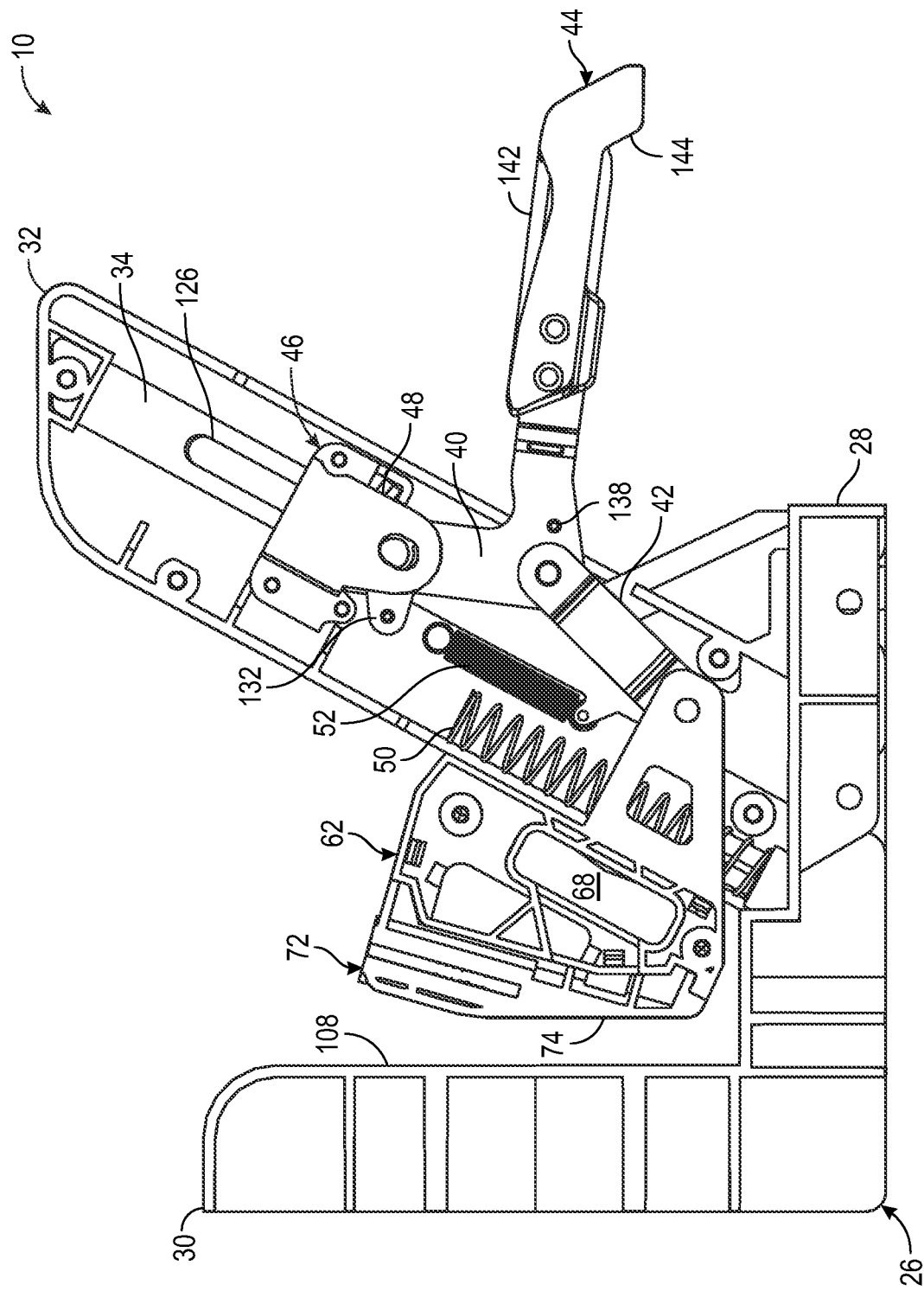
FIG. 24 shows a left side cutaway view of the self-adjusting pocket hole jig system shown, in FIG. 2, in accordance with one or more embodiments.
Figure 25:
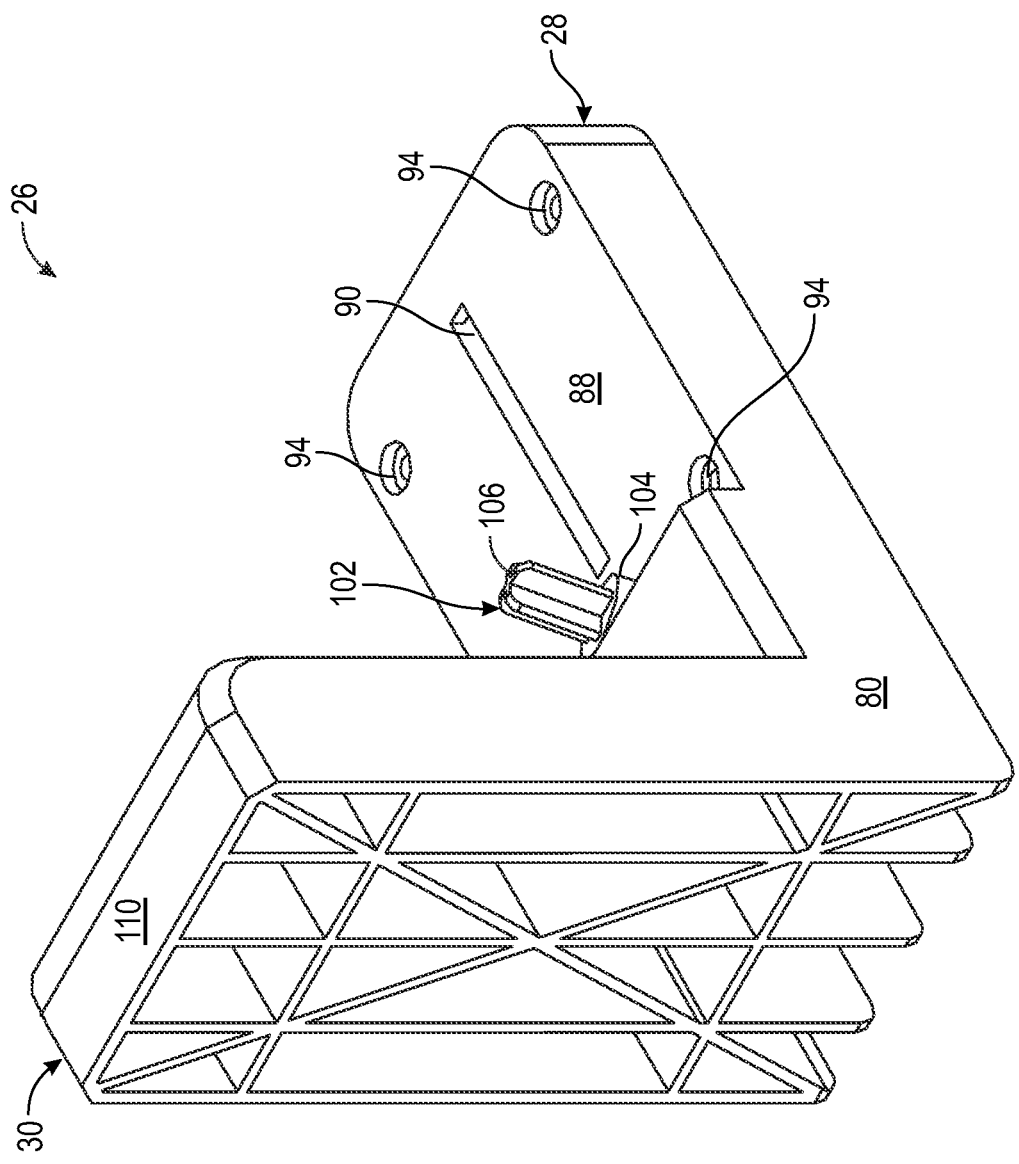
FIG. 25 shows a perspective view of a base structure of a self-adjusting pocket hole jig system, in accordance with one of more embodiments.
Figure 26:
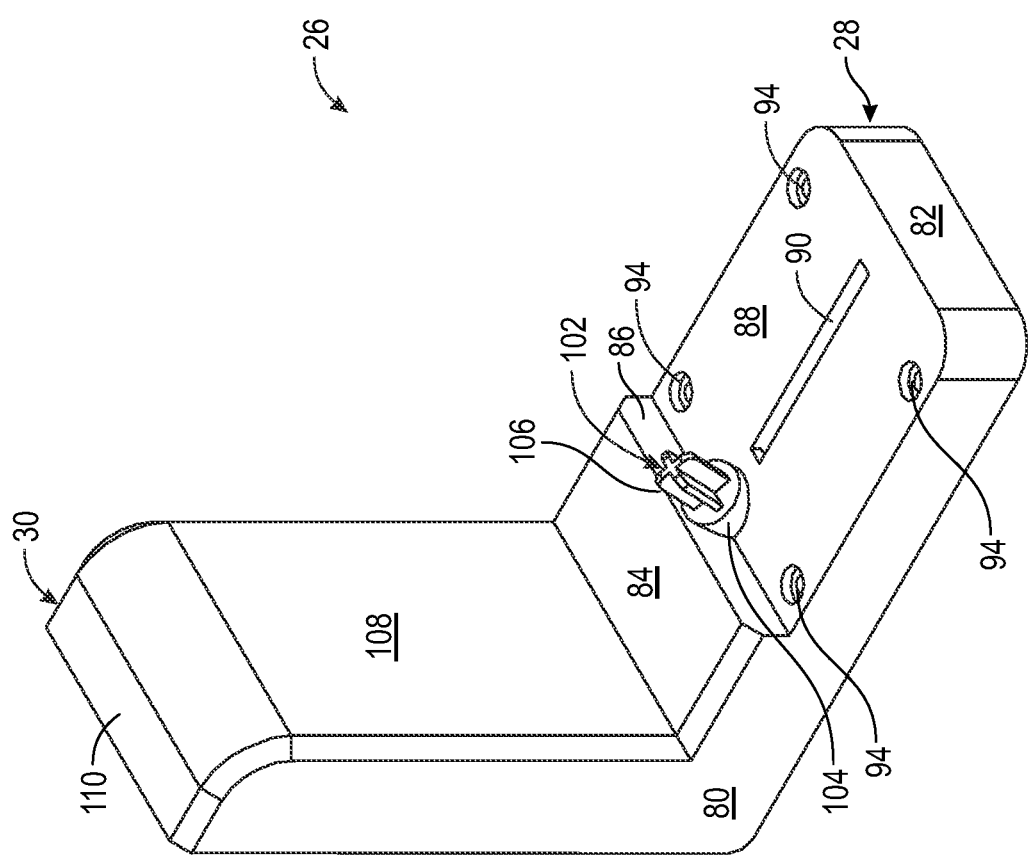
FIG. 26 shows a left side view of an upright assembly of a self-adjusting pocket hole jig system, in accordance with one of more embodiments.
Figure 27:
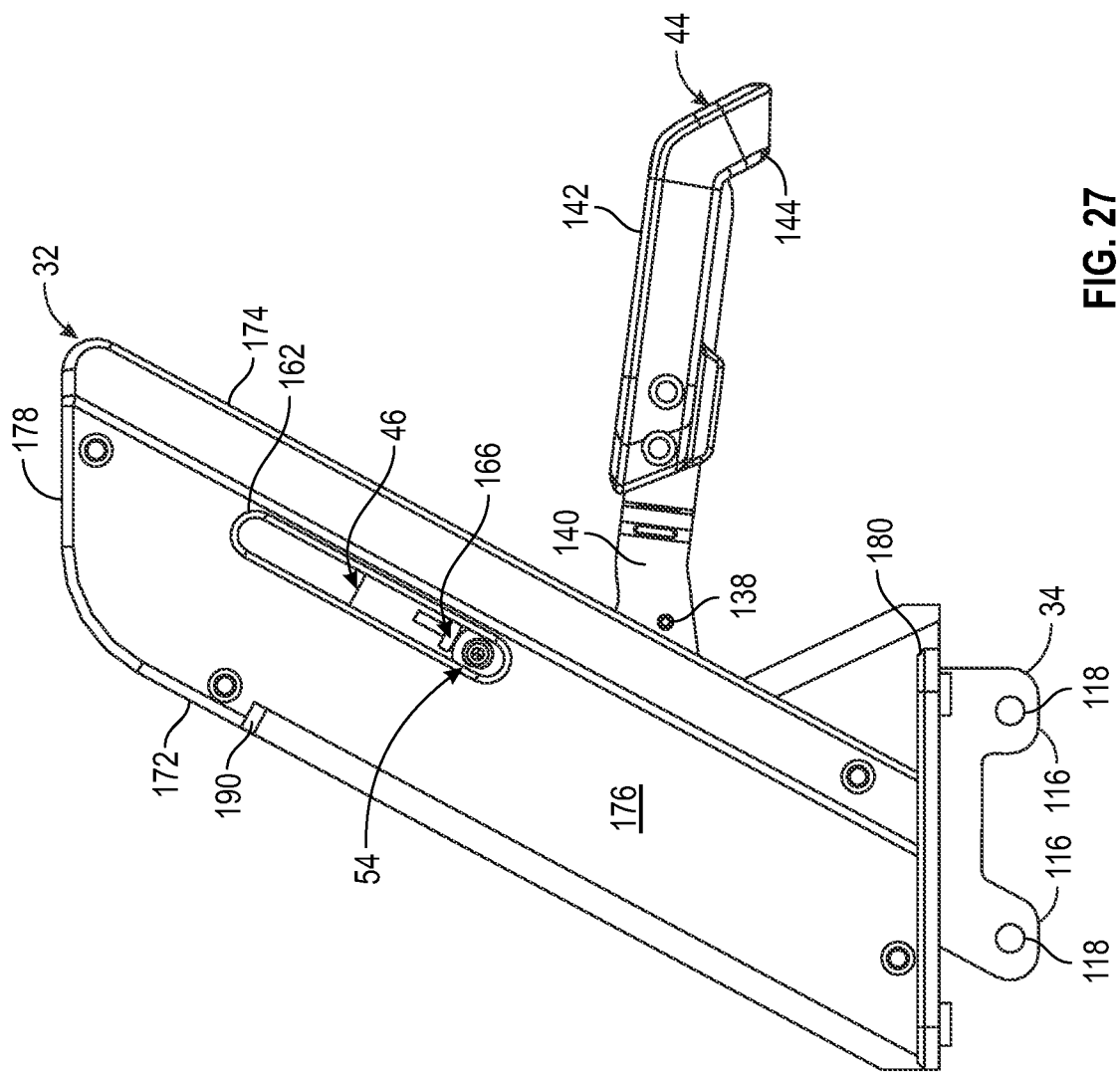
FIG. 27 shows a bottom side view of an upright assembly of a self-adjusting pocket hole jig system, in accordance with one of more embodiments.
Figure 28:
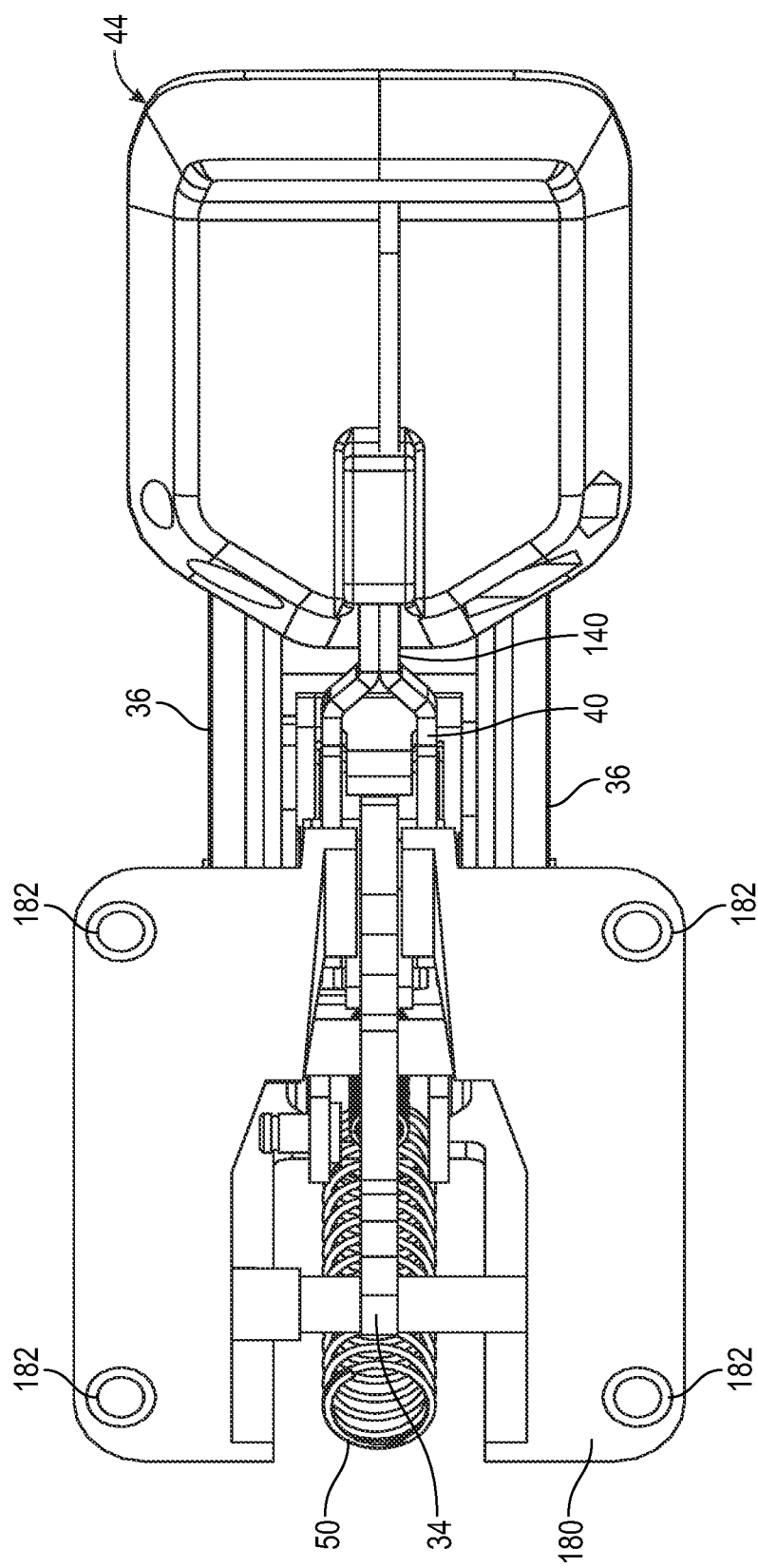
FIG. 28 shows a perspective view of an upright assembly of a self-adjusting pocket hole jig system, in accordance with one of more embodiments.
Figure 29:
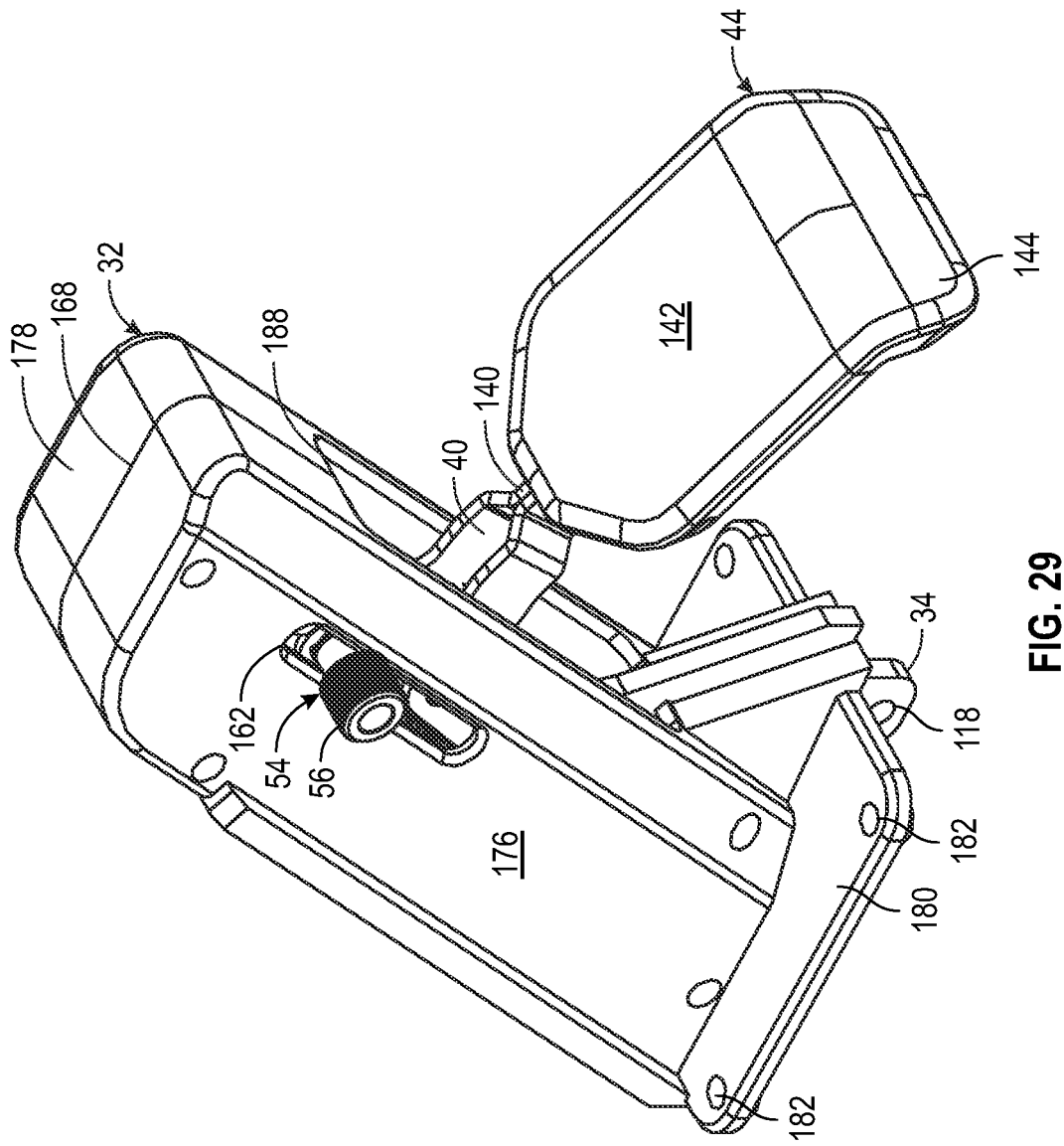
FIG. 29 shows another perspective view of an upright assembly of a self-adjusting pocket hole jig system, in accordance with one of more embodiments.
Figure 30:
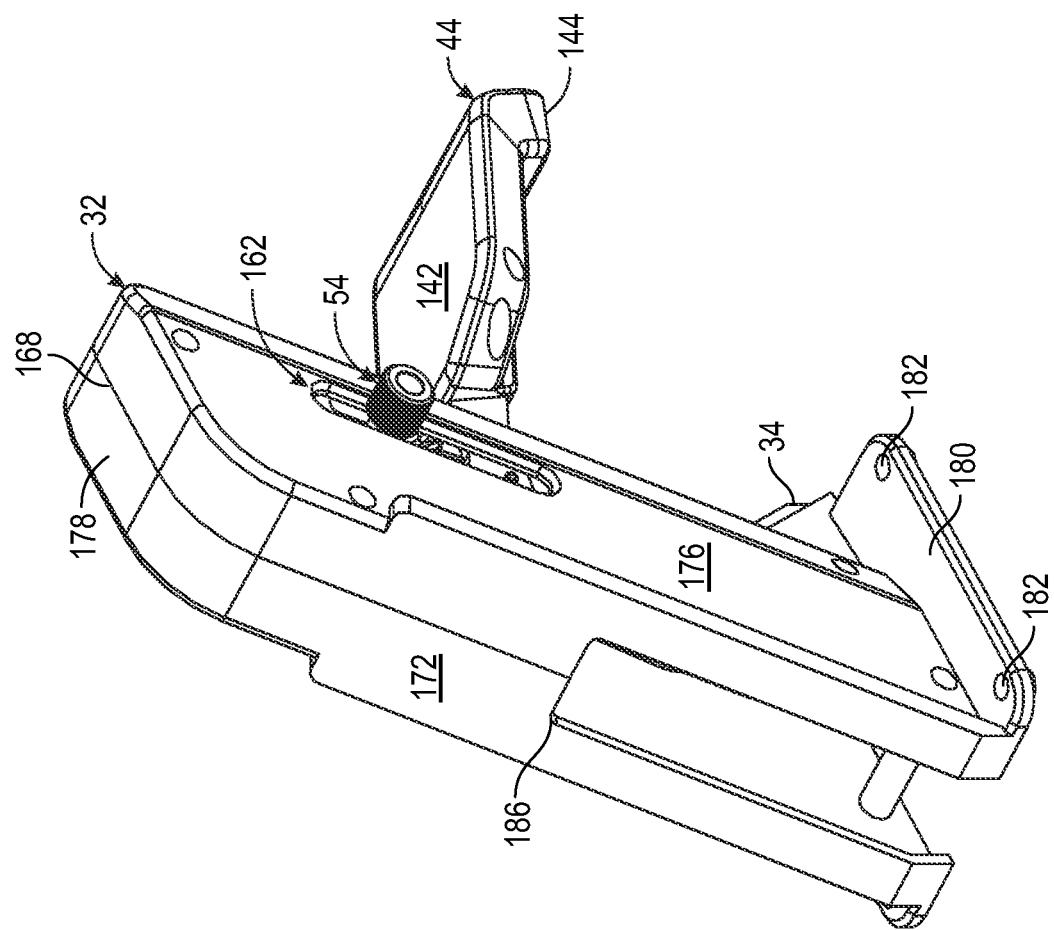
FIG. 30 shows yet another perspective view of an upright assembly of a self-adjusting pocket hole jig system, in accordance with one of more embodiments.
Figure 31:
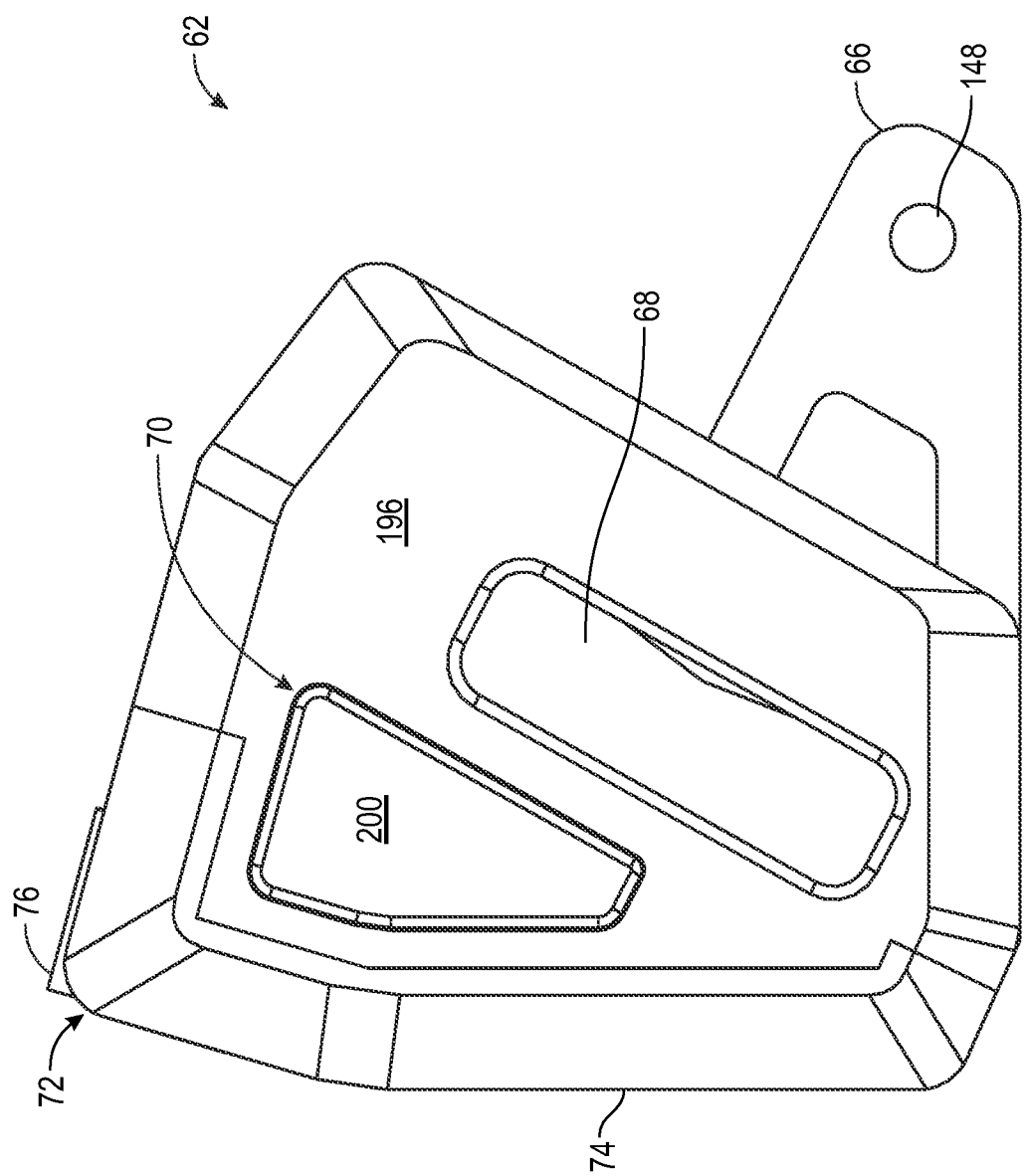
FIG. 31 shows a left side view of a drill guide assembly of a self-adjusting pocket hole jig system, in accordance with one of more embodiments.
Figure 32:
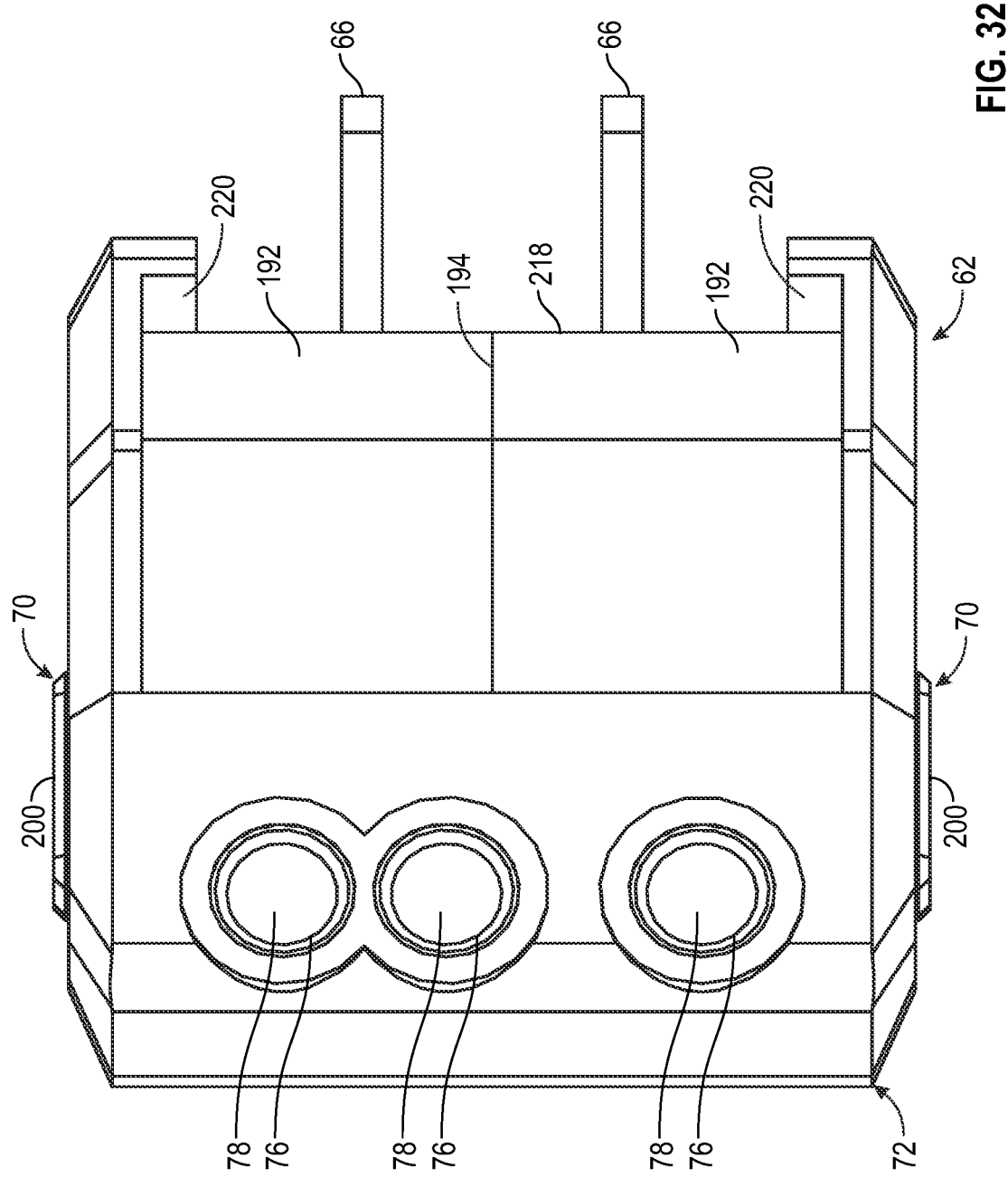
FIG. 32 shows a top side view of the drill guide assembly shown in FIG. 31, in accordance with one of more embodiments.
Figure 33:
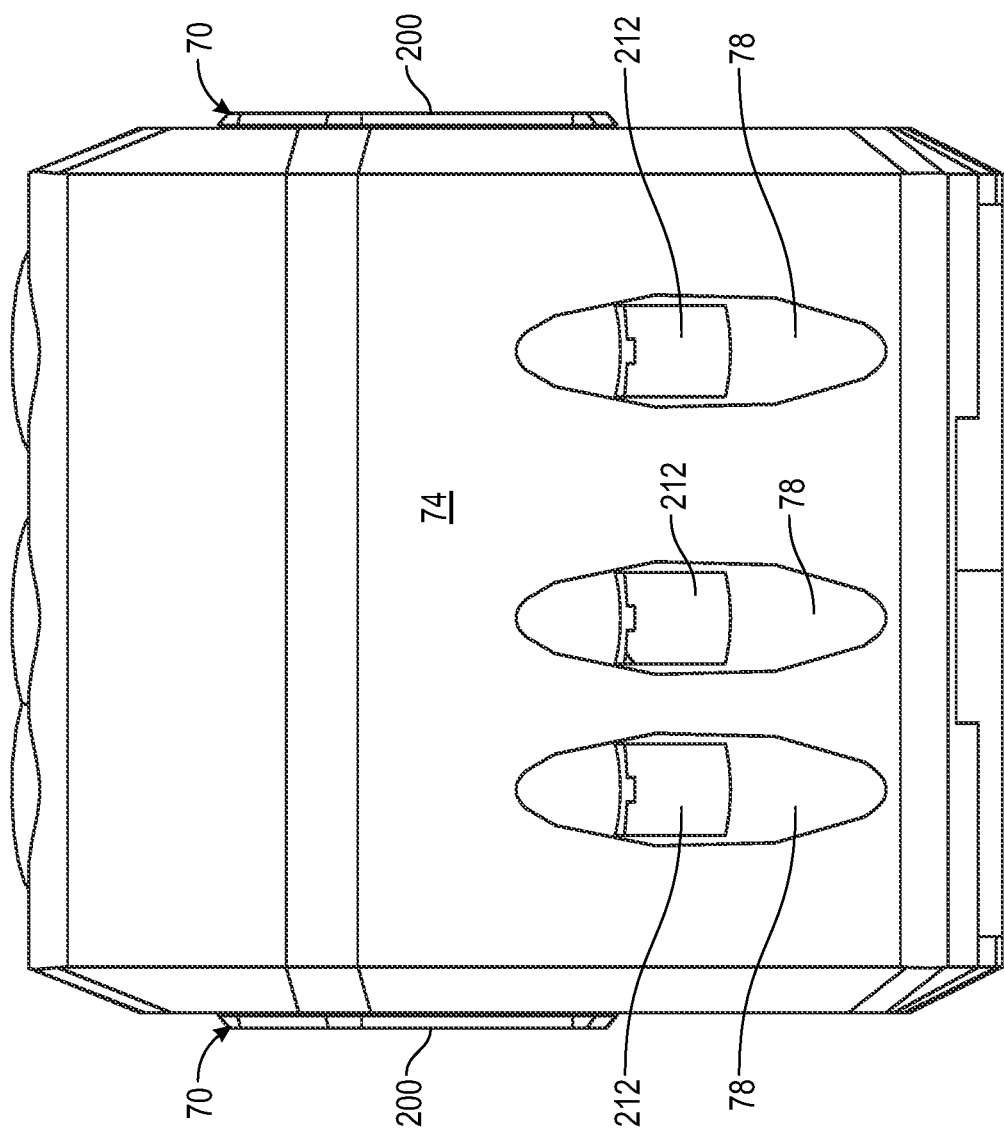
FIG. 33 shows a forward side view of the drill guide assembly shown in FIG. 31, in accordance with one of more embodiments.
Figure 34:
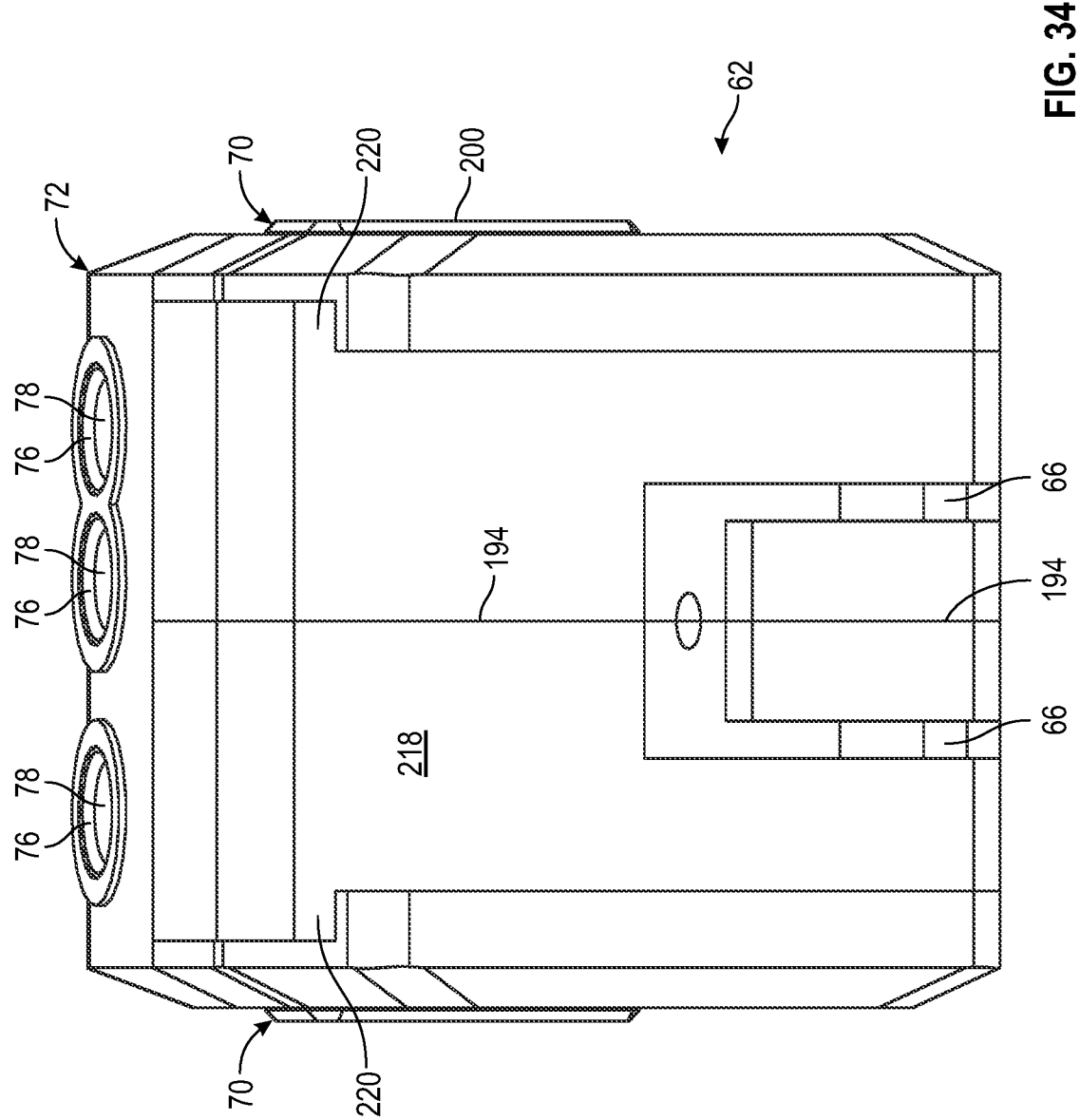
FIG. 34 shows a rearward side view of the drill guide assembly shown in FIG. 31, in accordance with one of more embodiments.
Figure 35:
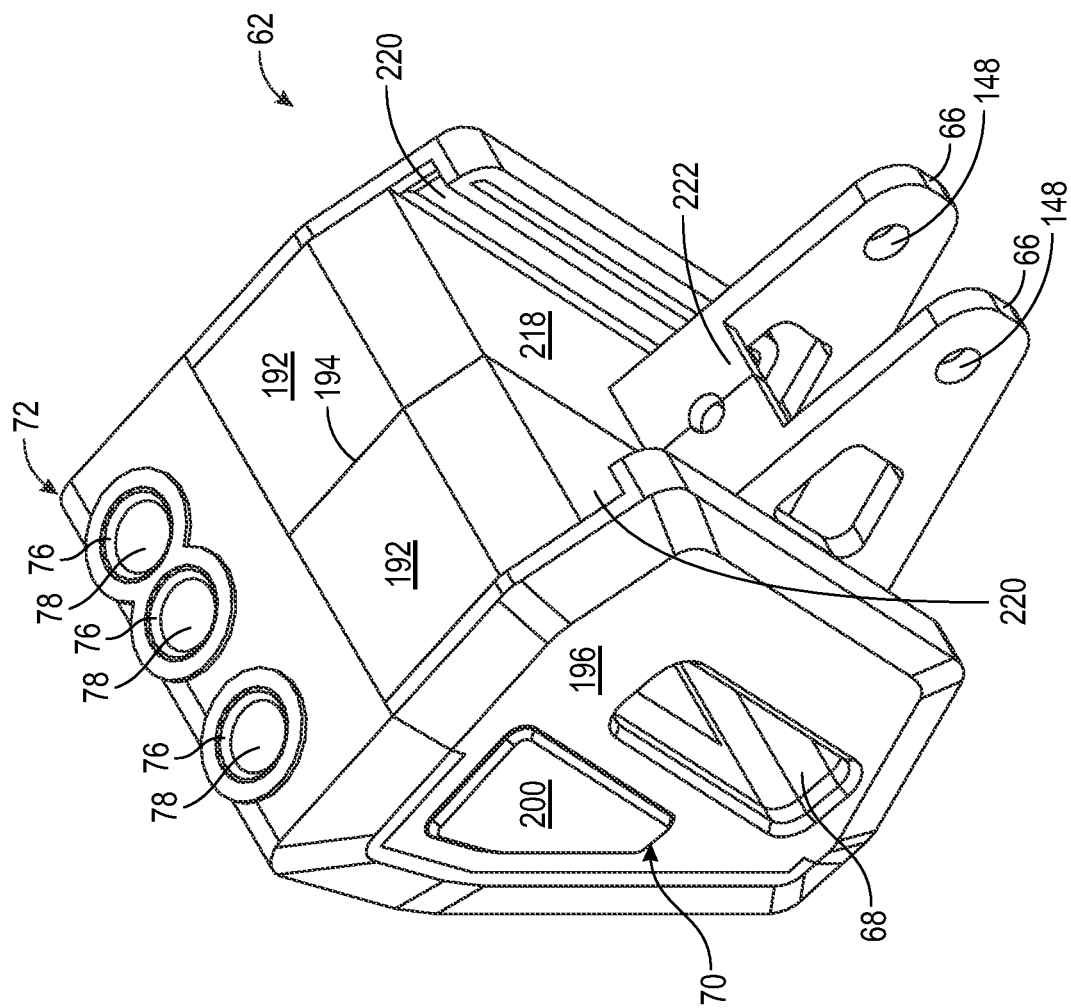
FIG. 35 shows a perspective view of the drill guide assembly shown in FIG. 31, in accordance with one of more embodiments.
Figure 36:
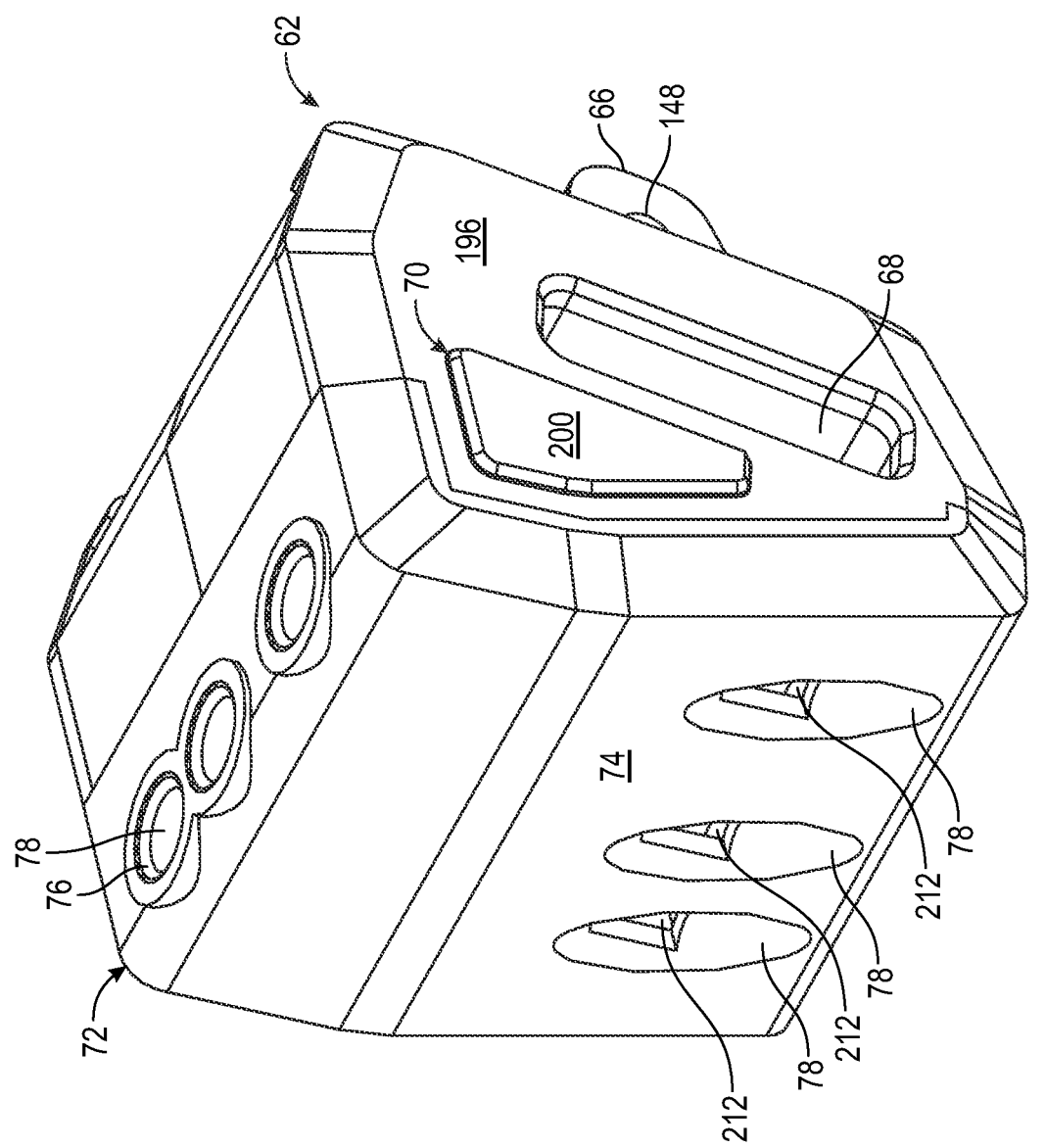
FIG. 36 shows another perspective view of the drill guide assembly shown in FIG. 31, in accordance with one of more embodiments.
Figure 37:
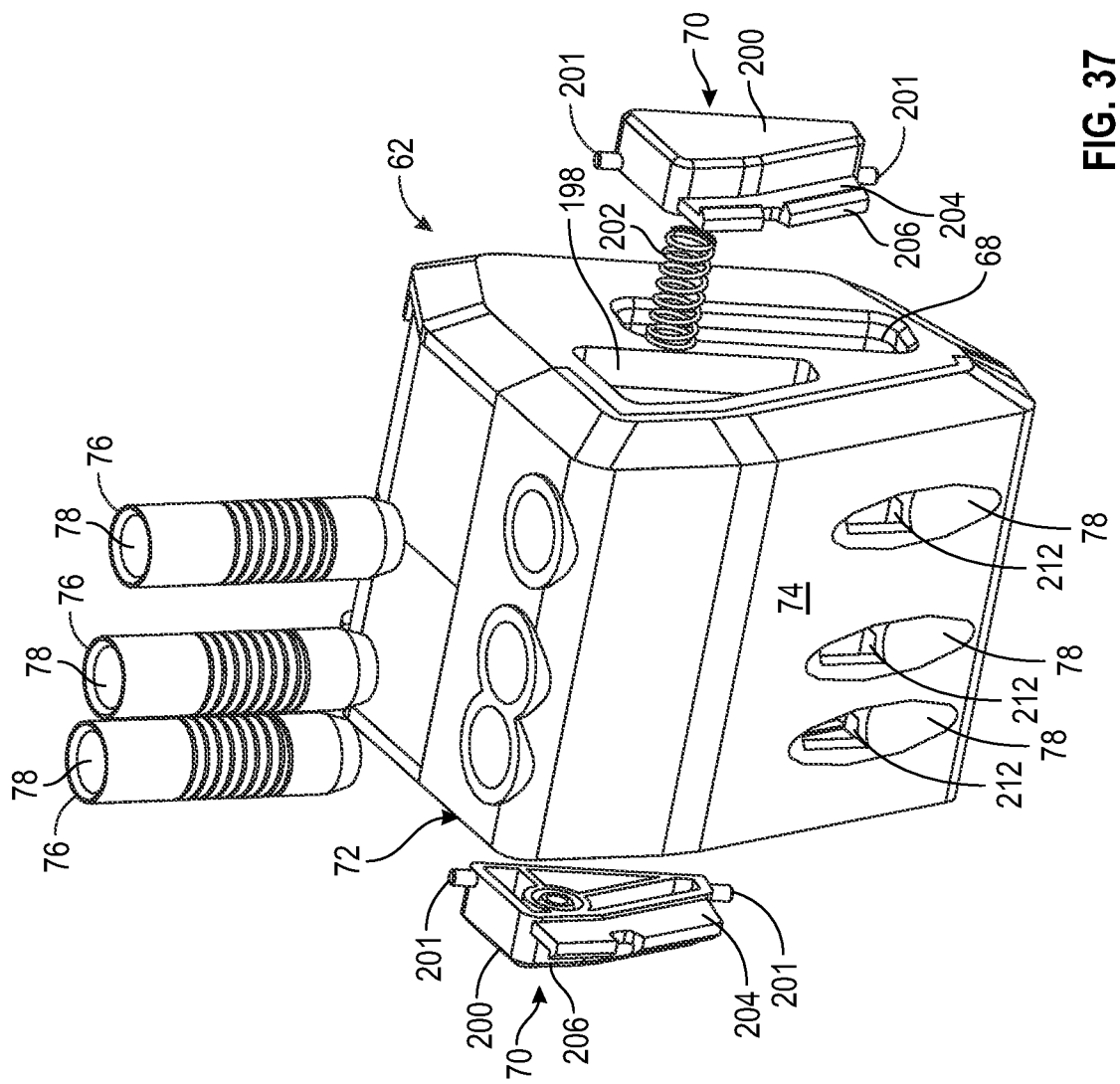
FIG. 37 shows an exploded perspective view of the drill guide assembly shown in FIG. 31, in accordance with one of more embodiments.
Figure 38:
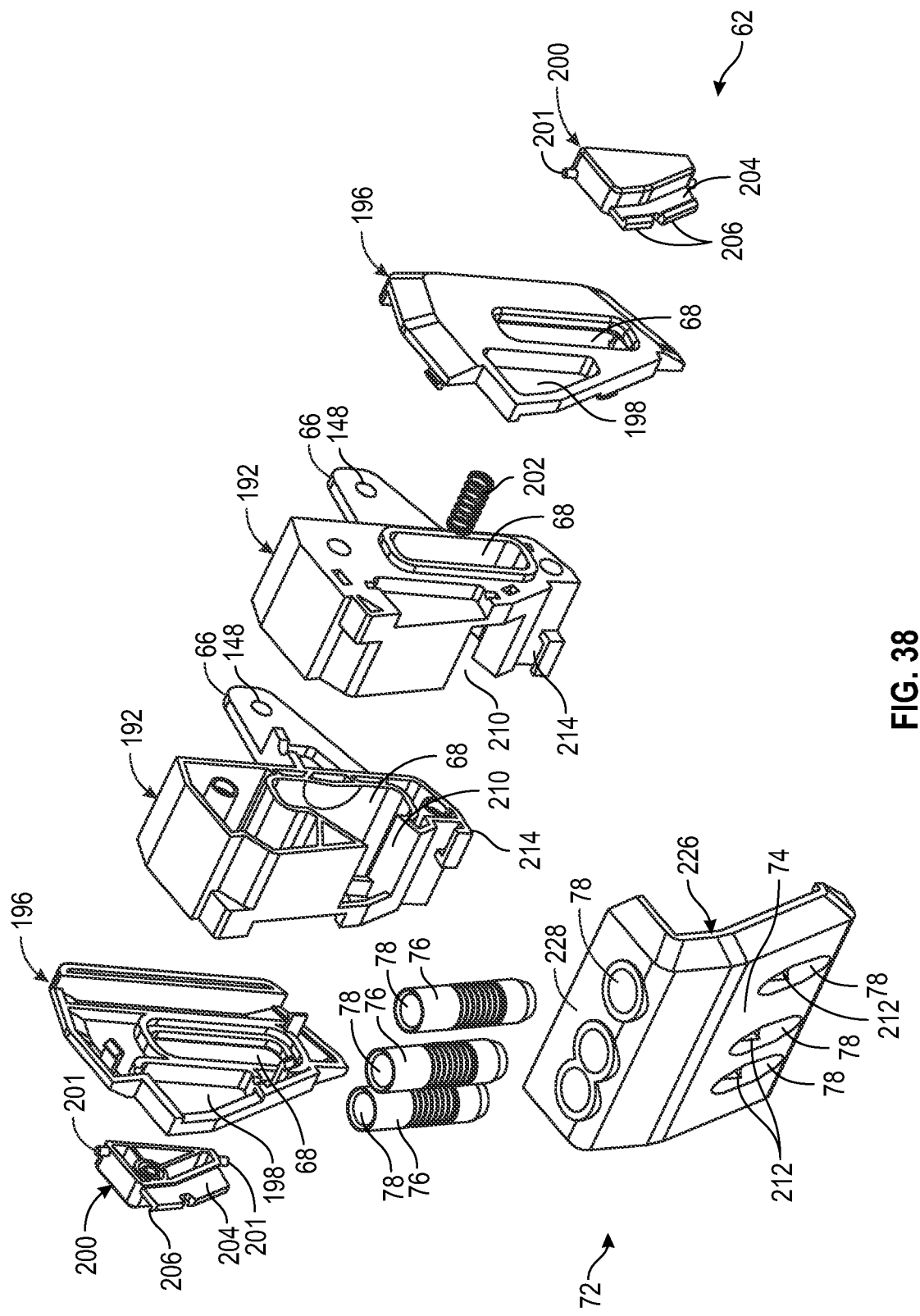
FIG. 38 shows another exploded perspective view of the drill guide assembly shown in FIG. 31, in accordance with one of more embodiments.
Figure 39:
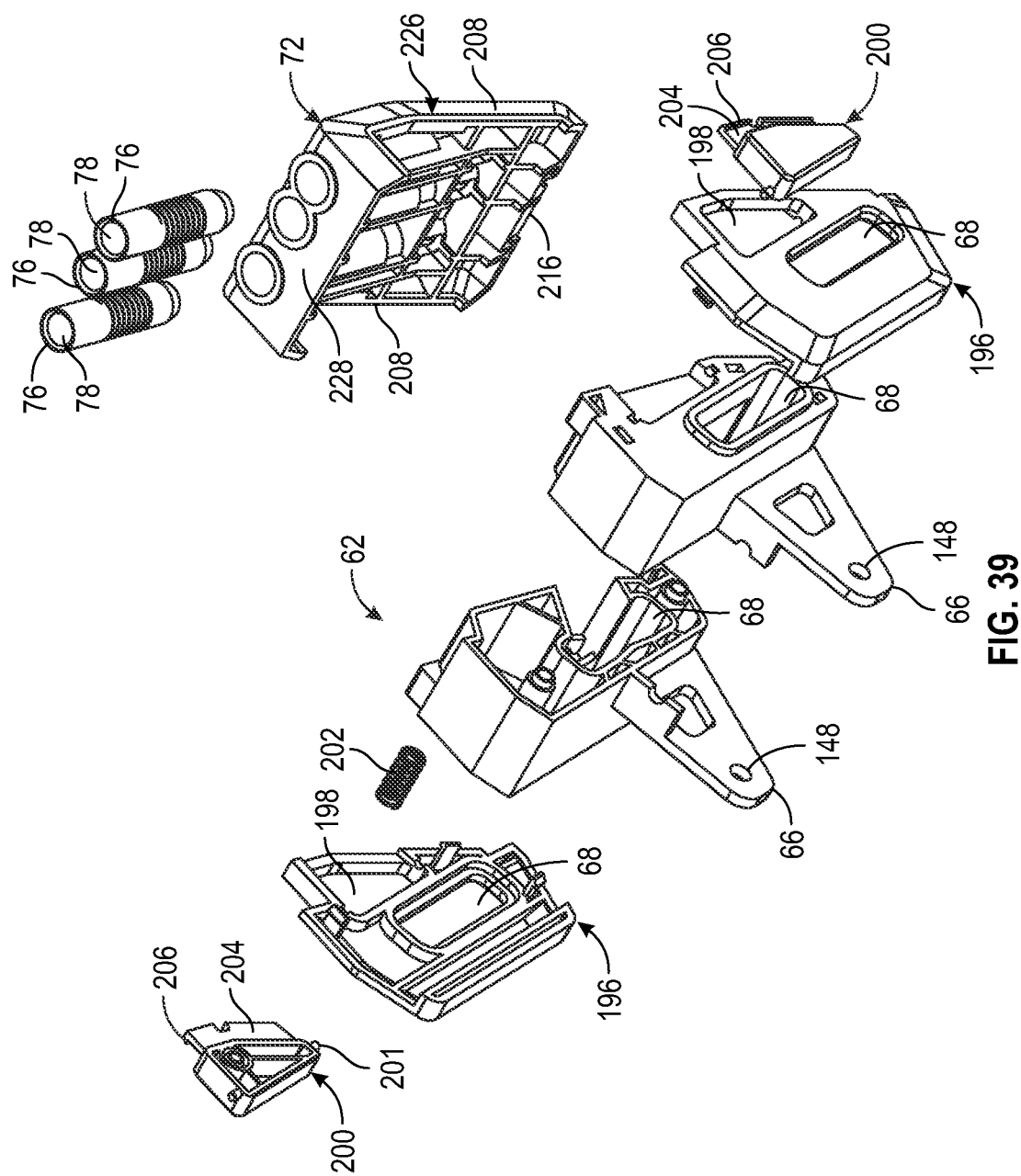
FIG. 39 shows yet another exploded perspective view of the drill guide assembly shown in FIG. 31, in accordance with one of more embodiments.
Figure 40:
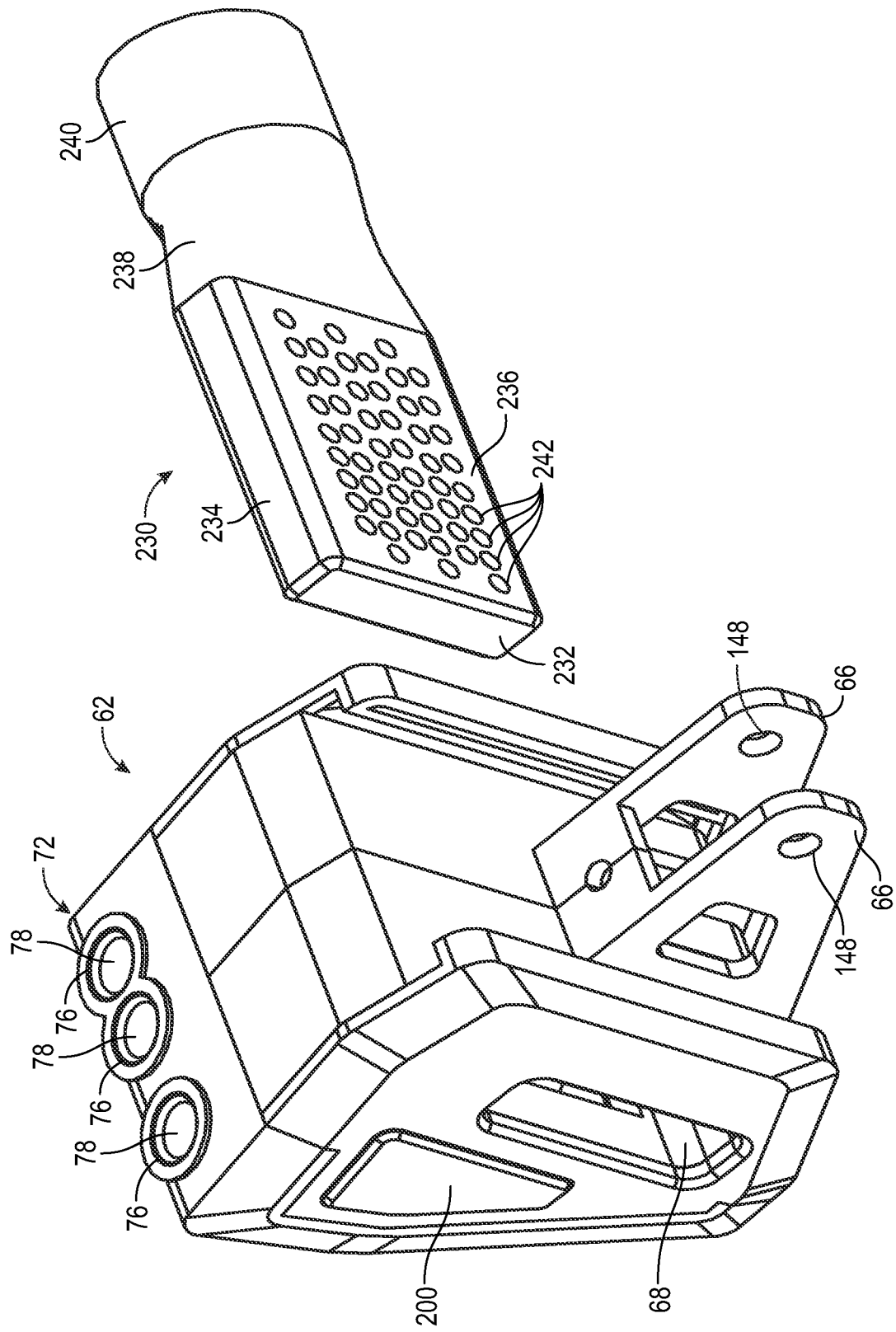
FIG. 40 shows a perspective view of a drill guide assembly of a self-adjusting pocket hole jig system and vacuum attachment, which may be inserted therein in accordance with one of more embodiments.
Figure 41:
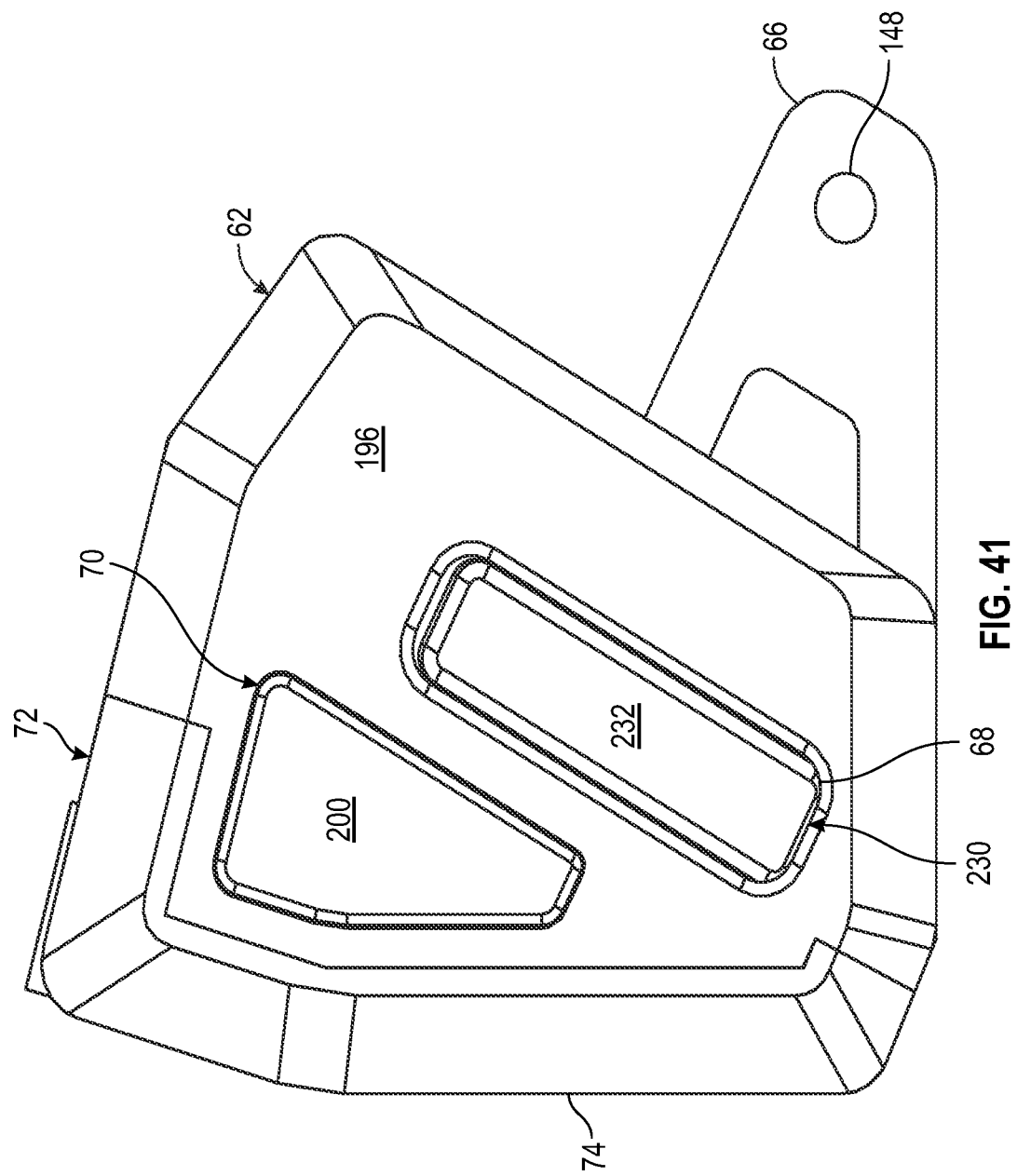
FIG. 41 shows a left side view of the drill guide assembly shown in FIG. 40 with vacuum attachment shown in FIG. 40 inserted therein, which may be inserted therein in accordance with one of more embodiments.
Figure 42:
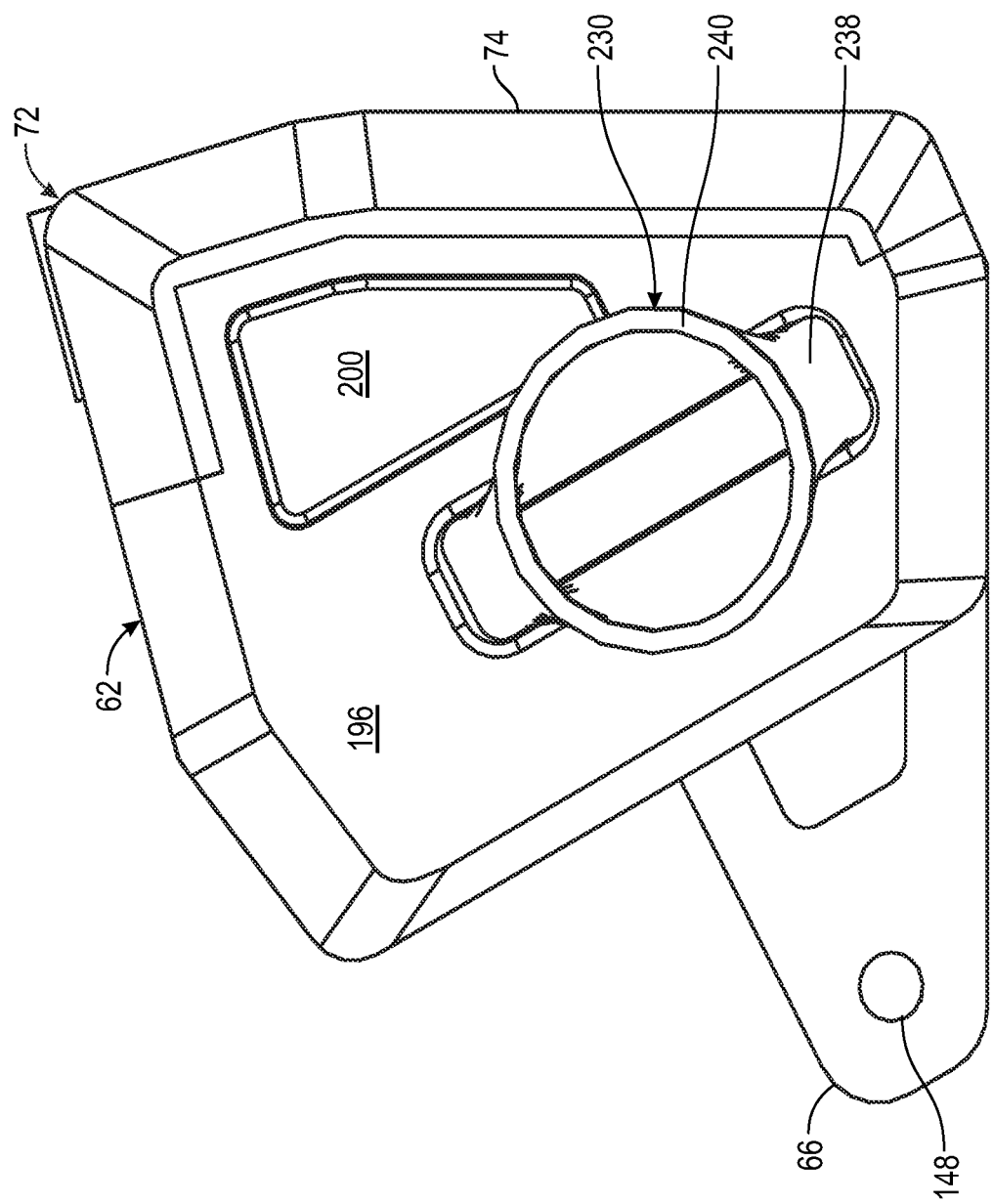
FIG. 42 shows a right side view of the drill guide assembly shown in FIG. 40 with vacuum attachment shown in FIG. 40 inserted therein, which may be inserted therein in accordance with one of more embodiments.
Figure 43:
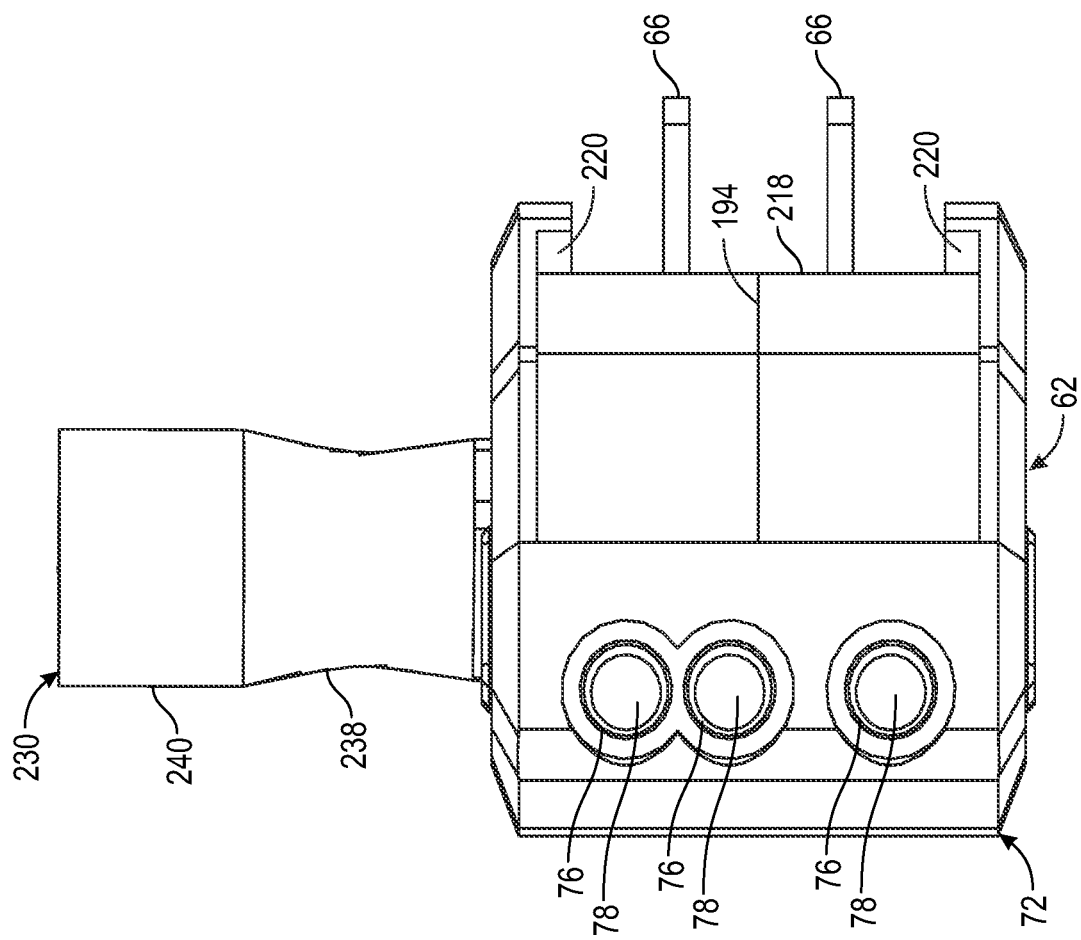
FIG. 43 shows a top side view of the drill guide assembly and vacuum attachment shown in FIG. 42, in accordance with one of more embodiments.
Figure 44:
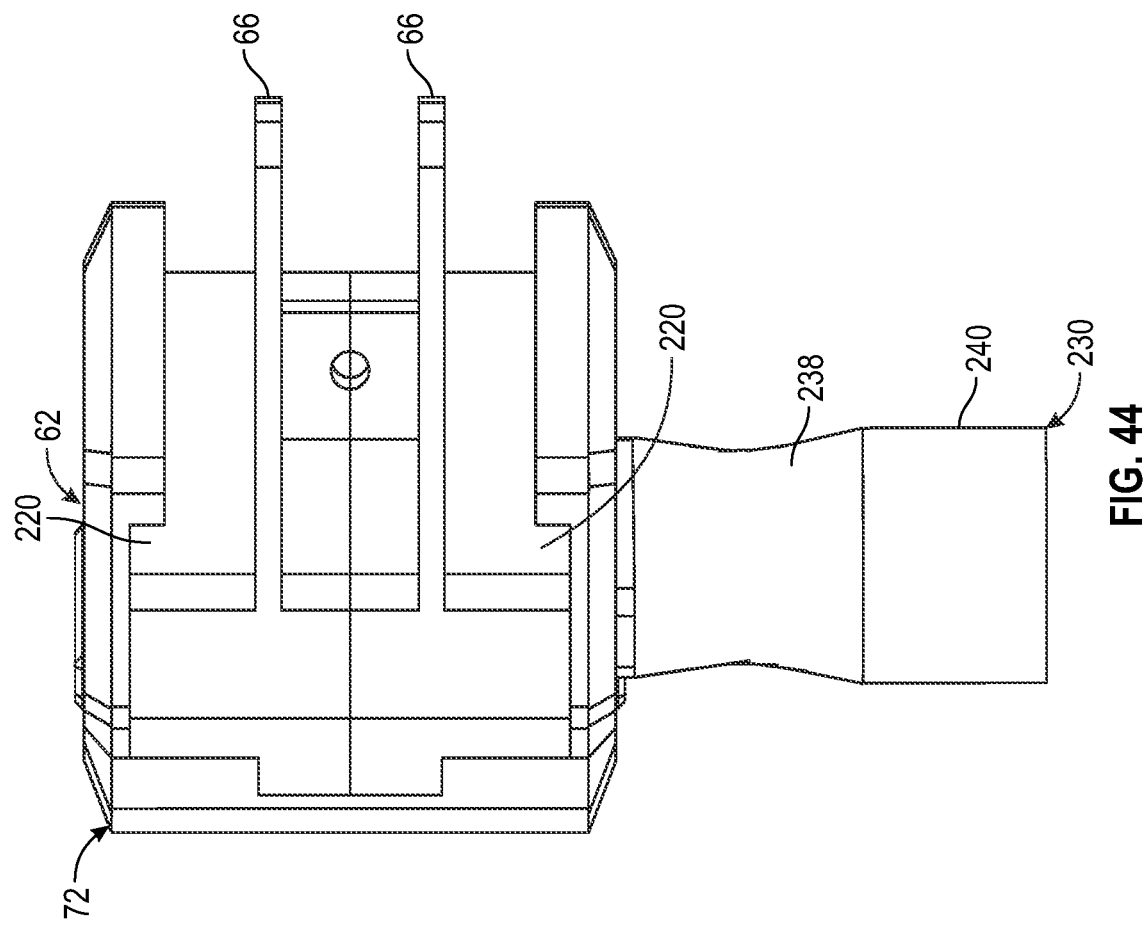
FIG. 44 shows a bottom top side view of the drill guide assembly and vacuum attachment shown in FIG. 42, in accordance with one of more embodiments.
Figure 45:
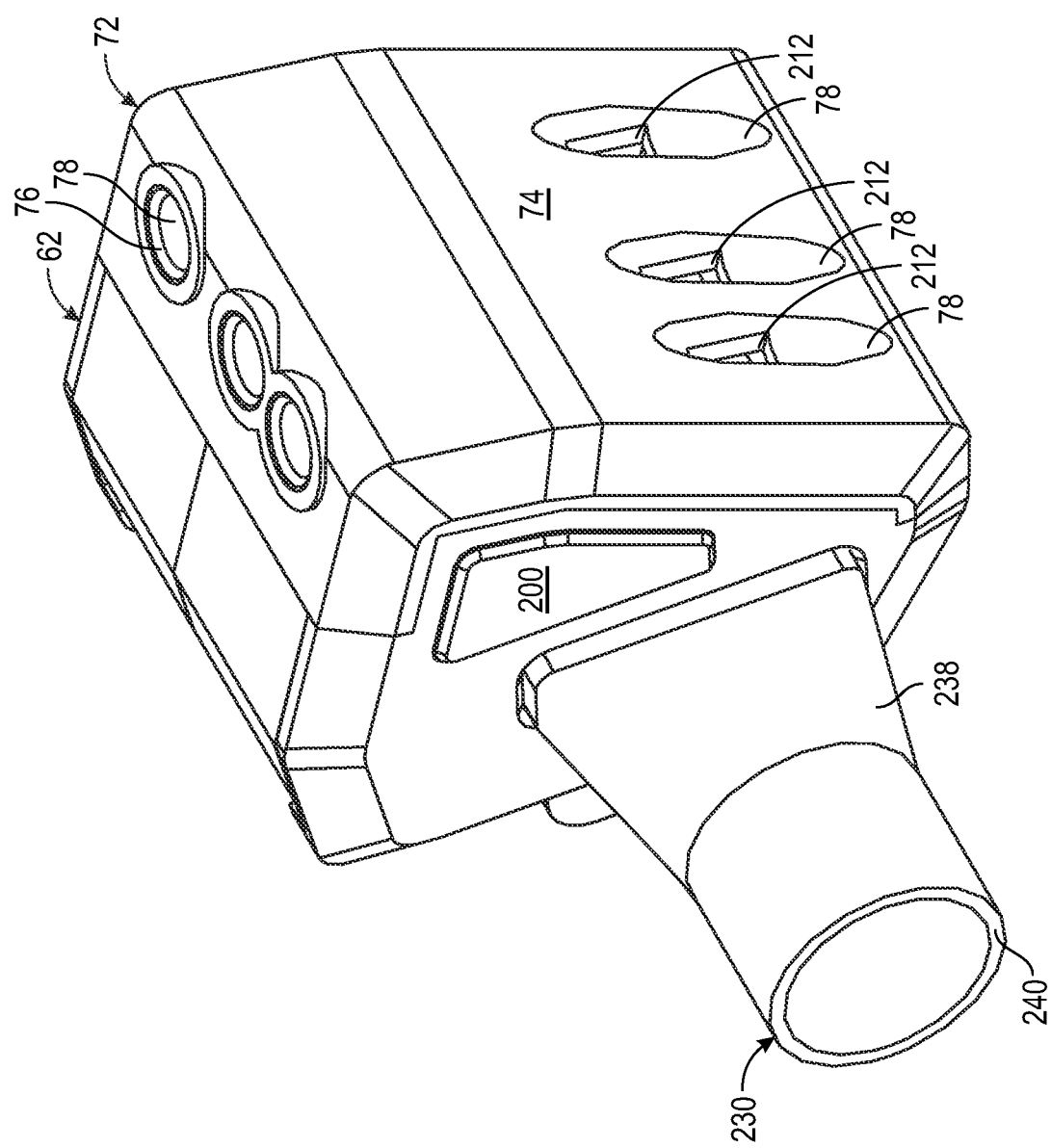
FIG. 45 shows a perspective view of the drill guide assembly and vacuum attachment shown in FIG. 42, in accordance with one of more embodiments.
Figure 46:
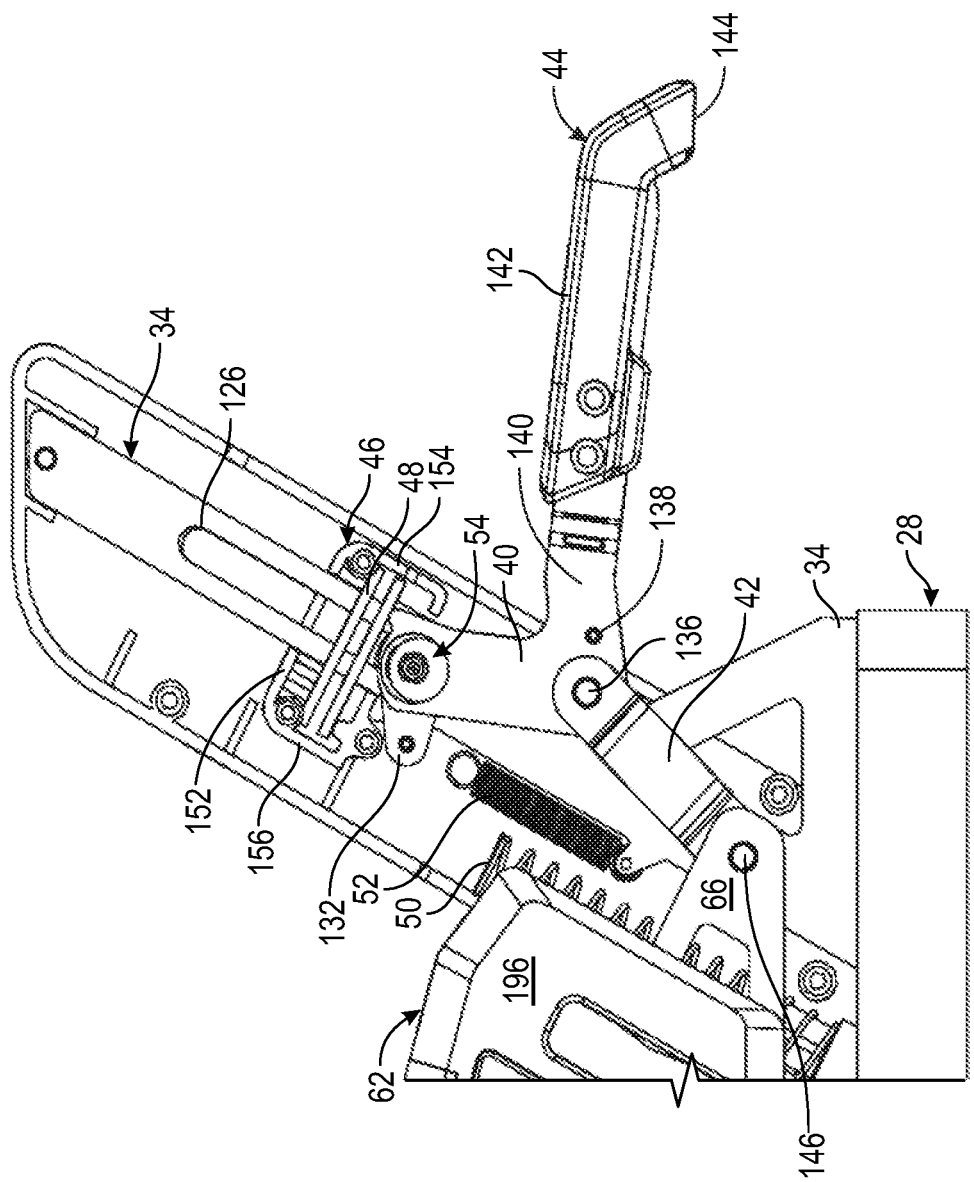
FIG. 46 shows a close-up left side view of the self-adjusting pocket hole jig system shown in FIG. 1 with cut away section of upright element, in accordance with one or more embodiments.
Figure 47:
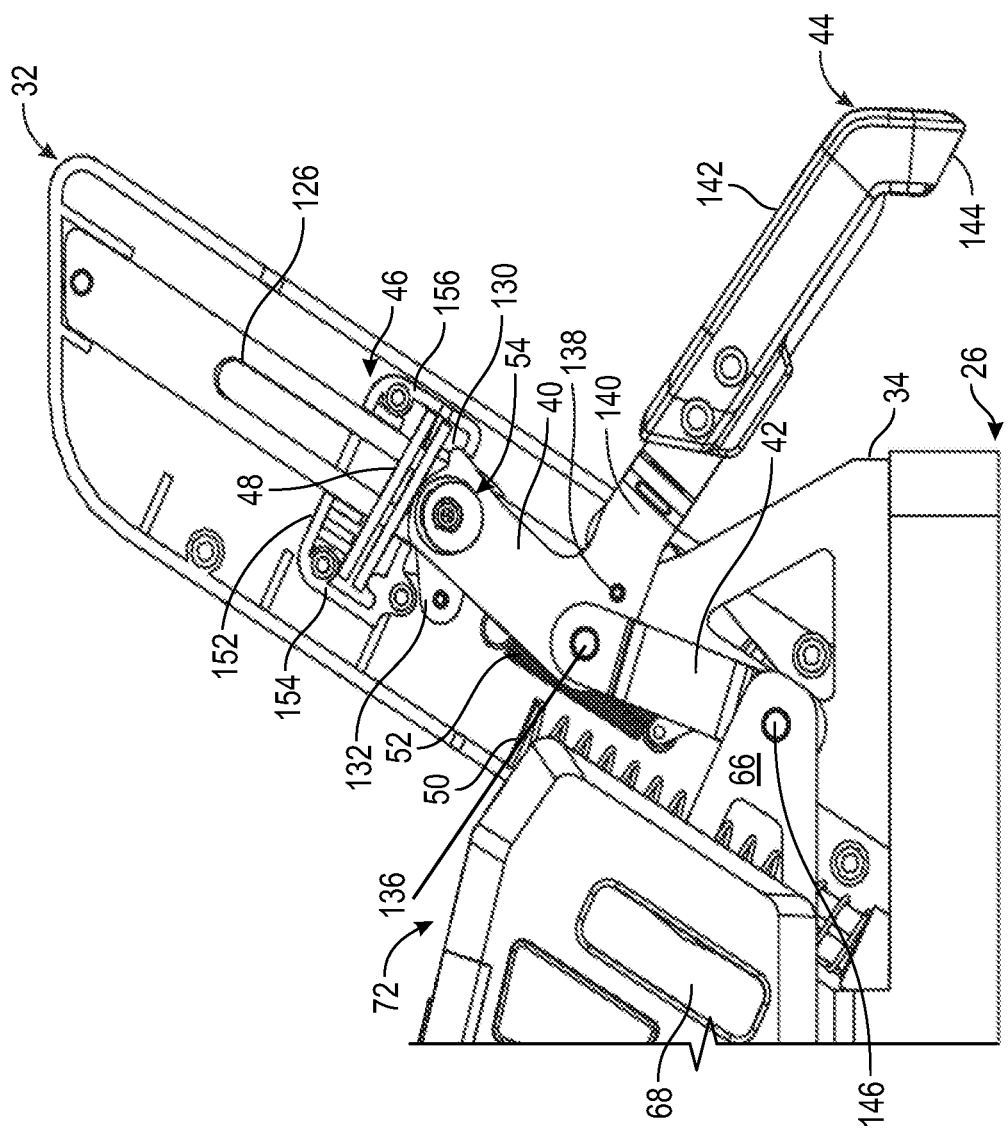
FIG. 47 shows a close-up left side view of the self-adjusting pocket hole jig system shown in FIG. 46 with cut away section of upright element and with handle 44 in a lower position to cause clamping face 74 of drill guide block 72 to be positioned closer to the base, in accordance with one or more embodiments.

Alternative Arrangement—Benchtop Arrangement:

FIGS. 1-61 show an embodiment of self-adjusting pocket hole jig system 10 that includes base 26 that is attached to, and integral with, upright assembly 32. In an alternative arrangement, it is hereby contemplated that self-adjusting pocket hole jig system 10 may be used without base 26. In this arrangement, upright assembly 32 is installed onto another component, such as a benchtop or work bench, that serves as base 26 having a horizontal portion and a vertical portion that serve as lower portion 28 and back stop 30 of base 26 as is shown herein. Once upright assembly 32 is installed onto such as benchtop or work bench, the self-adjusting pocket hole jig system 10 operates in the manner described herein. In one arrangement, to facilitate easier installation of upright assembly 32 onto a benchtop, the lower surface of platform 180 is flat so as to easily install onto a benchtop such as by the insertion of screws or bolts through the through holes 182 in the corners of platform 180 and into the benchtop.

Alternative Arrangement—Automaxx Self-Adjusting Clamping Mechanism:

With reference to FIGS. 62-74 an alternative arrangement of self-adjusting pocket hole jig system 10 is presented. This alternative arrangement presented in FIGS. 62-74 is similar to the self-adjusting pocket hole jig system 10 is presented in FIGS. 1-61, and therefore, unless specifically stated otherwise, the teachings presented herein apply to the embodiment presented in FIGS. 62-74.

In the arrangement shown, as one example, self-adjusting pocket hole jig system 10 utilizes a self-adjusting clamping mechanism 244 similar to that presented in Applicant's U.S. patent application Ser. No. 15/188,151 entitled Self-Adjusting Clamp System filed on Jun. 21, 2016 and published as US 2016-0368119 A1 on Dec. 22, 2016 which is fully incorporated by reference herein. This product is sold by Applicant under the trademark Automaxx. In this arrangement, as one example, self-adjusting clamping mechanism 244 includes a wedge lock 246 and an activator wedge 248 which are separated by a separation plate 250 such as that presented in the incorporated by reference patent application. The self-adjusting clamping mechanism 244 self-adjusts and facilitates clamping in the manner described by the incorporated by reference patent application in association with the modifications presented herein with the association of clamping assembly with upper link 40, lower link 42, handle 44, base 26 and drill guide assembly 62 and drill guide block 72 as well as the other features and components presented and described and shown herein.

Alternative Arrangement—Ratcheting Self-Adjusting Clamping Mechanism:

With reference to FIGS. 75-89 an alternative arrangement of self-adjusting pocket hole jig system 10 is presented. This alternative arrangement presented in FIGS. 75-89 is similar to the self-adjusting pocket hole jig system 10 is presented in FIGS. 1-74, and therefore, unless specifically stated otherwise, the teachings presented herein apply to the embodiment presented in FIGS. 75-89.

In the arrangement shown, as one example, self-adjusting pocket hole jig system 10 utilizes a self-adjusting clamping mechanism 252 that interacts with a ratchet surface 254 in an interior side 256 of the forward wall 258 of upright assembly 32 opposite forward side 172. In this arrangement, as one example, self-adjusting clamping mechanism 252 includes a carrier 260 that slides up and down within upright assembly 32 and includes a clutch member 262 that interacts with teeth of the ratchet surface 254 positioned on the interior side 256 of forward wall 258. The self-adjusting clamping mechanism 252 self-adjusts and facilitates clamping in a similar manner to that described herein with the clamping assembly 32 having an upper link 40, lower link 42, handle 44, base 26 and drill guide assembly 62 and drill guide block 72 as well as the other features and components presented and described and shown herein with the addition that upon clamping, the lower end of clutch member 262 pivots forward under the force of protrusion 130 at the upper end of upper link 40 and engages at least one tooth of the ratchet surface 254 with at least one tooth of its own thereby locking the carrier 260 in position along upright assembly 32.

Alternative Arrangement—Spring and Tube Self-Adjusting Clamping Mechanism:

With reference to FIGS. 90-103 an alternative arrangement of self-adjusting pocket hole jig system 10 is presented. This alternative arrangement presented in FIGS. 90-103 is similar to the self-adjusting pocket hole jig system 10 is presented in FIGS. 1-89, and therefore, unless specifically stated otherwise, the teachings presented herein apply to the embodiment presented in FIGS. 90-103.

In the arrangement shown, as one example, self-adjusting pocket hole jig system 10 utilizes a self-adjusting clamping mechanism 264 having a cylindrical tube 266 with a spring 268 positioned around tube 266 and constrained between an upper stop surface 270 and a lower stop surface 272. A collar 274 is connected to the upper end of upper link 40. Collar 274 is positioned above lower stop surface 272 and the lower end of spring 268. Spring 268 is constrained between the upper surface of collar 274 and the upper stop surface 270. In one arrangement, a second spring 276, like first return spring 50 is used to force drill guide assembly 62 upward to a non-clamping position.

In this arrangement, as handle 44 is lowered after workpiece 24 is engaged, collar 274 begins to move upward along tube 266 until protrusion 130 engages the side of tube 266 at a slightly over-center condition thereby clamping and locking workpiece 24 in place between clamping face 74 and backstop 30.

Alternative Arrangement:

With reference to FIG. 105-123 an alternative arrangement of a self-adjusting pocket hole jig system 10 is presented. This alternative arrangement of a self-adjusting pocket hole jig system 10 presented in FIG. 105 through FIG. 123 is similar to the configuration of self-adjusting pocket hole jig system 10 presented in FIG. 1 through FIG. 61. For this reason, unless specifically stated otherwise, all of the teaching and disclosure presented with respect to the arrangement presented in FIG. 1 through FIG. 61 applies equally to the arrangement presented in FIG. 105 through FIG. 123. In addition, unless specifically stated otherwise, while the embodiments are different, all of the teaching and disclosure presented with respect to the arrangements presented in FIG. 62-104 apply equally to the arrangement presented in FIG. 105-123.

The alternative arrangement presented in FIG. 105-123 is a revision to the arrangement presented in FIG. 1 through FIG. 61.

Grippy Material:

In one arrangement, some or all of the surfaces of self-adjusting pocket hole jig system 10 that engage workpiece 24 are partially or wholly covered by a compressible material that has a high coefficient of friction. This compressible material with a high coefficient of friction helps to hold workpiece 24 in place within self-adjusting pocket hole jig system 10 as well as reduces the amount of clamping pressure required to adequately hold workpiece 24 in place. This is because this grippy material has a high coefficient of friction making it less likely that workpiece 24 will slide or shift after being clamped.

In one arrangement, this compressible material and/or material having a high coefficient of friction, covers some or all of the upper surface or resting surface 84 of lower portion 28 of base 26, the clamping surface 108 of backstop 30, and/or the clamping face 74 of drill guide block 72 or any combination thereof. In contrast, the material that forms the underlying components, e.g. base 26, lower portion 28, backstop 30, drill guide block 72, is formed of a hard and rigid and durable material, such as a plastic, nylon, metal or the like. While these hard, rigid and durable materials provide a strong jig 10, they do not have a high coefficient of friction. As such, additional clamping pressure is required to secure workpiece 24 in place. The addition of a grippy material having a higher coefficient of friction as compared to the underlying material of jig 10 reduces the clamping pressure required to secure the workpiece 24.

This grippy material may be molded onto jig 10, formed as part of jig 10, adhered to jig 10, sprayed on jig 10, deposited on jig 10, connected to jig 10 or added in any other manner, method or means or any combination thereof. In the arrangement shown, as one example, this grippy material is added as a grip pad 300 placed on clamping surface 108 that covers most of clamping surface 108 of backstop 30. In this way, when a workpiece 24 is clamped in place, drill guide block 72 forces workpiece 24 against grip pad 300. The high coefficient of friction of grip pad 300 helps to hold workpiece 24 in place. The presence of grip pad 300 provides greater grip at the same clamping force as compared to grip pad 300 or grippy material not being present and instead the workpiece 24 engaging the hard, rigid and durable underlying material of jig 10.

Clamp Recess 302:

In the arrangement shown, as one example, with reference to FIG. 105 through FIG. 123 self-adjusting pocket hole jig system 10 includes one or more clamp recesses 302. Clamp recess 302 is formed of any suitable size, shape and design and is configured to receive a portion of a clamp, such as a conventional C-clamp, project clamp, or any other form of a clamp, therein so as to facilitate clamping of self-adjusting pocket hole jig system 10 to a work surface, such as a table, bench, board, sawhorse, or the like.

In the arrangement shown, as one example, clamp recess 302 is a t-shaped slot or a square-shaped opening or a rectangular shaped opening, or any other opening that extends inward a distance into self-adjusting pocket hole jig system 10 and receives a portion of a clamp therein that facilitates clamping of the self-adjusting pocket hole jig system 10 in place. This clamp recess 302 is configured to receive an arm of a clamp therein thereby allowing jig system 10 to be clamped to a work surface in a convenient, easy, simple, safe and secure manner. Further information regarding clamp recess 302 is more fully presented in Applicant's U.S. Provisional Patent Application No. 62/950, 189 filed Dec. 19, 2019, entitled: "DOCKING STATION SYSTEM" which is fully incorporated by reference herein. However, other sizes, shape and design is hereby contemplated for use as clamp recess 302

In the arrangement shown, as one example, a clamp recess 302 is positioned in the rearward end 82 of lower portion 28 of base 26. This clamp recess 302 enables self-adjusting pocket hole jig system 10 to be clamped from its rearward end in an upright manner. This is useful for drilling on small to medium sized workpieces 24.

In the arrangement shown, as one example, a clamp recess 302 is positioned in the forward end of lower portion 28 of base 26 at the intersection of lower portion 28 of base 26 and backstop 30 of base 26. This clamp recess 302 enables self-adjusting pocket hole jig system 10 to be clamped from its forward end in an upright manner. This is useful for drilling on small to medium sized workpieces 24.

In the arrangement shown, as one example, a clamp recess 302 is positioned in the upper end 110 of backstop 30 of base 26. This clamp recess 302 enables self-adjusting pocket hole jig system 10 to be clamped from its forward end in a horizontal manner as compared to clamping using the other clamp recesses 302 in lower portion 28 of base 26. That is, using clamp recess 302 in the upper end 110 of backstop 30 of base 26 allows for self-adjusting pocket hole jig system 10 to be clamped in a 90° orientation as compared to using the other clamp recesses 302 in the lower portion 28 of base 26. This is useful for drilling on large or long workpieces 24 such as large sheets of plywood and long lengths of dimension lumber.

Wings 304:

In the arrangement shown, as one example, with reference to FIG. 105 through FIG. 123 self-adjusting pocket hole jig system 10 includes one or more wings 304. Wings 304 are formed of any suitable size, shape and design and are configured to move between a retracted position, wherein wings 304 are tucked into the sides 80 of lower portion 28 of base 26, and an extended position, wherein wings 304 are extended or pivoted outward from the sides 80 of lower portion 28 of base 26. In the arrangement shown, as one example, a wing 304 is connected to each side 80 of the lower portion 28 of base 26 adjacent the resting surface 84. In the arrangement shown, as one example, the upper surface 306 of wings 304 extend in a generally flat and flush parallel planar alignment to the resting surface 84 of lower portion 28 of base 26. In this way, regardless whether wings 304 are extended or retracted the upper surface 306 of wings 304 are flat and flush with the resting surface 84 of lower portion 28 of base 26. In this way, the presence of wings 304 does not disturb the resting surface 84 of lower portion 28 of base 26, and instead, the presence of wings 304 can extend the resting surface 84 of lower portion 28 of base 26.

In the arrangement shown, as one example, the forward end 308 of wings 304 connect to the lower portion 28 of base 26 at a pivot point. This connection of wings 304 to lower portion 28 of base 26 at a pivot point at forward end 308 allows wings 304 to rotate between a retracted position, wherein wings 304 are tucked in along the sides 80 of lower portion 28 of base 26, and an extended position, wherein wings 304 are extended in an approximate perpendicular alignment to the forward-to-back length of lower portion 28 of base 26.

In this extended position, the upper surface 306 of wings 304 extend the support for workpiece 24 out to the side of lower portion 28 of base 26 the length of wings 304. This provides additional support for longer workpieces 24.

In the arrangement shown, as one example, a plurality of supports 310 extend downward from upper surface 306 of wings 304 and establish a plane at their lower end that wings 304 rest upon when placed on a work surface such as a bench, table or the like. In this way, supports 310 provide strength and rigidity to wings 304 as well as stability to wings 304.

In the arrangement shown, as one example, recess 312 is placed just rearward of the rearward end 314 of wings 304 in the side 80 of lower portion 28 of base 26. This recess 312 is configured to allow a user to place their finger or a tool into contact with the rearward end 314 of wing 304 so as to move wing 304 from a retracted position to an extended position. To move wing 304 from a retracted position to an extended position, as well as to move wing 304 from an extended position to a retracted position, the wing 304 may simply be rotated into position upon the pivot point established by the connection between lower portion 28 of base 26 and forward end 308 of wing 304. As such, extending and retracting wings 304 is quick, easy and user friendly.

In one of more embodiments, the connection between the forward end 308 of wings 304 and lower portion 28 of base 26 has sufficient friction to hold wing 304 in the user-set extended position. That is, wings 304 remain in an extended position until a user moves them to a retracted position. Similarly, in the arrangement shown, as one example, the connection between the wings 304 and lower portion 28 of base 26 has sufficient friction to hold wing 304 in the user-set retracted position. That is, wings 304 remain in a retracted position until a user moves them to an extended position. As such, this prevents unintentional movement of wings 34. Additionally or alternatively, in one or more embodiments, the base 26 and/or wings may include a locking mechanism configured and arranged to lock wings in an extended and/or retracted position.

Center Support 34:

In the arrangement shown, as one example, with reference to FIG. 105 through FIG. 123 self-adjusting pocket hole jig system 10 includes a center support 34. In the arrangement shown, as one example, with reference to FIG. 105 through FIG. 123, center support 34 extends through upright assembly 32, through lower portion 28 of base 26 and through backstop 30 of base 26. In the arrangement shown, as one example, center support 34 is formed of a strong, rigid and durable metallic material. In contrast, upright assembly 32, lower portion 28 of base 26 and backstop 30 of base 26 may be formed of a non-metallic material such as a plastic, a nylon, a composite, a fiberglass or any other non-metallic material or any combination thereof. While upright assembly 32, lower portion 28 of base 26 and backstop 30 of base 26 are formed of strong and rigid materials, the addition of center support 34 extending through all of these components provides additional strength and rigidity.

In particular, by having center support 34 extend upward within backstop 30 of base 26, this substantially prevents or reduces the flexion of backstop 30 when clamping force is applied by clamping assembly 38 onto workpiece 24 which applies force onto backstop 30 of base 26. That is, by completing the U-shaped profile of center support 34, and extending center support 34 through all of upright assembly 32, lower portion 28 of base 26 and backstop 30 of base 26 this increases the strength and rigidity of the self-adjusting pocket hole jig system 10 and increases the accuracy of the pocket holes it drills by reducing or eliminating flexing of the system 10 under clamping pressure.

Storage Features 316:

In the arrangement shown, as one example, with reference to FIG. 105 through FIG. 123 self-adjusting pocket hole jig system 10 includes storage features 316. Storage features 316 are formed of any suitable size, shape and design and are configured to hold and store components that are needed or useful when using self-adjusting pocket hole jig system 10.

In the arrangement shown, as one example, storage features 316 are positioned in the forward side of backstop 30.

In the arrangement shown, as one example, storage features 316 are sized and shaped to frictionally hold a stepped drill bit 318 and stop collar 320, Allen wrench 322, short driver 324 and long driver 326 therein among any other tool, part, component or the like.

Objectives Met:

In this way the system 10 is used to form pocket hole and all of the objectives of the disclosure are met. That is, the self-adjusting pocket hole jig system presented herein: improves upon the state of the art; is easy to use; is efficient; can be used with any type of workpiece; is cost effective; forms accurate pocket holes; is safe to use; has a durable design; has a long useful life; provides additional functionality for pocket hole jigs and pocket hole joinery; has a wide variety of uses; has a wide variety of applications; provides cost savings to a user; is relatively inexpensive; provides value; prevents or reduces relative movement between the pocket hole jig and the workpiece; reduces the amount of clamping pressure required to adequately clamp a pocket hole jig to a workpiece; facilitates the formation of aesthetically pleasing finished products; provides a clamping with a single movement of a handle; facilitates easier clamping; facilitates raising and lowering of the drill guide assembly with a single movement of the handle; facilitates easy release of the clamping mechanism; facilitates easy return of the clamping mechanism to a non-clamping position; facilitates easy adjustment of the clamping pressure; facilitates stable placement when used horizontally; facilitates stable placement when used vertically; facilitates easy removal of chips and debris during use; is comfortable to use; is more stable than other pocket hole jigs; facilitates automatic return of the clamping assembly to a non-clamping position; facilitates spring loaded return of the clamping assembly to a non-clamping position; improves the ergonomics of use; easily adjusts to workpieces of various thickness; adjusts the drill guide assembly to the optimum position for each workpiece; consistently applies the same clamping pressure regardless of workpiece thickness, improves the intuitiveness of drilling pocket hole jigs; improves the usability of pocket hole jigs; reduces set-up time; provides a single touch point for clamping and adjusting the position of the drill guide assembly; provides convenient woodchip, dust and debris removal; provides easy removal and replacement of drill guide blocks, among countless other features and benefits.

Although specific embodiments have been illustrated and described herein, it will be appreciated by those of ordinary skill in the art that other arrangements calculated to achieve the same purpose may be substituted for the specific embodiments shown. This application is intended to cover any adaptations or variations of the disclosed embodiments. It is intended that this disclosure be limited only by the following claims, and the full scope of equivalents thereof. To be clear, the term "operatively", as used in the claims, such as when a claim states "operably connected" or "connected in an operable manner" or similar language is intended to mean connected by any manner, method or means, including directly connected, indirectly connected, connected by intervening or intermediary parts, pieces or components, connected as separate components, connected as a single component, or connected in any manner that facilitates operation. In this ways, the term "operatively" is intended to be broadly interpreted as connected in any way and does not require direct connection but may include a direct connection and may include being formed of a single member or formed of a plurality of members that are connected to one another. A direct connection between two parts or components is only required when a claim states "directly connected" "directly engaged" "connected directly to" or similar language.

What is claimed:

1. A pocket hole jig system, comprising;
a base;
an upright assembly;
the upright assembly operably connected to the base;
a clamping assembly;
the clamping assembly operably connected to the upright assembly;
a handle;
the handle operably connected to the clamping assembly;
a drill guide assembly;
the drill guide assembly operably connected to the clamping assembly;
wherein the drill guide assembly moves along the upright assembly between an unclamped position and a clamped position;
wherein the handle is configured to be moveable between a raised position and a lowered position;
wherein a single movement of the handle from the raised position to the lowered position simultaneously adjusts the height of the drill guide assembly, facilitates clamping of the drill guide assembly for workpieces of various thicknesses, and locks the drill guide assembly in the clamped position.

2. The system of claim 1, wherein the base is L-shaped.

3. The system of claim 1, wherein the base has a lower portion and a backstop, wherein the backstop is positioned opposite the upright assembly.

4. The system of claim 1, wherein the upright assembly is directly connected to the base.

5. The system of claim 1, wherein the upright assembly is formed as part of the base.

6. The system of claim 1, wherein the upright assembly connects at its lower end to the base and extends upward and away from a backstop of the base at an angle.

7. The system of claim 1, wherein the upright assembly extends upward and away from the base at an angle such that the drill guide assembly moves downward and forward toward a workpiece when the handle is moved from the raised position to the lowered position.

8. The system of claim 1, wherein a workpiece is clamped between a backstop of the base and a forward face of the drill guide assembly.

9. The system of claim 1, wherein the drill guide assembly has at least one drill guide therein that defines a bore that extends through a forward face of the drill guide assembly at an angle.

10. The system of claim 1, further comprising a clamp force adjustment mechanism operably connected with the clamping assembly, wherein the clamp force adjustment mechanism adjusts the clamping pressure applied on a workpiece.

11. The system of claim 1, wherein the clamping assembly includes a linkage assembly that clamps a workpiece in an over-center condition.

12. The system of claim 1, further comprising a return spring wherein the return spring facilitates automatic return of the drill guide assembly to the unclamped position.

13. The system of claim 1, wherein the drill guide assembly includes a removable drill guide block.

14. The system of claim 1, wherein the drill guide assembly includes an opening therein that receives a dust collection member therein that facilitates removal of woodchips, dust and debris generated during drilling.

15. The system of claim 1, wherein the user only moves the handle to adjust the height of the drill guide assembly, based on thickness of a workpiece, as well as to clamp the workpiece.

16. The system of claim 1, wherein movement of the handle from the raised position to the lowered position automatically lowers the drill guide assembly to the appropriate height for workpieces of different thicknesses.

17. The system of claim 1, wherein movement of the handle from the raised position to the lowered position automatically moves the drill guide assembly to the appropriate forward position for a workpiece based on thickness of the workpiece.

18. The system of claim 1, wherein movement of the handle from the raised position to the lowered position automatically applies approximately a set clamping pressure on workpieces of different thickness.

19. The system of claim 1, wherein the handle moves in a single plane to facilitate clamping as well as unclamping of the workpiece.

20. A pocket hole jig system, comprising;
a base;
an upright assembly;
the upright assembly operably connected to the base;
a clamping assembly;
the clamping assembly operably connected to the upright assembly;
a handle;
the handle operably connected to the clamping assembly;
wherein the handle is moveable between a raised position and a lowered position;
a drill guide assembly;
the drill guide assembly operably connected to the clamping assembly;
wherein the drill guide assembly moves along the upright assembly between an unclamped position and a clamped position;
wherein a single movement of the handle from the raised position to the lowered position simultaneously adjusts the vertical position of the drill guide assembly as well as the lateral position of the drill guide assembly thereby facilitating clamping of the drill guide assembly for workpieces of various thicknesses, and places the clamping assembly in an over center position, in which the clamping assembly is held in the clamped position by forces generated through the clamping.

21. A pocket hole jig system, comprising;
a base;
an upright assembly operably connected to the base;
a clamping assembly operably connected to the upright assembly;
a handle operably connected to the clamping assembly;
wherein the handle is moveable between a raised position and a lowered position;
a drill guide assembly operably connected to the clamping assembly;
wherein movement of the handle from the raised position to the lowered position automatically adjusts the height of the drill guide assembly to facilitates clamping of workpieces of various thicknesses and locks drill guide assembly in position to complete a clamping process.

22. A pocket hole jig system, comprising;
a base;
an upright assembly operably connected to the base;
a clamping assembly operably connected to the upright assembly;
a handle operably connected to the clamping assembly;

a drill guide assembly operably connected to the clamping assembly;

wherein movement of the handle from a raised position to a lowered position causes the drill guide assembly to move downward and forward toward a workpiece to facilitating clamping of workpieces of various thicknesses and complete a clamping process.

23. A pocket hole jig system, comprising;
a base;
an upright assembly operably connected to the base;
a clamping assembly operably connected to the upright assembly;
a handle operably connected to the clamping assembly;
a drill guide assembly operably connected to the clamping assembly;
wherein movement of the handle from an unclamped position to a clamped position causes the drill guide assembly to move downward and forward toward a workpiece thereby facilitating clamping of workpieces of various thicknesses with a single movement.

24. A pocket hole jig system, comprising;
a base;
the base having a lower potion and a backstop;
an upright assembly operably connected to the lower portion of the base;
a clamping assembly operably connected to the upright assembly;
a handle operably connected to the clamping assembly;
a drill guide assembly operably connected to the clamping assembly;
wherein the upright assembly angles upward and away from the backstop of the base;
wherein movement of the handle from an unclamped position to a clamped position causes the drill guide assembly to move downward and forward toward a workpiece thereby facilitating clamping of workpieces of various thicknesses with a single movement between the clamping assembly and the backstop of the base.

25. A pocket hole jig system, comprising;
a base;
an upright assembly operably connected to the base;
a clamping assembly operably connected to the upright assembly;
a handle operably connected to the clamping assembly;
a drill guide assembly operably connected to the clamping assembly;
wherein movement of the handle from an unclamped position to a clamped position causes the drill guide assembly to move downward and forward toward a workpiece thereby facilitating clamping of workpieces of various thicknesses with a single movement of the handle from a raised position to a lowered position.

* * * * *

UNITED STATES PATENT AND TRADEMARK OFFICE
CERTIFICATE OF CORRECTION

PATENT NO. : 11,364,551 B2
APPLICATION NO. : 16/788440
DATED : June 21, 2022
INVENTOR(S) : Shelby Strempke et al.

It is certified that error appears in the above-identified patent and that said Letters Patent is hereby corrected as shown below:

In the Claims

Column 42 Lines 47-61 Claim 21 should read as follows:
A pocket hole jig system, comprising; a base; an upright assembly operably connected to the base; a clamping assembly operably connected to the upright assembly; a handle operably connected to the clamping assembly; wherein the handle is moveable between a raised position and a lowered position; a drill guide assembly operably connected to the clamping assembly; wherein movement of the handle from the raised position to the lowered position automatically adjusts the height of the drill guide assembly to facilitate clamping of workpieces of various thicknesses and locks drill guide assembly in position to complete a clamping process.

Column 42 Lines 62-Column 43 Line 7 Claim 22 should read as follows:
A pocket hole jig system, comprising; a base; an upright assembly operably connected to the base; a clamping assembly operably connected to the upright assembly; a handle operably connected to the clamping assembly; a drill guide assembly operably connected to the clamping assembly; wherein movement of the handle from a raised position to a lowered position causes the drill guide assembly to move downward and forward toward a workpiece to facilitate clamping of workpieces of various thicknesses and complete a clamping process.

Column 43 Lines 21-Column 44 Line 11 Claim 24 should read as follows:
A pocket hole jig system, comprising; a base; the base having a lower portion and a backstop; an upright assembly operably connected to the lower portion of the base; a clamping assembly operably connected to the upright assembly; a handle operably connected to the clamping assembly; a drill guide assembly operably connected to the clamping assembly; wherein the upright assembly angles upward and away from the backstop of the base; wherein movement of the handle from an unclamped position to a clamped position causes the drill guide assembly to move downward and forward toward a workpiece thereby facilitating clamping of workpieces of various thicknesses with a single movement between the clamping assembly and the backstop of the base.

Signed and Sealed this
Thirteenth Day of September, 2022

Katherine Kelly Vidal
*Director of the United States Patent and Trademark Office*